(12) United States Patent
Yatake et al.

(10) Patent No.: US 8,556,400 B2
(45) Date of Patent: Oct. 15, 2013

(54) INKJET RECORDING INK

(75) Inventors: Masahiro Yatake, Nagano-ken (JP); Motoki Masuda, Nagano-ken (JP); Jyun Ito, Nagano-ken (JP); Yasuhiro Oki, Nagano-ken (JP); Hiroko Hayashi, Nagano-ken (JP)

(73) Assignee: Seiko Epson Corporation (JP)

( * ) Notice: Subject to any disclaimer, the term of this patent is extended or adjusted under 35 U.S.C. 154(b) by 1229 days.

(21) Appl. No.: 11/660,812

(22) PCT Filed: Oct. 24, 2005

(86) PCT No.: PCT/JP2005/019513
§ 371 (c)(1),
(2), (4) Date: Feb. 22, 2007

(87) PCT Pub. No.: WO2006/043700
PCT Pub. Date: Apr. 27, 2006

(65) Prior Publication Data
US 2007/0263054 A1 Nov. 15, 2007

(30) Foreign Application Priority Data

| Oct. 22, 2004 | (JP) | 2004-307763 |
|---|---|---|
| Mar. 29, 2005 | (JP) | 2005-094813 |
| Mar. 29, 2005 | (JP) | 2005-094818 |
| Mar. 29, 2005 | (JP) | 2005-094819 |
| Mar. 29, 2005 | (JP) | 2005-094820 |
| Oct. 5, 2005 | (JP) | 2005-292131 |
| Oct. 5, 2005 | (JP) | 2005-292132 |
| Oct. 5, 2005 | (JP) | 2005-292133 |
| Oct. 5, 2005 | (JP) | 2005-292134 |
| Oct. 5, 2005 | (JP) | 2005-292135 |
| Oct. 5, 2005 | (JP) | 2005-292136 |
| Oct. 5, 2005 | (JP) | 2005-292139 |
| Oct. 5, 2005 | (JP) | 2005-292140 |
| Oct. 5, 2005 | (JP) | 2005-292141 |
| Oct. 5, 2005 | (JP) | 2005-292142 |
| Oct. 5, 2005 | (JP) | 2005-292144 |
| Oct. 5, 2005 | (JP) | 2005-292145 |

(51) Int. Cl.
*C09D 11/00* (2006.01)

(52) U.S. Cl.
USPC .......................................... 347/100

(58) Field of Classification Search
USPC .......................................... 347/100
See application file for complete search history.

(56) References Cited

U.S. PATENT DOCUMENTS

| 2,083,372 A | 8/1934 | Guthmann |
| 5,141,556 A | 8/1992 | Matrick |

(Continued)

FOREIGN PATENT DOCUMENTS

| EP | 0 921 166 | 6/1999 |
| EP | 0 974 626 | 1/2000 |

(Continued)

OTHER PUBLICATIONS

Patent Abstracts of Japan 2005-171223 dated Jun. 30, 2005.

(Continued)

*Primary Examiner* — Laura Martin
(74) *Attorney, Agent, or Firm* — Harness, Dickey & Pierce, P.L.C.

(57) ABSTRACT

The present invention aims to provide an ink for ink jet recording that is excellent in storage stability and discharge stability and attains high coloration on regular paper or gloss paper and high glossiness on gloss paper. The ink for ink jet recording of the invention includes: water; and a pigment dispersed by using a polymer which is obtained by polymerizing at least 50% by weight or more of benzylacrylate and 15% by weight or less of (meth)acrylic acid as components of the polymer and has an acid value of no less than 50 mgKOH/g and no more than 120 mgKOH/g and a weight average molecular weight of no less than 10000 and no more than 120000.

30 Claims, 4 Drawing Sheets

(56) References Cited

U.S. PATENT DOCUMENTS

| | | |
|---|---|---|
| 5,156,675 A | 10/1992 | Breton et al. |
| 5,183,502 A | 2/1993 | Meichsner et al. |
| 5,196,056 A | 3/1993 | Prasad |
| 5,356,454 A | 10/1994 | Itoyama et al. |
| 5,356,464 A | 10/1994 | Hiekman et al. |
| 5,439,514 A | 8/1995 | Kashiwazaki et al. |
| 5,531,815 A | 7/1996 | Gundlach et al. |
| 5,534,050 A | 7/1996 | Gundlach |
| 5,540,765 A | 7/1996 | Gundlach et al. |
| 5,772,746 A | 6/1998 | Sawada et al. |
| 6,277,183 B1 | 8/2001 | Johnson et al. |
| 6,284,029 B1 * | 9/2001 | Sano et al. ............ 106/31.6 |
| 6,341,856 B1 | 1/2002 | Thompson et al. |
| 6,378,999 B1 | 4/2002 | Doi et al. |
| 6,783,581 B2 | 8/2004 | Shen et al. |
| 6,800,673 B2 | 10/2004 | Yamanouchi et al. |
| 6,924,327 B2 * | 8/2005 | Sano et al. ............ 523/160 |
| 6,942,723 B2 | 9/2005 | Yatake et al. |
| 6,949,138 B2 | 9/2005 | Nakamura et al. |
| 7,052,537 B2 | 5/2006 | Uhlir-Tsang |
| 7,135,208 B2 | 11/2006 | Kubota |
| 7,229,489 B2 | 6/2007 | Yatake |
| 7,284,851 B2 | 10/2007 | Bannai et al. |
| 7,345,098 B2 | 3/2008 | Mizushima et al. |
| 7,427,641 B2 | 9/2008 | Kataoka et al. |
| 7,442,244 B2 | 10/2008 | Ishihara |
| 7,553,883 B2 | 6/2009 | Yatake |
| 2001/0008908 A1 * | 7/2001 | Parazak ............ 523/160 |
| 2002/0100392 A1 * | 8/2002 | Sano et al. ............ 106/31.6 |
| 2003/0035034 A1 * | 2/2003 | Fukumoto et al. ............ 347/86 |
| 2003/0071883 A1 * | 4/2003 | Suzuki et al. ............ 347/100 |
| 2003/0079647 A1 * | 5/2003 | Kaneko et al. ............ 106/31.43 |
| 2003/0081092 A1 | 5/2003 | Ishizuka et al. |
| 2003/0101906 A1 * | 6/2003 | Shen et al. ............ 106/31.86 |
| 2003/0106462 A1 | 6/2003 | Yatake et al. |
| 2003/0128264 A1 * | 7/2003 | Ishikawa et al. ............ 347/102 |
| 2003/0177945 A1 | 9/2003 | Li et al. |
| 2004/0020406 A1 * | 2/2004 | Kato ............ 106/31.6 |
| 2004/0024086 A1 | 2/2004 | Segawa et al. |
| 2004/0030002 A1 | 2/2004 | Tsuru et al. |
| 2004/0171738 A1 | 9/2004 | Harz et al. |
| 2005/0235870 A1 | 10/2005 | Ishihara |
| 2006/0266260 A1 | 11/2006 | Yatake |
| 2007/0117882 A1 | 5/2007 | Aoyama et al. |
| 2007/0159516 A1 | 7/2007 | Sato et al. |
| 2007/0209550 A1 | 9/2007 | Tsuru et al. |
| 2007/0247496 A1 | 10/2007 | Sekiguchi |
| 2007/0263054 A1 | 11/2007 | Yatake |
| 2008/0213548 A1 | 9/2008 | Koganehira et al. |

FOREIGN PATENT DOCUMENTS

| | | |
|---|---|---|
| EP | 0 997 506 | 5/2000 |
| EP | 1 088 866 | 4/2001 |
| EP | 1245653 A | 3/2002 |
| EP | 1 201 719 | 5/2002 |
| EP | 1 285 949 | 2/2003 |
| EP | 1391489 A1 | 2/2004 |
| EP | 1 630 221 | 3/2006 |
| JP | 56-147861 | 11/1981 |
| JP | 01-301760 | 12/1989 |
| JP | 3-2279 | 1/1991 |
| JP | 08-030158 | 4/1992 |
| JP | 04-239068 | 8/1992 |
| JP | 06-157955 A | 6/1994 |
| JP | 6-508392 | 9/1994 |
| JP | 06-287492 A | 11/1994 |
| JP | 06-306317 | 11/1994 |
| JP | 06-322307 | 11/1994 |
| JP | 07-305009 A | 11/1995 |
| JP | 08-319442 A | 3/1996 |
| JP | 08-183920 | 7/1996 |
| JP | 08-333541 A | 12/1996 |
| JP | 09-003371 A | 1/1997 |
| JP | 09-040895 | 2/1997 |
| JP | 09-111165 | 4/1997 |
| JP | 09-132740 | 5/1997 |
| JP | 10-140065 | 5/1998 |
| JP | 11-061024 A | 3/1999 |
| JP | 11-140356 A | 5/1999 |
| JP | 11-172180 | 6/1999 |
| JP | 11-217532 | 8/1999 |
| JP | 11-228888 | 8/1999 |
| JP | 2000-072864 A | 3/2000 |
| JP | 2000-108495 A | 4/2000 |
| JP | 2000-154227 A | 6/2000 |
| JP | 2000-345090 | 12/2000 |
| JP | 2001-187851 | 7/2001 |
| JP | 2002-020673 | 1/2002 |
| JP | 2002-105351 | 4/2002 |
| JP | 2002-161225 A | 6/2002 |
| JP | 2002-179977 A | 6/2002 |
| JP | 2002-201401 A | 7/2002 |
| JP | 2002-249685 A | 9/2002 |
| JP | 2002-309122 | 10/2002 |
| JP | 2002-322394 | 11/2002 |
| JP | 2002-363470 A | 12/2002 |
| JP | 2003-026966 | 1/2003 |
| JP | 2003-034770 A | 2/2003 |
| JP | 2003-176431 | 6/2003 |
| JP | 2003-238854 | 8/2003 |
| JP | 2003-192956 | 9/2003 |
| JP | 2003-306627 A | 10/2003 |
| JP | 2004-035872 | 2/2004 |
| JP | 2004-050412 | 2/2004 |
| JP | 2004-059932 A | 2/2004 |
| JP | 2004-075988 A | 3/2004 |
| JP | 2004-124081 A | 4/2004 |
| JP | 2004-137357 | 5/2004 |
| JP | 2004-182889 A | 7/2004 |
| JP | 2004-217916 | 8/2004 |
| JP | 2004-261679 | 9/2004 |
| JP | 2004-277450 A | 10/2004 |
| JP | 2004-285161 A | 10/2004 |
| JP | 2004-285172 | 10/2004 |
| JP | 2004-285311 A | 10/2004 |
| JP | 2004-290839 A | 10/2004 |
| JP | 2004-300370 | 10/2004 |
| JP | 2004-315564 A | 11/2004 |
| JP | 2004-535508 | 11/2004 |
| JP | 2004-339282 A | 12/2004 |
| JP | 2005-002186 A | 1/2005 |
| JP | 2005-082607 A | 3/2005 |
| JP | 2005-154548 | 6/2005 |
| JP | 2005-171108 A | 6/2005 |
| JP | 2005-171223 | 6/2005 |
| JP | 2005171223 A * | 6/2005 |
| JP | 2005-179482 | 7/2005 |
| JP | 2005-179842 | 7/2005 |
| JP | 2005-194500 A | 7/2005 |
| JP | 2005-272625 | 10/2005 |
| JP | 2005-281666 | 10/2005 |
| JP | 2005-290044 A | 10/2005 |
| JP | 2005-307184 A | 11/2005 |
| JP | 2006-16412 | 1/2006 |
| JP | 2006-2141 | 5/2006 |
| JP | 2006-182800 A | 7/2006 |
| JP | 2006-274018 A | 10/2006 |
| JP | 2006-274020 | 10/2006 |
| WO | 90/04005 | 4/1990 |
| WO | 92/22614 | 6/1992 |
| WO | 2006/019662 | 2/2006 |
| WO | 2006/043700 A1 | 4/2006 |

OTHER PUBLICATIONS

Patent Abstracts of Japan 2004-217916 dated Aug. 5, 2004.
Patent Abstracts of Japan 2004-261679 dated Sep. 24, 2004.
Patent Abstracts of Japan 2004-137357 dated May 13, 2004.
Patent Abstracts of Japan 2004-050412 dated Feb. 19, 2004.
Patent Abstracts of Japan 2002-309122 dated Oct. 23, 2002.
Patent Abstracts of Japan 2001-187851 dated Jul. 10, 2001.
Patent Abstracts of Japan 2004-035872 dated Feb. 05, 2004.

(56) References Cited

OTHER PUBLICATIONS

Patent Abstracts of Japan 2003-238854 dated Aug. 27, 2003.
Patent Abstracts of Japan 2004-285172 dated Oct. 14, 2004.
Patent Abstracts of Japan 2002-020673 dated Jan. 23, 2002.
Patent Abstracts of Japan 2003-176431 dated Jun. 24, 2003.
Patent Abstracts of Japan 2003-026966 dated Jan. 29, 2003.
Patent Abstracts of Japan 01-301760 dated Dec. 5, 1989.
Patent Abstracts of Japan 10-140065 dated May 26, 1998.
Patent Abstracts of Japan 56-147861 dated Nov. 17, 1981.
Patent Abstracts of Japan 08-183920 dated Jul. 16, 1996.
Patent Abstracts of Japan 09-111165 dated Apr. 28, 1997.
Patent Abstracts of Japan 09-040895 dated Feb. 10, 1997.
Patent Abstracts of Japan 04-239068 dated Aug. 26, 1992.
Patent Abstracts of Japan 06-322307 dated Nov. 22, 1994.
Patent Abstracts of Japan 2004-300370 dated Oct. 28, 2004.
Patent Abstracts of Japan 2005-154548 dated Jun. 16, 2005.
Patent Abstracts of Japan 2002-322394 dated Nov. 8, 2002.
Patent Abstracts of Japan 11-228888 dated Aug. 24, 1999.
Patent Abstracts of Japan 2002-105351 dated Apr. 10, 2002.
Patent Abstracts of Japan 06-306317 dated Nov. 1, 1994.
Patent Abstracts of Japan 11-172180 dated Jun. 29, 1999.
English Abstract of Japanese Application 2006-2141 Published May 1, 2006.
English Abstract of Japanese Application 2003-192956 Published Sep. 7, 2003.
English Abstract of Japanese Application JP2004075988 (A) Published Mar. 11, 2004.
English Abstract of Japanese Application JP2004-124081 (A) Published Apr. 22, 2004.
English Abstract of Japanese Application Mar. 2279 Published Jan. 8, 1991.
English Abstract of Japanese Application 2000-345090 Published Dec. 12, 2000.
English Abstract of Japanese Application 11-217532 Published Aug. 10, 1999.
English Abstract of Japanese Application 09-132740 Published May 20, 1997.
English Abstract of Japanese Application 2005-179482 Published Jul. 7, 2005.
English Patent Abstract of Japanese Application 2004-290830 Published Oct. 21, 2004.
English Patent Abstract of Japanese Application 2004-277450A Published Oct. 7, 2004.
English Patent Abstract of Japanese Application 2004-285311A Published Oct. 14, 2004.
English Patent Abstract of Japanese Application 2006-182800A Published Jul. 13, 2006.
English Patent Abstract of Japanese Application 20040599321A Published Feb. 26, 2004.
English Patent Abstract of Japanese Application 2004-339282A Published Dec. 2, 2004.
English Patent Abstract of Japanese Application 2004-285161A Published Oct. 14, 2004.
English Patent Abstract of Japanese Application 2003-306627 Published Oct. 31, 2003.
English Abstract of Japanese Application 2005-179842 Published Jul. 7, 2005.
Patent English Abstract of Japanese 2006-16412 Published Jan. 19, 2006.
Computer-Generated Translation of Japanese 2005-171108A Published Jun. 30, 2005.
English Abstract of Japanese 06-157955 Published Jun. 7, 1994.
Computer-Generated Translation of Japanese 07-305009 Published Nov. 21, 1995.
English Abstract of Japanese 08-333541A Published Dec. 17, 1996.
English Abstract of Japanese 06-287492A Published Nov. 10, 1994.
Computer-Generated English Translation of Japanese 08-319442A Published Mar. 12, 1996.
English Abstract of Japanese 09-003371A Published Jan. 7, 1997.
Computer-Generated Translation of Japanese 11-061024A Published Mar. 5, 1999.
Computer-Generated Translation of Japanese 2000-154227A Published Jun. 6, 2000.
Computer-Generated Translation of Japanese 2000-072864 Published Mar. 7, 2000.
English Abstract of Japanese 2002-161225 Published Jun. 4, 2002.
Computer-Generated Translation of Japanese 2002-249685 Published Sept. 6, 2002.
English Abstract of Japanese 2002-363470A Published Dec. 18, 2002.
English Abstract of Japanese 2003-34770 Published Feb. 7, 2003.
Computer-Generated Translation of Japanese 2004-182889 Published Jul. 2, 2004.
Computer-Generated Translation of Japanese 2005-290044 Published Oct. 20, 2005.
Computer-Generated Translation of Japanese 2005-194500 Published Jul. 21, 2005.
English Abstract of Japanese 2005-307184 Published Nov. 4, 2005.
Computer-Generated Translation of Japanese 2004-315564 Published Nov. 11, 2004.
Computer-Generated Translation of Japanese 2005-082607 Published Mar. 31, 2005.
Computer-Generated Translation of Japanese 2004-315564A Published Nov. 11, 2004.
Computer-Generated Translation of Japanese 2005-272625 Published Oct. 6, 2005.
Computer-Generated Translation of Japanese 2005-281666 Published Oct. 13, 2005.

\* cited by examiner

INKJET RECORDING INK

FIELD OF THE INVENTION

The present invention relates to an ink for ink jet recording, a pigment dispersion for the ink, a method for producing the same, and an ink jet recording method that attain excellent characteristics such as storage stability, discharge stability, high coloration property on regular paper or gloss paper, high gloss property on gloss paper and excellent light resistance.

BACKGROUND OF THE INVENTION

Conventional inks for ink jet recording often use dyes as colorants, and inks for ink jet recording using pigments have also been widely used. For example, JP A-1-301760 discloses a method for using a surfactant as a means for dispersing the pigment in water in the ink using the pigment. JP A-5-064724 discloses a method for dispersing a pigment by using a dispersion polymer having a hydrophobic part and a hydrophilic part. Furthermore, In JP A-10-140065, a method for covering the surface of the pigment with a polymer has been examined, and as an example, a phase inversion emulsification reaction and an acid precipitation method have been examined.

DISCLOSURE OF THE INVENTION

However, since any method uses the polymer having styrene as a principal component as the method for dispersing the pigment, the ink does not have a satisfactory fixing property and tends to yellow readily upon long-term storage of a printed matter. A problem has existed, in that since the adsorption and desorption of the polymer readily occur when a substance having a hydrophilic part and a hydrophobic part such as a surfactant and glycol ether existed in the ink in a usual case, the preservation stability of the ink was inferior. Substances having the hydrophilic part and the hydrophobic part such as the surfactant and the glycol ether are required for conventional aqueous ink so as to reduce blurring to the paper. A problem has existed, in that the permeability to the paper became unsatisfactory in the ink which did not use these substances, and the paper kinds were limited so as to perform uniform printing to readily cause deterioration in a printing image.

Furthermore, for example, when an additive for improving printing quality (acetylene glycol, acetylene alcohol, silicon-based surfactant di(tri)ethylene glycol monobutyl ether or 1,2-alkylene glycol or the mixture thereof) is added to the conventional pigment dispersion, long-term storage stability cannot be obtained, and due to poor redissolution of the ink, the ink tended to clog the nozzle of an ink jet head upon drying and attack and thereby lower the adhesion strength of an adhesive agent and other materials used among the substances making up the head, thus degrading the discharge stability.

Also, with a pigment dispersed using such a dispersant, residues of the dispersant remain in the ink system and the dispersant is separated from the pigment without contributing sufficiently to dispersion, causing the viscosity to be high. When the viscosity becomes high, the added amount of a pigment or other coloring material becomes restricted and satisfactory printing quality cannot be obtained, especially on regular paper.

Since the colorant is dispersed and is not dissolved particularly, referring to the pigment ink, the reservation of discharge stability and reliability is a more important item than dye ink. Of these, various methods have been conventionally provided with respect to coexistence of printing quality and discharge stability. Specific examples include a method for using a resin obtained by neutralizing 60 mol % or more of an acid radical of a dispersed resin with an alkaline neutralizer (Japanese Published Unexamined Patent Application Nos. 08-183920 and 09-040895), a method for using an acetylene glycol type surfactant and an alcohol compound (JP A-04-239068 and 06-322307), and a method for containing a polymer consisting of a (meth)acrylate which contains a reactant of a functional group chemically combined with a pigment surface and copolymer of an ionic monomer and hydrophobic monomer and further has an alkyleneoxy chain (JP A-2004-300370). However, these methods may hinder the dispersibility of the dispersant depending on selection of solvents, and may reduce the storage stability of the ink composition. Also, the gloss property on a gloss paper is not described in any reference, and the methods of the prior arts have not been actually sufficient in respect to the achievement of the coexistence of the gloss property and discharge stability. As for the solvent of the ink, JP A-2005-154548 discloses a method in which blurring on regular paper is minimal to enable two-sided printing by combining an ink containing 1,2-alkylene glycol and glycol ethers with a nonionic surfactant. However, in this method, possible problems of the added amount and discharge stability is not described, and a reduction in the discharge stability has been sometimes actually caused depending on the added amount.

Furthermore, in a conventional pigment ink for ink jet, there have been examined a method for mixing a pigment and a polymer solution using a dissolver and carrying out premixing to be dispersed in a stirring type ball mill due to an oxide milling medium with which zirconia is mixed (see JP A-2004-535508), a method for passing the pigment and the polymer solution to a dispersion device filled with the zirconia bead to disperse in a circuit system (see JP A-2004-217916), or a method for premixing the pigment and the polymer solution to process in a Microfluidizer (see JP A-2003-176431). However, there has been proposed the use of a dispersing machine such as a beads mill, sand mill or roll mill for the dispersion of the pigment after mixing of a usual agitator and dissolver or the like in the case of the conventional pigment ink for ink jet. However, since media are physically destroyed by this method and inorganic contamination occurs, the stability when used as the pigment ink for ink jet is worsened. So as to reduce the above contamination, the dispersion of the pigment using a high pressure homogenizer has been examined (see JP A-8-30158). Since the generation of the contamination is suppressed by this method, the stability when used as the pigment ink for ink jet is improved. However, since a shear rate is low in this processing condition, the stability has not yet become sufficient.

In an ink jet recording device capable of printing color images, examples of recording methods for forming black color include the following three methods: (1) a method (composite black) for superposing color inks to express black color using a third color or a multi dimensional color beyond the third color; (2) a method for providing black ink consisting of the same solvent composition as the color ink and applying the black ink in both black image and color image; and (3) a method for emphasizing text print, providing black ink having an osmosis force weaker than color ink, and forming the black ink in the black image and the text printing and forming composite black using the color ink in the color image. In the ink (1), since a plurality of ink droplets are superposed in the ink using the pigment dispersed by the above common dispersant, the reduction in the printing quality is caused by the reduction in the gloss property on gloss paper and the blurring or the like on regular paper. Also, the reduction in coloration property is caused when the applied amount is reduced so as to suppress the reduction in the printing quality. Even in the ink (3), the formation of the black color in the color image is the same as the ink (1), and the ink (3) had the same problem. Also, in the ink (2), it is difficult to obtain sufficient coloration property in the text printing to the regular paper, and the blurring is readily generated. Also, since hue is different from that of the black color formed by the color ink, a hue gap is generated at a boundary part with gray color or the like formed by the color ink (gradation is not finely connected), or gloss spots are generated since the gloss property is suddenly changed at the portion of the black color.

Although the pigment ink is excellent in various weatherabilities such as light resistance, gas resistance or water resistance as compared with the dye ink, the capability is inferior in yellow ink, such as C.I. Pigment Yellow 74 which is conventionally and generally used, as compared with cyan or magenta in respect to light resistance. On the other hand, although C.I. Pigment Yellow 138 has been conventionally known as yellow pigment excellent in light resistance, it was not suitable to use the C.I. Pigment Yellow 138 for the ink for ink jet recording in view of low coloration property and low storage stability as ink. Therefore, various methods have been proposed for the ink for ink jet recording using the yellow pigment, such as the C.I. Pigment Yellow 138, in order to attain compatibility of various characteristics such a slight resistance, printing quality and storage stability. Such methods include: a method for covering a pigment with an organic high polymer compound having a neutralized anionic group to improve water resistance, light resistance, hue and storage stability (JP A-11-172180); a method for combining the C.I. Pigment Yellow 138 with a recording medium having an ink absorbing layer to which a specific coating is applied to obtain a printed matter having an image which is clear and high in quality and excellent in light resistance (JP A-11-228888); and a method for changing grinding conditions in the pigment production and applying C.I. Pigment Yellow 138 as a special crystallized type to be suitable for the ink jet excellent in transparency and clarity (JP A-2002-105351), and which are conventionally used. However, although the light resistance of the recorded matter is excellent even for any method, the coloration property, particularly the coloration property on regular paper is not sufficient. Also, the gloss property on gloss paper cannot be secured, and the printing quality has not been satisfied. Thus, in the ink for ink jet recording using the yellow pigment as the colorant, the ink for ink jet recording having the characteristics of both the light resistance and the printing quality suitably has not yet been found.

It is an object of the present invention to provide an ink composition for ink jet recording capable of solving the above problems, a pigment dispersion, a method for producing the same and an ink jet recording method. The present invention is constructed as follows.

(I) An ink for ink jet recording of the invention includes: water; and a pigment dispersed by using a polymer which is obtained by polymerizing at least 50% by weight or more of benzyl acrylate and/or cyclohexyl acrylate and 20% by weight or less of (meth)acrylic acid as components of the polymer and has an acid value of no less than 30 mgKOH/g and no more than 150 mgKOH/g. The weight average molecular weight of the polymer may be no less than 20000 and no more than 200000. The ink of the invention may include at least one adduct selected from an alkylene oxide adduct of no less than 0.05% by weight and no more than 1% by weight of 2,4,7,9-tetramethyl-5-decyne-4,7-diol, 3,6-dimethyl-4-octyne-3,6-diol and 2,4,7,9-tetramethyl-5-decyne-4,7-diol, and an alkylene oxide adduct of 3,6-dimethyl-4-octyne-3,6-diol. This ink of the invention is excellent in storage stability and discharge stability and attains high coloration on regular paper or gloss paper and high glossiness on gloss paper.

(II) An ink for ink jet recording of the invention includes: a pigment dispersed by using water and a polymer, which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000. This ink of the invention is excellent in storage stability and discharge stability and attains high coloration on regular paper or gloss paper and high glossiness on gloss paper.

(III) An ink for ink jet recording of the invention includes: a pigment dispersed by using water and a polymer, which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000, wherein the pigment includes PY74 as a yellow pigment, at least one selected from PV19, PR122, PR177 and PR254 as a magenta pigment, or PB15:1 as a cyan pigment. In this ink for ink jet recording, the dispersed particle diameter of the yellow pigment is preferably no less than 90 nm and no more than 110 nm, and the primary particle diameter thereof is preferably no less than 30 nm and no more than 80 nm. The dispersed particle diameter of the magenta pigment is preferably no less than 20 nm and no more than 100 nm, and the primary particle diameter thereof is preferably no less than 20 nm and no more than 70 nm. The dispersed particle diameter of the cyan pigment is preferably no less than 20 nm and no more than 100 nm, and the primary particle diameter thereof is preferably no less than 20 nm and no more than 70 nm. According to the invention (III), there also provides an ink set having at least a yellow ink, a magenta ink and a cyan ink, where each of the inks includes a pigment dispersed by using water and a polymer, which obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000, and the yellow ink includes PY74 as a pigment, the magenta ink includes at least one selected from PV19, PR122, PR177 and PR254 as a pigment, and the cyan ink includes PB15:1 as a pigment. This ink of the invention is excellent in storage stability and discharge stability and attains high coloration on regular paper or gloss paper and high glossiness on gloss paper.

(IV) An ink for ink jet recording of the invention includes: a pigment dispersed by using water and a polymer, which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000, the ink including no less than 1% by weight and no more than 20% by weight of trimethylolpropane. This ink of the invention is excellent in storage stability and discharge stability and attains high coloration on regular paper or gloss paper and high glossiness on gloss paper. In addition, the ink of the invention is not easily accumulated in a ink jet recording device after being discharged and dried, thus a print medium does not get dirty in borderless printing on a print medium, such as a postcard.

(V) An ink for ink jet recording of the invention includes: a pigment dispersed by using water and a polymer, which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000, the ink including no less than 0.1% by weight and no more than 10% by weight of 2-butyl-2-ethyl-1,3-propanediol. This ink of the invention is excellent in storage stability and discharge stability and attains high coloration on regular paper or gloss paper and high glossiness on gloss paper.

(VI) A method for producing pigment dispersion of the invention mixes and disperses water, disperse medium, a pigment, and polymer, and modifies the polymer on a particle surface of the pigment so as to obtain pigment dispersion, where the polymer has at least 50% by weight or more of benzyl acrylate and 15% by weight or less of (meth)acrylic acid as the component, has an acid value of no less than 50 mgKOH/g and no more than 120 mgKOH/g, and a weight average molecular weight of no less than 20000 and no more than 120000, and the amount of the disperse medium is no less than 95% by weight and no more than 300% by weight based on the pigment when the weight average molecular weight of the polymer is no less than 50000 and no more than 120000 during dispersion, and the amount of the disperse medium is no less than 45% by weight and less than 180% by weight based on the pigment when the weight average molecular weight of the polymer is no less than 20000 and less than 50000. The invention also provides pigment dispersion obtained by this method for producing pigment dispersion, and an ink composition containing this pigment dispersion. The method for producing pigment dispersion of the invention provides an ink, which is excellent in storage stability and discharge stability and attains high coloration on regular paper or gloss paper and high glossiness on gloss paper, and also provides an ink for ink jet recording which contains the pigment dispersion.

(VII) An ink for ink jet recording of the invention includes: a pigment dispersed by using water and a polymer, which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000, the ink further including at least one kind of resin fine particles containing a polymer which is obtained by polymerizing at least 50% by weight or more of benzyl acrylate and 15% by weight or less of (meth)acrylic acid as components of the polymer and has an acid value of 50 mgKOH/g to 120 mgKOH/g and a weight average molecular weight of no less than 20000 and no more than 120000 in the form of a resin emulsion. In this ink, the polymer used for the resin emulsion preferably includes 50% or more of the same component as that of the polymer used for the pigment dispersion in terms of weight ratio. The average particle size of the resin fine particles contained as the resin emulsion is preferably 30 to 150 nm. It is preferable that 0.1 to 10% by weight of the resin fine particles contained as the resin emulsion is contained based on the total amount of ink. This ink of the invention is excellent in storage stability and discharge stability and attains high coloration on regular paper or gloss paper and high glossiness on gloss paper.

(VIII) An ink for ink jet recording of the invention includes: a pigment dispersed by using water and a polymer, which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000, the ink including at least (i) 0.5 to 15% by weight of 1,2-alkylene glycol of $C_4$ to $C_{10}$, and (ii) 5 to 30% by weight of polyhydric alcohols of $C_{10}$ or less except the 1,2-alkylene glycol. In this ink, the sum of the contents of the 1,2-alkylene glycol and the polyhydric alcohols is preferably 6 to 40% by weight. The content ratio of the 1,2-alkylene glycol to the polyhydric alcohols is preferably 1:50 to 1:1.5. The ink for ink jet recording preferably includes 0.5 to 15% by weight of glycol ethers represented by $R^1O-(C_mH_{2m}O)_n-R^2$, where m and n are an integer of 1 or more; m×n≤10; $R^1$ and $R^2$ are an alkyl group having $C_8$ or less; and $R^1$ and $R^2$ may be the same or different. In this case, the content ratio of the 1,2-alkylene glycol to the glycol ethers is preferably 10:1 to 1:10, and the sum of the contents of the 1,2-alkylene glycol, the polyhydric alcohols and the glycol ethers is preferably 7 to 40% by weight. This ink of the invention is excellent in storage stability and discharge stability and attains high coloration on regular paper or gloss paper and high glossiness on gloss paper.

(IX) A pigment ink for ink jet using pigment dispersion of the invention is obtained from a pigment and a polymer having at least an acid value of no less than 50 mgKOH/g and no more than 120 mgKOH/g and a weight average molecular weight of no less than 20000 and no more than 120000, by a dispersion process of no less than 3 passes and no more than 8 passes at a processing pressure of 150 MPa or more in a high pressure homogenizer. A producing method for a pigment ink of the invention, including the steps of: mixing the a pigment and a polymer solution as a dispersant and performing the dispersion process of no less than 3 passes and no more than 8 passes at a processing pressure of 150 MPa or more in a high pressure homogenizer to produce pigment dispersion; and mixing the produced pigment dispersion with a vehicle component, so as to produce a pigment ink. This ink of the invention is excellent in storage stability and discharge stability and attains high coloration on regular paper or gloss paper and high glossiness on gloss paper.

(X) An ink for ink jet recording of the invention includes: a pigment dispersed by using water and a polymer, which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000, the ink including pigment dispersion which is obtained by modifying the polymer on a surface of a self-dispersed pigment particle. This ink of the invention is excellent in storage stability and discharge stability and attains high coloration on regular paper or gloss paper and high glossiness on gloss paper.

(XI) An ink jet recording method of the invention forms a third color containing a secondary color and a black color using inks of at least three colors of cyan, magenta and yellow, so as to form a color image and a monochrome image, where the ink is an ink for ink jet recording comprising water, and a pigment dispersed by using a polymer which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular of no less than 20000 and no more than 120000, and a third color containing a black color is formed by applying the ink in the order of cyan, magenta and yellow to from an image. In this ink jet recording method, a color arrangement in a print head may be perpendicular to a scanning direction of the print head, and printing may be carried out by using an ink jet recording device in which a color order is the order of cyan, magenta and yellow from an earlier application side. The color arrangement in a print head may be otherwise parallel to a scanning direction of the print head, and printing may be carried out only during an outward scan by using an ink jet recording device in which an arrangement order is the order of cyan, magenta and yellow. In this ink jet recording method, printing may be carried out only during a homeward scan by using an ink jet recording device in which an arrangement order is the order of yellow, magenta and cyan. This ink jet recording method of the invention provides an ink which attains high coloration on regular paper or gloss paper and high glossiness on gloss paper, with respect to a third color including black in color image printing.

(XII) An ink for ink jet recording of the invention includes: a pigment dispersed by using water and a polymer, which is obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000, where the pigment includes at least C.I. Pigment Yellow 138. In this ink, the pigment may include at least C.I. Pigment Yellow 74. In this case, the content ratio of C.I. Pigment Yellow 138 to the C.I. Pigment Yellow 74 is preferably 20:1 to 1:10 in terms of weight. This ink of the invention is excellent in storage stability and discharge stability and attains high coloration on regular paper or gloss paper and high glossiness on gloss paper as well as high light resistance.

(XIII) A producing method for a pigment ink for ink jet, including the steps of: mixing a wet cake of a pigment through no drying process after synthesizing the pigment or a powdery pigment with water and dispersing the mixture in a two-roll mill or a three-roll mill, so as to obtain a mixed pigment; mixing the obtained mixed pigment with a polymer solution and disperse medium as a dispersant and performing the dispersion process of no less than 3 passes and no more than 8 passes at a processing pressure of 150 MPa or more in a high pressure homogenizer to produce pigment dispersion; and mixing the produced pigment dispersion with a vehicle component, so as to produce a pigment ink. This producing method of the invention provides an ink which is excellent in stability and attains high coloration on regular paper or gloss paper and high glossiness on gloss paper as well as high discharge stability from a print head.

(XIV) An ink for ink jet recording of the invention includes: a pigment dispersed by using water and a polymer, which is obtained by polymerizing at least 50% by weight or more of benzyl acrylate and 15% by weight or less of (meth) acrylic acid as components of the polymer and has an acid value of no less than 50 mgKOH/g and no more than 120 mgKOH/g and a weight average molecular weight of no less than 20000 and no more than 120000, the ink further including 10% or more of epoxy(meth)acrylate and/or urethane (meth)acrylate as a component of the polymer. This ink of the invention is excellent in storage stability and discharge stability and attains high coloration on regular paper or gloss paper and high glossiness on gloss paper as well as high fixing property.

(XV) A producing method for pigment dispersion of the invention includes the step of carrying out a dispersion process by a high pressure homogenizer without using media when a polymer having at least 50% by weight or more of benzyl acrylate and 15% by weight or less of (meth)acrylic acid as a component of a polymer and having an acid value of no less than 50 mgKOH/g and no more than 120 mgKOH/g and a weight average molecular weight of the polymer of no less than 20000 and no more than 120000 is modified on a particle surface of the pigment. The invention also provides an ink for ink jet recording containing pigment dispersion obtained by this producing method. This ink of the invention is excellent in storage stability and discharge stability and attains high coloration on regular paper or gloss paper and high glossiness on gloss paper.

(XVI) An ink for ink jet recording of the invention includes: a pigment dispersed by using water and a polymer, which is obtained by polymerizing at least 50% by weight or more of benzyl acrylate and 15% by weight or less of (meth) acrylic acid as components of the polymer and has an acid value of no less than 50 mgKOH/g and no more than 120 mgKOH/g and a weight average molecular weight of no less than 20000 and no more than 120000, the ink including 10% or more of a styrene monomer and/or styrene macromonomer as a component of the polymer. This ink of the invention is excellent in storage stability and discharge stability and attains high coloration on regular paper or gloss paper and high glossiness on gloss paper as well as high fixing property.

(XVII) An ink for ink jet recording of the invention includes: a pigment dispersed by using water and a polymer, which is obtained by polymerizing at least 50% by weight or more of benzyl acrylate and 15% by weight or less of (meth) acrylic acid as components of the polymer and has an acid value of no less than 50 mgKOH/g and no more than 120 mgKOH/g and a weight average molecular weight of no less than 20000 and no more than 120000, the ink including 10% or more of alkyl(meth)acrylate and/or alkylene glycol(meth) acrylate as a component of the polymer. This ink of the invention is excellent in storage stability and discharge stability and attains high coloration on regular paper or gloss paper and high glossiness on gloss paper as well as high fixing property.

BEST MODE FOR CARRYING OUT THE INVENTION

Figure 1:
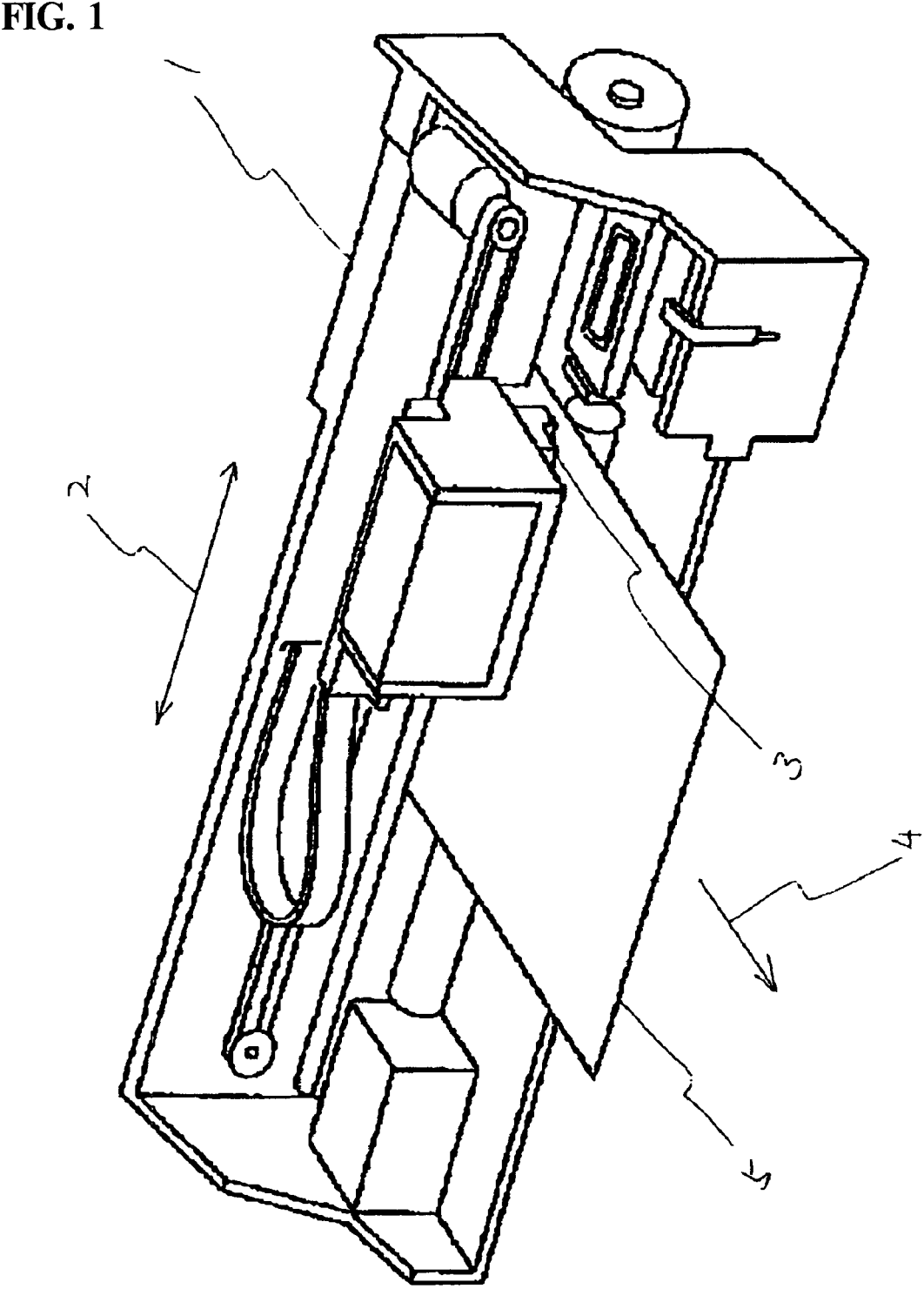
FIG. 1 is a schematic diagram of an ink jet recording device carrying out the present invention.

An ink for ink jet recording, a pigment dispersion, a method for producing the same and an ink jet recording method of the present invention have been made by conducting earnest studies in view of required characteristics such as excellent storage stability and discharge stability, high coloring on regular paper and gloss paper, sufficient gloss property and fixing property on gloss paper, and excellent discharge stability of an ink from an ink jet head.

Ink for Ink Jet Recording

An ink for ink jet recording of various forms contained in the present invention, includes: water; and a pigment dispersed by using a polymer obtained by polymerizing at least 50% by weight or more of benzyl acrylate and/or cyclohexyl acrylate, and 20% by weight or less of (meth)acrylic acid as a component of a polymer and having an acid value of no less than 30 mgKOH/g and no more than 150 mgKOH/g, preferably having a weight average molecular weight of 2000 to 200000.

Polymer Component

In the present invention, the polymer may be obtained by polymerizing 50% by weight or more of cyclohexyl acrylate and/or benzyl acrylate, and 20% by weight or less of (meth)acrylic acid can also be used as the component of the polymer. Since the cyclohexyl acrylate and/or benzyl acrylate of less than 50% by weight reduces the fixing property, the preferable ranges are 50% by weight or more. However, a case where the amount is less than 50% by weight is not negated. Therefore, although the amount is preferably 50% by weight or more, the amount is more preferably 60% by weight or more, and more preferably 70% by weight or more. Although the polymerization with (meth)acrylic acid of 20% by weight or less is preferable, the (meth)acrylic acid exceeding 20% by weight tends to reduce the coloration property on regular paper of the ink jet ink. However, the polymerization exceeding 20% by weight is not negated, and the (meth)acrylic acid of 20% by weight or less is shown as a more preferable range. A more preferable range is 10% by weight or less. It is more preferable to use the acrylic acid in view of the fixing property when the methacrylic acid is compared with the acrylic acid.

In the present invention, the polymer may be obtained by polymerizing benzyl acrylate of 50% by weight or more and (meth)acrylic acid of 15% by weight or less as the component of the polymer is preferable, for example, as in the ink (II). The benzyl acrylate of less than 50% by weight reduces fixing property, and the preferable range is 50% by weight or more. However, a case where the amount is less than 50% by weight is not negated. Therefore, although the amount is preferably 50% by weight or more, the amount is more preferably 60% by weight or more, and more preferably 70% by weight or more. A polymerization with (meth)acrylic acid of 15% by weight or less is preferable. The (meth)acrylic acid exceeding 15% by weight tends to reduce the coloration property on regular paper of the ink jet ink. However, the polymerization exceeding 15% by weight is not negated, and the (meth) acrylic acid of 15% by weight or less is shown as a more preferable range. A more preferable range is 10% by weight or less. It is preferable to use the acrylic acid in view of the fixing property when compared with the methacrylic acid. It is preferable that a polymer for dispersing a pigment in the present invention has a weight average molecular weight of no less than 20000 and no more than 200000. The weight average molecular weight of less than 20000 tends to worsen the long-term storage stability, heat stability and fixing property as the ink jet ink. The weight average molecular weight exceeding 200000 tends to increase the viscosity as the ink jet ink, worsen the dispersion stability and reduce the discharge stability. The weight average molecular weight is more preferably 120000 or less. When the weight average molecular weight exceeds 120000, excellent dispersion stability is not readily obtained.

In the present invention, the fixing property and the gloss property can be enhanced by using epoxy(meth)acrylate and/ or urethane(meth)acrylate of 10% by weight or more, for example, as in the ink (XIV). The fixing property is deteriorated when it is 10% by weight or less. 15% by weight or more is more preferable.

The epoxy(meth)acrylate and/or the urethane(meth)acrylate can be used. Examples of the epoxy(meth)acrylates and urethane(meth)acrylates include one having epoxy(meth)acrylate and/or urethane(meth)acrylate at a side chain. For example, one having the epoxy(meth)acrylate is obtained by carrying out the addition reaction of a (meth)acrylic acid to one obtained by copolymerizing methyl(meth)acrylate and glycidyl(meth)acrylate. For example, one having the urethane(meth)acrylate is obtained by adding one obtained by reacting trilene diisocyanate or isophorone diisocyanate and 2-hydroxyethyl(meth)acrylate at the molar ratio 1 to one obtained by copolymerizing methyl(meth)acrylate and 2-hydroxyethyl(meth)acrylate and reacting.

Examples of the epoxy(meth)acrylates include an adduct of an epoxy resin such as a bisphenol A type epoxy resin, a bisphenol F type epoxy resin, a cresol novolac type epoxy resin, a phenol novolac type epoxy resin and glycidyl ether such as a polypropylene glycol/polytetramethylene glycol and methacrylic acid. Examples of the urethane(meth)acrylates include polyisocyanates such as trilene diisocyanate, isophoronediisocyanate and hexamethylenediisocyanate, polypropylene glycol, an ethylene oxide-propylene oxide copolymer, polytetramethylene glycol, an adipic acid, ethylene glycol, diethylene glycol, 1,4-butanediol and a condensation polymerization product with a polyol such as 1,6-hexanediol, and an adduct of an isocyanate prepolymer obtained by reacting a polyol such as polycaprolactone and hydroxyl group-containing acrylate such as 2-hydroxy ethyl (meth)acrylate, 2-hydroxy propyl(meth)acrylate, pentaerythritoltri(meth)acrylate and a dipentaerythritolpenta(meth) acrylate.

Examples of the polymerizable monomers having a (meta) acrylyl group used in the ink (XIV) include a monofunctional (meth)acrylate, a multifunctional (meth)acrylate and the mixture thereof. Examples of the monofunctional (meth)acrylates include 2-methoxyethyl(meth)acrylate, 2-ethoxyethyl (meth)acrylate, 2-phenoxyethyl(meth)acrylate, ethoxydiethylene glycol(meth)acrylate, phenoxydiethylene glycol(meth)acrylate, ethylene oxide adduct(meth)acrylate of nonylphenol, propylene oxide adduct (meth)acrylate of nonylphenol, benzyl(meth)acrylate, cyclohexyl(meth)acrylate, tetrahydrofurfuryl(meth)acrylate, dicyclopentenyl (meth)acrylate, isobornyl(meth)acrylate, dicyclopentenyloxy ethyl(meth)acrylate, 2-hydroxy-3-phenoxypropy(meth) acrylate, 2-hydroxyethyl(meth)acrylate and 2-hydroxypropyl(meth)acrylate.

Furthermore, in the present invention, a styrene monomer and/or styrene macromonomer of 10% by weight or more can be used, for example, as in the ink for ink jet recording of (XVI). Thereby, fixing property and gloss property can be enhanced. The fixing property is deteriorated when the amount of the monomer is 10% by weight or less. The amount of the monomer of 15% by weight or more is more preferable.

In the present invention, alkyl(meth)acrylate and/or alkylene glycol(meth)acrylate of 10% or more can be used, for example, as in the ink (XVII). Thereby, fixing property and gloss property can be enhanced. The fixing property is deteriorated when the amount of the acrylate is 10% or less. The amount of the acrylate of 15% or more is more preferable. Examples of alkyl(meth)acrylates and/or alkyleneglycol (meth)acrylates include C1-C20 alkyl or C4-C20 branch (meth)acrylate (mono, di, tri, tetra)ethylene glycol(meth) acrylate, PEG (200, 400, 600, 1000)(meth)acrylate and (mono, di, tri) propylene glycol(meth)acrylate.

In a method for polymerizing various polymers used for the present invention, an alcohol solvent, a ketone solvent, an ether solvent and a glycol ether solvent can be used as a solvent. However, a solvent capable of removing the above solvent later is required in aqueous pigment dispersion. Therefore, the following can be used as such a solvent. Examples of the alcohol solvents include methanol, ethanol, isopropanol, 1-butanol, tertiary butanol, isobutanol and diacetone alcohol. Examples of the ketone solvent include acetone, methyl ethyl ketone, diethyl ketone, methyl isobutyl ketone and cyclohexanone. Examples of the ether solvents include dibutyl ether, tetrahydrofuran and dioxane. Examples of the glycol ether systems include ethylene glycol monomethyl ether, diethylene glycol monomethyl ether, diethylene glycol monoethyl ether, diethylene glycol diethyl ether and butyl cellosolve.

Examples of the radical polymerization initiator for polymerizing the polymer include organic peroxides such as t-butylperoxy(2-ethylhexanoate), di-t-butyl peroxide, t-butyl peroxy benzoate and t-butyl peroxy octoate, azo compounds such as 2,2'-azobisisobutyronitrile, 2,2'-azobis(2,4-dimethyl valeronitrile), dimethyl-2,2'-azobis butilate and 2,2'-azobis (2-methylbutyronitrile), potassium persulfate, and sodium persulfate, and are not limited thereto. Initiators other than the above radical polymerization initiators may be used as long as the polymer can be radically polymerized. The amount of the radical polymerization initiator used is preferably no less than 0.01 mol % and no more than 5 mol % based on the monomer used in the case of the polymerization. The temperature of the polymerization is not limited, but is usually 30 to 100° C., and more preferably 40 to 90° C. When the temperature of the polymerization is too low, it is necessary to require a long time for polymerization of monomers, and according to the circumstances, the polymerization rate may be reduced and a large amount of monomers may be left.

The polymer used for the dispersion of the pigment in the present invention may be obtained by combining at least one kind selected from a commercially available styrene-(meth) acrylic acid copolymers, styrene-(meth)acrylic acid ester-(meth)acrylic acid copolymers, polyethylene glycol(meth) acrylate-(meta) acrylic acid copolymers, acetic acid vinyl-maleic acid copolymers and styrene-maleic acid copolymers to the extent that there is no influence. It is preferable that the amount of a polymer obtained by copolymerizing the acrylate and the acrylic acid is at least 80% by weight or more. Examples of the acrylates include commercially available acrylates such as methyl acrylate, ethyl acrylate, propyl acrylate, butyl acrylate, hexyl acrylate, cyclohexyl acrylate, octyl acrylate, lauryl acrylate, 2-ethylhexyl acrylate, 2-ethylhexylcarbitol acrylate, phenol EO modified acrylate, N-vinylpyrrolidone, isobornyl acrylate, benzyl acrylate, paracumylphenol EO modified acrylate, 2-hydroxyethyl-3-phenoxypropyl acrylate. In place of acrylic acid, ω-carboxy-polycaprolactone monoacrylate, phthalic acid monohydroxyethyl acrylate, or acrylic acid dimmer may be used.

In the present invention, for example, as in the ink (VII), at least one kind of the resin fine particles containing the polymer obtained by polymerizing 50% by weight or more of benzyl acrylate and 15% by weight or less of (meth)acrylic acid as the component of the polymer and having the acid value of 50 to 120 mgKOH/g and the average molecular weight of 20000 to 120000 may be further contained in the ink in the form of the resin emulsion. Thereby, higher coloration property on regular paper and gloss paper, and high gloss property and fixing property on gloss paper can be obtained while a state where the storage stability and the discharge stability are excellent is secured. Although examples of means for enhancing the coloration property and the gloss property include a method for raising the used amount of a dispersant used for pigment dispersion, when the operating ratio as the dispersant becomes too high, it is not preferable that a reduction in clogging recovery property, an increase in the viscosity of the ink and a reduction in discharge reliability accompanying the viscosity rise may be caused. On the other hand, when the resin fine particles consisting of the polymer are contained in the form of the resin emulsion, the coloration property and the gloss property can be effectively enhanced without causing the above reduction in the discharge reliability. The effect of enhancing the weatherability (light resistance and gas resistance) of the ink can also be obtained by adding the resin emulsion. In the ink (VII), it is preferable that the polymer which constitutes the resin fine particles contained in the resin emulsion is obtained by polymerizing 50% by weight or more of benzyl acrylate and 15% by weight or less of (meth)acrylic acid. Since the benzyl acrylate of less than 50% by weight reduces the fixing property, the preferable range of the benzyl acrylate is 50% by weight or more. However, a case where the amount of the benzyl acrylate is less than 50% by weight is not negated. The amount of benzyl acrylate is preferably 50% by weight or more, more preferably 60% by weight or more, and still more preferably 70% by weight or more. The polymerization with (meth)acrylic acid of 15% by weight or less is preferable. The (meth)acrylic acid exceeding 15% by weight tends to reduce the coloration property of the ink jet ink on regular paper. However, the polymerization exceeding 15% by weight is not negated, and the more preferable range is 10% by weight or less. It is more preferable to use acrylic acid in view of the fixing property when the methacrylic acid is compared with the acrylic acid. In the ink (VII), it is preferable to use resin fine particles consisting of a polymer having an acid value of 50 mg to 80 mgKOH/g as the resin emulsion when the main constituting colorant of the ink is a pigment other than yellow in view of the provision of an ink for ink jet recording which excels in storage stability and discharge stability and has high coloration property on regular paper or gloss paper and high gloss property on gloss paper. The acid value of less than 50 mgKOH/g reduces the dispersion stability of the pigment, and the acid value exceeding 80 mgKOH/g reduces the coloration property on regular paper. The acid value is more preferably 50 to 70 mgKOH/g.

For example, in the ink (VII), when the main constituting colorant of ink is a yellow pigment, it is more preferable to use resin fine particles consisting of a polymer having an acid value of 50 to 120 mgKOH/g in view of the realization of high coloration property on regular paper or gloss paper and high gloss property and fixing property on gloss paper. The acid value of less than 50 mgKOH/g reduces the dispersion stability of the pigment, and the acid value exceeding 120 mgKOH/g reduces the coloration property on regular paper.

It is preferable that a polymer which constitutes resin fine particles contained in the resin emulsion, for example, in the ink (VII) has a weight average molecular weight of 20000 to 200000. The weight average molecular weight of less than 20000 tends to worsen the long-term storage stability, heat stability and fixing property as the ink jet ink. The weight average molecular weight exceeding 200000 tends to increase the viscosity as the ink jet ink, worsen the dispersion stability and reduce the discharge stability.

Furthermore, for example, in the ink (VII), it is preferable that the component of the polymer which constitutes the resin fine particles contained in the resin emulsion contains at least 50% or more of the same component as that of the polymer used for pigment dispersion in terms of weight in the whole polymer contained in the resin emulsion. The coloration property and the gloss property can be more effectively enhanced in a smaller amount by using the polymer having the same component of 50% or more, and the coloration property on regular paper can be largely enhanced.

Furthermore, in the ink (VII), it is preferable that the average particle size of the resin fine particles contained in the resin emulsion is 20 to 150 nm. When the average particle size is too small, effects such as the enhancement of the coloration property and gloss property are difficult to obtain. When the average particle size is too large, the coloration property on regular paper and the gloss property on gloss paper tends to be reduced. Thereby, it is preferable to use the resin fine particles in the above range.

In the ink for ink jet recording of the invention of (VII), it is preferable that the resin fine particles contained in the resin emulsion are contained in the range of 0.1 to 10% by weight based on the ink total amount. When the amount of the resin fine particles is too small, effects such as the enhancement of the coloration property and gloss property are difficult to obtain. When the amount is too large, the coloration property on regular paper and the gloss property on gloss paper tend to be reduced. Thereby, it is preferable to use the resin fine particles in the above range.

Pigment

As the pigment used in the present invention, examples of pigments for black ink include carbon blacks (C.I. Pigment black 7) such as furnace black, lamp black, acetylene black and channel black; metals such as copper oxides, iron oxides (C.I. Pigment black 11) and titanium oxide; and organic pigments such as aniline black (C.I. Pigment black 1). The carbon black which is comparatively low in specific gravity and does not settle readily in water is preferable for ink jet. Examples of pigments for color inks include C.I. Pigment Yellow 1 (Fast Yellow G), 3, 12 (Dis-Azo Yellow AAA), 13, 14, 17, 24, 34, 35, 37, 42 (Yellow Iron Oxide), 53, 55, 74, 81, 83 (Dis-Azo Yellow HR), 93, 94, 95, 97, 98, 100, 101, 104, 108, 109, 110, 117, 120, 128, 138, 153, 180, C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G lake), 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 185, 190, 193, 202, 209, 219, 254, C.I. Pigment Violet 19, 23, C.I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, 63, C.I. Pigment Green 1, 4, 7, 8, 10, 17, 18, 36.

The amount added as the pigment in the present invention is preferably 0.5 to 30%, and more preferably 1.0 to 12%. The added amount of 0.5% or less cannot secure printing density. The amount of 30% or more tends to cause the increase in viscosity and generation of structural viscosity in viscosity characteristic of the ink to worsen the discharge stability of the ink from the ink jet head.

When the ink of the present invention produced using the above pigment contains a pigment other than yellow such as C.I. Black 7 and C.I. Pigment Blue 15:1, C.I. Pigment Blue 15:2, C.I. Pigment Blue 15:3, C.I. Pigment Blue 15:4, C.I. Pigment Blue 15:6, C.I. Pigment Green 36, C.I. Pigment Red 122, C.I. Pigment Red 177, C.I. Pigment Red 254, C.I. Pigment Violet 19 or C.I. Pigment Violet 23, the dispersion using the polymer which has an average particle diameter of 20 to 100 nm and an acid value of no less than 50 mgKOH/g and no more than 80 mgKOH/g is preferable in view of the provision of the ink for ink jet recording which excels in storage stability and discharge stability and has the high coloration property on regular paper or gloss paper and the high gloss property on gloss paper. The average particle diameter exceeding 100 nm reduces the gloss on gloss paper. The average particle diameter is preferably 20 to 90 nm. The acid value of less than 50 mgKOH/g causes unstable dispersion. The acid value exceeding 80 mgKOH/g reduces the coloration property on regular paper. The acid value is more preferably 50 mgKOH/g to 70 mgKOH/g.

When the ink of the present invention contains a pigment yellow such as, for example, C.I. Pigment Yellow 55, C.I. Pigment Yellow 74, C.I. Pigment Yellow 79, C.I. Pigment Yellow 93, C.I. Pigment Yellow 110, C.I. Pigment Yellow 120, C.I. Pigment Yellow 128, C.I. Pigment Yellow 138, C.I. Pigment Yellow 139, C.I. Pigment Yellow 150, C.I. Pigment Yellow 151, C.I. Pigment Yellow 155, C.I. Pigment Yellow 156, C.I. Pigment Yellow 175 or C.I. Pigment Yellow 180, the dispersion using the polymer which has an average particle diameter of 90 to 110 nm and an acid value of no less than 50 mgKOH/g and no more than 120 mgKOH/g is preferable in view of the provision of the ink for ink jet recording which excels in storage stability and discharge stability and has the high coloration property on regular paper or gloss paper and the high gloss property on gloss paper. The average particle diameter of less than 90 nm deteriorates the light resistance, and the average particle diameter exceeding 110 nm reduces the coloration property on regular paper. The acid value of less than 50 mgKOH/g causes unstable dispersion, and the acid value exceeding 120 mgKOH/g reduces the coloration property on regular paper.

In the present invention, examples of the pigments used, for example, in the ink (III) may include C.I. Pigment Yellow 1 (fast yellow G), 3, and 12 (Dis-Azo Yellow AAA), 13, 14, 17, 24, 34, 35, 37, 42 (Yellow Iron Oxide), 53, 55, 74, 81, 83 (Dis-Azo Yellow HR), 93, 94, 95, 97, 98, 100, 101, 104, 108, 109, 110, 117, 120, 128, 138, 153, 180, C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G lake), 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 185, 190, 193, 202, 209, 219, 254, C.I. Pigment Violet 19, 23, C.I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, 63, C.I. Pigment Green 1, 4, 7, 8, 10, 17, 18, 36. Among these, PY74 is preferable as the yellow pigment since the excellent light resistance and gas resistance, and high coloration property are attained. And PV19, PR122, PR177, PR254 or the mixture thereof are preferable as the magenta pigment since high coloring is attained and light source dependability (metamerism) is suppressed. Furthermore, PB15:1 is preferable as the cyan pigment since bronze phenomenon on the record surface is improved. From the above, overall quality of printing can be improved by using the pigment colorants described above as the ink set. The black pigment can be used for monochrome printing for text on regular paper although a record due to the combined use of color pigment is also carried out. Examples of pigments for black ink include carbon blacks (C.I. Pigment black 7) such as furnace black, lamp black, acetylene black and channel black; metals such as copper oxides, iron oxides (C.I. Pigment black 11) and titanium oxide; and organic pigments such as aniline black (C.I. Pigment black 1). The carbon black which is comparatively low in specific gravity and does not readily settle in water is preferable for ink jet.

The particle diameter of the pigment used in the invention, for example, in the ink (III) is preferably 100 nm or less. When the average particle diameter of the pigment particles is set smaller than 20 nm, the light resistance is reduced, the coloring degradation of the recorded matter becomes remarkable, and the coloration property on regular paper is reduced. Therefore, it is preferable that the average particle diameter is 20 nm or more.

When the ink (III) includes yellow pigments of C.I. Pigment Yellow 55, 74, 79, 93, 109, 110, 120, 128, 138, 139, 150, 151, 155, 156, 175, 180 or the like as the pigment, the dispersed particle diameter of the pigment is preferably no less than 90 nm and no more than 110 nm.

The dispersion of the ink (III) using a polymer which has an average particle diameter of no less than 90 and no more than 110 nm and an acid value of no less than 50 mgKOH/g and no more than 120 mgKOH/g is preferable in view of the provision of an ink for ink jet recording which excels in storage stability and discharge stability, and has high coloration property on regular paper or gloss paper and high gloss property on gloss paper. The average particle diameter of less than 90 nm deteriorates the light resistance, and the average particle diameter exceeding 110 nm reduces the coloration property on regular paper. However, the average particle diameter which provides excellent quality to both the light resistance and the coloration property on regular paper is limited to no less than 90 nm and no more than 110 nm. The acid value of less than 50 mgKOH/g causes unstable dispersion, and the acid value exceeding 120 mgKOH/g reduces the coloration property on regular paper.

It is preferable, in the ink (III) that the primary particle diameters of the above yellow pigment, magenta pigment and cyan pigment are respectively no less than 30 nm and no more than 80 nm, no less than 20 nm and no more than 70 nm and no less than 20 nm and no more than 70 nm. When the primary particle diameter of each color pigment is within this preferable range, the dispersed particle diameter is within the suitable range. For example, in the ink (III), it is preferable that the dispersed particle diameter of the yellow pigment is no less than 90 nm and no more than 110 nm, and the primary particle diameter is no less than 30 nm and no more than 80 nm. In the ink (III), it is preferable that the dispersed particle diameter of the magenta pigment is no less than 20 nm and no more than 100 nm and the primary particle diameter thereof is no less than 20 nm and no more than 70 nm. Furthermore, it is preferable that the dispersed particle diameter of the ink (III) is no less than 20 nm and no more than 100 nm, and the primary particle diameter thereof is no less than 20 nm and no more than 70 nm.

In the present invention, when for example, the pigments used in the ink (VI), (VII), (VIII), (X), (XI), (XV) are other than yellow pigments such as C.I. Black 7, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Green 36, C.I. Pigment Red 122, C.I. Pigment Red 177, C.I. Pigment Red 254, C.I. Pigment Violet 19 and C.I. Pigment Violet 23, the dispersion using the pigment using the polymer which has an average particle diameter of 90 nm or less and an acid value of no less than 50 mgKOH/g and no more than 80 mgKOH/g is preferable in view of the provision of the ink for ink jet recording which excels in storage stability and discharge stability and has the high coloration property on regular paper or gloss paper and the high gloss property and fixing property on gloss paper. The average particle diameter of the polymer exceeding 90 nm reduces the gloss on gloss paper. The acid value of the polymer of less than 50 mgKOH/g causes unstable dispersion. In addition, the acid value exceeding 80 mgKOH/g reduces the coloration property on regular paper. The acid value is more preferably 50 mgKOH/g to 70 mgKOH/g. When the pigments used for the inks (VI), (VII), (VIII), (X), (XI), and (XV) are, for example, yellow pigments such as C.I. Pigment Yellow 55, C.I. Pigment Yellow 74, C.I. Pigment Yellow 79, C.I. Pigment Yellow 93, C.I. Pigment Yellow 110, C.I. Pigment Yellow 120, C.I. Pigment Yellow 128, C.I. Pigment Yellow 138, C.I. Pigment Yellow 139, C.I. Pigment Yellow 150, C.I. Pigment Yellow 151, C.I. Pigment Yellow 155, C.I. Pigment Yellow 156, C.I. Pigment Yellow 175 and C.I. Pigment Yellow 180, it is preferable to disperse the pigment using the polymer which has an average particle diameter of no less than 20 nm and no more than 110 nm and an acid value of no less than 50 mgKOH/g and no more than 120 mgKOH/g, in view of the provision of the ink for ink jet recording which excels in storage stability and discharge stability and has the high coloration property on regular paper or gloss paper and the high gloss property and fixing property on gloss paper. The average particle diameter of less than 20 nm deteriorates the light resistance, and the average particle diameter exceeding 110 nm reduces the coloration property on regular paper. The acid value of less than 50 mgKOH/g causes unstable dispersion, and the acid value exceeding 120 mgKOH/g reduces the coloration property on regular paper.

It is preferable to use at least C.I. Pigment Yellow 138 as the main constituting colorant in view of the light resistance, in the yellow pigment used in, for example, the invention of (XII) in the present invention. A recorded matter which exhibits the high coloring on both regular paper and gloss paper and the high gloss property on gloss paper, and has excellent light resistance can be obtained by using the C.I. Pigment Yellow 138 and above polymer in combination. In the ink (XII), it is also preferable to use C.I. Pigment Yellow 74 for the object of mixing colors or the like. The effect for enhancing the coloration property on regular paper is obtained by using together C.I. Pigment Yellow 138 and C.I. Pigment Yellow 74. In the ink (XII), when using together C.I. Pigment Yellow 138 and C.I. Pigment Yellow 74, it is preferable that the content ratio is within the range of 20:1 to 1:10 in terms of weight. When the content ratio of C.I. Pigment Yellow 74 is less than 20:1, the effect of the addition of C.I. Pigment Yellow 74 is not obtained. On the other hand, when the content ratio is more than 1:10, the light resistance capability is reduced, and thereby the content ratio of the range of 20:1 to 1:10 is preferably used. Although the added amount as the pigment is preferably 0.5 to 30% in the ink (XII), the added amount is more preferably 1.0 to 12%. The printing density cannot be secured in the added amount of less than 0.5%, and the viscosity increase of the ink is generated and structural viscosity is generated in the viscosity characteristics in the added amount exceeding 30%. Therefore, the discharge stability of the ink from the ink jet head tends to be worsened. In the ink (XII), the dispersion of yellow pigment using a polymer which has an average particle diameter of 20 to 100 nm and an acid value of no less than 50 mgKOH/g and no more than 120 mgKOH/g is preferable in view of the provision of an ink for ink jet recording which excels in storage stability and discharge stability and has high coloration property on regular paper or gloss paper and high gloss property on gloss paper. The average particle diameter of less than 20 nm deteriorates the light resistance, and the average particle diameter exceeding 110 nm reduces the coloration property on regular paper. The acid value of less than 50 mgKOH/g causes unstable dispersion, and the acid value exceeding 120 mgKOH/g reduces the coloration property on regular paper.

Alkylene Oxide Adduct or the Like of Diols

An ink of the present invention may contain at least one kind selected from 2,4,7,9-tetramethyl-5-decyne-4,7-diol, 3,6-dimethyl-4-octyne-3,6-diol, an alkylene oxide adduct of 2,4,7,9-tetramethyl-5-decyne-4,7-diol and an alkylene oxide adduct of 3,6-dimethyl-4-octene-3,6-diol. The added amount is preferably no less than 0.05% by weight and no more than 1% by weight. It is not preferable that the added amount of less than 0.05% by weight increases blurring on regular paper. The added amount exceeding 1% by weight worsens the storage stability as the ink jet ink, and long-term preservation becomes difficult. The added amount is more preferably no less than 0.1% by weight and 0.7% by weight.

Alkylene oxide adducts of 2,4,7,9-tetramethyl-5-decyne-4,7-diol, 3,6-dimethyl-4-octyne-3,6-diol and 2,4,7,9-tetramethyl-5-decyne-4,7-diol are commercially available. Surfynol 104, Surfynol 82, Surfynol 2502, Surfynol 420, Surfynol 440, Surfynol 465, Surfynol 485, made by Nissin Chemical Industry Co., Ltd. and acetylenol EOO, acetylenol E40 and acetylenol E100 made by Kawaken Fine Chemicals Co., Ltd. or the like can be obtained.

1,2-Alkylene Glycol

It is preferable that the ink of the invention contains 1,2-alkylene glycol. 1,2-hexanediol and/or 4-methyl-1,2-pentanediol is particularly preferable in 1,2-alkylene glycol, and the discharge stability of the ink jet ink is enhanced by using them to reduce blurring when printing on regular paper.

In the invention, for example in the ink (VIII), 1,2-alkylene glycol of $C_4$ to $C_{10}$ of 0.5 to 15% by weight and polyhydric alcohols of $C_{10}$ or less except 1,2-alkylene glycol of 5 to 30% by weight corresponding to the above description can be used together. In the invention of (VIII), 1,2-alkylene glycol of $C_4$ to $C_{10}$ act on the discharge property during the high-speed continuous discharge of ink droplets, and stable discharge is secured by setting the content to 0.5 to 15% by weight. When the content is less than 0.5% by weight, the weight of an ink droplet tends to become excessive in the high-speed continuous discharge, and the discharge instability accompanied by poor supply of the ink in a head part may be caused. Also, blurring may be caused in solid printing. When the content exceeds 15% by weight, discharge instability is caused by too small a weight of the ink droplets and printing quality is deteriorated, the solid printing is not filled (white lines occur) and sufficient coloration property is not obtained. Examples of 1,2-alkylene glycols of $C_4$ to $C_{10}$ used in the ink (VIII) include 1,2-propanediol, 1,2-butanediol, 1,2-pentanediol, 1,2-hexanediol, 1,2-heptanediol, 1,2-octanediol, 1,2-decanediol, 3,3-dimethyl-1,2-butanediol and 4-methyl-1,2-pentanediol. 1,2-hexanediol and 4-methyl-1,2-pentanediol are more preferable. When using the pigments of the present invention, and furthermore using the above 1,2-alkylene glycols, the discharge stability of the ink can be enhanced and the effect of the blurring reduction during regular paper printing can be obtained.

In the ink (VIII), the polyhydric alcohols of $C_{10}$ or less except the 1,2-alkylene glycol contribute to a usual discharge of a comparatively medium/low speed, or the discharge property of intermittent ink droplets. The amount of the polyhydric alcohols of 5 to 30% by weight realizes stable discharge. When the content the polyhydric alcohols is too little, the ink is readily dried, and the ink is solidified in a nozzle part only by not being applied for an extremely short period of time, thereby poor discharge is caused. When the content is too much, the solidification of ink does not take place. However, the viscosity is readily raised by the evaporation of slight moisture, and flying deflection is generated, thereby poor discharge is caused. The present inventors found that this phenomenon is notably generated when used by combining with the above 1,2-alkylene glycol and that excellent discharge stability can be secured when the range of the content of the polyhydric alcohols of $C_{10}$ or less except the 1,2-alkylene glycol is 5 to 30% by weight.

Examples of the polyhydric alcohols of $C_{10}$ or less except 1,2-alkylene glycol used in the ink (VIII) include diethylene glycol, triethylene glycol, tetraethylene glycol, 1-butoxyethoxypropanol, dipropylene glycol, tripropylene glycol, 1,3-propanediol, 1,3-butanediol, 1,5-pentanediol, hexylene glycol, octylene glycol, glycerin, trimethylol ethane and trimethylolpropane. More preferable examples include triethylene glycol, dipropylene glycol, 1,3-propanediol, glycerin and trimethylolpropane. Furthermore, in the ink of (VIII), it is preferable that the sum of the contents of 1,2-alkylene glycol of $C_4$ to $C_{10}$ and content of polyhydric alcohols of $C_{10}$ or less except the 1,2-alkylene glycol is within the range of 6 to 40% by weight. When the ink jet printer is not used for a while, and the sum of the contents is less than 6% by weight, the moisture evaporation of the ink is advanced, and clogging in the nozzle part due to drying is readily generated. When the sum of the contents is more than 40% by weight, the discharge instability due to increase in the viscosity of the ink is readily generated, and thereby it is preferable that the sum of the contents is within the above range. It is preferable that the content ratio of the 1,2-alkylene glycol and polyhydric alcohols is within the range of 1:50 to 1:1.5. When the ratio of the polyhydric alcohols is higher than 1:50, the discharge stability during the high speed continuous discharge as the effect of the addition of 1,2-alkylene glycol cannot be sufficiently obtained. When the ratio is lower than 1:1.5, the drying of the ink is readily advanced, and intermittent discharge and clogging recovery property are influenced. Thereby, it is preferable that the ratio is within the above range. As another aspect, it is preferable that the ink (VIII) contains 0.5 to 15% by weight of glycol ethers represented by $R^1O-(C_mH_{2m}O)_n-R^2$, wherein m and n are an integer of 1 or more; $m \times n \leq 10$; $R^1$ and $R^2$ are an alkyl group of $C_8$ or less; and $R^1$ and $R^2$ may be the same or different. As described above, a method in which blurring on regular paper is minimal to enable two-sided printing by combining the ink containing 1,2-alkylene glycol and glycol ethers with a nonionic surfactant has been proposed in Japanese Published Unexamined Patent Application No. 2005-154548. However, in the reference, no problem of the added amount and discharge stability is described, and a reduction in the discharge stability has been sometimes actually caused depending on the added amount. That is, in the ink (VIII), the stabilized ink discharge is secured by setting the added amount of the 1,2-alkylene glycol as the above amount and setting the added amount of the glycol ethers to 0.5 to 15% by weight. The glycol ethers act on the ink discharge stability in a usual discharge of a comparatively medium/low speed. When the added amount is too little, the ink weight in the usual discharge tends to be unstable. When the added amount is too much, blurring and bleeding or the like influence the printing quality. Thereby, it is preferable to use the glycol ethers in the above range.

Preferable examples of glycol ethers used for the ink (VIII) include at least one kind selected from di(tri)ethylene glycol mono butyl ether, (di)propylene glycol mono butyl ether, di(tri) ethylene glycol mono pentyl ether and di(tri)ethylene glycol mono hexyl ether. For example, the effect of the blurring reduction during regular paper printing in addition to the enhancement in the discharge stability can be obtained by combining the pigment used for the ink for ink jet recording of (VIII) with the glycol ethers, and the printing quality is thereby enhanced. Particularly preferable examples include at least one kind selected from di(tri)ethylene glycol mono butyl ether and (di)propylene glycol mono butyl ether.

In the ink (VIII), the content ratio of 1,2-alkylene glycol of $C_4$ to $C_{10}$ and the glycol ethers is preferably within the range of 10:1 to 1:10. When the content ratio of the 1,2-alkylene glycol is too large, the above effect obtained by adding the glycol ethers is not sufficiently obtained. When the glycol ethers are conversely too large, the effect obtained by containing 1,2-alkylene glycol is not sufficiently obtained, and thereby it is preferable to set the content ratio to the above range. In the ink (VIII), it is preferable that the sum of the content of 1,2-alkylene glycol of $C_4$ to $C_{10}$, the content of polyhydric alcohols of $C_{10}$ or less except the 1,2-alkylene glycol, and the content of the glycol ethers represented by $R^1O-(C_mH_{2m}O)_n-R^2$ is 7 to 40% by weight, wherein m and n are an integer of 1 or more; $m \times n \leq 10$; $R^1$ and $R^2$ are an alkyl group of $C_8$ or less; and $R^1$ and $R^2$ may be the same or different. When the ink jet printer is not used for a while, and the sum of the contents is less than 7% by weight, the moisture evaporation of the ink is advanced, and clogging in the nozzle part due to drying is readily generated. When the sum of the contents is more than 40% by weight, the discharge instability due to increase in the viscosity of the ink is readily generated, and thereby it is preferable that the sum of the contents is within the above range.

Butyl Ethers

At least one kind selected from di(tri) ethylene glycol mono butyl ether, (di)propylene glycol monobutyl ether, di(tri)ethylene glycol monopenthyl ether and di(tri)ethylene glycol monohexyl ether is preferably contained. The blurring when the ink is printed on regular paper by the ink jet method is further reduced by using the glycol ethers to enhance the printing quality.

Propanediol

It is preferable that the ink of the invention contains 2-butyl-2-ethyl-1,3-propanediol. The gloss property on gloss paper is enhanced and the coloration property on regular paper is enhanced by using 2-butyl-2-ethyl-1,3-propanediol. The preferable amount of 2-butyl-2-ethyl-1,3-propanediol added is 0.1% by weight to 10% by weight.

In the present invention, it is preferable to contain no less than 0.1% by weight and no more than 10% by weight of 2-butyl-2-ethyl-1,3-propanediol, for example, as in the ink (V). When an ink system contains the additive agent, the coloration property on regular paper and the gloss property on gloss paper can be enhanced. Although the additive agent exhibits the improvement effect of printing quality even in a small amount as compared with additive-free ink, it is preferable to add 0.1% by weight or more, more preferable to add 0.5% by weight or more of the additive agent. The solubility of the additive agent to an aqueous ink is low. It is not preferable that the additive agent is not dissolved in the ink to cause the phase separation when the addition exceeds 10% by weight. The added amount is preferably 5.0% by weight or less in view of the storage stability of the ink, and is more preferably 2.0% by weight or less.

Trimethylolpropane

In the present invention, for example, trimethylolpropane of no less than 1% by weight and no more than 20% by weight can be contained, as in the inks (III), (IV), (V). When an ink system contains the additive agent, the clogging reversion property in the head can be improved, and the effect for suppressing the deposition due to the drying of the left ink into the ink jet recording device during frameless printing is obtained. Although the additive agent of a small amount exhibits the above effect as compared with additive-free ink, a remarkable improvement is difficult to be obtained when the additive agent is less than 1% by weight. Thereby, the additive agent of 1% by weight or more is preferable. On the other hand, the addition exceeding 20% by weight is not preferable since the improvement of the clogging and the deposition suppressing effect peak. The added amount is preferably 15% by weight or less, and more preferably 10% by weight or less also in view of the storage stability of the ink.

In the present invention, for example, as in the ink (VIII), at least one kind selected from tetrasaccharide, pentasaccharide and hexasaccharide may also be contained in addition to polyhydric alcohols of $C_{10}$ or less except 1,2-alkylene glycol of $C_4$ to $C_{10}$ in order to prevent the clogging of the ink jet head.

In the present invention, for example, as in the ink (XII), at least one kind selected from glycerin, trimethylolethane, trimethylolpropane, tetrasaccharide, pentasaccharide and hexasaccharide may be contained in order to prevent the clogging of the ink jet head.

The polymer in the ink of the invention has a carboxyl group. It is preferable that the ink of the invention contains triethanolamine and/or tripropanolamine as a counter ion. The clogging of the ink jet ink is hardly occurred even in a drying state by using the triethanolamine and/or the tripropanolamine.

In the present invention, a dispersant, a surface tension modifier or a penetrating agent (surfactant), a humid drying prevention agent, a preservative, a disinfectant, a PH modifier, a corrosion inhibitor, a moisturizer and the other additive agents may be further used if needed. These additive agents may be used singly or in combination of two kinds or more.

Producing Method for Ink for Ink Jet Recording

The producing method of the ink for ink jet recording of the present invention includes the steps of emulsifying alkali or the like such as the polymer for ink jet ink of the invention, aqueous medium, and sodium hydroxide by high-speed stirring, inputting a pigment or the like, and strongly dispersing the mixture in a disper or the like. The method may further include, according to need, the steps of dispersing in a three-roll mill or the like, dispersing the obtained pigment slurry to a predetermined particle diameter in a high pressure dispersing machine or the like, and removing an organic solvent or the like from the obtained pigment dispersion.

The above high pressure dispersing machine is not particularly limited, and examples thereof include a Microfluidizer (Microfluidics), Ultimizer (Sugino Machine Limited), wet jet mill (Genus Co., Ltd.) and Nanomizer (Nanomizer Co., Ltd.).

The pressure during dispersing in the above high pressure dispersing machine is not limited as long as a desired pigment particle diameter can be reached, and is preferably 100 MPa to 300 MPa. The pressure of less than 100 MPa readily increases the dispersed particle diameter, and a long time is required for dispersing. Also, the stabilized dispersion is hardly formed unless the number of passes is extremely increased, and thereby the pressure of less than 100 MPa is not economical. The pressure exceeding 300 MPa readily causes excessive dispersion, and the stability of the dispersion is hardly obtained. When the desired pigment particle diameter cannot be reached, the number of times of dispersion may be increased in the above pressure range, or the dispersion may be carried out by increasing the pressure.

The method may use a polymer solution for ink jet ink, which is obtained by adding an alkaline solution to the above polymer for ink jet ink in which the polymerization has been completed, heating the polymer, removing a solvent, and replacing by ion exchanged water or the like.

It is preferable that a dispersion method using the polymer used in the invention is an inversion emulsification in water so that the pigment is covered with the polymer. The ink becomes stable by using the inversion emulsification method, and the coloration property on regular paper is improved.

The method may further use a polymer solution for ink jet ink, which is obtained by removing a solvent contained in the above polymer for ink jet ink in which the polymerization has been completed using reduced-pressure distillation, grinding the solid of the obtained polymer for ink jet ink, adding ion exchanged water and an alkaline solution or the like, and heat-solving the mixture. In this case, it is not necessary to remove the organic solvent or the like from the obtained pigment dispersion.

Examples of alkalis used for the above alkaline solution include tertiary alkyl alkanolamines such as triethanolamine, tripropanolamine, and inorganic bases such as sodium hydroxide, potassium hydrate and lithium hydroxide.

In the present invention, for example, as in the pigment dispersion and producing method of (VI), an inversion emulsification method for modifying so that the pigment is covered with the polymer is suitable. In consideration of the dispersibility of the polymer, the amount of the disperse medium used during the inversion emulsification may be varied according to the weight average molecular weight of the polymer. That is, when the weight average molecular weight of the polymer is no less than 50000 and no more than 120000, it is preferable that the amount of the disperse medium except water during the dispersion is no less than 95% by weight and no more than 300% by weight based on the pigment. The amount of less than 95% by weight causes an insufficient dispersion state. The amount exceeding 300% by weight reduces the attainment frequency of the polymer onto the surface of the pigment, the inversion emulsification requires time, and the polymer is insufficiently modified onto the surface of the pigment.

As in the producing method for the pigment dispersion of (VI), when the weight average molecular weight of the polymer is less than 50000, it is preferable that the amount of the disperse medium is no less than 45% by weight and less than 180% by weight based on the pigment. For the same reason as the above description, the amount of less than 45% by weight causes an insufficient dispersion state, and the amount of 180% by weight or more reduces the attainment frequency of the polymer onto the surface of the pigment, the inversion emulsification requires time, and the polymer is insufficiently modified onto the surface of the pigment. When the weight average molecular weight of the above polymer is no less than 50000 and no more than 120000, the effect can be obtained in the case where the amount of the disperse medium except water during the dispersion is no less than 95% by weight and no more than 300% by weight based on the pigment. It is more preferable that the weight average molecular weight is no less than 150% by weight and no more than 280% by weight. When the weight average molecular weight of the polymer is less than in 50000, the amount of the disperse medium only needs to be no less than 45% by weight and less than 180% by weight. It is more preferable that the amount is no less than 50% by weight and no more than 150% by weight. The ink becomes stable by using the inversion emulsification method under this condition, and the coloration property on regular paper is improved.

In the present invention, the processing pressure of the high pressure homogenizer is preferably 150 MPa or more when producing the pigment dispersion as in the ink (IX) and the producing method thereof. The processing pressure of less than 150 MPa deteriorates the storage stability as the pigment ink for ink jet. The processing pressure is more preferably no less than 180 MPa and no more than 245 MPa. The processing pressure is still more preferably no less than 190 MPa and no more than 220 MPa. The high processing pressure readily causes excess dispersion, and therefore, the storage stability as the pigment ink for ink jet is deteriorated. The number of passes is preferably no less than 3 and no more than 8. The number of passes of less than 3 causes insufficient dispersion, and thereby the storage stability as the pigment ink for ink jet is deteriorated. Furthermore, the gloss property on gloss paper is also deteriorated. The number of passes exceeding 8 readily causes excessive dispersion, and thereby the storage stability as the pigment ink for ink jet is deteriorated.

In the present invention, for example as in the ink (IX) and the producing method thereof, it is preferable to process the above pigment and the polymer solution as the dispersant for 30 passes or less under the processing pressure of 150 MPa or more in the high-pressure homogenizer. It is more preferable to prepare the ink for ink jet recording by using the pigment dispersion produced by carrying out the dispersion processing of no less than 3 passes and no more than 8 passes, and by mixing the pigment dispersion with vehicle components. According to this producing method, the gloss property on gloss paper is improved.

A non-media dispersion system is preferable as the dispersing machine used in the ink (IX) and the producing method thereof. The dispersing machine may be, for example, a wet jet mill (Genus Co., Ltd.), Nanomizer (Nanomizer Co., Ltd.), Homogenizer (Gorlin Co., Ltd.), Ultimaizer (Sugino Machine Limited), or Microfluidizer (Microfluidics).

In the ink (IX), the added amount of the pigment is preferably 0.5 to 30%, and more preferably 1.0 to 15%. The added amount of 0.5% or less can not secure the printing density. The added amount of 30% or more tends to cause an increase in viscosity and generation of structural viscosity in viscosity characteristics of the ink to worsen the discharge stability of the ink from the ink jet head. As the vehicle component of the ink (IX), a surfactant, an organic solvent and a moisturizer or the like can be used. At least the surfactant is preferably added from a standpoint that the surface tension of no less than 20 mN/m and no more than 40 mN/m extends the dot diameter printed by ink jet to the optimal width. It is more preferable that the surfactant is at least one kind selected from an acetylene alcohol-based surfactant, an acetylene glycol-based surfactant and a silicone-based surfactant. The blurring on regular paper is particularly reduced by using these surfactants, and it becomes possible to extend the dot diameter on the specialized paper to the optimal width. At least alkylene glycol monoalkyl ether and/or 1,2-alkylene glycol are preferably added so as to set the surface tension of the pigment ink for ink jet of (IX) to no less than 20 mN/m and no more than 40 mN/m. It is preferable that the alkylene glycol monoalkyl ether is an alkylene glycol having repeating units of 10 or less and an alkyl ether having 4 to 10 carbons. It is preferable that the above alkylene glycol monoalkyl ether is di(tri)ethylene glycol mono butyl ether and/or (di)propylene glycol mono butyl ether. In addition, it is preferable that the above 1,2-alkylene glycol is 1,2-hexanediol and/or 1,2-pentanediol. The drying of the print is improved by the addition, and since even when continuous printing is performed, a previously printed part will not become transferred onto the rear surface of a subsequent medium, high-speed printing is enabled. It is preferable that the added amount of at least one kind of substance selected from the acetylene glycol-based surfactant, the acetylene alcohol-based surfactant and the silicone-based surfactant is no less than 0.1% and no more than 5%. It is preferable that the ink for ink jet recording contains at least one kind selected from the above acetylene glycol-based surfactant, acetylene alcohol-based surfactant and silicone-based surfactant, and at least one kind selected from di(tri)ethylene glycol mono butyl ether, (di)propylene glycol mono butyl ether and 1,2-alkylene glycol. It is preferable that the added amount of at least one kind selected from the above acetylene glycol-based surfactant, acetylene alcohol-based surfactant and silicone-based surfactant is 0.01% to 0.5%, and the added amount of at least one kind selected from di(tri)ethylene glycol monobutyl ether, (di)propylene glycol monobutyl ether and 1,2-alkylene glycol is 1% or more.

In the present invention, it is preferable to use a pigment dispersion obtained by modifying the polymer used in the present invention on the surface of the self-dispersed pigment particle, for example, as in the ink (X). The pigment dispersion can be obtained by using an inversion emulsification method or the like for modifying so that the polymer is covered with the surface of the self-dispersed pigment particle. Thereby, the ink is stabilized, and the coloration property on regular paper is improved.

Furthermore, in the present invention, when the pigment particle diameter cannot be reached to a desirable diameter, for example, at the time of producing the pigment dispersion of the ink (X), the number of times of dispersion may be increased, or the pressure may be increased in the range of the above pressure to disperse. It is preferable that the number of times of dispersion is at most 30 times or less from an economical standpoint and a desired dispersed form is obtained.

The high pressure dispersing machine used when producing the inks (XIV) and (XVI) is not particularly limited. However, it is preferable to use a medialess dispersing machine in view of the commingling of contamination and the dispersion stability. Examples thereof include a Microfluidizer (Microfluidics), Ultimizer (Sugino Machine Limited), a wet jet mill (Genus Co., Ltd.) and Nanomizer (Nanomizer Co., Ltd.).

In the present invention, it is preferable to use the inversion emulsification method for modifying so that the pigment is covered with the polymer, for example, as in the pigment dispersion for the ink for ink jet recording, producing method of (XV) and the ink. Thereby the ink is stabilized and the coloration property on regular paper is improved. In the production of the pigment dispersion for ink jet recording of (XV), it is preferable to carry out processing by a high pressure homogenizer using no media. It is not preferable that the particle size distribution readily spreads in the dispersion using media such as a beads mill and the contamination of media is readily generated. Examples of the high pressure homogenizers include a Microfluidizer (Microfluidics), Ultimizer (Sugino Machine Limited), a wet jet mill (Genus Co., Ltd.) and Nanomizer (Nanomizer Co., Ltd.).

In the present invention, for example, a wet cake of a pigment in the producing method (XIII) can be produced as follows. That is, after synthesizing the pigment, crude is produced and the pigment is ground by carrying out salt milling by using the crude. Then, desalination processing is carried out by washing using ion exchanged water, and a wet cake of a state where water is contained is produced. When using a powder pigment, a pigment is moisturized, and the powder pigment is used as a moisturized pigment obtained by forcibly dispersing using a mill such as a two-roll mill or three-roll mill.

As the dispersing machine used in the producing process of the pigment dispersion in the producing method (XIII), a non-media dispersion system is preferable. Of these, the examples include a wet jet mill (Genus Co., Ltd.), Nanomizer (Nanomizer Co., Ltd.), Homogenizer (Gorlin Co., Ltd.), Ultimizer (Sugino Machine Limited) and Microfluidizer (Microfluidics). Thus, the pigment ink for ink jet which has high coloring on regular paper, high gloss on specialized paper and excellent discharge stability of the ink from the ink jet head can be provided by producing the above ink for ink jet recording.

The processing pressure of the high pressure homogenizer used in the producing process of the pigment dispersion of (XIII) is preferably 150 MPa or more. The processing pressure of less than 150 MPa deteriorates the storage stability as the pigment ink for ink jet. The processing pressure is more preferably no less than 180 MPa and no more than 245 MPa. The processing pressure is still more preferably no less than 190 MPa and no more than 220 MPa. The high processing pressure readily causes excess dispersion, and therefore, the storage stability as the pigment ink for ink jet is deteriorated. The number of passes is preferably no less than 3 and no more than 8. The number of passes of less than 3 causes insufficient dispersion, and thereby the storage stability as the pigment ink for ink jet is deteriorated. Furthermore, the gloss property on gloss paper is also deteriorated. The number of passes exceeding 8 readily causes excessive dispersion, and thereby the storage stability as the pigment ink for ink jet is deteriorated.

In the producing method for the pigment ink (XIII), the method uses a mixed pigment obtained by mixing the wet cake of the pigment through no drying process after synthesizing the pigment, or the powdery pigment with water and dispersing the mixture in the two-roll mill or the three-roll mill. Since these are not in a dried state, they can be uniformly dispersed. After mixing the mixed pigment with the polymer solution and disperse medium as the dispersant and mixing the above pigment of the wet state with the polymer solution and the disperse medium as the dispersant, it is preferable that the mixed pigment is produced by carrying out dispersion processing in the high pressure homogenizer, and by mixing with the vehicle components. Thereby, the pigment is uniformly dispersed, and the gloss property on gloss paper is enhanced. When the powder pigment once subjected to the drying process is used as it is, it becomes difficult to obtain the dispersion having a uniform particle size for recondensation. In the pigment ink for ink jet using the ununiform dispersion, the gloss property on gloss paper is readily deteriorated.

When the pigment is an organic pigment in the producing method (XIII), the organic pigment can be ground by a salt milling method or the like, and thereby the gloss property on gloss paper is improved.

Ink Jet Recording Method

The ink jet recording method of the present invention supplies the droplets of the inks for ink jet recording of various kinds of modes of the present invention to recording media such as paper by the conventionally known method to form an image.

In particular, in the present invention, for example, as in the ink jet recording method according to the invention of (XI), the ink for ink jet recording of at least cyan, magenta and yellow which are produced by the above polymer, composition and method or the like are used. The ink is applied in the order of cyan, magenta and yellow, and thereby a third color containing black color can be formed to realize the image.

In the ink jet recording method (XI), it is preferable to apply the cyan ink to print media first. The coloration property can be most highly obtained by first applying the cyan ink in the multi dimensional color using the cyan ink as a constituent element. On the other hand, the coloration property of the cyan ink is reduced by the dot previously applied when applying another ink before applying the cyan ink, and blurring is readily generated. Thereby, it is preferable to apply the cyan ink first.

In the ink jet recording method (XI), it is preferable to finally apply the yellow ink to the recording medium. The gloss property on gloss paper can be most highly obtained in the multi dimensional color which uses the yellow ink as a constituent element by finally applying the yellow ink. On the other hand, when applying another ink after the yellow ink, a phenomenon occurs, in which the transparency of the subsequently applied ink is also lost in addition to the transparency of the yellow ink, and the gloss property is reduced. Thereby, it is preferable to finally apply the yellow ink.

Furthermore, in the ink jet recording method (XI), the magenta ink is preferably applied between the cyan ink and the yellow ink. Since the magenta ink is located in the middle of the characteristics of the cyan ink and yellow ink, exhibits the same action as that of yellow in the mixture of the magenta ink and cyan ink, and exhibits the same action as that of cyan in the mixture of the magenta ink and yellow ink, the magenta ink is preferably applied to the middle.

When the ink kind which constitutes an ink set exceeds three kinds of cyan, magenta and yellow in the ink jet recording method (XI), a color near cyan is preferably applied in color order between cyan and magenta, and a color near yellow is preferably applied in color order between magenta and yellow. The coloration property and the gloss property can be most effectively exhibited in multi dimensional color containing black color by applying in order.

Figure 2:
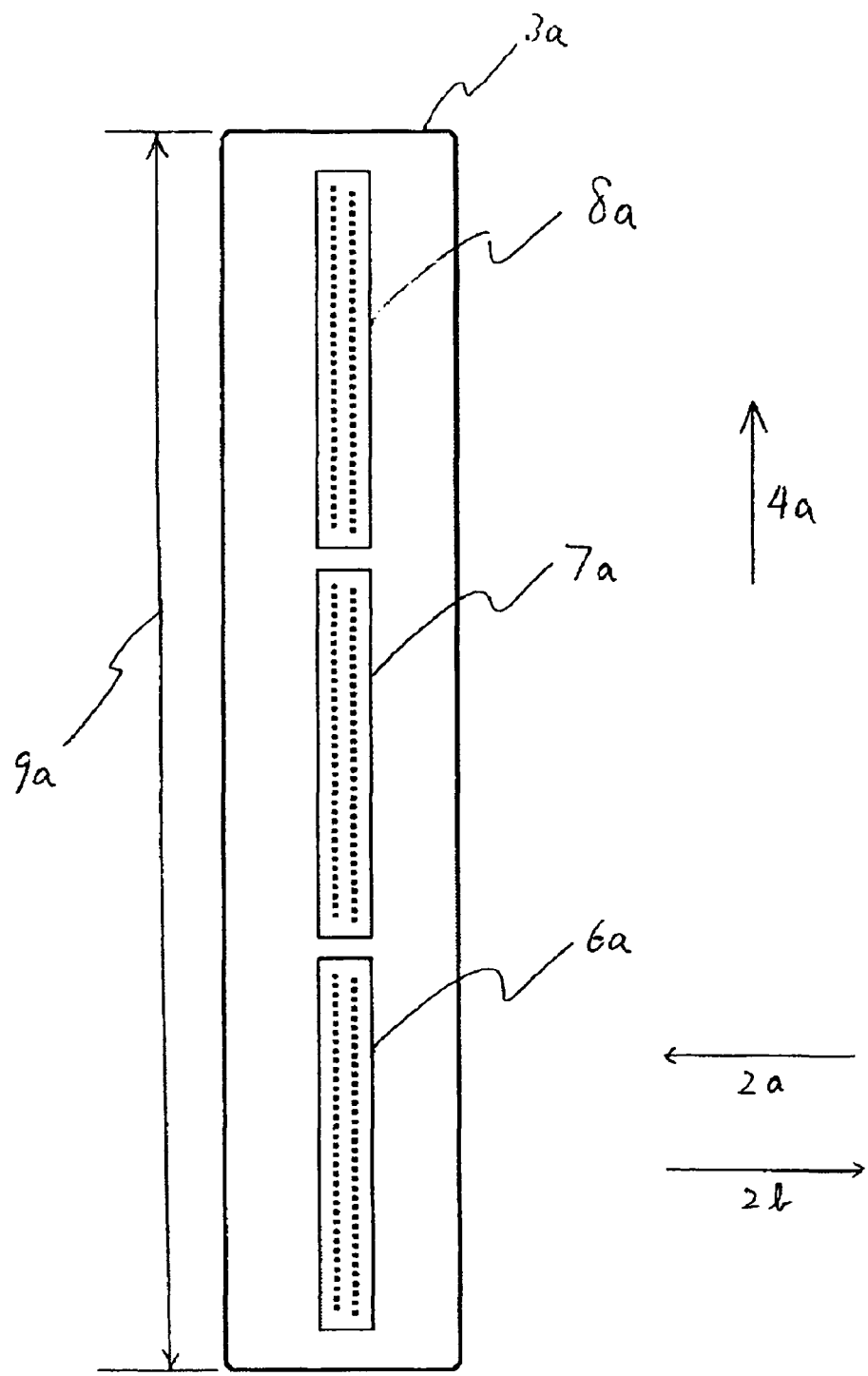
FIG. 2 is a nozzle arrangement diagram of a print head in which a color arrangement of an ink nozzle is a longitudinal arrangement.

Furthermore, in the ink jet recording method (XI), it is preferable that the color arrangement of a nozzle in a print head is perpendicularly arranged to the printing scanning direction of a head, that is, parallel to the scanning direction of a recording medium. In addition, it is preferable that the printing is carried out by using an ink jet recording device which contains cyan, magenta and yellow in a fast order of the application to the recording medium. In the ink jet recording, referring to the application to the recording medium, it is preferable that the ink can be applied in both an outward and a homeward when a print head carries out a printing scan in view of printing speed. In the ink jet recording device 1 of FIG. 1, an arrow 2 shows the scanning direction (hereinafter, referred to as main scanning direction) of a print head 3, and an arrow 4 shows the scanning direction (hereinafter, referred to as subscanning direction) of a recording medium 5. However, at this time, as shown in the print head 3a of FIG. 2, when the nozzle arrangement of the print head 3 is arranged so that the arrangement of the color is parallel to the subscanning direction 4a, even if the application is carried out in any of an outward 2a1 and homeward 2a2 of the main scan, the application order of cyan 6a, magenta 7a and yellow 8a become the same. Therefore, the printing operation can be carried out by using both the outward and the homeward, and it becomes possible to carry out excellent printing at high speed.

Figure 3:
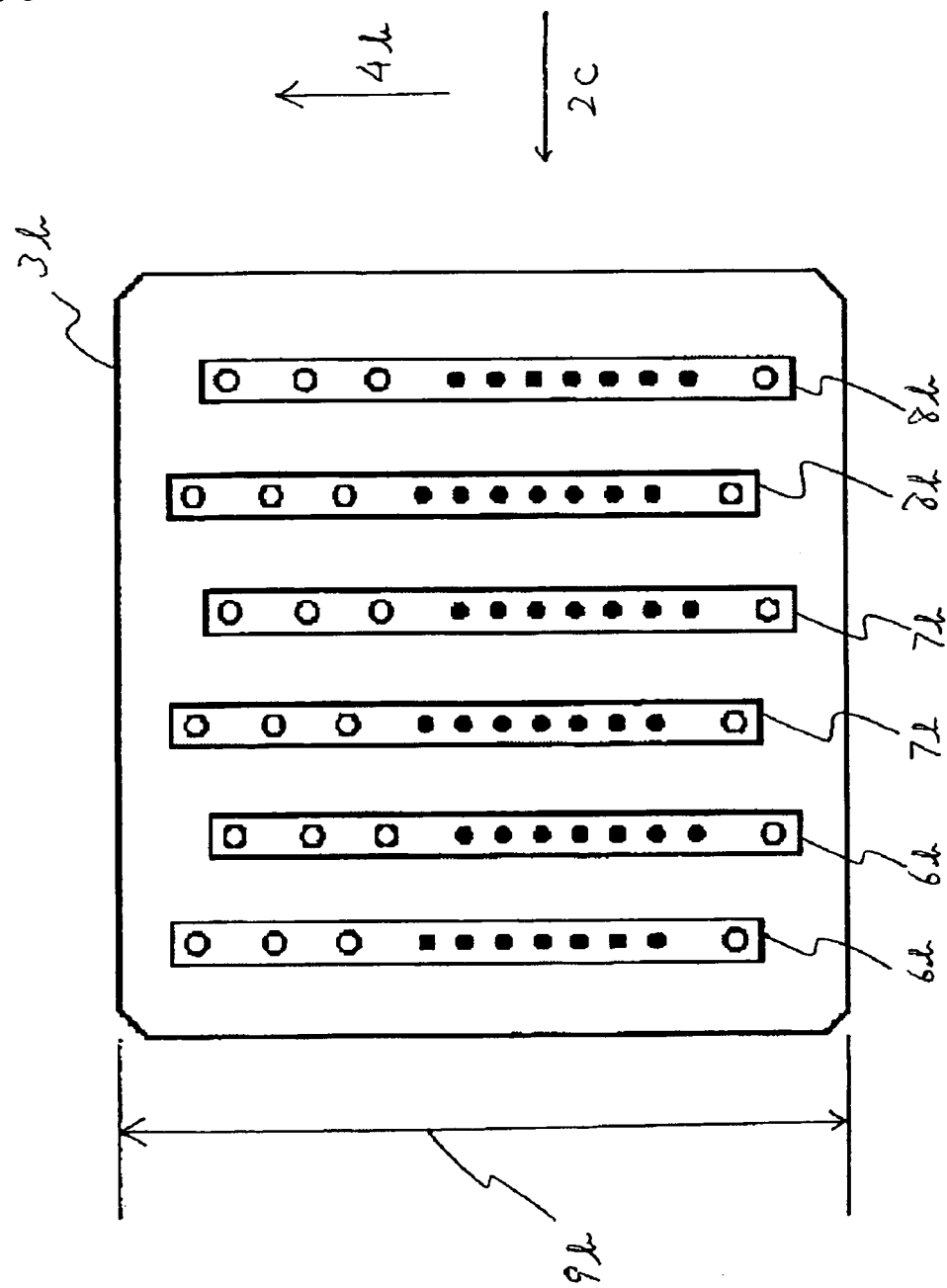
FIG. 3 is a nozzle arrangement diagram 1 of a print head in which a color arrangement of an ink nozzle is a transversal arrangement.
Figure 4:
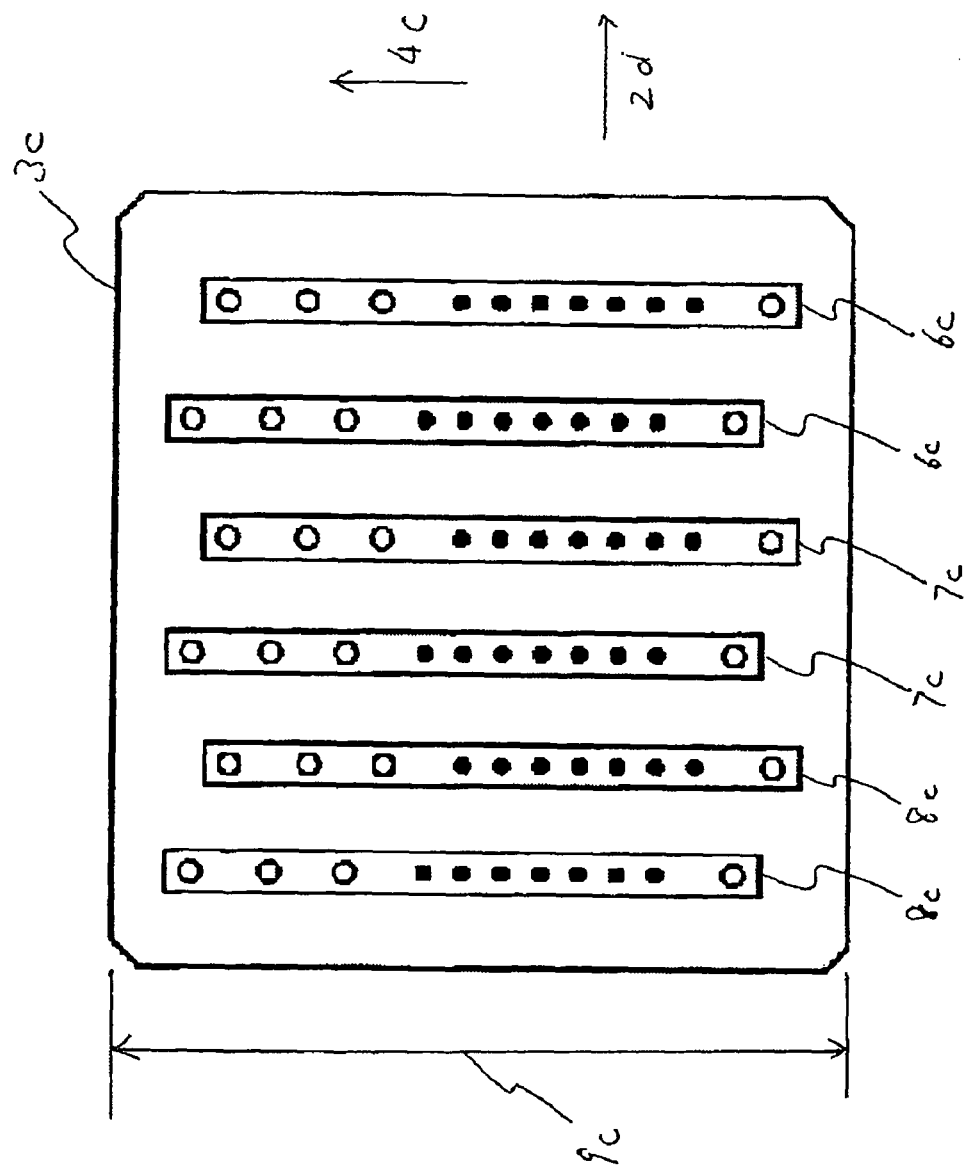
FIG. 4 is a nozzle arrangement diagram 2 of a print head in which a color arrangement of an ink nozzle is a transversal arrangement.

Furthermore, in the ink jet recording method (XI), the printing is carried out only at the time of the outward scan by using the ink jet recording device in which the color arrangement in the print head is parallel to the printing scanning direction of the head, that is, the arrangement order is cyan, magenta and yellow in the scanning direction of the print head. It is also preferable that the printing is carried out only at the time of the homeward scan by using the ink jet recording device in which the arrangement order is yellow, magenta and cyan. In this case, the printing speed becomes slower as compared with one in which color arrangement is longitudinal since the application scan is any of the outward or homeward. However, since a head length 9 is proportionally increased as the color number is increased in the longitudinal arrangement, and the printing area in one scan is increased, a problem is generated, in that the impact accuracy of the dots is reduced and a recorder is increased in size. On the other hand, since a head length b is not based on the color number and is not changed in the transversal arrangement, the recorder has an advantage that the printing area in one scan is not also changed, and the recorder is only slightly increased in size in the transverse direction, and the impact accuracy of the dots is hardly reduced. Thereby, when the color number is more, as shown in FIG. 3, the printing is carried out only at the time of the outward scan (2b) by using an ink jet recording device in which cyan 6b, magenta 7b and yellow 8b are arranged in this order in the transversal arrangement. Or, as shown in FIG. 4, the printing is carried out only at the time of the homeward scan (2c) by using an ink jet recording device in which yellow 8c, magenta 7c and cyan 6c are arranged in this order. Thereby, it becomes possible to obtain the printing image of multi dimensional color which exhibits the high coloring on any of regular paper and gloss paper, has the excellent gloss property on gloss paper and contains black color.

EXAMPLES

The present invention will be more specifically explained with reference to the following examples. However, the present invention is not limited to these examples, and various changes can be carried out without departing from the spirit of the present invention.

Example I

Example I-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of cyclohexyl acrylate, 33.3 parts by weight of methacrylic acid, 25.2 parts by weight of acrylic acid, and 4.8 parts by weight of t-butylperoxy(2-ethylhexanoate) were placed in the dripping funnel, and the resultant solution was dripped into the separable flask at 80° C. over a period of 4 hours to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 43000.

Next, 3.0 parts by weight of a 30% sodium hydroxide solution was then added into 120.0 parts by weight of the thus produced polymer composition solution, and the resultant solution was stirred by a high speed disper for 5 minutes. Furthermore, 120.0 parts by weight of Cyanine Blue G-500 pure-A (C.I.PB15:1; made by Sanyo Color Works, Ltd.) was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After methyl ethyl ketone was removed from the pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink composition Example 1 shown in Table I-1 was produced.

Example I-2

An ink of composition example 2 shown in Table I-1 was produced in the same manner as in Example 1, except that 483.0 parts by weight of benzil acrylate was used in place of 483.0 parts by weight of cyclohexyl acrylate and 0 parts by weight of methacrylic acid and 50.4 parts by weight of the acrylic acid were used. After taking a part of the polymer composition solution and drying the polymer composition solution in an ignition drier of 105° C. for 1 hour, the acid value of the solid of the obtained polymer composition for the ink jet ink was 60 mgKOH/g, and the weight average molecular weight thereof was 32000.

Example I-3

An ink of composition example 3 shown in Table I-1 was produced in the same manner as in Example 1, except that 4.8 parts by weight of the t-butylperoxy(2-ethylhexanoate) was changed to 7.2 parts by weight thereof. After taking a part of the polymer composition solution and drying the polymer composition solution in an ignition drier of 105° C. for 1 hour, the acid value of the solid of the obtained polymer composition for ink jet ink was 80 mgKOH/g, and the weight average molecular weight thereof was 80000.

Example I-4

An ink of composition example 4 shown in Table I-1 was produced in the same manner as in Example 2, except that 4.8 parts by weight of the t-butylperoxy(2-ethylhexanoate) was changed to 7.2 parts by weight thereof. After taking a part of the polymer composition solution and drying the polymer composition solution in an ignition drier of 105° C. for 1 hour, the acid value of the solid of the obtained polymer composition for ink jet ink was 55 mgKOH/g, and the weight average molecular weight thereof was 39000.

Example I-5

An ink of composition example 5 shown in Table I-1 was produced in the same manner as in Example 1, except that 120.0 parts by weight of Fast Yellow 7413-A (C.I.PY74; made by Sanyo Color Works, Ltd.) was used in place of 480.0 parts by weight of Cyanine Blue G-500 pure-A having the pigment concentration of 25% by weight.

Example I-6

An ink of composition example 6 shown in Table I-1 was produced in the same manner as in Example 4, except that 120.0 parts by weight of Fast Yellow 7413-A was used in place of 120.0 parts by weight of Cyanine Blue G-500 pure-A.

Example I-7

An ink of composition example 7 shown in Table I-1 was produced in the same manner as in Example 1, except that 120.0 parts by weight of Pigment Violet GC227-A (C.I.PV19; made by Sanyo Color Works, Ltd.) was used in place of 120.0 parts by weight of Cyanine Blue G-500 pure-A.

Example I-8

An ink of composition example 8 shown in Table I-1 was produced in the same manner as in Example 4, except that 120.0 parts by weight of Pigment Violet GC227-A was used in place of 120.0 parts by weight of Cyanine Blue G-500 pure-A.

Example I-9

An ink of composition example 9 shown in Table I-1 was produced in the same manner as in Example 1, except that 200.0 parts by weight of the diethylene glycol monomethyl ether, 540.6 parts by weight of the cyclohexyl acrylate, 32.4 parts by weight of the methyl acrylate, 27.0 parts by weight of the acrylic acid, and 4.8 parts by weight of the t-butylperoxy (2-ethylhexanoate) were used in place of 200.0 parts by weight of diethylene glycol monomethyl ether, 483.0 parts by weight of cyclohexyl acrylate, 66.6 parts by weight of methyl acrylate, 50.4 parts by weight of acrylic acid and 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 32000.

Example I-10

An ink of composition example 10 shown in Table I-1 was produced in the same manner as in Example 1, except that 200.0 parts by weight of the diethylene glycol monomethyl ether, 363.0 parts by weight of the cyclohexyl acrylate, 66.6 parts by weight of the methyl acrylate, 50.4 parts by weight of the acrylic acid, 120.0 parts by weight of stearyl methacrylate and 5.4 parts by weight of the t-butylperoxy(2-ethylhexanoate) were used in place of 200.0 parts by weight of diethylene glycol monomethyl ether, 483.0 parts by weight of cyclohexyl acrylate, 66.6 parts by weight of methyl acrylate, 50.4 parts by weight of acrylic acid and 4.8 parts by weight of t-butylperoxy(2-ethylhexanoate), and the dripping temperature, holding temperature and reaction temperature of 85° C. were used in place of the dripping temperature, holding temperature and reaction temperature of 80° C. After taking a part of the polymer composition solution and drying the polymer composition solution in an ignition drier of 105° C. for 1 hour, the acid value of the solid of the obtained polymer composition was 130 mgKOH/g, and the weight average molecular weight thereof was 33000.

Example I-11

After carrying out sufficient nitrogen replacement of the interior of a separable flask of 2000 ml equipped with a stirrer, a reflux tube, a temperature sensor and a dripping funnel, 200.0 parts by weight of methyl ethyl ketone was placed in the separable flask and heated to 80° C. while being stirred.

Then, 200.0 parts by weight of methyl ethyl ketone, 520.8 parts by weight of cyclohexyl acrylate, 36.6 parts by weight of methyl acrylate, 30.6 parts by weight of acrylic acid, 12.0 parts by weight of 2-(diethyl amino) ethyl methacrylate, and 4.8 parts by weight of 2,2'-azobisisobutylnitrile were placed in the dripping funnel, and dripped into the separable flask at 80° C. over a period of 4 hours. After the completion of the dripping, the separable flask was held at 80° C. for 1 hour, and 0.8 parts by weight of 2,2'-azobisisobutylnitrile was added into the separable flask. Furthermore, the reaction was carried out at 80° C. for 1 hour.

After the completion of the aging, the separable flask was cooled to 25° C. 200.0 parts by weight of methyl ethyl ketone was then added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 80 mgKOH/g, and the weight average molecular weight thereof was 33000.

6.0 parts by weight of a 30% sodium hydroxide solution was then added into 120.0 parts by weight of the polymer composition solution, and the resultant solution was stirred by a high speed disper for 5 minutes. Furthermore, 480.0 parts by weight of Cyanine Blue G-500 pure-A having a pigment concentration of 25% by weight was added into the solution, and the resultant solution was stirred by the high speed disper for 1 hour to obtain pigment dispersion slurry.

The pigment dispersion slurry was repeatedly dispersed for 20 passes at 200 MPa by a high pressure homogenizer (Microfluidizer) to obtain pigment dispersion.

After methyl ethyl ketone was removed from the pigment dispersion by reduced-pressure distillation, and the pigment dispersion was centrifugally separated in a centrifugal separator (05P-21) at 5000 rpm for 30 minutes, pigment dispersion for ink jet ink was adjusted by adding ion exchanged water so that the pigment concentration was set to 15% by weight. A pressure filtration was carried out using a membrane filter (made by Advantec Co., Ltd.) of 2.5 μm. Then, an ink for ink jet of ink composition Example 11 shown in Table I-1 was produced.

Example I-12

An ink of composition example 12 shown in Table I-1 was produced in the same manner as in Example 11, except that 200.0 parts by weight of methyl ethyl ketone, 502.8 parts by weight of cyclohexyl acrylate, 36.6 parts by weight of methyl acrylate, 30.6 parts by weight of acrylic acid, 30.0 parts by weight of 2-hydroxyethyl methacrylate, and 4.8 parts by weight of azobisisobutyronitrile were used in place of 200.0 parts by weight of methyl ethyl ketone, 520.8 parts by weight of cyclohexyl acrylate, 36.6 parts by weight of methyl acrylate, 30.6 parts by weight of acrylic acid, 12.0 parts by weight of 2-(diethyl amino)ethyl methacrylate, and 4.8 parts by weight of azobisisobutyronitrile.

After taking a part of the polymer composition solution and drying the polymer composition solution in an ignition drier of 105° C. for 1 hour, the acid value of the solid of the obtained polymer composition was 80 mgKOH/g, and the weight average molecular weight thereof was 32000.

Example I-13

After carrying out nitrogen replacement of the interior of a separable flask of 2000 ml equipped with a stirrer, a reflux tube, a temperature sensor and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of cyclohexyl acrylate, 66.6 parts by weight of methyl acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. After the completion of the dripping, the separable flask was held at 80° C. for 1 hour, and 0.8 parts by weight of t-butylperoxy (2-ethylhexanoate) was added into the separable flask. Furthermore, the reaction was carried out at 80° C. for 1 hour.

The diethylene glycol monomethyl ether was then removed by reduced-pressure distillation. 600.0 parts by weight of methyl ethyl ketone was added to obtain a polymer composition solution for ink jet ink having a resin solid content of 50%. After taking the thus obtained polymer composition solution and drying the polymer composition solution in an ignition drier of 105° C. for 1 hour, the solid of the polymer composition was obtained.

Next, 300.0 parts by weight of the solid of the pulverized polymer composition and 727.0 parts by weight of ion exchanged water were placed and stirred in a separable flask of 2000 ml equipped with a stirrer, a reflux tube, a temperature sensor and a dripping funnel. Then, 173.0 parts by weight of a 30% sodium hydroxide solution was placed in a dripping funnel, and was dripped into the separable flask over a period of 5 minutes. After the completion of the dripping, the separable flask was heated to 90° C., and was held at 90° C. for 2 hours, the separable flask was cooled to a room temperature to obtain a polymer composition solution. The solid content concentration of the thus obtained polymer composition solution for ink jet ink was 29.0%, and the PH thereof was 9.2.

480.0 parts by weight of Cyanine Blue G-500 pure-A having a pigment concentration of 25% by weight was added into 206.0 parts by weight of the polymer composition solution for ink jet ink, and the resultant solution was stirred by a high speed disper for 1 hour to obtain pigment dispersion slurry. The pigment dispersion slurry was then repeatedly dispersed for 20 passes at 200 MPa by a high pressure homogenizer (Microfluidizer) to obtain pigment dispersion.

After the pigment dispersion was centrifugally separated in a centrifugal separator (05P-21) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink for ink jet of ink composition Example 13 shown in Table I-1 was produced.

Example I-14

After carrying out nitrogen replacement of the interior of a separable flask of 2000 ml equipped with a stirrer, a reflux tube, a temperature sensor and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 66.6 parts by weight of methyl acrylate, 50.4 parts by weight of acrylic acid, and 4.8 parts by weight of t-butylperoxy(2-ethylhexanoate) were placed in the dripping funnel, and the resultant solution was dripped into the separable flask at 80° C. over a period of 4 hours. After the completion of the dripping, the separable flask was held at 80° C. for 1 hour, and 0.8 parts by weight of t-butylperoxy(2-ethylhexanoate) was added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution for ink jet ink having a resin solid content of 50%.

Next, the polymer composition solution was placed in a separable flask of 3000 ml equipped with a stirrer, a reflux tube, a temperature sensor and a dripping funnel, and 1454.0 parts by weight of ion exchanged water and 346.0 parts by weight of a 30% sodium hydroxide solution were placed in the dripping funnel. The solution was dripped into the separable flask over a period of 20 minutes. After the completion of the dripping, the separable flask was held at 80° C. for 30 minutes, the methyl ethyl ketone was removed by reduced-pressure distillation to obtain a polymer composition solution. The solid content concentration of the thus obtained polymer composition solution was 30.5%, and the PH thereof was 9.1. After taking a part of the polymer composition solution and drying the polymer composition solution in an ignition drier of 105° C. for 1 hour, the acid value of the solid of the obtained polymer composition was 130 mgKOH/g, and the weight average molecular weight thereof was 32000.

480.0 parts by weight of Cyanine Blue G-500 pure-A having a pigment concentration of 25% by weight was added into 197.0 parts by weight of the polymer composition solution, and the resultant solution was stirred by the high speed disper for 1 hour to obtain pigment dispersion slurry. The pigment dispersion slurry was repeatedly dispersed for 20 passes at 200 MPa by an ultrahigh pressure homogenizer (Microfluidizer) to obtain pigment dispersion. After the pigment dispersion was centrifugally separated in a centrifugal separator (05P-21) at 5000 rpm for 30 minutes, pigment dispersion for ink jet ink was adjusted by adding ion exchanged water so that the pigment concentration was set to 15% by weight. A pressure filtration was carried out using a membrane filter (made by Advantec Co., Ltd.) of 2.5 μm. Then, an ink for ink jet of ink composition Example 14 shown in Table I-1 was produced.

Reference Example I-1

An ink of Reference Example 1 shown in Table I-3 was produced in the same manner as in Example 1, except that 483.0 parts by weight of 2-ethyl hexyl acrylate was used in place of 483.0 parts by weight the cyclohexylacrylate. After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 38000.

Reference Example I-2

An ink of Reference Example 2 shown in Table I-3 was produced in the same manner as in Example 3, except that 483.0 parts by weight of 2-ethyl hexyl acrylate and 16.8 parts by weight of the t-butylperoxy(2-ethylhexanoate) were used in place of 483.0 parts by weight of the cyclohexyl acrylate and 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 8000.

Reference Example I-3

An ink of Reference Example 3 shown in Table 3 was produced in the same manner as in Example 1, except that 483.0 parts by weight of lauryl acrylate was used in place of 483.0 parts by weight of the cyclohexyl acrylate. After taking a part of the polymer composition solution for ink jet ink and drying the polymer composition solution in an ignition drier of 105° C. for 1 hour, the acid value of the solid of the obtained polymer composition for ink jet ink was 65 mgKOH/g, and the weight average molecular weight was 38000.

Reference Example I-4

An ink of Reference Example 4 shown in Table I-3 was produced in the same manner as in Example 3, except that 483.0 parts by weight of lauryl acrylate and 16.8 parts by weight of t-butylperoxy(2-ethylhexanoate) were used in place of 483.0 parts by weight of cyclohexyl acrylate and 4.8 parts by weight of t-butylperoxy(2-ethylhexanoate). After taking a part of the polymer composition solution for ink jet ink and drying the polymer composition solution in an ignition drier of 105° C. for 1 hour, the acid value of the solid of the obtained polymer composition for ink jet ink was 65 mgKOH/g, and the weight average molecular weight thereof was 8000.

Reference Example I-5

An ink of Reference Example 5 shown in Table I-3 was produced in the same manner as in the Reference Example 4, except that 480.0 parts by weight of Fast Yellow 7413-A having a pigment concentration of 25% by weight was used in place of 480.0 parts by weight of Cyanine Blue G-500 pure-A having a pigment concentration of 25% by weight and ion exchanged water was added so that the pigment concentration is 6% by weight in place of adding the ion exchanged water so that the pigment concentration was 4% by weight.

Reference Example I-6

An ink of Reference Example 6 shown in Table I-3 was produced in the same manner as in Reference Example 4, except that 480.0 parts by weight of Pigment Violet GC227-A having a pigment concentration of 25% by weight was used in place of 480.0 parts by weight of Cyanine Blue G-500 pure-A having a pigment concentration of 25% by weight and ion exchanged water was added so that the pigment concentration was set to 6% by weight in place of adding the ion exchanged water so that the pigment concentration was set to 4% by weight.

Reference Example I-7

An ink of Reference Example 7 shown in Table I-3 was produced in the same manner as in Example 3, except that 7.2 parts by weight of t-butylperoxy(2-ethylhexanoate) were changed to 19.2 parts by weight. After taking a part of the polymer composition solution and drying the polymer composition solution in an ignition drier of 105° C. for 1 hour, the acid value of the solid of the obtained polymer composition for ink jet ink was 65 mgKOH/g, and the weight average molecular weight thereof was 7000.

Reference Example I-8

An ink of Reference Example 8 shown in Table I-4 was produced in the same manner as in Example 2, except that 0.15% by weight of the added amount of 2,4,7,9-tetramethyl-5-decyne-4,7-diol was changed to 0% by weight.

Reference Example I-9

An ink of Reference Example 9 shown in Table I-4 was produced in the same manner as in Example 2, except that 0.15% by weight of the added amount of 2,4,7,9-tetramethyl-5-decyne-4,7-diol was changed to 0% by weight, 3.5% by weight of the added amount of 1,2-hexanediol was changed to 0% by weight, and 7% by weight of triethylene glycol was changed to 10% by weight.

Reference Example I-10

An ink of Reference Example 10 shown in Table I-4 was produced in the same manner as in Example 2, except that 0.15% by weight of the added amount of 2,4,7,9-tetramethyl-5-decyne-4,7-diol was changed to 0% by weight, 3.5% by weight of the added amount of 1,2-hexanediol was changed too % by weight, and 0.5% of 2-butyl-2-ethyl-1,3-propanediol was changed to 0%, and 7% by weight of triethylene glycol was changed to 10.5% by weight.

Reference Example I-11

An ink of Reference Example 11 shown in Table 4 was produced in the same manner as in Example 2, except that 50.4 parts by weight of acrylic acid was changed into 20 part of acrylic acid. After taking a part of the polymer composition solution and drying the polymer composition solution in an ignition drier of 105° C. for 1 hour, the acid value of the solid of the obtained polymer composition was 25 mgKOH/g, and the weight average molecular weight thereof was 33000.

Reference Example I-12

An ink of Reference Example 12 shown in Table 4 was produced in the same manner as in Example 2, except that 50.4 parts by weight of acrylic acid was changed into 133 parts of acrylic acid. After taking a part of the polymer composition solution and drying the polymer composition solution in an ignition drier of 105° C. for 1 hour, the acid value of the solid of the obtained polymer composition was 160 mgKOH/g, and the weight average molecular weight thereof was 32000.

Reference Example I-13

An ink of Reference Example 13 shown in Table I-4 was produced in the same manner as in Example 1, except that 483.0 parts by weight of cyclohexyl acrylate was changed into 241.0 parts by weight of cyclohexyl acrylate and 242 parts of lauryl acrylate.

Reference Example I-14

An ink of Reference Example 14 shown in Table 4 was produced in the same manner as in Example 1, except that 483.0 parts by weight of benzil acrylate was changed to 241.0 parts by weight benzil acrylate and 242 parts of lauryl acrylate.

Evaluation Test 1: Valuation Method of Blurring on Regular Paper

A character of "writing" was printed by Microsoft Word MS Ming style characters of style standard size 8 on Xerox P paper (made by Fuji Xerox) using ink jet inks according to Examples 1 to 14 and Reference Examples 1 to 14 in Example I and an ink jet printer (EM-930C, made by Seiko Epson Co., Ltd.) to obtain test bodies. A printing mode of paper: regular paper, printing quality: super fine, color correction: none and printing direction: both directions was carried out. Macro photographies are taken, and a macro photography having no portion in which characters are connected, a macro photography having a portion in which characters are connected, a macro photography having two portions in which characters are connected, and a macro photography having portions of three or more in which characters are connected were respectively evaluated as A, B, C, D. The results are shown in Table I-1 to Table I-4.

Evaluation Test 2: Valuation Method of Coloration Property on Regular Paper

Solid printing was carried out on Xerox P paper (made by Fuji Xerox) using ink jet inks according to Examples 1 to 14 and Reference Examples 1 to 14 in Example I and an ink jet printer (EM-930C, made by Seiko Epson Co., Ltd.) to obtain test bodies. A printing mode of paper: regular paper, printing quality: super fine, color correction: none and printing direction: both directions was carried out. The OD value of each of the colors was measured using GRETAGMACBETH SPECTROSCAN SP 50 (made by Gretag Corp. (US)). The results are shown as OD value.

Evaluation Test 3: Valuation Method of Glossiness

Solid printing was carried out on a photo paper <gloss> (made by Seiko Epson Co., Ltd.) using ink jet inks according to Examples 1 to 14 and Reference Examples 1 to 14 in Example I and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table I-1 to Table I-4.

(Evaluation Test 4: Valuation Method of Dispersibility)

In Example I, the average particle size of particles in the ink jet inks according to Examples 1 to 14 and Reference Examples 1 to 6 was measured by a laser particle diameter analyzer (Zetasizer 3000, made by Malvern Instruments, Ltd. (Britain)). The results are shown in Table I-1 to Table 4.

Evaluation Test 5: Valuation Method of Storage Stability

In Example I, the initial viscosity of the pigment dispersion for ink jet ink used for Examples 1 to 14 and Reference Examples 1 to 14 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables 1 to 4. Monomer compositions, polymerization initiators, pigments and ink jet ink compositions used when producing the ink jet ink are also shown in Table I-1 to Table I-4.

TABLE I-1

|  |  | Example 1 | Example 2 | Example 3 | Example 4 | Example 5 | Example 6 | Example 7 |
|---|---|---|---|---|---|---|---|---|
| Polymer composition (parts by weight) | CHA | 483.0 | — | 483.0 | — | 483.0 | — | 483.0 |
|  | BZA | — | 483.0 | — | 483.0 | — | 483.0 | — |
|  | MAA | 33.3 | — | 33.3 | 33.3 | 33.3 | 33.3 | 33.3 |
|  | AA | 25.2 | 50.4 | 25.2 | 25.2 | 25.2 | 25.2 | 25.2 |
|  | SMA | — | — | — | — | — | — | — |
|  | EHA | — | — | — | — | — | — | — |
|  | LA | — | — | — | — | — | — | — |
|  | DEAEMA | — | — | — | — | — | — | — |
|  | HEMA | — | — | — | — | — | — | — |
| Polymerization initiator | BPEH | 5.6 | 5.6 | 8.0 | 8.0 | 5.6 | 8.0 | 5.6 |
|  | AIBN | — | — | — | — | — | — | — |
| Pigment | Blue | 480.0 | 480.0 | 480.0 | 480.0 | — | — | — |
|  | Yellow | — | — | — | — | 480.0 | 480.0 | — |
|  | Magenta | — | — | — | — | — | — | 480.0 |
| Property | Acid value (mgKOH/g) | 65 | 65 | 65 | 65 | 65 | 65 | 65 |
|  | Weight average molecular weight | 43000 | 32000 | 80000 | 39000 | 43000 | 39000 | 43000 |
| Ink composition example (% by weight) | Pigment dispersion | 24 | 24 | 24 | 24 | 30 | 30 | 24 |
|  | TDG | — | 0.15 | — | — | — | 0.1 | 0.1 |
|  | DOD | — | — | — | — | — | 0.1 | 0.1 |
|  | TDGEO10 | 0.1 | — | 0.1 | 0.1 | 0.1 | 0.1 | — |
|  | DODEO4 | — | — | — | — | — | — | 0.1 |
|  | 1,2-HD | 2.0 | 3.5 | 2.0 | 2.0 | 2.0 | 2.0 | 2.0 |
|  | 1,2-PD | 2.0 | — | 2.0 | 2.0 | 2.0 | 2.0 | 2.0 |
|  | TEGmBE | 0.5 | — | 0.5 | 0.5 | 0.5 | 0.5 | 0.5 |
|  | DEGmBE | — | — | — | — | — | 0.5 | 0.5 |
|  | PGmBE | — | — | — | — | — | 0.3 | 0.3 |
|  | DPGmBE | 0.1 | — | 0.1 | 0.1 | 0.1 | 0.1 | 0.1 |
|  | BEPD | 0.3 | 0.5 | 0.3 | 0.3 | 0.3 | 0.3 | 0.3 |
|  | 2-P | — | 3 | — | — | — | 2 | 2 |
|  | GL | 14 | 15 | 14 | 14 | 14 | 14 | 14 |
|  | TEG | 3 | 7 | 3 | 3 | 3 | 3 | 3 |
|  | TMP | 2 | — | 2 | 2 | 2 | 2 | 2 |
|  | TEA | 0.5 | 1 | 0.5 | 0.5 | 0.5 | 0.5 | 0.5 |
|  | Ion exchanged water | Residual quantity | Residual quantity | Residual quantity | Residual quantity | Residual quantity | Residual quantity | Residual quantity |
| Evaluation | Blurring | A | A | A | A | A | A | A |
|  | Regular paper OD | 1.14 | 1.16 | 1.19 | 1.18 | 1.22 | 1.23 | 1.20 |
|  | Glossiness value (%) | 40.4 | 45.2 | 39.7 | 46.1 | 38.6 | 42.9 | 39.9 |
|  | Average particle size (nm) | 71 | 72 | 70 | 70 | 76 | 71 | 77 |
|  | Stability | 1.00 | 0.98 | 1.03 | 1.02 | 1.01 | 1.00 | 0.98 |

TABLE I-2

|  |  | Example 8 | Example 9 | Example 10 | Example 11 | Example 12 | Example 13 | Example 14 |
|---|---|---|---|---|---|---|---|---|
| Polymer composition (parts by weight) | CHA | — | 540.6 | 363.0 | 520.8 | 502.8 | 483.0 | — |
|  | BZA | 483.0 | — | — | — | — | — | 483.0 |
|  | MAA | 33.3 | 32.4 | 33.3 | 36.6 | 36.6 | 33.3 | 33.3 |
|  | AA | 25.2 | 24.0 | 25.2 | 30.6 | 30.6 | 25.2 | 25.2 |
|  | SMA | — | — | 120.0 | — | — | — | — |
|  | EHA | — | — | — | — | — | — | — |
|  | LA | — | — | — | — | — | — | — |
|  | DEAEMA | — | — | — | 12.0 | — | — | — |
|  | HEMA | — | — | — | — | 30.0 | — | — |
| Polymerization initiator | BPEH | 8.0 | 5.6 | 6.2 | — | — | 5.6 | 5.6 |
|  | AIBN | — | — | — | 5.6 | 5.6 | — | — |
| Pigment | Blue | — | 480.0 | 480.0 | 480.0 | 480.0 | 480.0 | 480.0 |
|  | Yellow | — | — | — | — | — | — | — |
|  | Magenta | 480.0 | — | — | — | — | — | — |
| Property | Acid value (mgKOH/g) | 65 | 65 | 65 | 80 | 80 | 65 | 65 |
|  | Weight average molecular weight | 39000 | 33000 | 33000 | 33000 | 32000 | 43000 | 32000 |
| Ink composition exmple (% by weight) | Pigment dispersion | 30 | 30 | 30 | 30 | 30 | 30 | 24 |
|  | TDG | 0.1 | 0.1 | 0.1 | 0.1 | 0.15 | 0.15 | 0.15 |
|  | DOD | 0.1 | 0.1 | 0.1 | 0.1 | — | — | — |
|  | TDGEO10 | 0.1 | 0.1 | 0.1 | 0.1 | — | — | — |
|  | DODEO4 | — | — | — | — | — | — | — |
|  | 1,2-HD | 2.0 | 2.0 | 2.0 | 2.0 | 3.5 | 3.5 | 3.5 |
|  | 1,2-PD | 2.0 | 2.0 | 2.0 | 2.0 | — | — | — |
|  | TEGmBE | 0.5 | 0.5 | 0.5 | 0.5 | — | — | — |
|  | DEGmBE | 0.5 | 0.5 | 0.5 | 0.5 | — | — | — |
|  | PGmBE | 0.3 | 0.3 | 0.3 | 0.3 | — | — | — |
|  | DPGmBE | 0.1 | 0.1 | 0.1 | 0.1 | — | — | — |

TABLE I-2-continued

|  |  | Example 8 | Example 9 | Example 10 | Example 11 | Example 12 | Example 13 | Example 14 |
|---|---|---|---|---|---|---|---|---|
|  | BEPD | 0.3 | 0.3 | 0.3 | 0.3 | 0.5 | 0.5 | 0.5 |
|  | 2-P | 2 | 2 | 2 | 2 | 3 | 3 | 3 |
|  | GL | 14 | 14 | 14 | 14 | 15 | 15 | 15 |
|  | TEG | 3 | 3 | 3 | 3 | 1 | 7 | 7 |
|  | TMP | 2 | 2 | 2 | 2 | — | — | — |
|  | TEA | 0.5 | 0.5 | 0.5 | 0.5 | 1 | 1 | 1 |
|  | Ion exchanged water | Residual quantity | Residual quantity | Residual quantity | Residual quantity | Residual quantity | Residual quantity | Residual quantity |
| Evaluation | Blurring | A | A | A | A | A | A | A |
|  | Regular paper OD | 1.20 | 1.18 | 1.19 | 1.16 | 1.15 | 1.18 | 1.19 |
|  | Glossiness value (%) | 46.0 | 29.2 | 36.2 | 27.8 | 33.2 | 36.2 | 33.8 |
|  | Average particle size (nm) | 92 | 73 | 70 | 65 | 63 | 70 | 77 |
|  | Stability | 1.01 | 1.02 | 1.02 | 1.02 | 1.00 | 0.99 | 1.04 |

TABLE I-3

|  |  | Reference Example 1 | Reference Example 2 | Reference Example 3 | Reference Example 4 | Reference Example 5 | Reference Example 6 | Reference Example 7 |
|---|---|---|---|---|---|---|---|---|
| Polymer composition (parts by weight) | CHA | — | — | — | — | — | — | 483.0 |
|  | BZA | — | — | — | — | — | — | — |
|  | MAA | 33.3 | 33.3 | 33.3 | 33.3 | 33.3 | 33.3 | 33.3 |
|  | AA | 25.2 | 25.2 | 25.2 | 25.2 | 25.2 | 25.2 | 25.2 |
|  | SMA | — | — | — | — | — | — | — |
|  | EHA | 483.0 | 483.0 | — | — | — | — | — |
|  | LA | — | — | 483.0 | 483.0 | 483.0 | 483.0 | — |
|  | DEAEMA | — | — | — | — | — | — | — |
|  | HEMA | — | — | — | — | — | — | — |
| Polymerization initiator | BPEH | 8.0 | 17.6 | 8.0 | 17.6 | 17.6 | 17.6 | 20.0 |
|  | AIBN | — | — | — | — | — | — | — |
| Pigment | Blue | 480.0 | 480.0 | 480.0 | 480.0 | — | — | 480.0 |
|  | Yellow | — | — | — | — | 480.0 | — | — |
|  | Magenta | — | — | — | — | — | 480.0 | — |
| Property | Acid value (mgKOH/g) | 65 | 65 | 65 | 65 | 65 | 65 | 65 |
|  | Weight average molecular weight | 39000 | 8000 | 38000 | 8000 | 33000 | 33000 | 7000 |
| Ink composition example (% by weight) | Pigment dispersion | 24 | 24 | 24 | 24 | 24 | 24 | 24 |
|  | TDG | 0.1 | 0.1 | 0.1 | 0.1 | 0.1 | 0.1 | 0.1 |
|  | DOD | — | — | — | — | — | — | — |
|  | TDGEO10 | 0.1 | 0.1 | 0.1 | 0.1 | 0.1 | 0.1 | 0.1 |
|  | DODEO4 | — | — | — | — | — | — | — |
|  | 1,2-HD | 2.0 | 2.0 | 2.0 | 2.0 | 2.0 | 2.0 | 2.0 |
|  | 1,2-PD | 2.0 | 2.0 | 2.0 | 2.0 | 2.0 | 2.0 | 2.0 |
|  | TEGmBE | 0.5 | 0.5 | 0.5 | 0.5 | 0.5 | 0.5 | 0.5 |
|  | DEGmBE | — | — | — | — | — | — | — |
|  | PGmBE | — | — | — | — | — | — | — |
|  | DPGmBE | 0.1 | 0.1 | 0.1 | 0.1 | 0.1 | 0.1 | 0.1 |
|  | BEPD | 0.3 | 0.3 | 0.3 | 0.3 | 0.3 | 0.3 | 0.3 |
|  | 2-P | — | — | — | — | — | — | — |
|  | GL | 14 | 14 | 14 | 14 | 14 | 14 | 14 |
|  | TEG | 3 | 3 | 3 | 3 | 3 | 3 | 3 |
|  | TMP | 2 | 2 | 2 | 2 | 2 | 2 | 2 |
|  | TEA | 0.5 | 0.5 | 0.5 | 0.5 | 0.5 | 0.5 | 0.5 |
|  | Ion exchanged water | Residual quantity | Residual quantity | Residual quantity | Residual quantity | Residual quantity | Residual quantity | Residual quantity |
| Evaluation | Blurring | B | C | B | C | C | C | C |
|  | Regular paper OD | 0.98 | 0.91 | 0.85 | 0.89 | 0.81 | 0.99 | 1.00 |
|  | Glossiness value (%) | 23.3 | 18.5 | 21.5 | 17.5 | 17.4 | 19.2 | 13.2 |
|  | Average particle size (nm) | 121 | 111 | 140 | 165 | 124 | 135 | 120 |
|  | Stability | 18.50 | 21.30 | 11.30 | 18.90 | 54.60 | 34.50 | 34.60 |

TABLE I-4

|  |  | Reference Example 8 | Reference Example 9 | Reference Example 10 | Reference Example 11 | Reference Example 12 | Reference Example 13 | Reference Example 14 |
|---|---|---|---|---|---|---|---|---|
| Polymer composition (parts by weight) | CHA | — | — | — | — | — | 241.0 | 241.0 |
|  | BZA | 483.0 | 483.0 | 483.0 | 483.0 | 483.0 | — | — |
|  | MAA | — | — | — | — | — | 33.3 | 33.3 |
|  | AA | 50.4 | 50.4 | 50.4 | 20.0 | 133.0 | 25.2 | 25.2 |
|  | SMA | — | — | — | — | — | — | — |
|  | EHA | — | — | — | — | — | — | — |

TABLE I-4-continued

|  |  | Reference Example 8 | Reference Example 9 | Reference Example 10 | Reference Example 11 | Reference Example 12 | Reference Example 13 | Reference Example 14 |
|---|---|---|---|---|---|---|---|---|
|  | LA | — | — | — | — | — | — | — |
|  | DEAEMA | — | — | — | — | — | — | — |
|  | HEMA | — | — | — | — | — | — | — |
| Polymerization initiator | BPEH | 5.6 | 5.6 | 5.6 | 2.2 | 14.8 | 5.6 | 5.6 |
|  | AIBN | — | — | — | — | — | — | — |
| Pigment | Blue | 480.0 | 480.0 | 480.0 | 480.0 | 480.0 | 480.0 | 480.0 |
|  | Yellow | — | — | — | — | — | — | — |
|  | Magenta | — | — | — | — | — | — | — |
| Property | Acid value (mgKOH/g) | 65 | 65 | 65 | 25 | 160 | 65 | 65 |
|  | Weight average molecular weight | 39000 | 33000 | 33000 | 33000 | 32000 | 43000 | 32000 |
| Ink composition example (% by weight) | Pigment dispersion | 24 | 24 | 24 | 24 | 24 | 24 | 24 |
|  | TDG | — | — | — | 0.15 | 0.15 | — | — |
|  | DOD | — | — | — | — | — | — | — |
|  | TDGEO10 | — | — | — | — | — | 0.1 | 0.1 |
|  | DODEO4 | — | — | — | — | — | — | — |
|  | 1,2-HD | 3.5 | — | — | 3.5 | 3.5 | 2.0 | 2.0 |
|  | 1,2-PD | — | — | — | — | — | 2.0 | 2.0 |
|  | TEGmBE | — | — | — | — | — | 0.5 | 0.5 |
|  | DEGmBE | — | — | — | — | — | — | — |
|  | PGmBE | — | — | — | — | — | — | — |
|  | DPGmBE | — | — | — | — | — | 0.1 | 0.1 |
|  | BEPD | 0.5 | 0.5 | — | 0.5 | 0.5 | 0.3 | 0.3 |
|  | 2-P | 3 | 3 | 3 | 3 | 3 | — | — |
|  | GL | 15 | 15 | 15 | 15 | 15 | 14 | 14 |
|  | TEG | 7 | 10 | 10.5 | 7 | 7 | 3 | 3 |
|  | TMP | — | — | — | — | — | 2 | 2 |
|  | TEA | 1 | 1 | 1 | 1 | 1 | 0.5 | 0.5 |
|  | Ion exchanged water | Residual quantity | Residual quantity | Residual quantity | Residual quantity | Residual quantity | Residual quantity | Residual quantity |
| Evaluation | Blurring | C | D | D | A | C | A | A |
|  | Regular paper OD | 1.20 | 1.08 | 1.07 | 1.20 | 0.85 | 0.90 | 0.91 |
|  | Glossiness value %) | 45.6 | 42.6 | 46.4 | 5.3 | 48.5 | 36.2 | 33.8 |
|  | Average particle size (nm) | 92 | 73 | 70 | 151 | 63 | 70 | 72 |
|  | Stability | 1.02 | 0.99 | 1.03 | 35.00 | 15.40 | 5.30 | 3.20 |

The brevity codes used in Table I-1 to 4 are explained as follows.
CHA: cyclohexyl acrylate
BZA: benzyl acrylate
AA: acrylic acid
SMA: stearyl methacrylate
EHA: ethylhexyl acrylate
LA: lauryl acrylate
DEAEMA: 2-(diethylamino)ethyl methacrylate
HEMA: 2-hydroxyethyl methacrylate
BOEH: t-butylperoxy(2-ethylhexanoate)
AIBN: azobisisobutylnitrile
TDG: 2,4,7,9-tetramethyl-5-decyne-4,7-diol
DOD: 3,6-dimethyl-4-octyne-3,6-diol
TDGEO10: ethylene oxide 10 mol adduct of 2,4,7,9-tetramethyl-5-decyne-4,7-diol
DODEO4: ethylene oxide 4 mol adduct of 3,6-dimethyl-4-octyne-3,6-diol
1,2-HD: 1,2-hexanediol
1,2-PD: 1,2-oentanediol
TEGmBE: triethylene glycol mono butyl ether
DEGmBE: diethylene glycol mono butyl ether
PGmBE: propylene glycol mono butyl ether
DPGmBE: dipropylene glycol mono butyl ether
2-P: pyrolydone
GL: glycerin
TEG: triethylene glycol
TMP: trimethylolpropane
TEA: triethanolamine As is clear from the results of Table I-1 and Table I-2, the evaluation tests 1 to 5 showed excellent results when the ink jet inks according to Examples 1 to 14 in Example I were used. However, when the ink jet inks according to the Reference Examples 1 to 14 of Table I-3 and Table I-4 were used, excellent results were not shown in any one or a plurality of items of the revaluation tests 1 to 5.

Example II

Example II-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 34000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Blue G-500 pure-A (C.I.PB15:1; Sanyo Color Works, Ltd.) was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 µm. Then, an ink for ink jet of ink composition 1 shown in Table I-2 was produced.

Example II-2

An ink of composition example 2 shown in Table II-2 was produced in the same manner as in Example 1, except that 13.2 parts of methacrylic acid and 36.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 60 mgKOH/g, and the weight average molecular weight thereof was 32000.

Example II-3

An ink of composition example 3 shown in Table II-2 was produced in the same manner as in Example 1, except that 42.6 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 60 mgKOH/g, and the weight average molecular weight thereof was 48000.

Example II-4

An ink of composition example 4 shown in Table II-2 was produced in the same manner as in Example 1, except that 77.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 29000.

Example II-5

An ink of composition example 5 shown in Table II-2 was produced in the same manner as in Example 1, except that 93.0 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 120 mgKOH/g, and the weight average molecular weight thereof was 34000.

Example II-6

An ink of composition example 13 shown in Table I-2 was produced in the same manner as in Example 1, except that Monarch 800 (C.I.PBk7: made by Cabot Corp.) was used in place of 480.0 parts by weight of Cyanine Blue G-500 pure-A having a pigment concentration of 25% by weight.

Example II-7

An ink of composition example 14 shown in Table II-2 was produced in the same manner as in Example 2, except that Monarch 800 (C.I.PBk7: made by Cabot Corp.) was used in place of 480.0 parts by weight of Cyanine Blue G-500 pure-A having a pigment concentration of 25% by weight.

Example II-8

An ink of composition example 19 shown in Table II-2 was produced in the same manner as in Example 1, except that 120.0 parts by weight of Pigment Violet Gc227-A was used in place of 120.0 parts by weight of Cyanine Blue G-500 pure-A.

Example II-9

An ink of composition example 20 shown in Table II-2 was produced in the same manner as in Example 2, except that 120.0 parts by weight of Pigment Violet Gc227-A was used in place of 120.0 parts by weight of Cyanine Blue G-500 pure-A.

Example II-10

An ink of composition example 25 shown in Table II-2 was produced in the same manner as in Example 1, except that 120.0 parts by weight of Fast Yellow 74 13-A (C.I.PY74, made by Sanyo Color Works, Ltd.) was used in place of 120.0 parts by weight of Cyanine Blue G-500 pure-A.

Example II-11

An ink of composition example 26 shown in Table II-2 was produced in the same manner as in Example 2, except that 120.0 parts by weight of Fast Yellow 74 13-A (C.I.PY74, made by Sanyo Color Works, Ltd.) was used in place of 120.0 parts by weight of Cyanine Blue G-500 pure-A.

Reference Example II-1

An ink of composition example 6 shown in Table II-2 was produced in the same manner as in Example 1, except that 100.8 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 130 mgKOH/g, and the weight average molecular weight thereof was 29000.

Reference Example II-2

An ink of composition example 7 shown in Table II-2 was produced in the same manner as in Example 1, except that 116.3 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 150 mgKOH/g, and the weight average molecular weight thereof was 34000.

Reference Example II-3

An ink of composition example 8 shown in Table II-2 was produced in the same manner as in Example 1, except that 155.0 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 200 mgKOH/g, and the weight average molecular weight thereof was 29000.

Reference Example II-4

An ink of composition example 9 shown in Table II-2 was produced in the same manner as in Example 1, except that 20.0 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 10000.

Reference Example II-5

An ink of composition example 10 shown in Table II-2 was produced in the same manner as in Example 2, except that 15.0 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 60 mgKOH/g, and the weight average molecular weight thereof was 18000.

Reference Example II-6

An ink of composition example 11 shown in Table II-2 was produced in the same manner as in Example 1, except that 3.1 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 140000.

Reference Example II-7

An ink of composition example 12 shown in Table II-2 was produced in the same manner as in Example 1, except that 23.3 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 30 mgKOH/g, and the weight average molecular weight thereof was 33000.

Reference Example II-8

An ink of composition example 15 shown in Table II-2 was produced in the same manner as in Reference Example 1, except that 480.0 parts by weight of Monarch 800 (C.I.PBk7: made by Cabot Corp.) was used in place of 480.0 parts by weight of Cyanine Blue G-500 pure-A.

Reference Example II-9

An ink of composition example 16 shown in Table II-2 was produced in the same manner as in Reference Example 5, except that 480.0 parts by weight of Monarch 800 (C.I.PBk7: made by Cabot Corp.) was used in place of 480.0 parts by weight of Cyanine Blue G-500 pure-A.

Reference Example II-10

An ink of composition example 17 shown in Table II-2 was produced in the same manner as in Reference Example 6, except that 480.0 parts by weight of Monarch 800 (C.I.PBk7: made by Cabot Corp.) was used in place of 480.0 parts by weight of Cyanine Blue G-500 pure-A.

Reference Example II-11

An ink of composition example 18 shown in Table II-2 was produced in the same manner as in Reference Example 7, except that 480.0 parts by weight of Monarch 800 (C.I.PBk7: made by Cabot Corp.) was used in place of 480.0 parts by weight of Cyanine Blue G-500 pure-A.

Reference Example II-12

An ink of composition example 15 shown in Table II-2 was produced in the same manner as in Reference Example 1, except that 480.0 parts by weight of Pigment Violet GC227-A was used in place of 480.0 parts by weight of Cyanine Blue G-500 pure-A.

Reference Example II-13

An ink of composition example 22 shown in Table II-2 was produced in the same manner as in Reference Example 5, except that 480.0 parts by weight of Pigment Violet GC227-A was used in place of 480.0 parts by weight of Cyanine Blue G-500 pure-A.

Reference Example II-14

An ink of composition example 23 shown in Table II-2 was produced in the same manner as in Reference Example 6, except that 480.0 parts by weight of Pigment Violet GC227-A was used in place of 480.0 parts by weight of Cyanine Blue G-500 pure-A.

Reference Example II-15

An ink of composition example 24 shown in Table II-2 was produced in the same manner as in Reference Example 7, except that 480.0 parts by weight of Pigment Violet GC227-A was used in place of 480.0 parts by weight of Cyanine Blue G-500 pure-A.

Reference Example II-16

An ink of composition example 27 shown in Table II-2 was produced in the same manner as in Reference Example 1, except that 480.0 parts by weight of Fast Yellow 7413-A was used in place of 480.0 parts by weight of Cyanine Blue G-500 pure-A.

Reference Example II-17

An ink of composition example 28 shown in Table II-2 was produced in the same manner as in Reference Example 5, except that 480.0 parts by weight of Fast Yellow 7413-A was used in place of 480.0 parts by weight of Cyanine Blue G-500 pure-A.

Reference Example II-18

An ink of composition example 29 shown in Table II-2 was produced in the same manner as in Reference Example 6, except that 480.0 parts by weight of Fast Yellow 7413-A was used in place of 480.0 parts by weight of Cyanine Blue G-500 pure-A.

Reference Example II-19

An ink of composition example 30 shown in Table II-2 was produced in the same manner as in Reference Example 7, except that 480.0 parts by weight of Fast Yellow 7413-A was used in place of 480.0 parts by weight of Cyanine Blue G-500 pure-A.

Evaluation Test 1: Valuation Method of Coloration Property on Regular Paper

Solid printing was carried out on Xerox P paper (made by Fuji Xerox) using ink jet inks according to Examples 1 to 11 and Reference Examples 1 to 19 in Example II and an ink jet printer (EM-930C, made by Seiko Epson Co., Ltd.) to obtain test bodies. A printing mode of paper: regular paper, printing quality: super fine, color correction: none and printing direction: both directions was carried out. The OD value of each of the colors was measured using GRETAGMACBETH SPECTROSCAN SP 50 (made by Gretag Corp. (US)). The results are shown as OD value in Table II-1.

Evaluation Test 2: Valuation Method of Glossiness

Solid printing was carried out on a photo paper <gloss> (made by Seiko Epson Co., Ltd.) using ink jet inks according to Examples 1 to 11 and Reference Examples 1 to 19 in Example II and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table II-1.

(Evaluation Test 3: Valuation Method of Dispersibility)

In Example II, the average particle size of particles in the ink jet inks according to Examples 1 to 11 and Reference Examples 1 to 19 was measured by a laser particle diameter analyzer (Zetasizer 3000, made by Malvern Instruments, Ltd. (Britain)). The results are shown in Table II-1.

Evaluation Test 4: Valuation Method of Storage Stability

In Example II, the initial viscosity of the pigment dispersion for ink jet ink used for Examples 1 to 11 and Reference Examples 1 to 19 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables II-1. Monomer compositions, polymerization initiators, pigments and ink jet ink compositions used when producing the ink jet ink are also shown in Table II-1.

TABLE II-1

| | Example 1 | Example 2 | Example 3 | Reference Example 10 | Reference Example 11 | Example 4 | Example 5 | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|---|---|---|---|---|---|---|
| BZA | 483.0 | 483.0 | 483.0 | 483.0 | 483.0 | 483.0 | 483.0 | 483.0 | 483.0 | 483.0 | 483.0 | 483.0 | 483.0 | 483.0 | 483.0 |
| AA | 50.4 | 36.5 | 42.6 | 50.4 | 23.3 | 77.5 | 93.0 | 100.8 | 116.3 | 155.0 | 50.4 | 36.5 | 50.4 | 36.5 | 100.8 |
| MAA | — | 13.2 | — | 3.1 | — | — | — | — | — | — | — | 13.2 | — | 13.2 | — |
| BPEH | 5.6 | 5.6 | 5.6 | — | 5.6 | 5.6 | 5.6 | 5.6 | 5.6 | 5.6 | 20.0 | 15.0 | 3.1 | 5.6 | 5.6 |
| PBk7 | 480.0 | 480.0 | 480.0 | 480.0 | 480.0 | 480.0 | 480.0 | 480.0 | 480.0 | 480.0 | 480.0 | 480.0 | 480.0 | 480.0 | 480.0 |
| PB15:1 | — | — | — | — | — | — | — | — | — | — | — | — | — | — | — |
| PV19 | — | — | — | — | — | — | — | — | — | — | — | — | — | — | — |
| PY74 | — | — | — | — | — | — | — | — | — | — | — | — | — | — | — |
| Acid value (mgKOH/g) | 65 | 60 | 55 | 65 | 30 | 100 | 120 | 130 | 150 | 200 | 65 | 60 | 65 | 60 | 130 |
| Weight average molecular weight | 34000 | 32000 | 48000 | 140000 | 33000 | 29000 | 34000 | 29000 | 34000 | 29000 | 10000 | 18000 | 140000 | 34000 | 29000 |
| Glossiness | 60.3 | 58.8 | 59.3 | 19.3 | 40.4 | 66.1 | 64.7 | 65.2 | 65.7 | 66.0 | 40.4 | 38.8 | 19.3 | 38.8 | 41.2 |
| Average particle size (nm) | 71 | 72 | 70 | 156 | 146 | 70 | 66 | 72 | 77 | 92 | 102 | 98 | 120 | 98 | 110 |
| Stability | 1.00 | 0.98 | 1.01 | 24.30 | 156.20 | 1.06 | 1.09 | 1.51 | 1.95 | 1.85 | 98.50 | 52.40 | 12.30 | 0.98 | 1.62 |
| OD | 1.2 | 1.21 | 1.22 | 1.12 | 1.05 | 1.18 | 1 | 0.98 | 0.94 | 0.99 | 1.12 | 1.12 | 1.08 | 1.33 | 1.01 |

| | Reference Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
|---|---|---|---|---|---|---|---|---|---|---|---|
| BZA | 483.0 | 483.0 | 483.0 | 483.0 | 483.0 | 483.0 | 483.0 | 483.0 | 483.0 | 483.0 | 483.0 |
| AA | 36.5 | 100.8 | 36.5 | 50.4 | 23.3 | 50.4 | 36.5 | 100.8 | 36.5 | 50.4 | 23.3 |
| MAA | 13.2 | — | 13.2 | — | — | — | 13.2 | — | 13.2 | — | — |
| BPEH | 15.0 | 5.6 | 15.0 | 3.1 | 5.6 | 5.6 | 5.6 | 5.6 | 15.0 | 3.1 | 5.6 |
| PBk7 | 480.0 | 480.0 | — | — | — | — | — | — | — | — | — |
| PB15:1 | — | — | 480.0 | 480.0 | 480.0 | — | — | 480.0 | — | — | — |
| PV19 | — | — | — | — | — | 480.0 | 480.0 | — | 480.0 | 480.0 | 480.0 |
| PY74 | — | — | — | — | — | — | — | — | — | — | — |
| Acid value (mgKOH/g) | 60 | 130 | 60 | 65 | 30 | 65 | 60 | 130 | 60 | 65 | 30 |
| Weight average molecular weight | 18000 | 29000 | 18000 | 140000 | 33000 | 34000 | 32000 | 29000 | 18000 | 140000 | 33000 |
| Glossiness value (%) | 28.8 | 61.3 | 58.8 | 29.6 | 20.4 | 66.4 | 65.8 | 60.2 | 38.8 | 29.7 | 20.4 |
| Average particle size (nm) | 130 | 71 | 89 | 110 | 123 | 85 | 92 | 91 | 120 | 125 | 135 |
| Stability | 35.40 | 1.00 | 23.50 | 46.20 | 125.30 | 1.02 | 0.98 | 180.00 | 23.50 | 46.20 | 135.20 |
| OD | 1.31 | 1.01 | 1.12 | 1.02 | 1.05 | 1.24 | 1.25 | 1.02 | 1.15 | 1.1 | 1.06 |

TABLE II-2

Composition Example

| | 1 | 2 | 3 | 4 | 5 | 6 | 7 | 8 Example* Reference Example | 9 | 10 | 11 | 12 | 13 | 14 | 15 |
|---|---|---|---|---|---|---|---|---|---|---|---|---|---|---|---|
| | Reference Example 9 | Example 2 | Example 3 | Example 4 | Example 5 | Reference Example 1 | Reference Example 2 | Reference Example 3 | Reference Example 4 | Reference Example 5 | Reference Example 6 | Reference Example 7 | Reference Example 6 | Reference Example 7 | Reference Example 8 |
| PB15:1 | — | 4 | 4 | 4 | 4 | — | 4 | 4 | 4 | 4 | 4 | 4 | — | — | — |
| PBk7 | 5 | — | — | — | — | 5 | — | — | — | — | — | — | 5 | 5 | 5 |
| PV19 | — | — | — | — | — | — | — | — | — | — | — | — | — | — | — |
| PY74 | — | — | — | — | — | — | — | — | — | — | — | — | — | — | — |
| DEGmBE | 4 | 0.2 | 0.2 | 0.2 | 0.2 | 0.2 | 0.2 | 0.2 | 0.2 | 0.2 | 0.2 | 0.2 | — | — | — |
| TEGmBE | — | 1 | 1 | 1 | 1 | 1 | 1 | 1 | 1 | 1 | 1 | 1 | — | — | — |
| PGmBE | — | — | — | — | — | — | — | — | — | — | — | — | 2 | 3 | 4 |
| DPGmBE | — | — | — | — | — | — | — | — | — | — | — | — | — | — | — |
| BEPD | 0.7 | 0.1 | 0.1 | 0.1 | 0.1 | 0.1 | 0.1 | 0.1 | 0.1 | 0.1 | 0.1 | 0.1 | 0.7 | 0.7 | 0.7 |
| 1,2-HD | 3 | 0.7 | 0.7 | 0.7 | 0.7 | 0.7 | 0.7 | 0.7 | 0.7 | 0.7 | 0.7 | 0.7 | 3 | 3 | 3 |
| Glycerin | 10 | 4 | 4 | 4 | 4 | 4 | 4 | 4 | 4 | 4 | 4 | 4 | 10 | 10 | 10 |
| TMP | 4 | 15 | 15 | 15 | 15 | 15 | 15 | 15 | 15 | 15 | 15 | 15 | 4 | 4 | 4 |
| OlfineE1010 | — | 7 | 7 | 7 | 7 | 7 | 7 | 7 | 7 | 7 | 7 | 7 | — | — | — |
| Surfynol104 | 0.15 | 0.1 | 0.1 | 0.1 | 0.1 | 0.1 | 0.1 | 0.1 | 0.1 | 0.1 | 0.1 | 0.1 | 0.15 | 0.15 | 0.15 |
| Ion exchanged water | Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | Residual quantity | Residual quantity | Residual quantity |

Composition Example

| | 16 | 17 | 18 | 19 | 20 | 21 | 22 | 23 Example* Reference Example | 24 | 25 | 26 | 27 | 28 | 29 | 30 |
|---|---|---|---|---|---|---|---|---|---|---|---|---|---|---|---|
| | Reference Example 9 | Reference Example 10 | Reference Example 11 | Example 8 | Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
| PB15:1 | — | — | — | — | — | — | — | — | — | — | — | — | — | — | — |
| PBk7 | 5 | 5 | 5 | 5 | 5 | 5 | 5 | 5 | 5 | 5 | 5 | 5 | 5 | 5 | 5 |
| PV19 | — | — | — | — | — | — | — | — | — | — | — | — | — | — | — |
| PY74 | 5 | 5 | 6 | 1 | 1 | 1 | 1 | 1 | 1 | 1 | 1 | 1 | 1 | 1 | 1 |
| DEGmBE | — | — | — | — | — | — | — | — | — | — | — | — | — | — | — |
| TEGmBE | — | — | — | 0.3 | 0.3 | 0.3 | 0.3 | 0.3 | 0.3 | 0.1 | 0.1 | 0.1 | 0.1 | 0.1 | 0.1 |
| PGmBE | — | — | — | 1 | 1 | 1 | 1 | 1 | 1 | — | — | — | — | — | — |
| DPGmBE | — | — | — | — | — | — | — | — | — | — | — | — | — | — | — |
| BEPD | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| 1,2-HD | 3 | 3 | 3 | 4 | 4 | 4 | 4 | 4 | 4 | 4 | 4 | 4 | 4 | 4 | 4 |
| Glycerin | 10 | 10 | 10 | 5 | 5 | 10 | 10 | 10 | 10 | 10 | 10 | 10 | 10 | 10 | 10 |
| TMP | 4 | 4 | 4 | 5 | 5 | 5 | 5 | 5 | 5 | 5 | 5 | 5 | 5 | 5 | 5 |

TABLE II-2-continued

| | | | | | | | | | | | | |
|---|---|---|---|---|---|---|---|---|---|---|---|---|
| OlfineE1010 | 0.1 | 0.1 | 0.1 | — | — | — | — | — | — | — | — | — |
| Surfynol104 | 0.15 | 0.15 | 0.15 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity | Residual quantity | Residual quantity | Residual quantity |

The brevity codes used in Table II-1 to 2 are explained as follows.
BZA: benzyl acrylate
AA: acrylic acid
MAA: methacrylic acid
BPEH: t-butylperoxy(2-ethylhexanoate)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane As is clear from the results of Table II-1 and Table II-2, the evaluation tests 1 to 5 showed excellent results when the ink jet inks according to Examples 1 to 11 in Example II were used. However, when the ink jet inks according to the Reference Examples 1 to 18, excellent results were not shown in any one or a plurality of items of the revaluation tests 1 to 5.

Example III

Example III-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 34000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Pigment C.I.PB15:1 was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink for ink jet of ink composition 1 shown in Table III-2 was produced.

Example III-2

An ink of composition example 2 shown in Table III-2 was produced in the same manner as in Example 1, except that 13.2 parts of methacrylic acid and 36.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 60 mgKOH/g, and the weight average molecular weight thereof was 32000.

Example III-3

An ink of composition example 3 shown in Table III-2 was produced in the same manner as in Example 1, except that 42.6 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 55 mgKOH/g, and the weight average molecular weight thereof was 48000.

Example III-4

An ink of composition example 4 shown in Table III-2 was produced in the same manner as in Example 1, except that 77.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 29000.

Example III-5

An ink of composition example 5 shown in Table III-2 was produced in the same manner as in Example 1, except that 93.0 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 120 mgKOH/g, and the weight average molecular weight thereof was 34000.

Example III-6

An ink of composition example 13 shown in Table III-2 was produced in the same manner as in Example 1, except that 480.0 parts by weight of cyan pigment C.I.PB15:1 having a pigment concentration of 25% by weight was changed to 480.0 parts by weight of black pigment C.I.PBk7.

Example III-7

An ink of composition example 14 shown in Table III-2 was produced in the same manner as in Example 2, except that 480.0 parts by weight of cyan pigment C.I.PB15:1 having a pigment concentration of 25% by weight was changed to 480.0 parts by weight of black pigment C.I.PBk7.

Example III-8

An ink of composition example 19 shown in Table III-2 was produced in the same manner as in Example 1, except that 480.0 parts by weight of cyan pigment C.I.PB15:1 was changed to 480.0 parts by weight of magenta pigment C.I.PR122.

Example III-9

An ink of composition example 20 shown in Table III-2 was produced in the same manner as in Example 2, except that 480.0 parts by weight of cyan pigment C.I.PB15:1 was changed to 480.0 parts by weight of magenta pigment C.I.PR122.

Example III-10

An ink of composition example 25 shown in Table III-2 was produced in the same manner as in Example 1, except that 480.0 parts by weight of cyan pigment C.I.PB15:1 was changed to 480.0 parts by weight of yellow pigment C.I.PY74.

Example III-11

An ink of composition example 26 shown in Table III-2 was produced in the same manner as in Example 2, except that 480.0 parts by weight of cyan pigment C.I.PB15:1 was changed to 480.0 parts by weight of yellow pigment C.I.PY74.

Reference Example III-1

An ink of composition example 6 shown in Table III-2 was produced in the same manner as in Example 1, except that 100.8 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 130 mgKOH/g, and the weight average molecular weight thereof was 29000.

Reference Example III-2

An ink of composition example 7 shown in Table III-2 was produced in the same manner as in Example 1, except that 116.3 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 150 mgKOH/g, and the weight average molecular weight thereof was 34000.

Reference Example III-3

An ink of composition example 8 shown in Table III-2 was produced in the same manner as in Example 1, except that 155.0 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 200 mgKOH/g, and the weight average molecular weight thereof was 29000.

Reference Example III-4

An ink of composition example 9 shown in Table III-2 was produced in the same manner as in Example 1, except that 20.0 parts by weight of t-butylperoxy(2-ethylhexanoate) were used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 10000.

Reference Example III-5

An ink of composition example 10 shown in Table III-2 was produced in the same manner as in Example III-2, except that 15.0 parts by weight of t-butylperoxy(2-ethylhexanoate) were used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 60 mgKOH/g, and the weight average molecular weight thereof was 18000.

Reference Example III-6

An ink of composition example 11 shown in Table III-2 was produced in the same manner as in Example 1, except that 3.1 parts by weight of t-butylperoxy(2-ethylhexanoate) were used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 14000.

Reference Example III-7

An ink of composition example 12 shown in Table III-2 was produced in the same manner as in Example 1, except that 23.3 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 30 mgKOH/g, and the weight average molecular weight thereof was 33000.

Reference Example III-8

An ink of composition example 15 shown in Table III-2 was produced in the same manner as in Reference Example 1, except that 480.0 parts by weight of cyan pigment C.I.PB15:1 was changed to 480.0 parts by weight of black pigment C.I.PBk7.

Reference Example III-9

An ink of composition example 16 shown in Table III-2 was produced in the same manner as in Reference Example 5, except that 480.0 parts by weight of cyan pigment C.I.PB15:1 was changed to 480.0 parts by weight of black pigment C.I.PBk7.

Reference Example III-10

An ink of composition example 17 shown in Table III-2 was produced in the same manner as in Reference Example 6, except that 480.0 parts by weight of cyan pigment C.I.PB15:1 was changed to 480.0 parts by weight of black pigment C.I.PBk7.

Reference Example III-11

An ink of composition example 18 shown in Table III-2 was produced in the same manner as in Reference Example 7, except that 480.0 parts by weight of cyan pigment C.I.PB15:1 was changed to 480.0 parts by weight of black pigment C.I.PBk7.

Reference Example III-12

An ink of composition example 21 shown in Table III-2 was produced in the same manner as in Reference Example 1, except that 480.0 parts by weight of cyan pigment C.I.PB15:1 was changed to 480.0 parts by weight of magenta pigment C.I.PR122.

Reference Example III-13

An ink of composition example 22 shown in Table III-2 was produced in the same manner as in Reference Example 5, except that 480.0 parts by weight of cyan pigment C.I.PB15:1 was changed to 480.0 parts by weight of magenta pigment C.I.PR122.

Reference Example III-14

An ink of composition example 23 shown in Table III-2 was produced in the same manner as in Reference Example 6, except that 480.0 parts by weight of cyan pigment C.I.PB15:1 was changed to 480.0 parts by weight of magenta pigment C.I.PR122.

Reference Example III-15

An ink of composition example 24 shown in Table III-2 was produced in the same manner as in Reference Example 7, except that 480.0 parts by weight of cyan pigment C.I.PB15:1 was changed to 480.0 parts by weight of magenta pigment C.I.PR122.

Reference Example III-16

An ink of composition example 27 shown in Table III-2 was produced in the same manner as in Reference Example 1, except that 480.0 parts by weight of cyan pigment C.I.PB15:1 was changed to 480.0 parts by weight of yellow pigment C.I.PY74.

Reference Example III-17

An ink of composition example 28 shown in Table III-2 was produced in the same manner as in Reference Example 5, except that 480.0 parts by weight of cyan pigment C.I.PB15:1 was changed to 480.0 parts by weight of yellow pigment C.I.PY74.

Reference Example III-18

An ink of composition example 29 shown in Table III-2 was produced in the same manner as in Reference Example 6, except that 480.0 parts by weight of cyan pigment C.I.PB15:1 was changed to 480.0 parts by weight of yellow pigment C.I.PY74.

Reference Example III-19

An ink of composition example 30 shown in Table III-2 was produced in the same manner as in Reference Example 7, except that 480.0 parts by weight of cyan pigment C.I.PB15:1 was changed to 480.0 parts by weight of yellow pigment C.I.PY74.

Evaluation Test 1: Valuation Method of Blurring on Regular Paper

A character of "writing" was printed by Microsoft Word MS Ming style characters of style standard size 8 on Xerox P paper (made by Fuji Xerox) using ink jet inks according to Examples 1 to 11 and Reference Examples 1 to 19 in Example III and an ink jet printer (EM-930C, made by Seiko Epson Co., Ltd.) to obtain test bodies. A printing mode of paper: regular paper, printing quality: super fine, color correction: none and printing direction: both directions was carried out. Macro photographies are taken, and a macro photography having no portion in which characters are connected, a macro photography having a portion in which characters are connected, a macro photography having two portions in which characters are connected, and a macro photography having portions of three or more in which characters are connected were respectively evaluated as A, B, C, D. The results are shown in Table III-1.

Evaluation Test 2: Valuation Method of Coloration Property on Regular Paper

Solid printing was carried out on Xerox P paper (made by Fuji Xerox) using ink jet inks according to Examples 1 to 11 and Reference Examples 1 to 19 in Example III and an ink jet printer (EM-930C, made by Seiko Epson Co., Ltd.) to obtain test bodies. A printing mode of paper: regular paper, printing quality: super fine, color correction: none and printing direction: both directions was carried out. The OD value of each of the colors was measured using GRETAGMACBETH SPECTROSCAN SP 50 (made by Gretag Corp. (US)). The results are shown as OD value in Table III-1.

Evaluation Test 3: Valuation Method of Glossiness

Solid printing was carried out on a photo paper <gloss> (made by Seiko Epson Co., Ltd.) using ink jet inks according to Examples 1 to 11 and Reference Examples 1 to 19 in Example III and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table III-1.

(Evaluation Test 4: Valuation Method of Dispersibility)

In Example III, the average particle size of particles in the ink jet inks according to Examples 1 to 11 and Reference Examples 1 to 19 was measured by a laser particle diameter analyzer (Zetasizer 3000, made by Malvern Instruments, Ltd. (Britain)). The results are shown in Table III-1.

Evaluation Test 5: Valuation Method of Storage Stability

In Example III, the initial viscosity of the pigment dispersion for ink jet ink used for Examples 1 to 11 and Reference Examples 1 to 19 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables III-1. Monomer compositions, polymerization initiators, pigments and ink jet ink compositions used when producing the ink jet ink are also shown in Table III-1.

TABLE III-1

| | Example 1 | Example 2 | Reference Example 10 | Reference Example 11 | Example 3 | Example 4 | Example 5 | Reference Example 1 | Reference Example 2 | Reference Example 3 | Reference Example 4 | Reference Example 5 | Reference Example 6 | Reference Example 7 | Reference Example 6 | Reference Example 7 | Reference Example 8 |
|---|---|---|---|---|---|---|---|---|---|---|---|---|---|---|---|---|---|
| BZA | 483.0 | 483.0 | 483.0 | 483.0 | 483.0 | 483.0 | 483.0 | 483.0 | 483.0 | 483.0 | 483.0 | 483.0 | 483.0 | 483.0 | 483.0 | 483.0 | 483.0 |
| AA | 50.4 | 36.5 | 50.4 | 23.3 | 42.6 | 77.5 | 93.0 | 100.8 | 116.3 | 155.0 | 50.4 | 36.5 | 50.4 | 23.3 | 50.4 | 36.5 | 100.8 |
| MAA | — | 13.2 | 3.1 | — | — | — | — | — | — | — | — | 13.2 | — | — | — | 13.2 | — |
| BPEH | 5.6 | 5.6 | — | 5.6 | 5.6 | 5.6 | 5.6 | 5.6 | 5.6 | 5.6 | 20.0 | 15.0 | 3.1 | 5.6 | 5.6 | 5.6 | 5.6 |
| PBk7 | 480.0 | 480.0 | 480.0 | — | 480.0 | 480.0 | 480.0 | 480.0 | 480.0 | 480.0 | 480.0 | 480.0 | 480.0 | 480.0 | 480.0 | 480.0 | 480.0 |
| PB15:1 | — | — | — | 480.0 | — | — | — | — | — | — | — | — | — | — | — | — | — |
| PV19 | — | — | — | — | — | — | — | — | — | — | — | — | — | — | — | — | — |
| PY74 | 65 | 60 | 65 | 30 | 55 | 100 | 120 | 130 | 150 | 200 | 65 | 60 | 65 | 30 | 65 | 60 | 130 |
| Acid value (mgKOH/g) | 34000 | 32000 | 140000 | 33000 | 48000 | 29000 | 34000 | 29000 | 34000 | 29000 | 10000 | 18000 | 140000 | 33000 | 34000 | 32000 | 29000 |
| Weight average molecular weight | | | | | | | | | | | | | | | | | |
| Evaluation of blurring (A–D) | A | A | A | B | A | A | A | C | D | D | B | B | A | A | A | A | B |
| Glossiness | 60.5 | 59.2 | 19.7 | 40.8 | 59.9 | 65.8 | 64.0 | 65.3 | 65.9 | 66.2 | 40.1 | 39.2 | 19.8 | 20.7 | 40.6 | 38.4 | 41.6 |
| Average particle size (nm) | 70 | 73 | 152 | 142 | 71 | 71 | 65 | 73 | 78 | 90 | 105 | 99 | 119 | 160 | 97 | 99 | 111 |
| Primary particle diameter (nm) | 57 | 61 | 80 | 79 | 55 | 53 | 50 | 59 | 62 | 71 | 75 | 72 | 82 | 90 | 66 | 68 | 71 |
| Stability | 1.01 | 0.98 | 21.50 | 148.30 | 1.03 | 1.05 | 1.08 | 1.55 | 2.03 | 1.88 | 95.10 | 50.30 | 11.90 | 113.90 | 1.06 | 0.97 | 1.54 |
| OD | 1.22 | 1.19 | 1.13 | 1.06 | 1.23 | 1.17 | 1.02 | 0.97 | 0.93 | 0.98 | 1.1 | 1.23 | 1.05 | 1.21 | 1.33 | 1.31 | 0.97 |

| | Reference Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
|---|---|---|---|---|---|---|---|---|---|---|---|
| BZA | 483.0 | 483.0 | 483.0 | 483.0 | 483.0 | 483.0 | 483.0 | 483.0 | 483.0 | 483.0 | 483.0 |
| AA | 36.5 | 100.8 | 36.5 | 50.4 | 23.3 | 50.4 | 36.5 | 100.8 | 36.5 | 50.4 | 23.3 |
| MAA | 13.2 | — | 13.2 | — | — | — | 13.2 | — | 13.2 | — | — |
| BPEH | 3.1 | 5.6 | 15.0 | 3.1 | 5.6 | 5.6 | 5.6 | 5.6 | 15.0 | 3.1 | 5.6 |
| PBk7 | 480.0 | 480.0 | 480.0 | 480.0 | 480.0 | 480.0 | 480.0 | 480.0 | 480.0 | 480.0 | 480.0 |
| PB15:1 | — | — | — | — | — | — | — | — | — | — | — |
| PV19 | — | — | — | — | — | — | — | — | — | — | — |
| PY74 | 60 | 130 | 60 | 65 | 30 | 65 | 60 | 130 | 60 | 65 | 30 |
| Acid value (mgKOH/g) | 18000 | 29000 | 18000 | 140000 | 33000 | 34000 | 32000 | 29000 | 18000 | 140000 | 33000 |
| Weight average molecular weight | | | | | | | | | | | |
| Evaluation of blurring (A–D) | B | D | B | C | D | A | A | D | D | C | C |
| Glossiness | 29.1 | 61.1 | 58.3 | 29.9 | 21.3 | 66.0 | 65.4 | 59.9 | 39.4 | 30.5 | 20.9 |
| Average particle size (nm) | 131 | 72 | 92 | 112 | 121 | 101 | 95 | 89 | 123 | 122 | 139 |
| Primary particle diameter (nm) | 77 | 52 | 71 | 73 | 77 | 75 | 80 | 68 | 81 | 76 | 83 |
| Stability | 33.30 | 1.02 | 22.10 | 43.70 | 102.20 | 1.04 | 0.99 | 1.01 | 22.30 | 46.20 | 121.90 |
| OD | 1.29 | 1.04 | 1.13 | 1.05 | 1.07 | 1.22 | 1.23 | 1.03 | 1.14 | 1.13 | 1.02 |

TABLE III-2

Composition Example

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | Reference Example 9 | Example 2 | Example 3 | Example 4 | Example 5 | Reference Example 1 | Reference Example 2 | Example* Reference Example 3 | Reference Example4 | Reference Example 5 | Reference Example 6 | Reference Example 7 | Reference Example 6 | Reference Example 7 | Reference Example 8 |
| PB15:1 | 4 | 4 | 4 | 4 | 4 | — | — | 4 | 4 | 4 | 4 | 4 | — | — | — |
| PBk7 | — | — | — | — | — | — | — | — | — | — | — | — | 5 | 5 | 5 |
| PV19 | — | — | — | — | — | — | — | — | — | — | — | — | — | — | — |
| PY74 | — | — | — | — | — | 4 | 4 | — | — | — | — | — | — | — | — |
| DEGmBE | 0.2 | 0.2 | 0.2 | 0.2 | 0.2 | 0.2 | 0.2 | 0.2 | 0.2 | 0.2 | 0.2 | 0.2 | — | — | — |
| TEGmBE | 1 | 1 | 1 | 1 | 1 | 1 | 1 | 1 | 1 | 1 | 1 | 1 | 2 | 3 | 4 |
| PGmBE | 0.1 | 0.1 | 0.1 | 0.1 | 0.1 | 0.1 | 0.1 | 0.1 | 0.1 | 0.1 | 0.1 | 0.1 | — | — | — |
| DPGmBE | 5 | 5 | 5 | 5 | 5 | 5 | 5 | 5 | 5 | 5 | 5 | 5 | 4 | 4 | 4 |
| 1,2-HD | 18 | 18 | 18 | 18 | 18 | 18 | 18 | 18 | 18 | 18 | 18 | 18 | — | — | — |
| Glycerin | 15 | 15 | 15 | 15 | 15 | 15 | 15 | 15 | 15 | 15 | 15 | 15 | 15 | 15 | 15 |
| OlfineE1010 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity |

Composition Example

| | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| | Reference Example 9 | Reference Example 10 | Reference Example 11 | Example 8 | Example 9 | Reference Example 12 | Reference Example 13 | Example* Reference Example 14 | Reference Example 15 | Example 10 | Example 11 | Reference Example 16 | Reference Example 17 | Reference Example 18 | Reference Example 19 |
| PB15:1 | — | — | — | — | — | — | — | — | — | — | — | — | — | — | — |
| PBk7 | 5 | 5 | 5 | — | — | — | — | — | — | — | — | — | — | — | — |
| PV19 | — | — | — | 5 | 5 | 5 | 5 | 5 | 5 | — | — | — | — | — | — |
| PY74 | — | — | — | — | — | — | — | — | — | 5 | 5 | 5 | 5 | 5 | 5 |
| DEGmBE | — | — | — | 0.3 | 0.3 | 0.3 | 0.3 | 0.3 | 0.3 | 1 | 1 | 1 | 1 | 1 | 1 |
| TEGmBE | 4 | 5 | 6 | 1 | 1 | 1 | 1 | 1 | 1 | 0.1 | 0.1 | 0.1 | 0.1 | 0.1 | 0.1 |
| PGmBE | — | — | — | — | — | — | — | — | — | — | — | — | — | — | — |
| DPGmBE | 4 | 4 | 4 | 4 | 4 | 4 | 4 | 4 | 4 | 4 | 4 | 4 | 4 | 4 | 4 |
| 1,2-HD | 15 | 15 | 15 | 13 | 13 | 13 | 13 | 13 | 13 | 13 | 13 | 13 | 13 | 13 | 13 |
| Glycerin | 0.1 | 0.1 | 0.1 | — | — | — | — | — | — | — | — | — | — | — | — |
| OlfineE1010 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Surfynol104 | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity |

The brevity codes used in Table III-1 to 2 are explained as follows.
BZA: benzyl acrylate
AA: acrylic acid
MAA: methacrylic acid
BPEH: t-butylperoxy(2-ethylhexanoate)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
1,2-HD: 1,2-hexanediol As is clear from the results of Table III-1 and Table III-2, the evaluation tests 1 to 5 showed excellent results when the ink jet inks according to Examples 1 to 11 in Example III were used. However, when the ink jet inks according to the Reference Examples 1 to 19, excellent results were not shown in any one or a plurality of items of the revaluation tests 1 to 5.

Example IV

Example IV-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 34000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Pigment C.I.PB15:1 was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 µm. Then, an ink for ink jet of ink composition 1 shown in Table IV-2 was produced.

Example IV-2

An ink of composition Example 2 of Table IV-2 was prepared in the same manner as in Example 1, except that 3.0 parts of trimethylolpropane was added in place of 1.0 parts of trimethylolpropane in the ink jet ink of the composition Example 1, and the amount of glycerin was increased and decreased for viscosity adjustment.

Example IV-3

An ink of composition example 3 of Table IV-2 was prepared in the same manner as in Example 1, except that 5.0 parts of trimethylolpropane was added in place of 1.0 parts of trimethylolpropane in the ink jet ink of composition example 1, and the amount of glycerin was increased and decreased for viscosity adjustment.

Example IV-4

An ink of composition example 4 of Table IV-2 was prepared in the same manner as in Example 1, except that 10.0 parts of trimethylolpropane was added in place of 1.0 parts of trimethylolpropane in the ink jet ink of the composition Example 1, and the amount of glycerin was increased and decreased for viscosity adjustment.

Example IV-5

An ink of composition example 5 of Table IV-2 was prepared in the same manner as in Example 1, except that 15.0 parts of trimethylolpropane was added in place of 1.0 parts of trimethylolpropane in the ink jet ink of the composition Example 1, and the amount of glycerin was increased and decreased for viscosity adjustment.

Example IV-6

An ink of composition example 6 of Table IV-2 was prepared in the same manner as in Example 1, except that 20.0 parts of trimethylolpropane was added in place of 1.0 parts of trimethylolpropane in the ink jet ink of the composition Example 1, and the amount of glycerin was increased and decreased for viscosity adjustment.

Example IV-7

An ink of composition example 11 of Table IV-2 was produced in the same manner as in Example 1, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Example IV-8

An ink of composition example 12 of Table IV-2 was produced in the same manner as in Example 2, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Example IV-9

An ink of composition example 13 of Table IV-2 was produced in the same manner as in Example 3, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Example IV-10

An ink of composition example 14 of Table IV-2 was produced in the same manner as in Example 4, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Example IV-11

An ink of composition example 15 of Table IV-2 was produced in the same manner as in Example 5, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Example IV-12

An ink of composition example 16 of Table IV-2 was produced in the same manner as in Example 6, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Example IV-13

An ink of composition example 21 of Table IV-2 was produced in the same manner as in Example 1, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Example IV-14

An ink of composition example 22 of Table IV-2 was produced in the same manner as in Example 2, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Example IV-15

An ink of composition example 23 of Table IV-2 was produced in the same manner as in Example 3, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Example IV-16

An ink of composition example 24 of Table IV-2 was produced in the same manner as in Example 4, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Example IV-17

An ink of composition example 25 of Table IV-2 was produced in the same manner as in Example 5, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Example IV-18

An ink of composition example 26 of Table IV-2 was produced in the same manner as in Example 6, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Example IV-19

An ink of composition example 31 of Table IV-2 was produced in the same manner as in Example 1, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Example IV-20

An ink of composition example 32 of Table IV-2 was produced in the same manner as in Example 2, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Example IV-21

An ink of composition example 33 of Table IV-2 was produced in the same manner as in Example 3, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Example IV-22

An ink of composition example 34 of Table IV-2 was produced in the same manner as in Example 4, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Example IV-23

An ink of composition example 35 of Table IV-2 was produced in the same manner as in Example 5, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Example IV-24

An ink of composition example 36 of Table IV-2 was produced in the same manner as in Example 6, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Reference Example IV-1

An ink of composition example 7 of Table IV-2 was prepared in the same manner as in Example 1, except that trimethylolpropane in the ink jet ink of the composition Example 1 was removed and the amount of glycerin was increased and decreased for viscosity adjustment.

Reference Example IV-2

An ink of composition example 8 of Table IV-2 was prepared in the same manner as in Example 1, except that 0.5 parts of trimethylolpropane was added in place of 1.0 part of trimethylolpropane in the ink jet ink of the composition Example 1, and the amount of glycerin was increased and decreased for viscosity adjustment.

Reference Example IV-3

An ink of composition example 9 of Table IV-2 was prepared in the same manner as in Example 1, except that 25.0 parts of trimethylolpropane was added in place of 1.0 part of trimethylolpropane in the ink jet ink of the composition Example 1, and the amount of glycerin was increased and decreased for viscosity adjustment.

Reference Example IV-4

An ink of composition example 10 of Table IV-2 was prepared in the same manner as in Example 1, except that 30.0 parts of trimethylolpropane was added in place of 1.0 part of trimethylolpropane in the ink jet ink of the composition Example 1, and the amount of glycerin was increased and decreased for viscosity adjustment.

Reference Example IV-5

An ink of composition example 17 of Table IV-2 was produced in the same manner as in Reference Example 1, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Reference Example IV-6

An ink of composition example 18 of Table IV-2 was produced in the same manner as in Reference Example 2, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Reference Example IV-7

An ink of composition example 19 of Table IV-2 was produced in the same manner as in Reference Example 3, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Reference Example IV-8

An ink of composition example 20 of Table IV-2 was produced in the same manner as in Reference Example 4, except that 480.0 parts by weight of cyan pigment C.I.PB15:1 having a pigment concentration of 25% by weight was changed to 480.0 parts by weight of black pigment C.I.PBk7, and the amount of glycerin was increased and decreased for viscosity adjustment.

Reference Example IV-9

An ink of composition example 27 of Table IV-2 was produced in the same manner as in Reference Example 1, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Reference Example IV-10

An ink of composition example 28 of Table IV-2 was produced in the same manner as in Reference Example 2, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Reference Example IV-11

An ink of composition example 29 of Table IV-2 was produced in the same manner as in Reference Example 3, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Reference Example IV-12

An ink of composition example 30 of Table IV-2 was produced in the same manner as in Reference Example 4, except that 480.0 parts by weight of cyan pigment C.I.PB15:1 having a pigment concentration of 25% by weight was changed to 480.0 parts by weight of magenta pigment C.I.PR122, and the amount of glycerin was increased and decreased for viscosity adjustment.

Reference Example IV-13

An ink of composition example 37 of Table IV-2 was produced in the same manner as in Reference Example 1, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Reference Example IV-14

An ink of composition example 38 of Table IV-2 was produced in the same manner as in Reference Example 2, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Reference Example IV-15

An ink of composition example 39 of Table IV-2 was produced in the same manner as in Reference Example 3, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Reference Example IV-16

An ink of composition example 40 of Table IV-2 was produced in the same manner as in Reference Example 4, except that 480.0 parts by weight of cyan pigment C.I.PB15:1 having a pigment concentration of 25% by weight was changed to 480.0 parts by weight of yellow pigment C.I.PY74, and the amount of glycerin was increased and decreased for viscosity adjustment.

Evaluation Test 1: Valuation Method of Head Clogging Reversion Property

After ink cartridges were filled with ink jet inks according to examples IV-1 to 24 and Reference Examples IV-1 to 16, the ink cartridges were attached to an ink jet printer (EM-930C, made by Seiko Epson Co., Ltd.). After the inks were left for 12 months under a dry environment at 50° C., clogging check pattern was printed, and manual cleaning was carried out at one rate/sheet until the inks were discharged out from all nozzles. The frequency of the reversion of all the nozzles was measured. A printing mode of paper: regular paper, printing quality: super fine, color correction: none and printing direction: both directions was carried out. Ahead reverted until manual cleanings of 1 to 3, a head reverted until manual cleanings of 4 to 6, a head reverted until manual cleanings of 7 to 9, and a head reverted until manual cleanings of 10 or more were evaluated as A, B, C, D. The results are shown in Table IV-1.

Evaluation Test 2: Valuation Method of Ink Depositional Property

After continuous printing of 3000 sheets was carried out at a frameless printing pattern of each color solid using ink jet inks according to examples IV-1 to 24 and Reference Examples IV-1 to 16 and an ink jet printer (PX-V600, made by Seiko Epson Co., Ltd.), the deposition level of ink to a left area was visually measured. A printing mode of paper: regular paper, printing quality: photo, color correction: none and printing direction: single direction was carried out. A head which had no deposition and in which dirt to a printed matter was not observed, a head in which deposition was observed and dirt to the printed matter was not observed, and a head in which dirt to the printed matter was generated by deposition was evaluated as A, B, C. The results are shown in Table IV-1.

Evaluation Test 3: Valuation Method of Coloration Property on Regular Paper

Solid printing was carried out on Xerox P paper (made by Fuji Xerox) using ink jet inks according to Examples VI 1 to 24 and Reference Examples VI 1 to 16 in Example IV and an ink jet printer (EM-930C, made by Seiko Epson Co., Ltd.) to obtain test bodies. A printing mode of paper: regular paper, printing quality: superfine, color correction: none and printing direction: both directions was carried out. The OD value of each of the colors was measured using GRETAGMACBETH SPECTROSCAN SP 50 (made by Gretag Corp. (US)). The results are shown as OD value in Table IV-1.

Evaluation Test 4: Valuation Method of Glossiness

Solid printing was carried out on a photo paper <gloss> (made by Seiko Epson Co., Ltd.) using ink jet inks according to Examples 1 to 24 and Reference Examples 1 to 16 in Example IV and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table IV-1.

(Evaluation Test 5: Valuation Method of Dispersibility)

In Example IV, the average particle size of particles in the ink jet inks according to Examples 1 to 24 and Reference Examples 1 to 16 in Example IV was measured by a laser particle diameter analyzer (Zetasizer 3000, made by Malvern Instruments, Ltd. (Britain)). The results are shown in Table I-1 to Table 4.

Evaluation Test 6: Valuation Method of Storage Stability

In Example IV, the initial viscosity of the pigment dispersion for ink jet ink used for Examples 1 to 24 and Reference Examples 1 to 16 in Example IV and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Table IV-1. Monomer compositions, polymerization initiators, pigments and ink jet ink compositions used when producing the ink jet ink are also shown in Table IV-1.

TABLE IV-1

|  | Example 1 | Example 2 | Example 3 | Example 4 | Example 5 | Example 6 | Reference Example 1 | Reference Example 2 | Reference Example 3 | Reference Example 4 |
|---|---|---|---|---|---|---|---|---|---|---|
| Clogging property (A-D) | A | A | A | A | A | A | D | D | B | C |
| Ink depositional property (A-C) | A | A | A | A | A | B | C | C | B | B |
| Glossiness | 61.4 | 61.9 | 62.8 | 63.0 | 62.7 | 62.1 | 59.3 | 60.0 | 53.2 | 46.1 |
| Average particle diameter (nm) | 72 | 74 | 78 | 80 | 79 | 77 | 76 | 80 | 131 | 156 |
| Stability | 1.04 | 1.09 | 1.06 | 1.01 | 1.10 | 1.09 | 1.15 | 1.16 | 19.40 | 56.00 |
| OD | 1.2 | 1.21 | 1.26 | 1.3 | 1.31 | 1.25 | 1.18 | 1.18 | 1.2 | 1.18 |

|  | Example 7 | Example 8 | Example 9 | Example 10 | Example 11 | Example 12 | Reference Example 5 | Reference Example 6 | Reference Example 7 | Reference Example 8 |
|---|---|---|---|---|---|---|---|---|---|---|
| Clogging property (A-D) | A | A | A | A | A | A | D | C | C | C |
| Ink depositional property (A-C) | A | A | A | A | A | A | C | C | B | B |
| Glossiness | 60.8 | 61.0 | 62.3 | 61.9 | 60.7 | 59.8 | 57.9 | 59.0 | 56.3 | 48.6 |
| Average particle diameter (nm) | 80 | 79 | 81 | 83 | 82 | 82 | 79 | 79 | 95 | 132 |
| Stability | 1.01 | 1.09 | 1.07 | 0.99 | 1.07 | 1.05 | 1.11 | 1.07 | 28.00 | 33.10 |
| OD | 1.21 | 1.19 | 1.23 | 1.25 | 1.23 | 1.2 | 1.13 | 1.15 | 1.15 | 1.09 |

|  | Example 13 | Example 14 | Example 15 | Example 16 | Example 17 | Example 18 | Reference Example 9 | Reference Example 10 | Reference Example 11 | Reference Example 12 |
|---|---|---|---|---|---|---|---|---|---|---|
| Clogging property (A-D) | A | A | A | A | A | A | D | D | C | C |
| Ink depositional property (A-C) | B | A | A | A | A | B | C | C | B | B |
| Glossiness | 60.2 | 61.3 | 60.8 | 63.2 | 61.4 | 60.1 | 58.3 | 59.1 | 55.3 | 41.8 |
| Average particle diameter (nm) | 74 | 77 | 76 | 80 | 79 | 78 | 72 | 73 | 93 | 96 |
| Stability | 1.06 | 1.03 | 1.01 | 1.00 | 0.98 | 1.01 | 1.19 | 1.11 | 28.00 | 33.10 |
| OD | 1.23 | 1.24 | 1.25 | 1.28 | 1.22 | 1.21 | 0.98 | 0.98 | 1.18 | 1.23 |

|  | Example 19 | Example 20 | Example 21 | Example 22 | Example 23 | Example 24 | Reference Example 13 | Reference Example 14 | Reference Example 15 | Reference Example 16 |
|---|---|---|---|---|---|---|---|---|---|---|
| Clogging property (A-D) | A | A | A | A | A | A | D | D | A | B |
| Ink depositional property (A-C) | A | A | A | A | A | A | C | C | B | B |
| Glossiness | 61.1 | 61.9 | 62.7 | 63.0 | 63.5 | 60.3 | 59.7 | 58.6 | 57.1 | 41.8 |
| Average particle diameter (nm) | 90 | 86 | 83 | 85 | 82 | 86 | 89 | 90 | 101 | 123 |
| Stability | 1.08 | 1.01 | 1.08 | 1.06 | 1.05 | 1.11 | 1.10 | 1.07 | 5.60 | 29.60 |
| OD | 1.23 | 1.19 | 1.22 | 1.27 | 1.26 | 1.25 | 1.21 | 1.2 | 1.3 | 1.29 |

TABLE IV-2

| Composition Example | 1 | 2 | 3 | 4 | 5 | 6 | 7 | 8 | 9 | 10 |
|---|---|---|---|---|---|---|---|---|---|---|
| Example/Reference Example | Example 1 | Example 2 | Example 3 | Example 4 | Example 5 | Example 6 | Reference Example 1 | Reference Example 2 | Reference Example 3 | Reference Example 4 |
| PB15:1 | 4 | 4 | 4 | 4 | 4 | 4 | 4 | 4 | 4 | 4 |
| PBk7 | — | — | — | — | — | — | — | — | — | — |
| PR122 | — | — | — | — | — | — | — | — | — | — |
| PY74 | — | — | — | — | — | — | — | — | — | — |
| DEGmBE | 0.2 | 0.2 | 0.2 | 0.2 | 0.2 | 0.2 | 0.2 | 0.2 | 0.2 | 0.2 |
| TEGmBE | 1 | 1 | 1 | 1 | 1 | 1 | 1 | 1 | 1 | 1 |
| PGmBE | 0.1 | 0.1 | 0.1 | 0.1 | 0.1 | 0.1 | 0.1 | 0.1 | 0.1 | 0.1 |
| DPGmBE | 0.1 | 0.1 | 0.1 | 0.1 | 0.1 | 0.1 | 0.1 | 0.1 | 0.1 | 0.1 |
| TMP | 1 | 3 | 5 | 10 | 15 | 20 | 0 | 0.5 | 25 | 30 |
| 1,2-HD | 4 | 4 | 4 | 4 | 4 | 4 | 4 | 4 | 4 | 4 |
| Glycerin | 17 | 16 | 15 | 12 | 8 | 6 | 19 | 18 | 4 | 1 |
| OlfineE1010 | 0.1 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 | 0.15 |

TABLE IV-2-continued

| Ion exchanged water | Residual quantity | Residual quantity | Residual quantity | Residual quantity | Residual quantity | Residual quantity | Residual quantity | Residual quantity | Residual quantity | Residual quantity |
|---|---|---|---|---|---|---|---|---|---|---|
| | Composition Example | | | | | | | | | |
| | 11 | 12 | 13 | 14 | 15 | 16 | 17 | 18 | 19 | 20 |
| | Example/Reference Example | | | | | | | | | |
| | Example 7 | Example 8 | Example 9 | Example 10 | Example 11 | Example 12 | Reference Example 5 | Reference Example 6 | Reference Example 7 | Reference Example 8 |
| PB15:1 | — | — | — | — | — | — | — | — | — | — |
| PBk7 | 5 | 5 | 5 | 5 | 5 | 5 | 5 | 5 | 5 | 5 |
| PR122 | — | — | — | — | — | — | — | — | — | — |
| PY74 | — | — | — | — | — | — | — | — | — | — |
| DEGmBE | 0.2 | 0.2 | 0.2 | 0.2 | 0.2 | 0.2 | 0.2 | 0.2 | 0.2 | 0.2 |
| TEGmBE | 1 | 1 | 1 | 1 | 1 | 1 | 1 | 1 | 1 | 1 |
| PGmBE | 0.1 | 0.1 | 0.1 | 0.1 | 0.1 | 0.1 | 0.1 | 0.1 | 0.1 | 0.1 |
| DPGmBE | 0.1 | 0.1 | 0.1 | 0.1 | 0.1 | 0.1 | 0.1 | 0.1 | 0.1 | 0.1 |
| TMP | 1 | 3 | 5 | 10 | 15 | 20 | 0 | 0.5 | 25 | 30 |
| 1,2-HD | 4 | 4 | 4 | 4 | 4 | 4 | 4 | 4 | 4 | 4 |
| Glycerin | 15 | 14 | 13 | 10 | 6 | 4 | 17 | 16 | 2 | 0 |
| OlfineE1010 | 0.1 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity | Residual quantity |
| | Composition Example | | | | | | | | | |
| | 21 | 22 | 23 | 24 | 25 | 26 | 27 | 28 | 29 | 30 |
| | Example/Reference Example | | | | | | | | | |
| | Example 13 | Example 14 | Example 15 | Example 16 | Example 17 | Example 18 | Reference Example 9 | Reference Example 10 | Reference Example 11 | Reference Example 12 |
| PB15:1 | — | — | — | — | — | — | — | — | — | — |
| PBk7 | — | — | — | — | — | — | — | — | — | — |
| PR122 | 5 | 5 | 5 | 5 | 5 | 5 | 5 | 5 | 5 | 5 |
| PY74 | — | — | — | — | — | — | — | — | — | — |
| DEGmBE | 0.2 | 0.2 | 0.2 | 0.2 | 0.2 | 0.2 | 0.2 | 0.2 | 0.2 | 0.2 |
| TEGmBE | 1 | 1 | 1 | 1 | 1 | 1 | 1 | 1 | 1 | 1 |
| PGmBE | 0.1 | 0.1 | 0.1 | 0.1 | 0.1 | 0.1 | 0.1 | 0.1 | 0.1 | 0.1 |
| DPGmBE | 0.1 | 0.1 | 0.1 | 0.1 | 0.1 | 0.1 | 0.1 | 0.1 | 0.1 | 0.1 |
| TMP | 1 | 3 | 5 | 10 | 15 | 20 | 0 | 0.5 | 25 | 30 |
| 1,2-HD | 4 | 4 | 4 | 4 | 4 | 4 | 4 | 4 | 4 | 4 |
| Glycerin | 16 | 15 | 14 | 11 | 7 | 5 | 18 | 17 | 3 | 0 |
| OlfineE1010 | 0.1 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity | Residual quantity |
| | Composition Example | | | | | | | | | |
| | 31 | 32 | 33 | 34 | 35 | 36 | 37 | 38 | 39 | 40 |
| | Example/Reference Example | | | | | | | | | |
| | Example 19 | Example 20 | Example 21 | Example 22 | Example 23 | Example 24 | Reference Example 13 | Reference Example 14 | Reference Example 15 | Reference Example 16 |
| PB15:1 | — | — | — | — | — | — | — | — | — | — |
| PBk7 | — | — | — | — | — | — | — | — | — | — |
| PR122 | — | — | — | — | — | — | — | — | — | — |
| PY74 | 5 | 5 | 5 | 5 | 5 | 5 | 5 | 5 | 5 | 5 |
| DEGmBE | 0.2 | 0.2 | 0.2 | 0.2 | 0.2 | 0.2 | 0.2 | 0.2 | 0.2 | 0.2 |
| TEGmBE | 1 | 1 | 1 | 1 | 1 | 1 | 1 | 1 | 1 | 1 |
| PGmBE | 0.1 | 0.1 | 0.1 | 0.1 | 0.1 | 0.1 | 0.1 | 0.1 | 0.1 | 0.1 |
| DPGmBE | 0.1 | 0.1 | 0.1 | 0.1 | 0.1 | 0.1 | 0.1 | 0.1 | 0.1 | 0.1 |
| TMP | 1 | 3 | 5 | 10 | 15 | 20 | 0 | 0.5 | 25 | 30 |
| 1,2-HD | 4 | 4 | 4 | 4 | 4 | 4 | 4 | 4 | 4 | 4 |
| Glycerin | 16 | 15 | 14 | 11 | 7 | 5 | 18 | 17 | 3 | 0 |
| OlfineE1010 | 0.1 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity | Residual quantity |

The brevity codes used in Table IV-1 to 2 are explained as follows.
BZA: benzyl acrylate
AA: acrylic acid
MAA: methacrylic acid
BPEH: t-butylperoxy(2-ethylhexanoate)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
1,2-HD: 1,2-hexanediol
TMP: trimethylolpropane As is clear from the results of Table IV-1 and Table IV-2, the evaluation tests 1 to 6 showed excellent results when the ink jet inks according to Examples 1 to 24 in Example IV were used. However, when the ink jet inks according to the Reference Examples 1 to 16, excellent results were not shown in anyone or a plurality of items of the revaluation tests 1 to 6.

Example V

Example V-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 34000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Pigment C.I.PB15:1 was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 µm. Then, an ink for ink jet of ink composition 1 shown in Table V-2 was produced.

Example V-2

An ink of composition example 2 of Table V-2 was prepared in the same manner as in Example 1, except that 0.5 parts of 2-butyl-2-ethyl-1,3-propanediol was added in place of 0.1 parts of 2-butyl-2-ethyl-1,3-propanediol in the ink jet ink of the composition Example 1 and the amount of glycerin was increased and decreased for viscosity adjustment.

Example V-3

An ink of composition example 3 of Table V-2 was prepared in the same manner as in Example 1, except that 1.0 parts of 2-butyl-2-ethyl-1,3-propanediol was added in place of 0.1 parts of 2-butyl-2-ethyl-1,3-propanediol in the ink jet ink of the composition Example 1 and the amount of glycerin was increased and decreased for viscosity adjustment.

Example V-4

An ink of composition example 4 of Table V-2 was prepared in the same manner as in Example 1, except that 2.0 parts of 2-butyl-2-ethyl-1,3-propanediol was added in place of 0.1 parts of 2-butyl-2-ethyl-1,3-propanediol in the ink jet ink of the composition Example 1 and the amount of glycerin was increased and decreased for viscosity adjustment.

Example V-5

An ink of composition example 5 of Table V-2 was prepared in the same manner as in Example 1, except that 0.5 parts of 2-butyl-2-ethyl-1,3-propanediol was added in place of 3.0 parts of 2-butyl-2-ethyl-1,3-propanediol in the ink jet ink of the composition Example 1 and the amount of glycerin was increased and decreased for viscosity adjustment.

Example V-6

An ink of composition example 6 of Table V-2 was prepared in the same manner as in Example 1, except that 5.0 parts of 2-butyl-2-ethyl-1,3-propanediol was added in place of 0.1 parts of 2-butyl-2-ethyl-1,3-propanediol in the ink jet ink of the composition Example 1 and the amount of glycerin was increased and decreased for viscosity adjustment.

Example V-7

An ink of composition example 7 of Table V-2 was prepared in the same manner as in Example 1, except that 10.0 parts of 2-butyl-2-ethyl-1,3-propanediol was added in place of 0.1 parts of 2-butyl-2-ethyl-1,3-propanediol in the ink jet ink of the composition Example 1 and the amount of glycerin was increased and decreased for viscosity adjustment.

Example V-8

An ink of composition example 10 shown in Table V-2 was produced in the same manner as in Example 1, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Example V-9

An ink of composition example 11 shown in Table V-2 was produced in the same manner as in Example 2, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Example V-10

An ink of composition example 12 shown in Table V-2 was produced in the same manner as in Example 3, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Example V-11

An ink of composition example 13 shown in Table V-2 was produced in the same manner as in Example 4, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Example V-12

An ink of composition example 14 shown in Table V-2 was produced in the same manner as in Example 5, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Example V-13

An ink of composition example 15 shown in Table V-2 was produced in the same manner as in Example 6, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Example V-14

An ink of composition example 16 shown in Table V-2 was produced in the same manner as in Example 7, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Example V-15

An ink of composition example 19 shown in Table V-2 was produced in the same manner as in Example 1, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Example V-16

An ink of composition example 20 shown in Table V-2 was produced in the same manner as in Example 2, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Example V-17

An ink of composition example 21 shown in Table V-2 was produced in the same manner as in Example 3, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Example V-18

An ink of composition example 22 shown in Table V-2 was produced in the same manner as in Example 4, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Example V-19

An ink of composition example 23 shown in Table V-2 was produced in the same manner as in Example 5, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Example V-20

An ink of composition example 24 shown in Table V-2 was produced in the same manner as in Example 6, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Example V-21

An ink of composition example 25 shown in Table V-2 was produced in the same manner as in Example 7, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Example V-22

An ink of composition example 28 shown in Table V-2 was produced in the same manner as in Example 1, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Example V-23

An ink of composition example 29 shown in Table V-2 was produced in the same manner as in Example 2, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Example V-24

An ink of composition example 30 shown in Table V-2 was produced in the same manner as in Example 3, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Example V-25

An ink of composition example 31 shown in Table V-2 was produced in the same manner as in Example 4, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Example V-26

An ink of composition example 32 shown in Table V-2 was produced in the same manner as in Example 5, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Example V-27

An ink of composition example 33 shown in Table V-2 was produced in the same manner as in Example 6, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Example V-28

An ink of composition example 34 shown in Table V-2 was produced in the same manner as in Example 7, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Reference Example V-1

An ink of composition Example 8 of Table IV-2 was prepared in the same manner as in Example 1, except that 2-butyl-2-ethyl-1,3-propanediol in the ink jet ink of the composition Example 1 was removed and the amount of glycerin was increased and decreased for viscosity adjustment.

Reference Example V-2

An ink of composition Example 9 of Table IV-2 was prepared in the same manner as in Example 1, except that 15.0 parts of 2-butyl-2-ethyl-1,3-propanediol was added in place of 0.1 part of 2-butyl-2-ethyl-1,3-propanediol in the ink jet ink of the composition Example 1 and the amount of glycerin was increased and decreased for viscosity adjustment.

Reference Example V-3

An ink of composition example 17 shown in Table V-2 was produced in the same manner as in Reference Example 1, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Reference Example V-4

An ink of composition example 18 shown in Table V-2 was produced in the same manner as in Reference Example 2, except that 480.0 parts by weight of cyan pigment C.I.PB15:1 having a pigment concentration of 25% by weight was changed to 480.0 parts by weight of black pigment C.I.PBk7 and the amount of glycerin was increased and decreased for viscosity adjustment.

Reference Example V-5

An ink of composition example 26 shown in Table V-2 was produced in the same manner as in Reference Example 1, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Reference Example V-6

An ink of composition example 27 shown in Table V-2 was produced in the same manner as in Reference Example 2, except that 480.0 parts by weight of cyan pigment C.I.PB15:1 having a pigment concentration of 25% by weight was changed to 480.0 parts by weight of magenta pigment C.I.PR122 and the amount of glycerin was increased and decreased for viscosity adjustment.

Reference Example V-7

An ink of composition example 35 shown in Table V-2 was produced in the same manner as in Reference Example 1, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Reference Example V-7

An ink of composition example 36 shown in Table V-2 was produced in the same manner as in Reference Example 2, except that 480.0 parts by weight of cyan pigment C.I.PB15:1 having a pigment concentration of 25% by weight was changed to 480.0 parts by weight of yellow pigment C.I.PY74 and the amount of glycerin was increased and decreased for viscosity adjustment.

Evaluation Test 1: Valuation Method of Blurring on Regular Paper

A character of "writing" was printed by Microsoft Word MS Ming style characters of style standard size 8 on Xerox P paper (made by Fuji Xerox) using ink jet inks according to Examples 1 to 28 and Reference Examples 1 to 8 in Example V and an ink jet printer (EM-930C, made by Seiko Epson Co., Ltd.) to obtain test bodies. A printing mode of paper: regular paper, printing quality: super fine, color correction: none and printing direction: both directions was carried out. Macro photographies are taken, and a macro photography having no portion in which characters are connected, a macro photography having a portion in which characters are connected, a macro photography having two portions in which characters are connected, and a macro photography having portions of three or more in which characters are connected were respectively evaluated as A, B, C, D. The results are shown in Table V-1.

Evaluation Test 2: Valuation Method of Coloration Property on Regular Paper

Solid printing was carried out on Xerox P paper (made by Fuji Xerox) using ink jet inks according to Examples 1 to 28 and Reference Examples 1 to 8 in Example V and an ink jet printer (EM-930C, made by Seiko Epson Co., Ltd.) to obtain test bodies. A printing mode of paper: regular paper, printing quality: super fine, color correction: none and printing direction: both directions was carried out. The OD value of each of the colors was measured using GRETAGMACBETH SPECTROSCAN SP 50 (made by Gretag Corp. (US)). The results are shown as OD value.

Evaluation Test 3: Valuation Method of Glossiness

Solid printing was carried out on a photo paper <gloss> (made by Seiko Epson Co., Ltd.) using ink jet inks according to Examples 1 to 28 and Reference Examples 1 to 8 in Example V and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table V-1.

(Evaluation Test 4: Valuation Method of Dispersibility)

In Example V, the average particle size of particles in the ink jet inks according to Examples 1 to 28 and Reference Examples 1 to 8 was measured by a laser particle diameter analyzer (Zetasizer 3000, made by Malvern Instruments, Ltd. (Britain)). The results are shown in Table V-1.

Evaluation Test 5: Valuation Method of Storage Stability

In Example V, the initial viscosity of the pigment dispersion for ink jet ink used for Examples 1 to 28 and Reference Examples 1 to 8 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Table V-1. Monomer compositions, polymerization initiators, pigments and ink jet ink compositions used when producing the ink jet ink are also shown in Table V-1.

TABLE V-1

|  | Example 1 | Example 2 | Example 3 | Example 4 | Example 5 | Example 6 | Example 7 | Reference Example 1 | Reference Example 2 |
|---|---|---|---|---|---|---|---|---|---|
| Evaluation of blurring | A | A | A | A | A | A | A | C | D |
| Glossiness | 61.8 | 62.2 | 63.4 | 61.2 | 59.9 | 60.5 | 59.2 | 55.9 | 51.3 |
| Average particle diameter (nm) | 71 | 78 | 73 | 77 | 69 | 72 | 72 | 76 | 131 |
| Stability | 1.06 | 1.10 | 1.01 | 1.02 | 1.09 | 1.11 | 1.13 | 3.02 | 12.30 |
| OD | 1.19 | 1.26 | 1.33 | 1.31 | 1.26 | 1.22 | 1.2 | 1.08 | 1.39 |

|  | Example 8 | Example 9 | Example 10 | Example 11 | Example 12 | Example 13 | Example 14 | Reference Example 3 | Reference Example 4 |
|---|---|---|---|---|---|---|---|---|---|
| Evaluation of blurring | A | A | A | A | A | A | A | C | D |
| Glossiness | 58.9 | 59.4 | 60.2 | 60.7 | 59.8 | 58.6 | 58.7 | 48.8 | 36.2 |
| Average particle diameter (nm) | 73 | 74 | 79 | 80 | 78 | 81 | 83 | 82 | 103 |
| Stability | 0.97 | 1.01 | 1.05 | 1.09 | 1.07 | 1.08 | 1.10 | 1.33 | 7.50 |
| OD | 1.23 | 1.26 | 1.34 | 1.36 | 1.38 | 1.35 | 1.29 | 1.11 | 1.09 |

|  | Example 15 | Example 16 | Example 17 | Example 18 | Example 19 | Example 20 | Example 21 | Reference Example 5 | Reference Example 6 |
|---|---|---|---|---|---|---|---|---|---|
| Evaluation of blurring | A | A | A | A | A | A | A | C | B |
| Glossiness | 60.6 | 61.5 | 63.2 | 65.0 | 62.7 | 61.1 | 60.8 | 52.3 | 50.4 |
| Average particle diameter (nm) | 80 | 79 | 82 | 83 | 79 | 75 | 77 | 79 | 93 |
| Stability | 1.04 | 1.07 | 0.99 | 1.01 | 1.00 | 1.05 | 1.12 | 1.33 | 7.50 |
| OD | 1.22 | 1.24 | 1.28 | 1.32 | 1.3 | 1.27 | 1.19 | 1.11 | 1.06 |

|  | Example 22 | Example 23 | Example 24 | Example 25 | Example 26 | Example 27 | Example 28 | Reference Example 7 | Reference Example 8 |
|---|---|---|---|---|---|---|---|---|---|
| Evaluation of blurring | A | A | A | A | A | A | A | C | D |
| Glossiness | 62.6 | 63.2 | 64.5 | 65.4 | 63.3 | 60.0 | 59.7 | 56.9 | 49.2 |
| Average particle diameter (nm) | 91 | 89 | 96 | 92 | 90 | 98 | 93 | 88 | 82 |
| Stability | 1.05 | 1.11 | 0.98 | 0.99 | 1.03 | 1.08 | 1.10 | 2.91 | 47.20 |
| OD | 1.2 | 1.25 | 1.3 | 1.33 | 1.28 | 1.19 | 1.22 | 1.21 | 1.29 |

TABLE V-2

| | Composition Example | | | | | | | | |
|---|---|---|---|---|---|---|---|---|---|
| | 1 | 2 | 3 | 4 | 5 | 6 | 7 | 8 | 9 |
| | Example/Reference Example | | | | | | | | |
| | Example 1 | Example 2 | Example 3 | Example 4 | Example 5 | Example 6 | Example 7 | Reference Example 1 | Reference Example 2 |
| PB15:1 | 4 | 4 | 4 | 4 | 4 | 4 | 4 | 4 | 4 |
| PBk7 | — | — | — | — | — | — | — | — | — |
| PR122 | — | — | — | — | — | — | — | — | — |
| PY74 | — | — | — | — | — | — | — | — | — |
| DEGmBE | 0.2 | 0.2 | 0.2 | 0.2 | 0.2 | 0.2 | 0.2 | 0.2 | 0.2 |
| TEGmBE | 1 | 1 | 1 | 1 | 1 | 1 | 1 | 1 | 1 |
| PGmBE | 0.1 | 0.1 | 0.1 | 0.1 | 0.1 | 0.1 | 0.1 | 0.1 | 0.1 |
| DPGmBE | 0.1 | 0.1 | 0.1 | 0.1 | 0.1 | 0.1 | 0.1 | 0.1 | 0.1 |
| BEPD | 0.1 | 0.5 | 1 | 2 | 3 | 5 | 10 | 0 | 15 |
| 1,2-HD | 4 | 4 | 4 | 4 | 4 | 4 | 4 | 4 | 4 |
| Glycerin | 18 | 18 | 17 | 16 | 14 | 11 | 7 | 18 | 5 |
| OlfineE1010 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity |

| | Composition Example | | | | | | | | |
|---|---|---|---|---|---|---|---|---|---|
| | 10 | 11 | 12 | 13 | 14 | 15 | 16 | 17 | 18 |
| | Example/Reference Example | | | | | | | | |
| | Example 8 | Example 9 | Example 10 | Example 11 | Example 12 | Example 13 | Example 14 | Reference Example 3 | Reference Example 4 |
| PB15:1 | — | — | — | — | — | — | — | — | — |
| PBk7 | 5 | 5 | 5 | 5 | 5 | 5 | 5 | 5 | 5 |
| PR122 | — | — | — | — | — | — | — | — | — |
| PY74 | — | — | — | — | — | — | — | — | — |
| DEGmBE | 0.2 | 0.2 | 0.2 | 0.2 | 0.2 | 0.2 | 0.2 | 0.2 | 0.2 |
| TEGmBE | 1 | 1 | 1 | 1 | 1 | 1 | 1 | 1 | 1 |
| PGmBE | 0.1 | 0.1 | 0.1 | 0.1 | 0.1 | 0.1 | 0.1 | 0.1 | 0.1 |
| DPGmBE | 0.1 | 0.1 | 0.1 | 0.1 | 0.1 | 0.1 | 0.1 | 0.1 | 0.1 |
| BEPD | 0.1 | 0.5 | 1 | 2 | 3 | 5 | 10 | 0 | 15 |
| 1,2-HD | 4 | 4 | 4 | 4 | 4 | 4 | 4 | 4 | 4 |
| Glycerin | 16 | 16 | 15 | 14 | 12 | 9 | 5 | 16 | 3 |
| OlfineE1010 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity |

| | Composition Example | | | | | | | | |
|---|---|---|---|---|---|---|---|---|---|
| | 19 | 20 | 21 | 22 | 23 | 24 | 25 | 26 | 27 |
| | Example/Reference Example | | | | | | | | |
| | Example 15 | Example 16 | Example 17 | Example 18 | Example 19 | Example 20 | Example 21 | Reference Example 5 | Reference Example 6 |
| PB15:1 | — | — | — | — | — | — | — | — | — |
| PBk7 | — | — | — | — | — | — | — | — | — |
| PR122 | 5 | 5 | 5 | 5 | 5 | 5 | 5 | 5 | 5 |
| PY74 | — | — | — | — | — | — | — | — | — |
| DEGmBE | 0.2 | 0.2 | 0.2 | 0.2 | 0.2 | 0.2 | 0.2 | 0.2 | 0.2 |
| TEGmBE | 1 | 1 | 1 | 1 | 1 | 1 | 1 | 1 | 1 |
| PGmBE | 0.1 | 0.1 | 0.1 | 0.1 | 0.1 | 0.1 | 0.1 | 0.1 | 0.1 |
| DPGmBE | 0.1 | 0.1 | 0.1 | 0.1 | 0.1 | 0.1 | 0.1 | 0.1 | 0.1 |
| BEPD | 0.1 | 0.5 | 1 | 2 | 3 | 5 | 10 | 0 | 15 |
| 1,2-HD | 4 | 4 | 4 | 4 | 4 | 4 | 4 | 4 | 4 |
| Glycerin | 15 | 15 | 13 | 12 | 10 | 7 | 3 | 15 | 1 |
| OlfineE1010 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity |

TABLE V-2-continued

| | Composition Example | | | | | | | | |
|---|---|---|---|---|---|---|---|---|---|
| | 28 | 29 | 30 | 31 | 32 | 33 | 34 | 35 | 36 |
| | Example/Reference Example | | | | | | | | |
| | Example 22 | Example 23 | Example 24 | Example 25 | Example 26 | Example 27 | Example 28 | Reference Example 7 | Reference Example 8 |
| PB15:1 | — | — | — | — | — | — | — | — | — |
| PBk7 | — | — | — | — | — | — | — | — | — |
| PR122 | 13 | — | — | — | — | — | — | — | — |
| PY74 | 5 | 5 | 5 | 5 | 5 | 5 | 5 | 5 | 5 |
| DEGmBE | 0.2 | 0.2 | 0.2 | 0.2 | 0.2 | 0.2 | 0.2 | 0.2 | 0.2 |
| TEGmBE | | 1 | 1 | 1 | 1 | 1 | 1 | 1 | 1 |
| PGmBE | 0.1 | 0.1 | 0.1 | 0.1 | 0.1 | 0.1 | 0.1 | 0.1 | 0.1 |
| DPGmBE | 0.1 | 0.1 | 0.1 | 0.1 | 0.1 | 0.1 | 0.1 | 0.1 | 0.1 |
| BEPD | 0.1 | 0.5 | 1 | 2 | 3 | 5 | 10 | 0 | 15 |
| 1,2-HD | | 4 | 4 | 4 | 4 | 4 | 4 | 4 | 4 |
| Glycerin | 6 | 16 | 15 | 14 | 12 | 9 | 5 | 16 | 3 |
| OlfineE1010 | 0.1 | 0.1 | 0.1 | 0.1 | 0.1 | 0.1 | 0.1 | 0.1 | 0.1 |
| Surfynol104 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity |

The brevity codes used in Table V-1 to 2 are explained as follows.
BZA: benzyl acrylate
AA: acrylic acid
MAA: methacrylic acid
BPEH: t-butylperoxy(2-ethylhexanoate)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane As is clear from the results of Table V-1 and Table V-2, the evaluation tests 1 to 5 showed excellent results when the ink jet inks according to Examples 1 to 18 in Example V were used. However, when the ink jet inks according to the Reference Examples 1 to 8, excellent results were not shown in any one or a plurality of items of the revaluation tests 1 to 5.

Example VI

Example VI-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 77.5 parts by weight of acrylic acid, and 7.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 100 mgKOH/g, and the weight average molecular weight thereof was 22000.

3.0 parts by weight of a 30% sodium hydroxide solution was then added into 120.0 parts by weight of the polymer composition solution thus produced, and the resultant solution was stirred by a high speed disper for 5 minutes. Furthermore, the solution was stirred by the high speed disper for 5 minutes. Furthermore, 480.0 parts by weight of Cyanine Blue G-500 pure-A (C.I.PB15:1; made by Sanyo Color Works, Ltd.) having a pigment concentration was added into the solution, and the solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink for ink jet of ink composition A shown in Table VI-2 was produced.

Example VI-2

An ink of composition example A of Table VI-2 was produced in the same manner as in Example 1, except that a polymer composition solution having a resin solid content of 22.7% was prepared by setting the amount of the methyl ethyl ketone to 2040 parts by weight and the added amount of the polymer composition solution added to the pigment was set to 264.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 22000.

Example VI-3

An ink of composition example A of Table VI-2 was produced in the same manner as in Example 1, except that 3.5 parts by weight of t-butylperoxy(2-ethylhexanoate) was used in place of 7.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 100 mgKOH/g, and the weight average molecular weight thereof was 48000.

Example VI-4

An ink of composition example A of Table VI-2 was produced in the same manner as in Example 1, except that 3.5 parts by weight of t-butylperoxy(2-ethylhexanoate) was used in place of 7.8 parts by weight of t-butylperoxy(2-ethylhexanoate), and that a polymer composition solution having a resin solid content of 22.7% was prepared by setting the amount of the methyl ethyl ketone to 2040 parts by weight and the added amount of the polymer composition solution added to the pigment was set to 264.0 parts by weight. After taking a part of the polymer composition solution and drying the polymer composition solution in an ignition drier of 105° C. for 1 hour, the acid value of the solid of the obtained polymer composition for ink jet ink was 100 mgKOH/g, and the weight average molecular weight thereof was 48000.

Example VI-5

An ink of composition example A of Table VI-2 was produced in the same manner as in Example 1, except that 3.2 parts by weight of t-butylperoxy(2-ethylhexanoate) was used in place of 7.8 parts by weight of t-butylperoxy(2-ethylhexanoate), and that a polymer composition solution having a resin solid content of 33.3% was prepared by setting the amount of the methyl ethyl ketone to 1200 parts by weight and the added amount of the polymer composition solution added to the pigment was set to 180.0 parts by weight. After taking a part of the polymer composition solution and drying the polymer composition solution in an ignition drier of 105° C. for 1 hour, the acid value of the solid of the obtained polymer composition for ink jet ink was 100 mgKOH/g, and the weight average molecular weight thereof was 52000.

Example VI-6

An ink of composition example A of Table VI-2 was produced in the same manner as in Example 1, except that 3.2 parts by weight of t-butylperoxy(2-ethylhexanoate) was used in place of 7.8 parts by weight of t-butylperoxy(2-ethylhexanoate), and that a polymer composition solution having a resin solid content of 15.1% was prepared by setting the amount of the methyl ethyl ketone to 3360 parts by weight and the added amount of the polymer composition solution added to the pigment was set to 396.0 parts by weight. After taking a part of the polymer composition solution and drying the polymer composition solution in an ignition drier of 105° C. for 1 hour, the acid value of the solid of the obtained polymer composition for ink jet ink was 100 mgKOH/g, and the weight average molecular weight thereof was 52000.

Example VI-7

An ink of composition example A of Table VI-2 was produced in the same manner as in Example 1, except that 966.0 parts by weight of benzil acrylate was used in place of 483.0 parts by weight of benzil acrylate, and 155.0 parts by weight of acrylic acid was used in place of 77.5 parts by weight of acrylic acid, 2.9 parts by weight of t-butylperoxy(2-ethylhexanoate) was used in place of 7.8 parts by weight of t-butylperoxy(2-ethylhexanoate), or 1200 parts by weight of methyl ethyl ketone was added to prepare a polymer composition solution having a resin solid content of 33.3%, and the added amount of the polymer composition solution added to the pigment was set to 180.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 115000.

Example VI-8

An ink of composition example A of Table VI-2 was produced in the same manner as in Example 1, except that 966.0 parts by weight of benzil acrylate was used in place of 483.0 parts by weight of benzil acrylate, and 155.0 parts by weight of acrylic acid was used in place of 77.5 parts by weight of acrylic acid, 2.9 parts by weight of t-butylperoxy(2-ethylhexanoate) was used in place of 7.8 parts by weight of t-butylperoxy(2-ethylhexanoate), or 3360 parts by weight of methyl ethyl ketone was added to prepare a polymer composition solution having a resin solid content of 15.1%, and the added amount of the polymer composition solution added to the pigment was set to 396.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 115000.

Example VI-9

An ink of composition example B shown in Table VI-2 was produced in the same manner as in Example 1, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example VI-10

An ink of composition example B shown in Table VI-2 was produced in the same manner as in Example 2, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example VI-11

An ink of composition example B shown in Table VI-2 was produced in the same manner as in Example 3, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example VI-12

An ink of composition example B shown in Table VI-2 was produced in the same manner as in Example 4, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example VI-13

An ink of composition example B shown in Table VI-2 was produced in the same manner as in Example 5, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example VI-14

An ink of composition example B shown in Table VI-2 was produced in the same manner as in Example 6, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example VI-15

An ink of composition example B shown in Table VI-2 was produced in the same manner as in Example 7, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example VI-16

An ink of composition example B shown in Table VI-2 was produced in the same manner as in Example 8, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example VI-17

An ink of composition example C shown in Table VI-2 was produced in the same manner as in Example 1, except that 480.0 parts by weight of Pigment Violet Gc227-A having a pigment concentration of 25% by weight was used in place of 480.0 parts by weight of Cyanine Blue G-500 pure-A.

Example VI-18

An ink of composition example C shown in Table VI-2 was produced in the same manner as in Example 2, except that 480.0 parts by weight of Pigment Violet Gc227-A having a pigment concentration of 25% by weight was used in place of 480.0 parts by weight of Cyanine Blue G-500 pure-A.

Example VI-19

An ink of composition example C shown in Table VI-2 was produced in the same manner as in Example 3, except that 480.0 parts by weight of Pigment Violet Gc227-A having a pigment concentration of 25% by weight was used in place of 480.0 parts by weight of Cyanine Blue G-500 pure-A.

Example VI-20

An ink of composition example C shown in Table VI-2 was produced in the same manner as in Example 4, except that 480.0 parts by weight of Pigment Violet Gc227-A having a pigment concentration of 25% by weight was used in place of 480.0 parts by weight of Cyanine Blue G-500 pure-A.

Example VI-21

An ink of composition example C shown in Table VI-2 was produced in the same manner as in Example 5, except that 480.0 parts by weight of Pigment Violet Gc227-A having a pigment concentration of 25% by weight was used in place of 480.0 parts by weight of Cyanine Blue G-500 pure-A.

Example VI-22

An ink of composition example C shown in Table VI-2 was produced in the same manner as in Example 6, except that 480.0 parts by weight of Pigment Violet Gc227-A having a pigment concentration of 25% by weight was used in place of 480.0 parts by weight of Cyanine Blue G-500 pure-A.

Example VI-23

An ink of composition example C shown in Table VI-2 was produced in the same manner as in Example 7, except that 480.0 parts by weight of Pigment Violet Gc227-A having a pigment concentration of 25% by weight was used in place of 480.0 parts by weight of Cyanine Blue G-500 pure-A.

Example VI-24

An ink of composition example C shown in Table VI-2 was produced in the same manner as in Example 8, except that 480.0 parts by weight of Pigment Violet Gc227-A having a pigment concentration of 25% by weight was used in place of 480.0 parts by weight of Cyanine Blue G-500 pure-A.

Example VI-25

An ink of composition example D shown in Table VI-2 was produced in the same manner as in Example 1, except that 480.0 parts by weight of Fast Yellow 7413-A having a pigment concentration of 25% by weight was used in place of 480.0 parts by weight of Cyanine Blue G-500 pure-A.

Example VI-26

An ink of composition example D shown in Table VI-2 was produced in the same manner as in Example 2, except that 480.0 parts by weight of Fast Yellow 7413-A having a pigment concentration of 25% by weight was used in place of 480.0 parts by weight of Cyanine Blue G-500 pure-A.

Example VI-27

An ink of composition example D shown in Table VI-2 was produced in the same manner as in Example 3, except that 480.0 parts by weight of Fast Yellow 7413-A having a pigment concentration of 25% by weight was used in place of 480.0 parts by weight of Cyanine Blue G-500 pure-A.

Example VI-28

An ink of composition example D shown in Table VI-2 was produced in the same manner as in Example 4, except that 480.0 parts by weight of Fast Yellow 7413-A having a pigment concentration of 25% by weight was used in place of 480.0 parts by weight of Cyanine Blue G-500 pure-A.

Example VI-29

An ink of composition example D shown in Table VI-2 was produced in the same manner as in Example 5, except that 480.0 parts by weight of Fast Yellow 7413-A having a pigment concentration of 25% by weight was used in place of 480.0 parts by weight of Cyanine Blue G-500 pure-A.

Example VI-30

An ink of composition example D shown in Table VI-2 was produced in the same manner as in Example 6, except that 480.0 parts by weight of Fast Yellow 7413-A having a pigment concentration of 25% by weight was used in place of 480.0 parts by weight of Cyanine Blue G-500 pure-A.

Example VI-31

An ink of composition example D shown in Table VI-2 was produced in the same manner as in Example 7, except that 480.0 parts by weight of Fast Yellow 7413-A having a pigment concentration of 25% by weight was used in place of 480.0 parts by weight of Cyanine Blue G-500 pure-A.

Example VI-32

An ink of composition example D shown in Table VI-2 was produced in the same manner as in Example 8, except that 480.0 parts by weight of Fast Yellow 7413-A having a pigment concentration of 25% by weight was used in place of 480.0 parts by weight of Cyanine Blue G-500 pure-A.

Reference Example VI-1

An ink of composition example A of Table VI-2 was produced in the same manner as in Example 1, except that a polymer composition solution having a resin solid content of 55.6% was prepared by setting the added amount of methyl ethyl ketone to 480 parts by weight and the added amount of the polymer composition solution added to the pigment was set to 108.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 22000.

Reference Example VI-2

An ink of composition example A of Table VI-2 was produced in the same manner as in Example 1, except that a polymer composition solution having a resin solid content of 20.0% was prepared by setting the added amount of methyl ethyl ketone to 2400 parts by weight and the added amount of the polymer composition solution added to the pigment was set to 300.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 22000.

Reference Example VI-3

An ink of composition example A shown in Table VI-2 was produced in the same manner as in Example 1, except that 3.5 parts by weight of t-butylperoxy(2-ethylhexanoate) was used in place of 7.8 parts by weight of t-butylperoxy(2-ethylhexanoate), 480 parts by weight of methyl ethyl ketone was added to prepare a polymer composition solution having a resin solid content of 55.6%, and the added amount of the polymer composition solution added to the pigment was set to 108.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 48000.

Reference Example VI-4

An ink of composition example A shown in Table VI-2 was produced in the same manner as in Example 1, except that 3.5 parts by weight of t-butylperoxy(2-ethylhexanoate) was used in place of 7.8 parts by weight of t-butylperoxy(2-ethylhexanoate), 2400 parts by weight of methyl ethyl ketone was added to prepare a polymer composition solution having a resin solid content of 20.0%, and the added amount of the polymer composition solution added to the pigment was set to 300.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 48000.

Reference Example VI-5

An ink of composition example A shown in Table VI-2 was produced in the same manner as in Example 1, except that 3.2 parts by weight of t-butylperoxy(2-ethylhexanoate) was used in place of 7.8 parts by weight of t-butylperoxy(2-ethylhexanoate), 1080 parts by weight of methyl ethyl ketone was added to prepare a polymer composition solution having a resin solid content of 35.7%, and the added amount of the polymer composition solution added to the pigment was set to 168.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 52000.

Reference Example VI-6

An ink of composition example A shown in Table VI-2 was produced in the same manner as in Example 1, except that 3.2 parts by weight of t-butylperoxy(2-ethylhexanoate) was used in place of 7.8 parts by weight of t-butylperoxy(2-ethylhexanoate), 3840 parts by weight of methyl ethyl ketone was added to prepare a polymer composition solution having a resin solid content of 13.5%, and the added amount of the polymer composition solution added to the pigment was set to 444.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 52000.

Reference Example VI-7

An ink of composition example A shown in Table VI-2 was produced in the same manner as in Example 1, except that 966.0 parts by weight of benzil acrylate, 155.0 parts by weight of acrylic acid and 2.9 parts by weight of t-butylperoxy(2-ethylhexanoate) were respectively used in place of 483.0 parts by weight of benzil acrylate and 77.5 parts by weight of acrylic acid, and 7.8 parts by weight of t-butylperoxy(2-ethylhexanoate); 1080 parts by weight of methyl ethyl ketone was added to prepare a polymer composition solution having a resin solid content of 35.7%; and the amount of the polymer composition solution to be added to the pigment was set to 168.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 115000.

Reference Example VI-8

An ink of composition example A shown in Table VI-2 was produced in the same manner as in Example 1, except that 966.0 parts by weight of benzil acrylate, 155.0 parts by weight of acrylic acid and 2.9 parts by weight of t-butylperoxy(2-ethylhexanoate) were respectively used in place of 483.0 parts by weight of benzil acrylate and 77.5 parts by weight of acrylic acid, and 7.8 parts by weight of t-butylperoxy(2-ethylhexanoate); 3840 parts by weight of methyl ethyl ketone was added to prepare a polymer composition solution having a resin solid content of 13.5%; and the amount of the polymer composition solution to be added to the pigment was set to 444.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 115000.

Reference Example VI-9

An ink of composition example A shown in Table VI-2 was produced in the same manner as in Example 1, except that 9.3 parts by weight of t-butylperoxy(2-ethylhexanoate) was used in place of 7.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 18000.

Reference Example VI-10

An ink of composition example A shown in Table VI-2 was produced in the same manner as in Example 1, except that 9.3 parts by weight of t-butylperoxy(2-ethylhexanoate) was used in place of 7.8 parts by weight of t-butylperoxy(2-ethylhexanoate); 2040 parts by weight of methyl ethyl ketone was added to prepare a polymer composition solution having a resin solid content of 22.7%; and the amount of the polymer composition solution to be added to the pigment was set to 264.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 18000.

Reference Example VI-11

An ink of composition example A shown in Table VI-2 was produced in the same manner as in Example 1, except that 966.0 parts by weight of benzil acrylate, 155.0 parts by weight of acrylic acid and 2.6 parts by weight of t-butylperoxy(2-ethylhexanoate) were respectively used in place of 483.0 parts by weight of benzil acrylate and 77.5 parts by weight of acrylic acid, and 7.8 parts by weight of t-butylperoxy(2-ethylhexanoate); 1200 parts by weight of methyl ethyl ketone was added to prepare a polymer composition solution having a resin solid content of 33.3%; and the amount of the polymer composition solution to be added to the pigment was set to 180.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 130000.

Reference Example VI-12

An ink of composition example A shown in Table VI-2 was produced in the same manner as in Example 1, except that 966.0 parts by weight of benzil acrylate, 155.0 parts by weight of acrylic acid and 2.6 parts by weight of t-butylperoxy(2-ethylhexanoate) were respectively used in place of 483.0 parts by weight of benzil acrylate and 77.5 parts by weight of acrylic acid, and 7.8 parts by weight of t-butylperoxy(2-ethylhexanoate); 3360 parts by weight of methyl ethyl ketone was added to prepare a polymer composition solution having a resin solid content of 15.1%; and the amount of the polymer composition solution to be added to the pigment was set to 396.0 parts by weight. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 130000.

Reference Example VI-13

An ink of composition example B shown in Table VI-2 was produced in the same manner as in Reference Example 1, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example VI-14

An ink of composition example B shown in Table VI-2 was produced in the same manner as in Reference Example 2, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example VI-15

An ink of composition example B shown in Table VI-2 was produced in the same manner as in Reference Example 3, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example VI-16

An ink of composition example B shown in Table VI-2 was produced in the same manner as in Reference Example 4, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example VI-17

An ink of composition example B shown in Table VI-2 was produced in the same manner as in Reference Example 5, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example VI-18

An ink of composition example B shown in Table VI-2 was produced in the same manner as in Reference Example 6, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example VI-19

An ink of composition example B shown in Table VI-2 was produced in the same manner as in Reference Example 7, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example VI-20

An ink of composition example B shown in Table VI-2 was produced in the same manner as in Reference Example 8, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example VI-21

An ink of composition example C shown in Table VI-2 was produced in the same manner as in Reference Example 1, except that 480.0 parts by weight of Pigment Violet GC227-A having a pigment concentration of 25% by weight was used in place of 480.0 parts by weight of Cyanine Blue G-500 pure-A.

Reference Example VI-22

An ink of composition example C shown in Table VI-2 was produced in the same manner as in Reference Example 2, except that 480.0 parts by weight of Pigment Violet GC227-A having a pigment concentration of 25% by weight was used in place of 480.0 parts by weight of Cyanine Blue G-500 pure-A.

Reference Example VI-23

An ink of composition example C shown in Table VI-2 was produced in the same manner as in Reference Example 3, except that 480.0 parts by weight of Pigment Violet GC227-A having a pigment concentration of 25% by weight was used in place of 480.0 parts by weight of Cyanine Blue G-500 pure-A.

Reference Example VI-24

An ink of composition example C shown in Table VI-2 was produced in the same manner as in Reference Example 4, except that 480.0 parts by weight of Pigment Violet GC227-A having a pigment concentration of 25% by weight was used in place of 480.0 parts by weight of Cyanine Blue G-500 pure-A.

Reference Example VI-25

An ink of composition example C shown in Table VI-2 was produced in the same manner as in Reference Example 5, except that 480.0 parts by weight of Pigment Violet GC227-A having a pigment concentration of 25% by weight was used in place of 480.0 parts by weight of Cyanine Blue G-500 pure-A.

Reference Example VI-26

An ink of composition example C shown in Table VI-2 was produced in the same manner as in Reference Example 6, except that 480.0 parts by weight of Pigment Violet GC227-A having a pigment concentration of 25% by weight was used in place of 480.0 parts by weight of Cyanine Blue G-500 pure-A.

Reference Example VI-27

An ink of composition example C shown in Table VI-2 was produced in the same manner as in Reference Example 7, except that 480.0 parts by weight of Pigment Violet GC227-A having a pigment concentration of 25% by weight was used in place of 480.0 parts by weight of Cyanine Blue G-500 pure-A.

Reference Example VI-28

An ink of composition example C shown in Table VI-2 was produced in the same manner as in Reference Example 8, except that 480.0 parts by weight of Pigment Violet GC227-A having a pigment concentration of 25% by weight was used in place of 480.0 parts by weight of Cyanine Blue G-500 pure-A.

Reference Example VI-29

An ink of composition example D shown in Table VI-2 was produced in the same manner as in Reference Example 1, except that 480.0 parts by weight of Fast Yellow 7413-A (C.I.PY74, made by Sanyo Color Works, Ltd.) having a pigment concentration of 25% by weight was used in place of 480.0 parts by weight of Cyanine Blue G-500 pure-A.

Reference Example VI-30

An ink of composition example D shown in Table VI-2 was produced in the same manner as in Reference Example 2, except that 480.0 parts by weight of Fast Yellow 7413-A (C.I.PY74, made by Sanyo Color Works, Ltd.) having a pigment concentration of 25% by weight was used in place of 480.0 parts by weight of Cyanine Blue G-500 pure-A.

Reference Example VI-31

An ink of composition example D shown in Table VI-2 was produced in the same manner as in Reference Example 3, except that 480.0 parts by weight of Fast Yellow 7413-A (C.I.PY74, made by Sanyo Color Works, Ltd.) having a pigment concentration of 25% by weight was used in place of 480.0 parts by weight of Cyanine Blue G-500 pure-A.

Reference Example VI-32

An ink of composition example D shown in Table VI-2 was produced in the same manner as in Reference Example 4, except that 480.0 parts by weight of Fast Yellow 7413-A (C.I.PY74, made by Sanyo Color Works, Ltd.) having a pigment concentration of 25% by weight was used in place of 480.0 parts by weight of Cyanine Blue G-500 pure-A.

Reference Example VI-33

An ink of composition example D shown in Table VI-2 was produced in the same manner as in Reference Example 5, except that 480.0 parts by weight of Fast Yellow 7413-A (C.I.PY74, made by Sanyo Color Works, Ltd.) having a pigment concentration of 25% by weight was used in place of 480.0 parts by weight of Cyanine Blue G-500 pure-A.

Reference Example VI-34

An ink of composition example D shown in Table VI-2 was produced in the same manner as in Reference Example 6, except that 480.0 parts by weight of Fast Yellow 7413-A (C.I.PY74, made by Sanyo Color Works, Ltd.) having a pigment concentration of 25% by weight was used in place of 480.0 parts by weight of Cyanine Blue G-500 pure-A.

Reference Example VI-35

An ink of composition example D shown in Table VI-2 was produced in the same manner as in Reference Example 7, except that 480.0 parts by weight of Fast Yellow 7413-A (C.I.PY74, made by Sanyo Color Works, Ltd.) having a pigment concentration of 25% by weight was used in place of 480.0 parts by weight of Cyanine Blue G-500 pure-A.

Reference Example VI-36

An ink of composition example D shown in Table VI-2 was produced in the same manner as in Reference Example 8, except that 480.0 parts by weight of Fast Yellow 7413-A (C.I.PY74, made by Sanyo Color Works, Ltd.) having a pigment concentration of 25% by weight was used in place of 480.0 parts by weight of Cyanine Blue G-500 pure-A.

Evaluation Test 1: Valuation Method of Coloration Property on Regular Paper

Solid printing was carried out on Xerox P paper (made by Fuji Xerox) using ink jet inks according to Examples 1 to 32 and Reference Examples 1 to 36 in Example VI and an ink jet printer (EM-930C, made by Seiko Epson Co., Ltd.) to obtain test bodies. A printing mode of paper: regular paper, printing quality: super fine, color correction: none and printing direction: both directions was carried out. The OD value of each of the colors was measured using GRETAGMACBETH SPECTROSCAN SP 50 (made by Gretag Corp. (US)). The results are shown as OD value.

Evaluation Test 2: Valuation Method of Glossiness

Solid printing was carried out on a photo paper <gloss> (made by Seiko Epson Co., Ltd.) using ink jet inks according to Examples 1 to 32 and Reference Examples 1 to 36 in Example VI and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table VI-1.

(Evaluation Test 3: Valuation Method of Dispersibility)

In Example VI, the average particle size of particles in the ink jet inks according to Examples 1 to 32 and Reference Examples 1 to 36 was measured by a laser particle diameter analyzer (Zetasizer 3000, made by Malvern Instruments, Ltd. (Britain)). The results are shown in Table VI-1.

Evaluation Test 4: Valuation Method of Storage Stability

In Example VI, the initial viscosity of the pigment dispersion for ink jet ink used for Examples 1 to 32 and Reference Examples 1 to 36 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables VI-1. Monomer compositions, polymerization initiators, pigments and ink jet ink compositions used when producing the ink jet ink are also shown in Table VI-1.

TABLE VI-1

| | Reference Example 1 | Example 1 | Example 2 | Reference Example 2 | Reference Example 3 | Example 3 | Example 4 | Reference Example 4 | Reference Example 5 |
|---|---|---|---|---|---|---|---|---|---|
| Ink composition (Refer to Table 2) | A | A | A | A | A | A | A | A | A |
| BZA | 483.0 | 483.0 | 483.0 | 483.0 | 483.0 | 483.0 | 483.0 | 483.0 | 483.0 |
| AA | 77.5 | 77.5 | 77.5 | 77.5 | 77.5 | 77.5 | 77.5 | 77.5 | 77.5 |
| BPEH | 7.8 | 7.8 | 7.8 | 7.8 | 3.5 | 3.5 | 3.5 | 3.5 | 3.2 |
| PBk7 | — | — | — | — | — | — | — | — | — |
| PB15:1 | 480.0 | 480.0 | 480.0 | 480.0 | 480.0 | 480.0 | 480.0 | 480.0 | 480.0 |
| PV19 | — | — | — | — | — | — | — | — | — |
| PY74 | — | — | — | — | — | — | — | — | — |
| MEK (Disperse medium: wt %) | 40.0 | 50.0 | 170.0 | 200.0 | 40.0 | 50.0 | 170.0 | 200.0 | 90.0 |

TABLE VI-1-continued

| | | | | | | | | | |
|---|---|---|---|---|---|---|---|---|---|
| Acid value (mgKOH/g) | 100 | 100 | 100 | 100 | 100 | 100 | 100 | 100 | 100 |
| Weight average molecular weight | 22000 | 22000 | 22000 | 22000 | 48000 | 48000 | 48000 | 48000 | 52000 |
| Glossiness | 38.5 | 61.1 | 60.5 | 55.0 | 49.0 | 60.9 | 59.8 | 59.9 | 40.3 |
| Average particle size (nm) | 86 | 81 | 79 | 152 | 139 | 78 | 78 | 91 | 110 |
| Stability | 1.32 | 1.04 | 0.97 | 1.55 | 1.44 | 1.00 | 0.99 | 1.49 | 1.67 |
| OD | 1.01 | 1.19 | 1.21 | 0.99 | 1.12 | 1.2 | 1.21 | 1.01 | 0.88 |

| | Example 5 | Example 6 | Reference Example 6 | Reference Example 7 | Example 7 | Reference Example 8 | Reference Example 8 | Reference Example 9 | Reference Example 10 |
|---|---|---|---|---|---|---|---|---|---|
| Ink composition (Refer to Table 2) | A | A | A | A | A | A | A | A | A |
| BZA | 483.0 | 483.0 | 483.0 | 966.0 | 966.0 | 966.0 | 966.0 | 483.0 | 483.0 |
| AA | 77.5 | 77.5 | 77.5 | 155.0 | 155.0 | 155.0 | 155.0 | 77.5 | 77.5 |
| BPEH | 3.2 | 3.2 | 3.2 | 2.9 | 2.9 | 2.9 | 2.9 | 9.3 | 9.3 |
| PBk7 | — | — | — | — | — | — | — | — | — |
| PB15:1 | 480.0 | 480.0 | 480.0 | 480.0 | 480.0 | 480.0 | 480.0 | 480.0 | 480.0 |
| PV19 | — | — | — | — | — | — | — | — | — |
| PY74 | — | — | — | — | — | — | — | — | — |
| MEK (Disperse medium: wt %) | 100.0 | 280.0 | 320.0 | 90.0 | 100.0 | 280.0 | 320.0 | 50.0 | 170.0 |
| Acid value (mgKOH/g) | 100 | 100 | 100 | 100 | 100 | 100 | 100 | 100 | 100 |
| Weight average molecular weight | 52000 | 52000 | 52000 | 115000 | 115000 | 115000 | 115000 | 18000 | 18000 |
| Glossiness | 63.5 | 63.7 | 55.4 | 30.4 | 64.0 | 62.2 | 40.9 | 33.7 | 53.0 |
| Average particle size (nm) | 85 | 86 | 98 | 151 | 83 | 86 | 168 | 170 | 135 |
| Stability | 1.03 | 1.02 | 1.38 | 2.04 | 1.08 | 0.97 | 1.56 | 2.22 | 1.49 |
| OD | 1.21 | 1.3 | 1.07 | 1.1 | 1.23 | 1.25 | 1.13 | 1.18 | 1.14 |

| | Reference Example 11 | Reference Example 12 | Reference Example 13 | Example 9 | Example 10 | Reference Example 14 | Reference Example 15 | Example 11 | Example 12 |
|---|---|---|---|---|---|---|---|---|---|
| Ink composition (Refer to Table 2) | A | A | B | B | B | B | B | B | B |
| BZA | 966.0 | 966.0 | 483.0 | 483.0 | 483.0 | 483.0 | 483.0 | 483.0 | 483.0 |
| AA | 155.0 | 155.0 | 77.5 | 77.5 | 77.5 | 77.5 | 77.5 | 77.5 | 77.5 |
| BPEH | 2.6 | 2.6 | 7.8 | 7.8 | 7.8 | 7.8 | 3.5 | 3.5 | 3.5 |
| PBk7 | — | — | 480.0 | 480.0 | 480.0 | 480.0 | 480.0 | 480.0 | 480.0 |
| PB15:1 | 480.0 | 480.0 | — | — | — | — | — | — | — |
| PV19 | — | — | — | — | — | — | — | — | — |
| PY74 | — | — | — | — | — | — | — | — | — |
| MEK (Disperse medium: wt %) | 100.0 | 280.0 | 40.0 | 50.0 | 170.0 | 200.0 | 40.0 | 50.0 | 170.0 |
| Acid value (mgKOH/g) | 100 | 100 | 100 | 100 | 100 | 100 | 100 | 100 | 100 |
| Weight average molecular weight | 130000 | 130000 | 22000 | 22000 | 22000 | 22000 | 48000 | 48000 | 48000 |
| Glossiness | 36.0 | 28.7 | 55.0 | 63.2 | 60.7 | 36.1 | 44.6 | 62.4 | 60.1 |
| Average particle size (nm) | 176 | 230 | 150 | 88 | 81 | 79 | 93 | 83 | 79 |
| Stability | 3.66 | 41.00 | 4.99 | 0.98 | 1.01 | 2.10 | 1.34 | 1.06 | 1.03 |
| OD | 1.01 | 1.23 | 1.03 | 1.21 | 1.19 | 1.11 | 1.18 | 1.22 | 1.23 |

| | Reference Example 16 | Reference Example 17 | Example 13 | Example 14 | Reference Example 18 | Reference Example 19 | Example 15 | Example 16 | Reference Example 20 |
|---|---|---|---|---|---|---|---|---|---|
| Ink composition (Refer to Table 2) | B | B | B | B | B | B | B | B | B |
| BZA | 483.0 | 483.0 | 483.0 | 483.0 | 483.0 | 966.0 | 966.0 | 966.0 | 966.0 |
| AA | 77.5 | 77.5 | 77.5 | 77.5 | 77.5 | 155.0 | 155.0 | 155.0 | 155.0 |
| BPEH | 3.5 | 3.2 | 3.2 | 3.2 | 3.2 | 2.9 | 2.9 | 2.9 | 2.9 |
| PBk7 | 480.0 | 480.0 | 480.0 | 480.0 | 480.0 | 480.0 | 480.0 | 480.0 | 480.0 |
| PB15:1 | — | — | — | — | — | — | — | — | — |
| PV19 | — | — | — | — | — | — | — | — | — |
| PY74 | — | — | — | — | — | — | — | — | — |
| MEK (Disperse medium: wt %) | 200.0 | 90.0 | 100.0 | 280.0 | 320.0 | 90.0 | 100.0 | 280.0 | 320.0 |
| Acid value (mgKOH/g) | 100 | 100 | 100 | 100 | 100 | 100 | 100 | 100 | 100 |
| Weight average molecular weight | 48000 | 52000 | 52000 | 52000 | 52000 | 115000 | 115000 | 115000 | 115000 |
| Glossiness | 63.5 | 59.7 | 59.9 | 61.0 | 50.1 | 34.9 | 61.7 | 60.7 | 45.6 |
| Average particle size (nm) | 100 | 95 | 89 | 87 | 76 | 111 | 82 | 85 | 80 |
| Stability | 1.96 | 1.40 | 1.07 | 1.01 | 3.88 | 8.77 | 1.05 | 1.00 | 2.64 |
| OD | 0.98 | 1.03 | 1.20 | 1.19 | 1.13 | 1.05 | 1.28 | 1.30 | 1.15 |

TABLE VI-1-continued

| | Reference Example 21 | Example 17 | Example 18 | Reference Example 22 | Reference Example 23 | Example 19 | Example 20 | Reference Example 24 | Reference Example 25 |
|---|---|---|---|---|---|---|---|---|---|
| Ink composition (Refer to Table 2) | C | C | C | C | C | C | C | C | C |
| BZA | 483.0 | 483.0 | 483.0 | 483.0 | 483.0 | 483.0 | 483.0 | 483.0 | 483.0 |
| AA | 77.5 | 77.5 | 77.5 | 77.5 | 77.5 | 77.5 | 77.5 | 77.5 | 77.5 |
| BPEH | 7.8 | 7.8 | 7.8 | 7.8 | 3.5 | 3.5 | 3.5 | 3.5 | 3.2 |
| PBk7 | — | — | — | — | — | — | — | — | — |
| PB15:1 | — | — | — | — | — | — | — | — | — |
| PV19 | 480.0 | 480.0 | 480.0 | 480.0 | 480.0 | 480.0 | 480.0 | 480.0 | 480.0 |
| PY74 | — | — | — | — | — | — | — | — | — |
| MEK (Disperse medium: wt %) | 40.0 | 50.0 | 170.0 | 200.0 | 40.0 | 50.0 | 170.0 | 200.0 | 90.0 |
| Acid value (mgKOH/g) | 100 | 100 | 100 | 100 | 100 | 100 | 100 | 100 | 100 |
| Weight average molecular weight | 22000 | 22000 | 22000 | 22000 | 48000 | 48000 | 48000 | 48000 | 52000 |
| Glossiness | 48.0 | 65.2 | 61.6 | 55.2 | 22.2 | 62.9 | 61.4 | 45.5 | 40.1 |
| Average particle size (nm) | 85 | 79 | 80 | 83 | 90 | 84 | 84 | 92 | 92 |
| Stability | 3.03 | 1.01 | 1.02 | 2.23 | 1.19 | 0.99 | 1.04 | 1.99 | 2.19 |
| OD | 0.99 | 1.23 | 1.21 | 1.13 | 1.16 | 1.22 | 1.19 | 0.97 | 0.94 |

| | Example 21 | Example 22 | Reference Example 26 | Reference Example 27 | Example 23 | Example 24 | Reference Example 28 | Reference Example 29 | Example 25 |
|---|---|---|---|---|---|---|---|---|---|
| Ink composition (Refer to Table 2) | C | C | C | C | C | C | C | D | D |
| BZA | 483.0 | 483.0 | 483.0 | 966.0 | 966.0 | 966.0 | 966.0 | 483.0 | 483.0 |
| AA | 77.5 | 77.5 | 77.5 | 155.0 | 155.0 | 155.0 | 155.0 | 77.5 | 77.5 |
| BPEH | 3.2 | 3.2 | 3.2 | 2.9 | 2.9 | 2.9 | 2.9 | 7.8 | 7.8 |
| PBk7 | — | — | — | — | — | — | — | — | — |
| PB15:1 | — | — | — | — | — | — | — | — | — |
| PV19 | 480.0 | 480.0 | 480.0 | 480.0 | 480.0 | 480.0 | 480.0 | — | — |
| PY74 | — | — | — | — | — | — | — | 480.0 | 480.0 |
| MEK (Disperse medium: wt %) | 100.0 | 280.0 | 320.0 | 90.0 | 100.0 | 280.0 | 320.0 | 40.0 | 50.0 |
| Acid value (mgKOH/g) | 100 | 100 | 100 | 100 | 100 | 100 | 100 | 100 | 100 |
| Weight average molecular weight | 52000 | 52000 | 52000 | 115000 | 115000 | 115000 | 115000 | 22000 | 22000 |
| Glossiness | 63.3 | 60.9 | 49.2 | 28.7 | 59.9 | 60.8 | 43.2 | 54.9 | 62.1 |
| Average particle size (nm) | 81 | 83 | 103 | 139 | 89 | 86 | 197 | 199 | 87 |
| Stability | 1.02 | 1.01 | 18.9 | 93.1 | 0.98 | 0.99 | 21.2 | 17.2 | 0.99 |
| OD | 1.20 | 1.23 | 1.16 | 1.16 | 1.24 | 1.26 | 1.26 | 0.83 | 1.21 |

| | Example 26 | Reference Example 30 | Reference Example 31 | Example 27 | Example 28 | Reference Example 32 | Reference Example 33 | Example 29 | Example 30 |
|---|---|---|---|---|---|---|---|---|---|
| Ink composition (Refer to Table 2) | D | D | D | D | D | D | D | D | D |
| BZA | 483.0 | 483.0 | 483.0 | 483.0 | 483.0 | 483.0 | 483.0 | 483.0 | 483.0 |
| AA | 77.5 | 77.5 | 77.5 | 77.5 | 77.5 | 77.5 | 77.5 | 77.5 | 77.5 |
| BPEH | 7.8 | 7.8 | 3.5 | 3.5 | 3.5 | 3.5 | 3.2 | 3.2 | 3.2 |
| PBk7 | — | — | — | — | — | — | — | — | — |
| PB15:1 | — | — | — | — | — | — | — | — | — |
| PV19 | — | — | — | — | — | — | — | — | — |
| PY74 | 480.0 | 480.0 | 480.0 | 480.0 | 480.0 | 480.0 | 480.0 | 480.0 | 480.0 |
| MEK (Disperse medium: wt %) | 170.0 | 200.0 | 40.0 | 50.0 | 170.0 | 200.0 | 90.0 | 100.0 | 280.0 |
| Acid value (mgKOH/g) | 100 | 100 | 100 | 100 | 100 | 100 | 100 | 100 | 100 |
| Weight average molecular weight | 22000 | 22000 | 48000 | 48000 | 48000 | 48000 | 52000 | 52000 | 52000 |
| Glossiness | 60.5 | 47.5 | 55.1 | 60.0 | 60.2 | 58.1 | 53.7 | 63.5 | 62.9 |
| Average particle size (nm) | 85 | 140 | 123 | 85 | 86 | 99 | 94 | 83 | 83 |
| Stability | 1.01 | 3.99 | 2.60 | 1.01 | 1.01 | 4.32 | 5.57 | 1.02 | 1.01 |
| OD | 1.22 | 1.13 | 0.93 | 1.24 | 1.21 | 1.12 | 0.96 | 1.19 | 1.21 |

| | Reference Example 34 | Reference Example 35 | Example 31 | Example 32 | Reference Example 36 |
|---|---|---|---|---|---|
| Ink composition (Refer to Table 2) | D | D | D | D | D |
| BZA | 483.0 | 966.0 | 966.0 | 966.0 | 966.0 |
| AA | 77.5 | 155.0 | 155.0 | 155.0 | 155.0 |
| BPEH | 3.2 | 2.9 | 2.9 | 2.9 | 2.9 |
| PBk7 | — | — | — | — | — |
| PB15:1 | — | — | — | — | — |

TABLE VI-1-continued

| | | | | | |
|---|---|---|---|---|---|
| PV19 | — | — | — | — | — |
| PY74 | 480.0 | 480.0 | 480.0 | 480.0 | 480.0 |
| MEK (Disperse medium: wt %) | 320.0 | 90.0 | 100.0 | 280.0 | 320.0 |
| Acid value (mgKOH/g) | 100 | 100 | 100 | 100 | 100 |
| Weight average molecular weight | 52000 | 115000 | 115000 | 115000 | 115000 |
| Glossiness | 41.9 | 25.3 | 61.3 | 59.9 | 42.9 |
| Average particle size (nm) | 129 | 90 | 79 | 80 | 129 |
| Stability | 1.99 | 67.2 | 1.00 | 1.03 | 36.6 |
| OD | 1.30 | 1.22 | 1.27 | 1.36 | 1.20 |

TABLE VI-2

| | Composition Example | | | |
|---|---|---|---|---|
| | A | B | C | D |
| PB15:1 | 4 | — | — | — |
| PBk7 | — | 5 | — | — |
| PV19 | — | — | 5 | — |
| PY74 | — | — | — | 5 |
| DEGmBE | 0.2 | — | 0.3 | — |
| TEGmBE | 1 | 3 | 1 | 1 |
| PGmBE | — | — | — | 0.1 |
| DPGmBE | 0.1 | — | — | — |
| BEPD | 0.7 | 0.7 | 0.7 | 0.7 |
| 1,2-HD | 4 | 3 | 4 | 4 |
| Glycerin | 15 | 10 | 10 | 10 |
| TMP | 7 | 4 | 5 | 5 |
| OlfineE1010 | 0.1 | 0.1 | — | — |
| Surfynol104 | 0.15 | 0.15 | 0.15 | 0.15 |
| EDTA 2.0% solution | 1 | 1 | 1 | 1 |
| Ion exchanged water | Residual quantity | Residual quantity | Residual quantity | Residual quantity |

The brevity codes used in Table VI-1 to 2 are explained as follows.
BZA: benzyl acrylate
AA: acrylic acid
BPEH: t-butylperoxy(2-ethylhexanoate)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane
EDTA: ethylenediamine tetraacetic acid)/2Na As is clear from the results of Table VI-1 and Table VI-2, the evaluation tests 1 to 5 showed excellent results when the ink jet inks according to Examples 1 to 32 in Example VI were used. However, when the ink jet inks according to the Reference Examples 1 to 36, excellent results were not shown in any one or a plurality of items of the revaluation tests 1 to 5.

Example VII

Preparation of Resin Emulsion

Resin Emulsion A

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 34000.

Next, methyl ethyl ketone in the polymer composition solution thus produced was removed by reduced-pressure distillation using an evaporator, and the polymer composition solution was cooled to a normal temperature. Ion exchanged water and a 5% sodium hydroxide solution were then added to produce a resin emulsion having a resin content of 40% by weight and PH 8. When the average particle size of the emulsion was measured by a laser particle diameter analyzer (Zetasizer 3000, made by Malvern Instruments, Ltd.), the average particle size thereof was 55 nm.

Resin Emulsion B

A resin emulsion B was prepared in the same manner as in the resin emulsion A, except that 13.2 parts by weight of methacrylic acid and acrylic acid of 36.5 parts by weight are used in place of 50.4 parts by weight of acrylic acid. After taking a part of the polymer composition solution and drying the polymer composition solution in an ignition drier of 105° C. for 1 hour, the acid value of the solid of the obtained polymer composition was 60 mgKOH/g, and the weight average molecular weight thereof was 32000. The average particle size of this emulsion was 62 nm.

Resin Emulsion C

A resin emulsion C was prepared in the same manner as in the resin emulsion A, except that 42.6 parts by weight of acrylic acid was used in place of 50.4 parts by weight of acrylic acid. After taking a part of the polymer composition solution and drying the polymer composition solution in an ignition drier of 105° C. for 1 hour, the acid value of the solid of the obtained polymer composition was 55 mgKOH/g, and the weight average molecular weight thereof was 48000. The average particle size of this emulsion was 58 nm.

Resin Emulsion D

A resin emulsion D was prepared in the same manner as in the resin emulsion A, except that 77.5 parts by weight of acrylic acid was used in place of 50.4 parts by weight of acrylic acid. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 29000. The average particle size of this emulsion was 48 nm.

Resin Emulsion E

A resin emulsion E was prepared in the same manner as in the resin emulsion A, except that 96.0 parts by weight of acrylic acid was used in place of 50.4 parts by weight of acrylic acid. After taking a part of the polymer composition solution and drying the polymer composition solution in an ignition drier of 105° C. for 1 hour, the acid value of the solid of the obtained polymer composition was 120 mgKOH/g, and the weight average molecular weight thereof was 34000. The average particle size of this emulsion was 43 nm.

Resin Emulsion F

A resin emulsion F was prepared in the same manner as in the resin emulsion A, except that 155.0 parts by weight of acrylic acid was used in place of 50.4 parts by weight of acrylic acid. After taking a part of the polymer composition solution and drying the polymer composition solution in an ignition drier of 105° C. for 1 hour, the acid value of the solid of the obtained polymer composition was 200 mgKOH/g, and the weight average molecular weight thereof was 29000. The average particle size of this emulsion was 38 nm.

Resin Emulsion G

A resin emulsion G was prepared in the same manner as in the resin emulsion A, except that 19.2 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 10000. The average particle size of this emulsion was 65 nm.

Resin Emulsion H

A resin emulsion H was prepared in the same manner as in the resin emulsion A, except that 2.3 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 140000. The average particle size of this emulsion was 78 nm.

Resin Emulsion I

After carrying out nitrogen replacement of the interior of a separable flask of 2000 ml equipped with a stirrer, a reflux tube, a thermometer and a dripping funnel, 300.0 parts by weight of ion exchanged water and 1 part by weight of sodium lauryl sulfate were placed in the separable flask and heated to 70° C. while being stirred. After 1.3 parts by weight of potassium persulfate as a polymerization initiator was added and dissolved, a solution obtained by previously stirring 150 parts by weight of ion exchanged water, 1 part by weight of sodium lauryl sulfate, 7 parts by weight of acryl amide, 225 parts by weight of methyl methacrylate, 78 parts by weight of butyl acrylate and 10 parts by weight of methacrylic acid was placed in the dripping funnel. The solution was dripped into the separable flask over a period of 4 hours at 70° C., and was reacted. After the dripping end, the resultant solution was held at 70° C. for 3 hours. After taking a part of the thus obtained polymer composition solution and drying the polymer composition solution in an ignition drier of 105° C. for 1 hour, the acid value of the solid of the obtained polymer composition was 75 mgKOH/g, and the weight average molecular weight thereof was 44000.

The polymer composition solution thus produced was cooled to a normal temperature, and ion exchanged water and a 5% sodium hydroxide solution were added to produce a resin emulsion having a resin content of 40% by weight and PH8. When the average particle size of the emulsion was measured by a laser particle diameter analyzer (Zetasizer 3000, made by Malvern Instruments, Ltd.), the average particle size thereof was 55 nm.

[Preparation of Ink]

Example VII-1

A polymer composition solution having a resin solid content of 50% was obtained by the same method as in that of the resin emulsion A. 3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Blue G-500 pure-A (C.I.PB15:1; Sanyo Color Works, Ltd.) was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 µm. Then, as shown in the ink composition 1 of Table VII-3, the pigment concentration was mixed with the various solvents containing the resin emulsion A to produce a desired ink for ink jet recording.

Example VII-2

An ink of composition example 2 shown in Table VII-3 was produced in the same manner as in Example 1, except that 13.2 parts of methacrylic acid and 36.5 parts by weight of acrylic acid were used in place of 50.4 parts by weight of acrylic acid, and a resin emulsion B was used.

Example VII-3

An ink of composition example 3 shown in Table VII-3 was produced in the same manner as in Example 1, except that 42.6 parts by weight of acrylic acid was used in place of 50.4 parts by weight of acrylic acid, and resin emulsions B and C (B:30%, C:70%) were used.

Example VII-4

An ink of composition example 4 shown in Table VII-3 was produced in the same manner as in Example 1, except that 77.5 parts by weight of acrylic acid was used in place of 50.4 parts by weight of acrylic acid, and resin emulsions D and E (B:50%, C:50%) were used.

Example VII-5

An ink of composition example 9 shown in Table VII-3 was produced in the same manner as in Example 1, except that 480.0 parts by weight of Pigment Violet GC227-A (C.I.PV19; made by Sanyo Color Works, Ltd.) was used in place of 480.0 parts by weight of Cyanine Blue G-500 pure-A.

Example VII-6

An ink of composition example 10 shown in Table VII-3 was produced in the same manner as in Example 2, except that 480.0 parts by weight of Pigment Violet GC227-A was used in place of 480.0 parts by weight of Cyanine Blue G-500 pure-A.

Example VII-7

An ink of composition example 13 shown in Table VII-4 was produced in the same manner as in Example 1, except that 480.0 parts by weight of Fast Yellow 7413-A (C.I.PY74; made by Sanyo Color Works, Ltd.) was used in place of 480.0 parts by weight of Cyanine Blue G-500 pure-A.

Example VII-8

An ink of composition example 14 shown in Table VII-4 was produced in the same manner as in Example 2, except that 480.0 parts by weight of Fast Yellow 7413-A (C.I.PY74; made by Sanyo Color Works, Ltd.) was used in place of 480.0 parts by weight of Cyanine Blue G-500 pure-A.

Example VII-9

An ink of composition example 17 shown in Table VII-4 was produced in the same manner as in Example 1, except that 480.0 parts by weight of Monarch 880 (made by Cabot Corp.) was used in place of 480.0 parts by weight of Cyanine Blue G-500 pure-A.

Example VII-10

An ink of composition example 18 shown in Table VII-4 was produced in the same manner as in Example 2, except that 480.0 parts by weight of Monarch 880 (made by Cabot Corp.) was used in place of 480.0 parts by weight of Cyanine Blue G-500 pure-A.

Reference Example VII-1

An ink of composition example 5 shown in Table VII-3 was produced in the same manner as in Example 1, except that a resin emulsion F was used.

Reference Example VII-2

An ink of composition example 6 shown in Table VII-3 was produced in the same manner as in Example 3, except that a resin emulsion G was used.

Reference Example VII-3

An ink of composition example 7 shown in Table VII-3 was produced in the same manner as in Example 4, except that resin emulsions G and H (G:30%, H:70%) were used.

Reference Example VII-4

An ink of composition example 8 shown in Table VII-3 was produced in the same manner as in Example 2, except that a resin emulsion I was used.

Reference Example VII-5

An ink of composition example 11 shown in Table VII-4 was produced in the same manner as in Example 5, except that a resin emulsion F was used.

Reference Example VII-6

An ink of composition example 12 shown in Table VII-4 was produced in the same manner as in Example 6, except that resin emulsions F and G (F:30%, G:70%) were used.

Reference Example VII-7

An ink of composition example 15 shown in Table VII-4 was produced in the same manner as in Example 7, except that a resin emulsion F was used.

Reference Example VII-8

An ink of composition example 16 shown in Table VII-4 was produced in the same manner as in Example 8, except that resin emulsions F and G (F:50%, G:50%) were used.

Reference Example VII-9

An ink of composition example 19 shown in Table VII-4 was produced in the same manner as in Example 9, except that a resin emulsion F was used.

Reference Example VII-10

An ink of composition example 20 shown in Table VII-4 was produced in the same manner as in Example 10, except that a resin emulsion I was used.

Evaluation Test 1: Valuation Method of Coloration Property on Regular Paper

Solid printing was carried out on Xerox P paper (made by Fuji Xerox) using ink jet inks according to Examples 1 to 10 and Reference Examples 1 to 10 in Example VII and an ink jet printer (EM-930C, made by Seiko Epson Co., Ltd.) to obtain test bodies. A printing mode of paper: regular paper, printing quality: super fine, color correction: none and printing direction: both directions was carried out. The OD (Optical Density) of each of the colors was measured using GRETAG-MACBETH SPECTROSCAN SP 50 (made by Gretag Corp. (US) (measurement condition; light source: D50 and viewing angle: 2 degrees). The results are shown as OD value in Table VII-1 and Table VII-2.

Evaluation Test 2: Valuation Method of Glossiness

Solid printing was carried out on a photo paper <gloss> (made by Seiko Epson Co., Ltd.) using ink jet inks according to Examples 1 to 10 and Reference Examples 1 to 10 in Example VII and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table VII-1 and VII-2.

Evaluation Test 3: Valuation Method of Dispersibility

In Example VII, the average particle size of particles in the ink jet inks according to Examples 1 to 10 and Reference Examples 1 to 10 was measured by a laser particle diameter analyzer (Zetasizer 3000, made by Malvern Instruments, Ltd. (Britain)). The results are shown in Table VII-1 and VII-2.

Evaluation Test 4: Valuation Method of Storage Stability

In Example VII, the initial viscosity of the pigment dispersion for ink jet ink used for Examples 1 to 10 and Reference Examples 1 to 10 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables VII-1 and VII-2. Monomer compositions, polymerization initiators, pigments and ink jet ink compositions used when producing the ink jet ink are also shown in Table VII-1 and VII-2.

TABLE VII-1

|  | Example 1 | Example 2 | Example 3 | Example 4 | Reference Example 1 | Reference Example 2 | Reference Example 3 | Reference Example 4 | Example 5 | Example 6 |
|---|---|---|---|---|---|---|---|---|---|---|
| BZA | 483.0 | 483.0 | 483.0 | 483.0 | 483.0 | 483.0 | 483.0 | 483.0 | 483.0 | 483.0 |
| AA | 50.4 | 36.5 | 42.6 | 77.5 | 50.4 | 42.6 | 77.5 | 36.5 | 50.4 | 36.5 |
| MAA | — | 13.2 | — | — | — | — | — | 13.2 | — | 13.2 |
| BPEH | 5.6 | 5.6 | 5.6 | 5.6 | 5.6 | 5.6 | 5.6 | 5.6 | 5.6 | 5.6 |
| Acid value (mgKOH/g) | 65 | 60 | 55 | 100 | 65 | 55 | 100 | 60 | 65 | 60 |
| Weight average molecular weight | 34000 | 32000 | 48000 | 29000 | 34000 | 48000 | 29000 | 32000 | 34000 | 32000 |
| PB15:1 | 480.0 | 480.0 | 480.0 | 480.0 | 480.0 | 480.0 | 480.0 | 480.0 | — | — |
| PV19 | — | — | — | — | — | — | — | — | 480.0 | 480.0 |
| PY74 | — | — | — | — | — | — | — | — | — | — |
| PBk7 | — | — | — | — | — | — | — | — | — | — |
| Emulsion | A | B | B(30%) + C(70%) | D(50%) + E(50%) | F | G | G(30%) + H(70%) | I | A | B |
| Glossiness value (%) | 65.2 | 61.4 | 63.1 | 68.6 | 45.0 | 57.7 | 54.1 | 44.3 | 64.4 | 62.3 |
| Average particle size (nm) | 72 | 74 | 73 | 72 | 80 | 95 | 117 | 90 | 73 | 75 |
| Stability | 1.01 | 0.97 | 1.00 | 1.03 | 1.58 | 11.61 | 7.64 | 8.92 | 1.03 | 1.01 |
| OD | 1.27 | 1.29 | 1.29 | 1.24 | 1.18 | 1.19 | 1.18 | 1.06 | 1.28 | 1.29 |

TABLE VII-2

|  | Reference Example 5 | Reference Example 6 | Example 7 | Example 8 | Reference Example 7 | Reference Example 8 | Example 9 | Example 10 | Reference Example 9 | Reference Example 10 |
|---|---|---|---|---|---|---|---|---|---|---|
| BZA | 483.0 | 483.0 | 483.0 | 483.0 | 483.0 | 483.0 | 483.0 | 483.0 | 483.0 | 483.0 |
| AA | 50.4 | 36.5 | 50.4 | 36.5 | 50.4 | 36.5 | 50.4 | 36.5 | 50.4 | 36.5 |
| MAA | — | 13.2 | — | 13.2 | — | 13.2 | — | 13.2 | — | 13.2 |
| BPEH | 5.6 | 5.6 | 5.6 | 5.6 | 5.6 | 5.6 | 5.6 | 5.6 | 5.6 | 5.6 |
| Acid value (mgKOH/g) | 65 | 60 | 65 | 60 | 65 | 60 | 65 | 60 | 65 | 60 |
| Weight average molecular weight | 34000 | 32000 | 34000 | 32000 | 34000 | 32000 | 34000 | 32000 | 34000 | 32000 |
| PB15:1 | — | — | — | — | — | — | — | — | — | — |
| PV19 | 480.0 | 480.0 | — | — | — | — | — | — | — | — |
| PY74 | — | — | 480.0 | 480.0 | 480.0 | 480.0 | — | — | — | — |
| PBk7 | — | — | — | — | — | — | 480.0 | 480.0 | 480.0 | 480.0 |
| Emulsion | F | F(30%) + G(70%) | A | B | F | F(50%) + H(50%) | A | B | F | I |
| Glossiness value (%) | 53.9 | 50.9 | 69.1 | 68.9 | 63.2 | 61.4 | 49.3 | 45.0 | 32.0 | 31.5 |
| Average particle size (nm) | 89 | 92 | 90 | 94 | 103 | 122 | 92 | 96 | 116 | 134 |
| Stability | 1.31 | 6.88 | 1.03 | 0.98 | 1.25 | 5.17 | 0.99 | 0.97 | 1.33 | 7.55 |
| OD | 1.18 | 1.20 | 1.30 | 1.29 | 1.21 | 1.15 | 1.41 | 1.37 | 1.29 | 1.06 |

TABLE VII-3

| | | Composition Example | | | | | | | | | |
|---|---|---|---|---|---|---|---|---|---|---|---|
| | | 1 | 2 | 3 | 4 | 5 | 6 | 7 | 8 | 9 | 10 |
| | | Example/Reference Example | | | | | | | | | |
| | | Example 1 | Example 2 | Example 3 | Example 4 | Reference Example 1 | Reference Example 2 | Reference Example 3 | Reference Example 4 | Example 5 | Example 6 |
| Colorant | PB15:1 | 4 | 4 | 4 | 4 | 4 | 4 | 4 | 4 | — | — |
| | PV19 | — | — | — | — | — | — | — | — | 5 | 5 |
| | PY74 | — | — | — | — | — | — | — | — | — | — |
| | PBk7 | — | — | — | — | — | — | — | — | — | — |
| Resin fine particles (Emulsion | A | 5 | — | — | — | — | — | — | — | 5 | — |
| | B | — | 5 | 1.5 | — | — | — | — | — | — | 5 |
| | C | — | — | 3.5 | — | — | — | — | — | — | — |

TABLE VII-3-continued

| | | Composition Example | | | | | | | | | |
|---|---|---|---|---|---|---|---|---|---|---|---|
| | | 1 | 2 | 3 | 4 | 5 | 6 | 7 | 8 | 9 | 10 |
| | | | | | | Example/Reference Example | | | | | |
| | | Example 1 | Example 2 | Example 3 | Example 4 | Reference Example 1 | Reference Example 2 | Reference Example 3 | Reference Example 4 | Example 5 | Example 6 |
| containing) | D | — | — | — | 2.5 | — | — | — | — | — | — |
| | E | — | — | — | 2.5 | — | — | — | — | — | — |
| | F | — | — | — | — | 5 | — | — | — | — | — |
| | G | — | — | — | — | — | 5 | 1.5 | — | — | — |
| | H | — | — | — | — | — | — | 3.5 | — | — | — |
| | I | — | — | — | — | — | — | — | 5 | — | — |
| 1,2-HD | | 4 | 4 | 4 | 4 | 4 | 4 | 4 | 4 | 3 | 3 |
| Glycerin | | 15 | 10 | 10 | 10 | 10 | 10 | 10 | 10 | 10 | 10 |
| TMP | | 7 | 7 | 7 | 7 | 7 | 7 | 7 | 7 | 5 | 5 |
| DEGmBE | | 0.2 | 0.2 | 0.2 | 0.2 | 0.2 | 0.2 | 0.2 | 0.2 | 0.3 | 0.3 |
| TEGmBE | | 1 | 1 | 1 | 1 | 1 | 1 | 1 | 1 | 1 | 1 |
| PGmBE | | — | — | — | — | — | — | — | — | — | — |
| DPGmBE | | 0.2 | 0.2 | 0.2 | 0.2 | 0.2 | 0.2 | 0.2 | 0.2 | — | — |
| BEPD | | 0.7 | 0.7 | 0.7 | 0.7 | 0.7 | 0.7 | 0.7 | 0.7 | 0.7 | 0.7 |
| OlfineE1010 | | 0.1 | 0.1 | 0.1 | 0.1 | 0.1 | 0.1 | 0.1 | 0.1 | — | — |
| Surfynol104 | | 0.15 | 0.15 | 0.15 | 0.15 | 0.15 | 0.15 | 0.15 | 0.15 | 0.15 | 0.15 |
| Ion exchanged water | | Residual quantity | Residual quantity | Residual quantity | Residual quantity | Residual quantity | Residual quantity | Residual quantity | Residual quantity | Residual quantity | Residual quantity |

TABLE VII-4

| | | Composition Example | | | | | | | | | |
|---|---|---|---|---|---|---|---|---|---|---|---|
| | | 11 | 12 | 13 | 14 | 15 | 16 | 17 | 18 | 19 | 20 |
| | | | | | | Example/Reference Example | | | | | |
| | | Reference Example 5 | Reference Example 6 | Example 7 | Example 8 | Reference Example 1 | Reference Example 2 | Reference Example 3 | Reference Example 4 | Example 5 | Example 6 |
| Colorant | PB15:1 | — | — | — | — | — | — | — | — | — | — |
| | PV19 | 5 | 5 | — | — | — | — | — | — | — | — |
| | PY74 | — | — | 5 | 5 | 5 | 5 | — | — | — | — |
| | PBk7 | — | — | — | — | — | — | 5 | 5 | 5 | 5 |
| Resin fine particles (Emulsion containing) | A | — | — | 0.1 | — | — | — | 10 | — | — | — |
| | B | — | — | — | 0.1 | — | — | — | 10 | — | — |
| | C | — | — | — | — | — | — | — | — | — | — |
| | D | — | — | — | — | — | — | — | — | — | — |
| | E | — | — | — | — | — | — | — | — | — | — |
| | F | 5 | 1.5 | — | — | 0.1 | 0.05 | — | — | 10 | — |
| | G | — | 3.5 | — | — | — | — | — | — | — | — |
| | H | — | — | — | — | — | 0.05 | — | — | — | — |
| | I | — | — | — | — | — | — | — | — | — | 10 |
| 1,2-HD | | 3 | 3 | 4 | 4 | 4 | 4 | 3 | 3 | 3 | 3 |
| Glycerin | | 10 | 10 | 10 | 10 | 10 | 10 | 10 | 10 | 10 | 10 |
| TMP | | 5 | 5 | 5 | 5 | 5 | 5 | 4 | 4 | 4 | 4 |
| DEGmBE | | 0.3 | 0.3 | — | — | — | — | — | — | — | — |
| TEGmBE | | 1 | 1 | 1 | 1 | 1 | 1 | 2 | 3 | 2 | 3 |
| PGmBE | | — | — | 0.1 | 0.1 | 0.1 | 0.1 | — | — | — | — |
| DPGmBE | | — | — | — | — | — | — | — | — | — | — |
| BEPD | | 0.7 | 0.7 | 0.7 | 0.7 | 0.7 | 0.7 | 0.7 | 0.7 | 0.7 | 0.7 |
| OlfineE1010 | | — | — | 0.1 | 0.1 | 0.1 | 0.1 | 0.1 | 0.1 | 0.1 | 0.1 |
| Surfynol104 | | 0.15 | 0.15 | 0.15 | 0.15 | 0.15 | 0.15 | 0.15 | 0.15 | 0.15 | 0.15 |
| Ion exchanged water | | Residual quantity | Residual quantity | Residual quantity | Residual quantity | Residual quantity | Residual quantity | Residual quantity | Residual quantity | Residual quantity | Residual quantity |

The brevity codes used in Table VII-1 to 4 are explained as follows.
BZA: benzyl acrylate
AA: acrylic acid
MAA: methacrylic acid
BPEH: t-butylperoxy(2-ethylhexanoate)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
PBk7: C.I. Pigment Black 7 (carbon black) 1,2-HD: 1,2-hexanediol
TMP: trimethylolpropane
DEGmBE: diethylene glycol mono butyl ether
TEGmBE: triethylene glycol mono butyl ether
PGmBE: propylene glycol mono butyl ether
DPGmBE: dipropylene glycol mono butyl ether BEPD: 2-butyl-2-ethyl-1,3-propanediol As is clear from the results of Table VII-1 to VII-4, the evaluation tests 1 to 5 showed excellent results when the ink jet inks according to Examples 1 to 10 in Example VII were used. However, when the ink jet inks according to the Reference Examples 1 to 10, excellent results were not shown in any one or a plurality of items of the revaluation tests 1 to 5.

Example VIII

Example VIII-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 34000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Blue G-500 pure-A (C.I.PB15:1; made by Sanyo Color Works, Ltd.) was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion. After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink for ink jet recording of ink composition 1 shown in Table VIII-3 was produced.

Example VIII-2

An ink of composition example 2 shown in Table VIII-3 was produced in the same manner as in Example 1, except that 13.2 parts of methacrylic acid and 36.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition for ink jet ink was 60 mgKOH/g, and the weight average molecular weight thereof was 32000.

Example VIII-3

An ink of composition example 3 shown in Table VIII-3 was produced in the same manner as in Example 1, except that 42.6 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition for ink jet ink was 55 mgKOH/g, and the weight average molecular weight thereof was 48000.

Example VIII-4

An ink of composition example 4 shown in Table VIII-3 was produced in the same manner as in Example 1, except that 77.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition for ink jet ink was 100 mgKOH/g, and the weight average molecular weight thereof was 29000.

Example VIII-5

An ink of composition example 4 shown in Table VIII-3 was produced in the same manner as in Example 1, except that 93.0 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition for ink jet ink was 120 mgKOH/g, and the weight average molecular weight thereof was 34000.

Example VIII-6

An ink of composition example 8 shown in Table VIII-3 was produced in the same manner as in Example 1, except that 480.0 parts by weight of Pigment Violet GC227-A (C.I.PV19; made by Sanyo Color Works, Ltd.) was used in place of 480.0 parts by weight of Cyanine Blue G-500 pure-A.

Example VIII-7

An ink of composition example 9 shown in Table VIII-3 was produced in the same manner as in Example 2, except that 480.0 parts by weight of Pigment Violet GC227-A was used in place of 480.0 parts by weight of Cyanine Blue G-500 pure-A.

Example VIII-8

An ink of composition example 10 shown in Table VIII-3 was produced in the same manner as in Example 3, except that 480.0 parts by weight of Pigment Violet GC227-A was used in place of 480.0 parts by weight of Cyanine Blue G-500 pure-A.

Example VIII-9

An ink of composition example 11 shown in Table VIII-3 was produced in the same manner as in Example 4, except that 480.0 parts by weight of Pigment Violet GC227-A was used in place of 480.0 parts by weight of Cyanine Blue G-500 pure-A.

Example VIII-10

An ink of composition example 14 shown in Table VIII-4 was produced in the same manner as in Example 1, except that 480.0 parts by weight of Fast Yellow 7413-A (C.I.PY74; made by Sanyo Color Works, Ltd.) was used in place of 480.0 parts by weight of Cyanine Blue G-500 pure-A.

Example VIII-11

An ink of composition example 15 shown in Table VIII-4 was produced in the same manner as in Example 2, except that 480.0 parts by weight of Fast Yellow 7413-A was used in place of 480.0 parts by weight of Cyanine Blue G-500 pure-A.

Example VIII-12

An ink of composition example 16 shown in Table VIII-4 was produced in the same manner as in Example 3, except that 480.0 parts by weight of Fast Yellow 7413-A was used in place of 480.0 parts by weight of Cyanine Blue G-500 pure-A.

Example VIII-13

An ink of composition example 17 shown in Table VIII-4 was produced in the same manner as in Example 4, except that 480.0 parts by weight of Fast Yellow 7413-A was used in place of 480.0 parts by weight of Cyanine Blue G-500 pure-A.

Example VIII-14

An ink of composition example 18 shown in Table VIII-4 was produced in the same manner as in Example 5, except that 480.0 parts by weight of Fast Yellow 7413-A was used in place of 480.0 parts by weight of Cyanine Blue G-500 pure-A.

Example VIII-15

An ink of composition example 21 shown in Table VIII-4 was produced in the same manner as in Example 1, except that 480.0 parts by weight of Monarch 880 (made by Cabot Corp.) was used in place of 480.0 parts by weight of Cyanine Blue G-500 pure-A.

Example VIII-16

An ink of composition example 22 shown in Table VIII-4 was produced in the same manner as in Example 2, except that 480.0 parts by weight of Monarch 880 was used in place of 480.0 parts by weight of Cyanine Blue G-500 pure-A.

Example VIII-17

An ink of composition example 23 shown in Table VIII-4 was produced in the same manner as in Example 3, except that 480.0 parts by weight of Monarch 880 was used in place of 480.0 parts by weight of Cyanine Blue G-500 pure-A.

Example VIII-18

An ink of composition example 24 shown in Table VIII-4 was produced in the same manner as in Example 4, except that 480.0 parts by weight of Monarch 880 was used in place of 480.0 parts by weight of Cyanine Blue G-500 pure-A.

Example VIII-19

An ink of composition example 25 shown in Table VIII-4 was produced in the same manner as in Example 5, except that 480.0 parts by weight of Monarch 880 was used in place of 480.0 parts by weight of Cyanine Blue G-500 pure-A.

Reference Example VIII-1

An ink of composition example 6 shown in Table VIII-3 was produced in the same manner as in Example 2.

Reference Example VIII-2

An ink of composition example 7 shown in Table VIII-3 was produced in the same manner as in Example 5.

Reference Example VIII-3

An ink of composition example 12 shown in Table VIII-3 was produced in the same manner as in Example 6.

Reference Example VIII-4

An ink of composition example 13 shown in Table VIII-3 was produced in the same manner as in Example 8.

Reference Example VIII-5

An ink of composition example 19 shown in Table VIII-4 was produced in the same manner as in Example 10.

Reference Example VIII-6

An ink of composition example 20 shown in Table VIII-4 was produced in the same manner as in Example 14.

Reference Example VIII-7

An ink of composition example 26 shown in Table VIII-4 was produced in the same manner as in Example 15.

Reference Example VIII-8

An ink of composition example 27 shown in Table VIII-4 was produced in the same manner as in Example 17.

Evaluation Test 1: Valuation Method of Coloration Property on Regular Paper

Solid printing was carried out on Xerox P paper (made by Fuji Xerox) using ink jet inks according to Examples 1 to 19 and Reference Examples 1 to 8 in Example VIII and an ink jet printer (EM-930C, made by Seiko Epson Co., Ltd.) to obtain test bodies. A printing mode of paper: regular paper, printing quality: super fine, color correction: none and printing direction: both directions was carried out. The OD (Optical Density) of each of the colors was measured using GRETAG-MACBETH SPECTROSCAN SP 50 (made by Gretag Corp. (US) (measurement condition; light source: D50 and viewing angle: 2 degrees). The results are shown as OD value in Table VIII-1 and Table VIII-2.

Evaluation Test 2: Valuation Method of Glossiness

Solid printing was carried out on a photo paper <gloss> (made by Seiko Epson Co., Ltd.) using ink jet inks according to Examples 1 to 19 and Reference Examples 1 to 8 in Example VIII and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table VIII-1 and VIII-2.

Evaluation Test 3: Valuation Method of Dispersibility

In Example VIII, the average particle size of particles in the ink jet inks according to Examples 1 to 19 and Reference Examples 1 to 8 was measured by a laser particle diameter analyzer (Zetasizer 3000, made by Malvern Instruments, Ltd. (Britain)). The results are shown in Table VIII-1 and VIII-2.

Evaluation Test 4: Valuation Method of Storage Stability

In Example VIII, the initial viscosity of the pigment dispersion for ink jet ink used for Examples 1 to 19 and Reference Examples 1 to 8 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables VIII-1 and VIII-2. Monomer compositions, polymerization initiators, pigments and ink jet ink compositions used when producing the ink jet ink are also shown in Table VIII-1 and VIII-2.

Evaluation Test 5: Evaluation of Continuous Discharge Stability

Continuous solid printing of 1000 sheets was carried out on A4-size regular paper by using inks according to examples VIII-1 to 19 and Reference Example VIII-1 to 8 and an ink jet printer (EM-930C). The average value of the number of sheets which can be continuously printed without carrying out cleaning operation was calculated, and was estimated by the following judging standard. The results are shown in Table VIII-3 and Table VIII-4.

Test Method:

(1) Printing was interrupted at a stage where printing defects (disorder, omission and bend of dots) were generated during printing, and was recovered by carrying out cleaning operation. When a plurality of cleanings were required for recovery, a plurality of cleaning operations are regarded as one defect.

(2) In the case of the temporary stop of printing due to the ink end of the ink cartridge, or in the case of the printing defect capable of being judged that the ink end was clearly the cause, the temporary stop or the printing defect is considered as no count, and the ink cartridge was promptly exchanged, and printing was resumed.

Judgment: A . . . Average continuous printing number of sheets is more than 80.

Judgment: B . . . Average continuous printing number of sheets is more than 40

Judgment: C . . . Average continuous printing number of sheets is more than 20

Judgment: D . . . Average continuous printing number of sheets is less than 20

(Evaluation Test 6: Evaluation of Printing Stability)

Continuous printing of 3000 sheets was carried out on A4-size regular paper by using inks according to examples VIII-1 to 19 and Reference Example VIII-1 to 8, an ink jet printer (EM-930C) and the following printing pattern. The average value of the number of sheets which can be continuously printed without carrying out cleaning operation was calculated, and was evaluated by the following judging standard. The results are shown in Table VIII-3 and Table VIII-4.

Printing Pattern:

English one byte characters and sign characters are arranged at random so that the number of the applied dots becomes about 12.5% of the number of dots capable of being maximally applied in the print range. The applied dot for 360DPI (DPI=Dot per Inch) was used.

Test Method:

(1) Printing was interrupted at a stage where printing defects (disorder, omission and bend of dots) were generated during printing, and was recovered by carrying out cleaning operation. When a plurality of cleanings were required for recovery, a plurality of cleaning operations are regarded as one defect.

(2) In the case of the temporary stop of printing due to the ink end of the ink cartridge, or in the case of the printing defect capable of being judged that the ink end was clearly the cause, the temporary stop or the printing defect is considered as no count, and the ink cartridge was promptly exchanged, and printing was resumed.

Judgment: A . . . Average continuous printing number of sheets is more than 600.

Judgment: B . . . Average continuous printing number of sheets is more than 300

Judgment: C . . . Average continuous printing number of sheets is more than 150

Judgment: D . . . Average continuous printing number of sheets is less than 150

(Evaluation Test 7: Evaluation of Printing Quality (Blurring))

An image in which the solids of Green (Cyan+Yellow), Red (Magenta+Yellow), Blue (Cyan+Magenta) and Black are respectively adjoined was printed on a photo paper <gloss> by using inks according to examples VIII-1 to 19 and Reference Examples VIII-1 to 8 and an ink-jet printer (EM-930C), and each contiguous (boundary) part was evaluated by the following judging standard. The results are shown in Table VIII-3 and Table VIII-4.

Judgment: A . . . sharp boundary part, very good

B . . . clear boundary part, good

C . . . unclear boundary part, no practical problem

D . . . collapsed boundary part, no practical use (Evaluation Test 8: Evaluation of Clogging Recovery Property)

An ink jet printer (EM-930C) was filled with inks according to examples VIII-1 to 19 and Reference Examples VIII-1 to 8, and a main part power supply was shut off after checking that the ink was normally discharged at a first stage. The inks were left at 40° C. at 20% RH environment in the state of being loaded with the ink cartridge. The printer was taken out after two months. After the temperature thereof was reduced to a normal temperature, the power supply was switched on, and it was observed whether the ink was normally discharged. When the ink was not normally discharged, cleaning recovery operation was carried out, and the number of times required until the ink was normally discharged was determined. The number of times was evaluated by the following judging standard. The results are shown in Table VIII-3 and Table VIII-4.

Judgment:

A . . . The ink was normally discharged at power supply ON or in a cleaning operation within 1.

B . . . The ink was normally discharged in cleaning operations of two or three.

C . . . The ink was normally discharged in cleaning operations of four to six.

D . . . The ink was not normally discharged even when six cleaning operations were carried out.

TABLE VIII-1

|  | Example 1 | Example 2 | Example 3 | Example 4 | Example 5 | Reference Example 1 | Reference Example 2 | Example 6 |
|---|---|---|---|---|---|---|---|---|
| BZA | 483.0 | 483.0 | 483.0 | 483.0 | 483.0 | 483.0 | 483.0 | 483.0 |
| AA | 50.4 | 36.5 | 42.6 | 77.5 | 93.0 | 36.5 | 93.0 | 50.4 |
| MAA | — | 13.2 | — | — | — | 13.2 | — | — |
| BPEH | 5.6 | 5.6 | 5.6 | 5.6 | 5.6 | 5.6 | 5.6 | 5.6 |
| PB15:1 | 480.0 | 480.0 | 480.0 | 480.0 | 480.0 | 480.0 | 480.0 | — |
| PV19 | — | — | — | — | — | — | — | 480.0 |
| PY74 | — | — | — | — | — | — | — | — |
| PBk7 | — | — | — | — | — | — | — | — |
| Acid value (mgKOH/g) | 65 | 60 | 55 | 100 | 120 | 60 | 120 | 65 |
| Weight average molecular weight | 34000 | 32000 | 48000 | 29000 | 34000 | 32000 | 34000 | 34000 |
| Evaluation 1: OD | 1.21 | 1.19 | 1.20 | 1.15 | 1.01 | 1.20 | 0.95 | 1.20 |
| Evaluation 2: Glossiness value (%) | 60.2 | 58.9 | 59.5 | 65.9 | 64.5 | 58.5 | 62.3 | 60.2 |
| Evaluation 3: Average particle size (nm) | 70 | 71 | 69 | 70 | 67 | 72 | 69 | 72 |
| Evaluation 4: Storage stability | 1.00 | 0.99 | 1.01 | 1.04 | 1.07 | 1.01 | 1.08 | 1.02 |

|  | Example 7 | Example 8 | Example 9 | Reference Example 3 | Reference Example 4 |
|---|---|---|---|---|---|
| BZA | 483.0 | 483.0 | 483.0 | 483.0 | 483.0 |
| AA | 36.5 | 42.6 | 77.5 | 50.4 | 42.6 |
| MAA | 13.2 | — | — | — | — |
| BPEH | 5.6 | 5.6 | 5.6 | 5.6 | 5.6 |
| PB15:1 | — | — | — | — | — |
| PV19 | 480.0 | 480.0 | 480.0 | 480.0 | 480.0 |
| PY74 | — | — | — | — | — |
| PBk7 | — | — | — | — | — |
| Acid value (mgKOH/g) | 60 | 55 | 100 | 65 | 55 |
| Weight average molecular weight | 32000 | 48000 | 29000 | 34000 | 48000 |
| Evaluation 1: OD | 1.21 | 1.19 | 1.11 | 1.22 | 1.14 |
| Evaluation 2: Glossiness value (%) | 58.4 | 59.1 | 65.1 | 60.3 | 55.2 |
| Evaluation 3: Average particle size (nm) | 71 | 68 | 72 | 73 | 70 |
| Evaluation 4: Storage stability | 0.99 | 1.01 | 1.03 | 1.02 | 0.99 |

TABLE VIII-2

|  | Example 10 | Example 11 | Example 12 | Example 13 | Example 14 | Reference Example 5 | Reference Example 6 | Example 15 |
|---|---|---|---|---|---|---|---|---|
| BZA | 483.0 | 483.0 | 483.0 | 483.0 | 483.0 | 483.0 | 483.0 | 483.0 |
| AA | 50.4 | 36.5 | 42.6 | 77.5 | 93.0 | 50.4 | 93.0 | 50.4 |
| MAA | — | 13.2 | — | — | — | — | — | — |
| BPEH | 5.6 | 5.6 | 5.6 | 5.6 | 5.6 | 5.6 | 5.6 | 5.6 |
| PB15:1 | — | — | — | — | — | — | — | — |
| PV19 | — | — | — | — | — | — | — | — |
| PY74 | 480.0 | 480.0 | 480.0 | 480.0 | 480.0 | 480.0 | 480.0 | — |
| PBk7 | — | — | — | — | — | — | — | 480.0 |
| Acid value (mgKOH/g) | 65 | 60 | 55 | 100 | 120 | 65 | 120 | 65 |
| Weight average molecular weight | 34000 | 32000 | 48000 | 29000 | 34000 | 34000 | 34000 | 34000 |
| Evaluation 1: OD | 1.25 | 1.27 | 1.25 | 1.21 | 1.11 | 1.18 | 1.05 | 1.35 |
| Evaluation 2: Glossiness value (%) | 66.3 | 66.0 | 66.2 | 67.9 | 67.0 | 61.9 | 65.7 | 40.4 |
| Evaluation 3: Average particle size (nm) | 87 | 94 | 88 | 92 | 90 | 88 | 91 | 95 |
| Evaluation 4: Storage stability | 1.03 | 0.99 | 1.02 | 1.01 | 1.05 | 1.04 | 0.98 | 1.02 |

|  | Example 16 | Example 17 | Example 18 | Example 19 | Reference Example 7 | Reference Example 8 |
|---|---|---|---|---|---|---|
| BZA | 483.0 | 483.0 | 483.0 | 483.0 | 483.0 | 483.0 |
| AA | 36.5 | 42.6 | 77.5 | 93.0 | 50.4 | 42.6 |
| MAA | 13.2 | — | — | — | — | — |
| BPEH | 5.6 | 5.6 | 5.6 | 5.6 | 5.6 | 5.6 |
| PB15:1 | — | — | — | — | — | — |
| PV19 | — | — | — | — | — | — |
| PY74 | — | — | — | — | — | — |
| PBk7 | 480.0 | 480.0 | 480.0 | 480.0 | 480.0 | 480.0 |
| Acid value (mgKOH/g) | 60 | 55 | 100 | 120 | 65 | 55 |
| Weight average molecular weight | 32000 | 48000 | 29000 | 34000 | 34000 | 48000 |
| Evaluation 1: OD | 1.33 | 1.33 | 1.32 | 1.29 | 1.32 | 1.31 |
| Evaluation 2: Glossiness value (%) | 38.8 | 39.1 | 43.6 | 41.8 | 40.1 | 39.7 |
| Evaluation 3: Average particle size (nm) | 98 | 99 | 96 | 94 | 94 | 94 |
| Evaluation 4: Storage stability | 0.98 | 1.03 | 1.03 | 1.05 | 1.01 | 1.04 |

TABLE VIII-3

|  |  | Composition Example | | | | | | |
|---|---|---|---|---|---|---|---|---|
|  |  | 1 | 2 | 3 | 4 | 5 | 6 | 7 |
|  |  | Example/Reference Example | | | | | | |
|  |  | Example 1 | Example 2 | Example 3 | Example 4 | Example 5 | Reference Example 1 | Reference Example 2 |
| colorant | PB15:1 | 4 | 4 | 4 | 4 | 4 | 4 | 4 |
|  | PV19 | — | — | — | — | — | — | — |
|  | PY74 | — | — | — | — | — | — | — |
|  | PBk7 | — | — | — | — | — | — | — |
| (1) | 1,2-HD | 4 | 0.5 | 0.5 | 4 | 5 | 0.3 | 10 |
|  | 4-m-1,2-PD | — | — | — | 1 | 5 | — | 10 |
| (2) | TEG | — | 10 | 2 | 5 | 5 | 6 | 5 |
|  | DPG | — | — | — | — | — | — | — |
|  | 1,3-PD | — | — | — | — | — | — | — |
|  | Glycerin | 15 | 10 | 2 | 10 | 10 | 6 | 10 |
|  | TMP | — | 5 | 1 | — | — | 3 | — |
| (3) | DEGmBE | — | — | — | 0.5 | 0.5 | — | 1 |
|  | TEGmBE | — | — | — | — | — | — | — |
|  | PGmBE | — | — | — | — | — | — | — |
|  | DPGmBE | — | — | — | — | — | — | 1 |
| other | BEPD | 0.7 | 0.7 | 0.7 | 0.7 | 0.7 | 0.7 | 0.7 |
|  | OlfineE1010 | 0.1 | 0.1 | 0.1 | 0.1 | 0.1 | 0.1 | 0.1 |
|  | Surfynol104 | 0.15 | 0.15 | 0.15 | 0.15 | 0.15 | 0.15 | 0.15 |
|  | Ion exchanged water | Residual quantity | Residual quantity | Residual quantity | Residual quantity | Residual quantity | Residual quantity | Residual quantity |
| (1) + (2) | | 19 | 25.5 | 5.5 | 20 | 25 | 15.3 | 35 |
| (1):(2) | | 1:3.75 | 1:50 | 1:10 | 1:3 | 1:15 | 1:50 | 1:0.75 |
| (1):(3) | | — | — | — | 8:1 | 20:1 | — | 10:1 |
| (1) + (2) + (3) | | — | — | — | 20.5 | 25.5 | — | 37 |
| Evaluation 5: Continuous discharge stability | | A | A | A | A | A | C | D |
| Evaluation 6: Printing stability | | B | B | B | A | B | B | B |
| Evaluation 7: Printing quality (Blurring) | | A | A | A | A | A | D | C |
| Evaluation 8: Cloggin recovery property | | A | A | C | B | B | B | C |

|  |  | Composition Example | | | | | |
|---|---|---|---|---|---|---|---|
|  |  | 8 | 9 | 10 | 11 | 12 | 13 |
|  |  | Example/Reference Example | | | | | |
|  |  | Example 6 | Example 7 | Example 8 | Example 9 | Reference Example 3 | Reference Example 4 |
| colorant | PB15:1 | — | — | — | — | — | — |
|  | PV19 | 5 | 5 | 5 | 5 | 5 | 5 |
|  | PY74 | — | — | — | — | — | — |
|  | PBk7 | — | — | — | — | — | — |
| (1) | 1,2-HD | 5 | 5 | — | — | 0.5 | — |
|  | 4-m-1,2-PD | 10 | 10 | 3 | 3 | 1.5 | 0.3 |
| (2) | TEG | 5 | 5 | — | — | 1 | — |
|  | DPG | 5 | 5 | 5 | 5 | 1 | 5 |
|  | 1,3-PD | — | — | — | — | — | — |
|  | Glycerin | 10 | 15 | 10 | 10 | 1.5 | 10 |
|  | TMP | 2.5 | 5 | — | — | 0.5 | — |
| (3) | DEGmBE | — | — | — | — | — | — |
|  | TEGmBE | — | — | 3 | 0.3 | — | 3 |
|  | PGmBE | — | — | — | — | — | — |
|  | DPGmBE | — | — | — | — | — | — |
| other | BEPD | 0.7 | 0.7 | 0.7 | 0.7 | 0.7 | 0.7 |
|  | OlfineE1010 | — | — | — | — | — | — |
|  | Surfynol104 | 0.15 | 0.15 | 0.15 | 0.15 | 0.15 | 0.15 |
|  | Ion exchanged water | Residual quantity | Residual quantity | Residual quantity | Residual quantity | Residual quantity | Residual quantity |
| (1) + (2) | | 37.5 | 45 | 18 | 18 | 6 | 15.3 |
| (1):(2) | | 1:1.5 | 1:2 | 1:5 | 1:5 | 1:2 | 1:50 |
| (1):(3) | | — | — | 1:1 | 10:1 | — | 1:10 |
| (1) + (2) + (3) | | — | — | 21 | 18.3 | — | 18.3 |
| Evaluation 5: Continuous discharge stability | | A | A | A | A | A | D |
| Evaluation 6: Printing stability | | B | B | A | B | B | A |
| Evaluation 7: Printing quality (Blurring) | | A | A | A | A | A | D |
| Evaluation 8: Cloggin recovery property | | A | B | B | B | C | B |

TABLE VIII-4

|  |  | Composition Example 14 | Composition Example 15 | Composition Example 16 | Composition Example 17 | Composition Example 18 | Composition Example 19 | Composition Example 20 |
|---|---|---|---|---|---|---|---|---|
|  |  | Example 10 | Example 11 | Example 12 | Example 13 | Example 14 | Reference Example 5 | Reference Example 6 |
| Colorant | PB15:1 | — | — | — | — | — | — | — |
|  | PV19 | — | — | — | — | — | — | — |
|  | PY74 | 5 | 5 | 5 | 5 | 5 | 5 | 5 |
|  | PBk7 | — | — | — | — | — | — | — |
| (1) | 1,2-HD | 1 | 0.5 | 1.5 | 2 | 0.5 | 10 | 0.5 |
|  | 4-m-1,2-PD | — | — | — | — | — | 10 | — |
| (2) | TEG | — | 10 | 5 | 5 | 5 | — | 10 |
|  | DPG | — | — | — | — | — | — | — |
|  | 1,3-PD | 1 | — | 5 | 5 | 5 | 1 | 10 |
|  | Glycerin | 4 | 15 | 10 | 10 | 10 | 4 | 10 |
|  | TMP | — | 5 | 3.5 | 3.5 | 3.5 | — | 4 |
| (3) | DEGmBE | — | — | 10 | 16 | 10 | — | 3 |
|  | TEGmBE | — | — | 3 | — | 3 | — | 1 |
|  | PGmBE | — | — | 2 | 2 | 2 | — | 1 |
|  | DPGmBE | — | — | — | — | — | — | — |
| Other | BEPD | 0.7 | 0.7 | 0.7 | 0.7 | 0.7 | 0.7 | 0.7 |
|  | OlfineE1010 | — | — | — | — | — | — | — |
|  | Surfynol104 | 0.15 | 0.15 | 0.15 | 0.15 | 0.15 | 0.15 | 0.15 |
|  | Ion exchanged water | Residual quantity | Residual quantity | Residual quantity | Residual quantity | Residual quantity | Residual quantity | Residual quantity |
| (1) + (2) |  | 6 | 30.5 | 25 | 25.5 | 24 | 25 | 34.5 |
| (1):(2) |  | 1:5 | 1:60 | 1:15.67 | 1:11.75 | 1:47 | 1:0.25 | 1:68 |
| (1):(3) |  | — | — | 1:10 | 1:9 | 1:30 | — | 1:10 |
| (1) + (2) + (3) |  | — | — | 40 | 43.5 | 39 | — | 39.5 |
| Evaluation 5: Continuous discharge stability |  | A | B | A | A | B | D | C |
| Evaluation 6: Printing stability |  | B | B | A | A | A | C | D |
| Evaluation 7: Printing quality (Blurring) |  | A | A | A | C | B | C | A |
| Evaluation 8: Cloggin recovery property |  | C | A | A | B | A | C | A |

|  |  | Composition Example 21 | Composition Example 22 | Composition Example 23 | Composition Example 24 | Composition Example 25 | Composition Example 26 | Composition Example 27 |
|---|---|---|---|---|---|---|---|---|
|  |  | Example 15 | Example 16 | Example 17 | Example 18 | Example 19 | Reference Example 7 | Reference Example 8 |
| Colorant | PB15:1 | — | — | — | — | — | — | — |
|  | PV19 | — | — | — | — | — | — | — |
|  | PY74 | — | — | — | — | — | — | — |
|  | PBk7 | 5 | 5 | 5 | 5 | 5 | 5 | 5 |
| (1) | 1,2-HD | 5 | 5 | 1 | 0.5 | 5 | 5 | 1 |
|  | 4-m-1,2-PD | 5 | 10 | — | — | 5 | 5 | — |
| (2) | TEG | 10 | 3 | 1 | 1 | 10 | 10 | 0.5 |
|  | DPG | 5 | — | — | — | — | 10 | — |
|  | 1,3-PD | — | — | — | — | 3 | — | — |
|  | Glycerin | 10 | 10 | 4 | 4 | 10 | 10 | 2.5 |
|  | TMP | 5 | 2 | — | — | 2 | 5 | — |
| (3) | DEGmBE | — | — | — | — | — | — | — |
|  | TEGmBE | — | — | — | — | 0.5 | — | — |
|  | PGmBE | — | — | — | — | — | — | — |
|  | DPGmBE | — | — | 1 | 1 | — | — | 1 |
| Other | BEPD | 0.7 | 0.7 | 0.7 | 0.7 | 0.7 | 0.7 | 0.7 |
|  | OlfineE1010 | 0.1 | 0.1 | 0.1 | 0.1 | 0.1 | 0.1 | 0.1 |
|  | Surfynol104 | 0.15 | 0.15 | 0.15 | 0.15 | 0.15 | 0.15 | 0.15 |
|  | Ion exchanged water | Residual quantity | Residual quantity | Residual quantity | Residual quantity | Residual quantity | Residual quantity | Residual quantity |
| (1) + (2) |  | 40 | 30 | 6 | 5.5 | 35 | 45 | 4 |
| (1):(2) |  | 1:3 | 1:1 | 1:5 | 1:10 | 1:2.5 | 1:3.5 | 1:3 |
| (1):(3) |  | — | — | 1:1 | 1:2 | 20:1 | — | 1:1 |
| (1) + (2) + (3) |  | — | — | 7 | 6.5 | 35.5 | — | 5 |
| Evaluation 5: Continuous discharge stability |  | A | A | A | A | A | A | A |
| Evaluation 6: Printing stability |  | B | C | A | A | B | D | D |
| Evaluation 7: Printing quality (Blurring) |  | A | A | A | A | A | A | A |
| Evaluation 8: Cloggin recovery property |  | B | C | C | C | A | B | D |

The brevity codes used in Table VIII-1 to 4 are explained as follows.
BZA: benzyl acrylate
AA: acrylic acid
MAA: methacrylic acid
BPEH: t-butylperoxy(2-ethylhexanoate)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
PBk7: C.I. Pigment Black 7 (carbon black)
1,2-HD: 1,2-hexanediol
4-m-1,2-PD: 4-methyl-1,2-pentanediol
TEG: triethylene glycol
DPG: dipropylene glycol
1,3-PD: 1,3-propanediol
TMP: trimethylolpropane
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol As is clear from the results of Table VIII-1 to VIII-4, all the evaluation tests showed excellent results when the ink jet inks according to Examples 1 to 19 in Example VIII were used. However, when the ink jet inks according to the Reference Examples 1 to 8, excellent results were not shown in anyone or a plurality of items of the revaluation tests.

Example IX

Production of Dispersion 1

As a dispersion 1, Monarch 880 which was a carbon black (PBk7) and was made by U.S. Cabot Corp. was used. After carrying out nitrogen replacement of the interior of a reaction vessel equipped with a stirrer, a thermometer, a reflux tube and a dripping funnel, 65 parts of paracumylphenoxyethylene glycol acrylate, 10 parts of benzyl acrylate, 2 parts of acrylic acid, and 0.3 parts of t-dodecyl mercaptan were placed in the reaction vessel and heated to 70° C. Then, 150 parts of paracumylphenoxyethylene glycol acrylate, 15 parts of acrylic acid, 5 parts of butyl acrylate, 1 part of t-dodecyl mercaptan, 20 parts of methyl ethyl ketone, and 1 part of azobisisovaleronitrile, which were prepared separately, were placed in the dripping funnel. The resultant solution was dripped into the reaction vessel over a period of 4 hours to carry out a polymerization reaction of dispersion polymer. Methyl ethyl ketone was then added to the reaction vessel to produce dispersion polymer solution of a concentration of 40%.

40 parts of the above dispersion polymer solution, 30 parts of Monarch 880 (made by Cabot Corp.), which is a carbon black, 100 parts of 0.1 mol/L sodium hydroxide aqueous solution, and 30 parts of methyl ethyl ketone were then mixed. Thereafter, the mixture was dispersed for 8 passes at 200 MPa using an ultrahigh pressure homogenizer (Ultimizer HJP-25005, made by Sugino Machine Limited). Thereafter, the dispersed mixture was moved to another container, and 300 parts of ion exchanged water was added into the mixture, and stirring was carried out for another hour. The entire amount of methyl ethyl ketone and a part of the water were then removed using a rotary evaporator, and the pH was adjusted to 8.5 by neutralization by a 0.1 mol/L sodium hydroxide aqueous solution. Then filtration through a membrane filter of 0.3 μm was carried out, thereby preparing pigment dispersion 1 having a pigment concentration of 15% by the adjustment with the ion exchanged water. The weight average molecular weight of the dispersion polymer was measured as a styrene-equivalent molecular weight when measuring a solvent as THF by taking a part of the dispersion polymer and by using gel permeation chromatography (GPC) of L7100 system made by Hitachi, Ltd.

Production of Dispersion 2

Dispersion 2 was firstly produced as in the dispersion 1 by using Pigment Blue 15:1 (trichloro copper phthalocyanine pigment: G500, made by Sanyo Color Works, Ltd.).

Production of Dispersion 3

Dispersion 3 was firstly produced as in the dispersion 1 by using Pigment Violet 19.

Production of Dispersion 4

Dispersion 4 was firstly produced as in the dispersion 1 by using Pigment Yellow 74.

Preparation Example of Pigment Ink for Ink Jet

Hereinafter, suitable examples of compositions for pigment inks for ink jet are shown in Table IX-2. The pigment ink for ink jet as the present invention was produced by mixing each of the dispersions produced by the above method with vehicle components as components other than the above dispersion solution shown in Table IX-2. 0.05% of Topside 240 (made by Permachem Asia Ltd.) in ion exchanged water for prevention corrosion of ink, 0.02% of benzotriazole in ion exchanged water for prevention of corrosion of ink jet head parts, and 0.04% of EDTA (ethylenediamine tetraacetic acid)/2Na salt in ion exchanged water for reducing the effects of metal ions in the ink system were used in the residual quantity of water in Table IX-1.

Example IX-1

An ink 1 was produced by mixing the dispersion 1 with vehicle components shown in Table IX-2.

Example IX-2

An ink 2 was produced by mixing the dispersion 2 with vehicle components shown in Table IX-2.

Example IX-3

An ink 3 was produced by mixing the dispersion 3 with vehicle components shown in Table IX-2.

Example IX-4

An ink 4 was produced by mixing the dispersion 4 with vehicle components shown in Table IX-2.

Reference Example IX-1

Monarch 880 which was a carbon black (PBk7) and was made by U.S. Cabot Corp. was used as in the dispersion 1. Pigment dispersion 5 was produced in the same manner as in Example 1, except that the amount of acrylic acid when producing a polymer used for the dispersion was decreased and a polymer having an acid value set to 40 was used. An ink 5 was produced by mixing the pigment dispersion 5 with the vehicle components shown in Table IX-2 in the same manner as in Example 1.

Reference Example IX-2

Monarch 880 which was a carbon black (PBk7) and was made by U.S. Cabot Corp. was used as in the dispersion 1. Pigment dispersion 6 was produced in the same manner as in Example 1, except that the amount of acrylic acid when producing a polymer used for the dispersion was increased and a polymer having an acid value set to 200 was used. An ink 6 was produced by mixing the pigment dispersion 6 with the vehicle components shown in Table IX-2 in the same manner as in Example 1.

Reference Example IX-3

Pigment Blue 15:1 (trichloro copper phthalocyanine pigment: G500, made by Sanyo Color Works, Ltd.) was used as in Reference Example 1. Pigment dispersion 7 was produced in the same manner as in Example 2, except that the amount of acrylic acid when producing a polymer used for the dispersion was decreased and a polymer having an acid value set to 40 was used. An ink 7 was produced by mixing the pigment dispersion 7 with the vehicle components shown in Table IX-2 in the same manner as in Example 2.

Reference Example IX-4

Pigment Blue 15:1 (trichloro copper phthalocyanine pigment: G500, made by Sanyo Color Works, Ltd.) was used as in Reference Example 2. Pigment dispersion 8 was produced in the same manner as in Example 2, except that the amount of acrylic acid when producing a polymer used for the dispersion was increased and a polymer having an acid value set to 200 was used. An ink 8 was produced by mixing the pigment dispersion 8 with the vehicle components shown in Table IX-2 in the same manner as in Example 2.

Reference Example IX-5

Pigment Violet 19 (quinacridone pigment; made by Clariant, Ltd.) was used as in Reference Example 1. Pigment dispersion 9 was produced in the same manner as in Example 3, except that the amount of acrylic acid when producing a polymer used for the dispersion was decreased and a polymer having an acid value set to 40 was used. An ink 9 was produced by mixing the pigment dispersion 9 with the vehicle components shown in Table IX-2 in the same manner as in Example 2.

Reference Example IX-6

Pigment Violet 19 (quinacridone pigment; made by Clariant, Ltd.) was used as in Reference Example 2. Pigment dispersion 10 was produced in the same manner as in Example 3, except that the amount of acrylic acid when producing a polymer used for the dispersion was increased and a polymer having an acid value set to 200 was used. An ink 10 was produced by mixing the pigment dispersion 10 with the vehicle components shown in Table IX-2 in the same manner as in Example 2.

Reference Example IX-7

Pigment Yellow 74 (condensed azo pigment; made by Clariant, Ltd.) was used as in Reference Example 1. Pigment dispersion 11 was produced in the same manner as in Example 4, except that the amount of acrylic acid when producing a polymer used for the dispersion was decreased and a polymer having an acid value set to 40 was used. An ink 11 was produced by mixing the pigment dispersion 11 with the vehicle components shown in Table IX-2 in the same manner as in Example 2.

Reference Example IX-8

Pigment Yellow 74 (condensed azo pigment; made by Clariant, Ltd.) was used as in Reference Example 2. Pigment dispersion 12 was produced in the same manner as in Example 4, except that the amount of acrylic acid when producing a polymer used for the dispersion was increased and a polymer having an acid value set to 200 was used. An ink 12 was produced by mixing the pigment dispersion 12 with the vehicle components shown in Table IX-2 in the same manner as in Example 2.

Reference Example IX-9

Monarch 880 which was carbon black (PBk7) and was made by U.S. Cabot Corp. was used as in the dispersion 1. Pigment dispersion 13 was produced in the same manner as in Example 1, except that the amount of azobisisovaleronitrile when producing a polymer used for the dispersion was increased and a polymer having a weight average molecular weight set to 15000 was used. An ink 13 was produced by mixing the pigment dispersion 13 with the vehicle components shown in Table IX-2 in the same manner as in Example 1.

Reference Example IX-10

Monarch 880 which was carbon black (PBk7) and was made by U.S. Cabot Corp. was used as in the dispersion 1. Pigment dispersion 14 was produced in the same manner as in Example 1, except that the amount of azobisisovaleronitrile when producing a polymer used for the dispersion was decreased and a polymer having a weight average molecular weight set to 110000 was used. An ink 14 was produced by mixing the pigment dispersion 14 with the vehicle components shown in Table IX-2 in the same manner as in Example 1.

Reference Example IX-11

Pigment Blue 15:1 (trichloro copper phthalocyanine pigment: G500, made by Sanyo Color Works, Ltd.) was used as in Reference Example 1. Pigment dispersion 15 was produced in the same manner as in Example 2, except that the amount of azobisisovaleronitrile when producing a polymer used for the dispersion was increased and a polymer having a weight average molecular weight set to 15000 was used. An ink 15 was produced by mixing the pigment dispersion 15 with the vehicle components shown in Table IX-2 in the same manner as in Example 2.

Reference Example IX-12

Pigment Blue 15:1 (trichloro copper phthalocyanine pigment: G500, made by Sanyo Color Works, Ltd.) was used as in Reference Example 2. Pigment dispersion 16 was produced in the same manner as in Example 2, except that the amount of azobisisovaleronitrile when producing a polymer used for the dispersion was decreased and a polymer having a weight average molecular weight set to 110000 was used. An ink 16 was produced by mixing the pigment dispersion 16 with the vehicle components shown in Table IX-2 in the same manner as in Example 2.

Reference Example IX-13

Pigment Violet 19 (quinacridone pigment; made by Clariant, Ltd.) was used as in Reference Example 1. Pigment dispersion 17 was produced in the same manner as in Example 3, except that the amount of azobisisovaleronitrile when producing a polymer used for the dispersion was increased and a polymer having a weight average molecular weight set to 15000 was used. An ink 17 was produced by mixing the pigment dispersion 17 with the vehicle components shown in Table IX-2 in the same manner as in Example 2.

Reference Example IX-14

Pigment Violet 19 (quinacridone pigment; made by Clariant, Ltd.) was used as in Reference Example 2. Pigment dispersion 18 was produced in the same manner as in Example 3, except that the amount of azobisisovaleronitrile when producing a polymer used for the dispersion was decreased and a polymer having a weight average molecular weight set to 110000 was used. An ink 18 was produced by mixing the pigment dispersion 18 with the vehicle components shown in Table IX-2 in the same manner as in Example 2.

Reference Example IX-15

Pigment Yellow 74 (condensed azo pigment; made by Clariant, Ltd.) was used as in Reference Example 1. Pigment dispersion 19 was produced in the same manner as in Example 4, except that the amount of azobisisovaleronitrile when producing a polymer used for the dispersion was increased and a polymer having a weight average molecular weight set to 15000 was used. An ink 19 was produced by mixing the pigment dispersion 19 with the vehicle components shown in Table IX-2 in the same manner as in Example 2.

Reference Example IX-12

Pigment Yellow 74 (condensed azo pigment; made by Clariant, Ltd.) was used as in Reference Example 2. Pigment dispersion 20 was produced in the same manner as in Example 4, except that the amount of azobisisovaleronitrile when producing a polymer used for the dispersion was decreased and a polymer having a weight average molecular weight set to 110000 was used. An ink 20 was produced by mixing the pigment dispersion 20 with the vehicle components shown in Table IX-2 in the same manner as in Example 2.

Reference Example IX-17

Monarch 880 which was carbon black (PBk7) and was made by U.S. Cabot Corp. was used as in the dispersion 1. Pigment dispersions 21 to 26 were produced in the same manner as in Example 1 except that dispersion pressure and the number of passes were changed by using the same polymer as that of the dispersion 1, and inks 21 to 26 were produced by mixing the pigment dispersions 21 to 26 with the vehicle components shown in Table IX-2 in the same manner as in Example 1.

Reference Example IX-18

Pigment Blue 15:1 (trichloro copper phthalocyanine pigment: G500, made by Sanyo Color Works, Ltd.) was used as in the dispersion 2. Pigment dispersions 27 to 32 were produced in the same manner as in Example 2 except that dispersion pressure and the number of passes were changed by using the same polymer as that of the dispersion 2, and inks 27 to 32 were produced by mixing the pigment dispersions 21 to 26 with the vehicle components shown in Table IX-2 in the same manner as in Example 2.

Reference Example IX-19

Pigment Violet 19 (quinacridone pigment; made by Clariant, Ltd.) was used as in the dispersion 3. Pigment dispersions 33 to 38 were produced in the same manner as in Example 1 except that dispersion pressure and the number of passes were changed by using the same polymer as that of the dispersion 3, and inks 33 to 38 were produced by mixing the pigment dispersions 33 to 38 with the vehicle components shown in Table IX-2 in the same manner as in Example 3.

Reference Example IX-20

Pigment Yellow 74 (condensed azo pigment; made by Clariant, Ltd.) was used as in the dispersion 4. Pigment dispersions 39 to 44 were produced in the same manner as in Example 4 except that dispersion pressure and the number of passes were changed by using the same polymer as that of the dispersion 4, and inks 39 to 44 were produced by mixing the pigment dispersions 39 to 44 with the vehicle components shown in Table IX-2 in the same manner as in Example 4.

Evaluation of Dispersion Stability

The percentage changes in viscosity (%) and sedimentation percentage (%) upon leaving pigment inks for ink jet produced by using dispersions which differ in the processing pressure and dispersions which differ in the number of passes at 60° C. for 30 days are shown in Table IX-1. The dispersion stability is indicated as the percentage change in viscosity (%) upon leaving each aqueous ink at 60° C. for 30 days. For the change in viscosity, viscosity values were measured at an angle of 60 degrees using the AMVn, made by Anton Paar GmbH (Germany), and 1−(value after 30 days)/(initial value) is indicated in the form of percentage (%).

Evaluation of Regular Paper OD and Glossiness of Gloss Paper

As regular paper, Xerox 4024 paper made by U.S. Xerox was used, and as gloss paper, photo paper (gloss) made by Seiko Epson Corporation was used. The ink jet printer EM930C, made by Seiko Epson Co., Ltd., was used as the printer and evaluations were made using samples printed at 720 dpi photo quality in the case of regular paper and samples printed at 1440 dpi photo quality in the case of gloss paper. The OD was measured using GRETAGMACBETH SPECTROSCAN SPM-50 manufactured by GRETAG COMPANY. Referring to the measurement of the gloss, the specular glossiness of a recorded surface was measured for an incidence angle of 60 degrees using a gloss checker (IG-320, made by Horiba, Ltd.) and the average of five measurements was determined for each recording paper. Photo paper (gloss), manufactured by Seiko Epson Co., Ltd. was used as the medium and printing at 720 dpi photo quality using the EM930C, made by Seiko Epson Co., Ltd., as the printer was carried out. The results are shown in Table IX-1.

Measurement of Discharge Stability

Printing on 100 pages of A4-size Xerox P paper made by Fuji Xerox at 4000 letters/page of a standard of character size of 11 and MSP Gothic of Microsoft Word was carried out at 35° C. in 35% atmosphere by using the ink jet printer PX-V600, made by Seiko Epson Co., Ltd., and evaluated. AA indicates that no print distortions occurred, A indicates that one print distortion occurred, B indicates that print distortions occurred at 2 to 3 locations, C indicates that print distortions occurred at 4 to 5 locations, and D indicates that print distortions occurred at no less than 6 locations. Table IX-1 shows the results.

TABLE IX-2

Ink composition (% by weight)

|  | Pigment | | | |
|---|---|---|---|---|
|  | PBk7 | PB15:1 | PV19 | PY74 |
| Example 1, Reference Examples 1, 2, 9, 10, 17 | 46.7 | — | — | — |
| Example 2, Reference Examples 3, 4, 11, 12, 18 | — | 33.3 | — | — |
| Example 3, Reference Examples 5, 6, 13, 14, 19 | — | — | 40 | — |
| Example 4, Reference Example 7, 8, 15, 16, 20 | — | — | — | 40 |
| TEGmBE | 2 | 1 | 1 | 1 |
| 1,2-hexanediol | 3 | 4 | 4 | 4 |
| Glycerine | 10 | 15 | 10 | 10 |

TABLE IX-1

Results of Tests for dispersion stability, OD on regular paper, Glossiness on gloss paper, and discharge stability

|  | Dispersion | Pressure | Pass | Mw | Acid value | Stability | OD | Glossiness | Discharge |
|---|---|---|---|---|---|---|---|---|---|
| Example 1 | 1 | 200 | 8 | 35000 | 100 | 1.0 | 1.40 | 71 | A |
| Example 2 | 2 | 210 | 7 | 41000 | 100 | 1.0 | 1.25 | 94 | AA |
| Example 3 | 3 | 190 | 6 | 33000 | 100 | 1.0 | 1.20 | 89 | AA |
| Example 4 | 4 | 180 | 5 | 31000 | 100 | 1.0 | 1.25 | 99 | AA |
| Reference Example 1 | 5 | 200 | 8 | 35000 | 40 | 2.9 | 1.35 | 75 | D |
| Reference Example 2 | 6 | 200 | 8 | 35000 | 200 | 3.5 | 1.35 | 70 | B |
| Reference Example 3 | 7 | 210 | 7 | 41000 | 40 | 1.5 | 1.12 | 95 | D |
| Reference Example 4 | 8 | 210 | 7 | 41000 | 200 | 2.1 | 1.12 | 90 | B |
| Reference Example 5 | 9 | 190 | 6 | 33000 | 40 | 2.9 | 1.11 | 92 | D |
| Reference Example 6 | 10 | 190 | 6 | 33000 | 200 | 3.5 | 1.11 | 85 | B |
| Reference Example 7 | 11 | 180 | 5 | 31000 | 40 | 2.0 | 1.14 | 90 | D |
| Reference Example 8 | 12 | 180 | 5 | 31000 | 200 | 2.4 | 1.14 | 105 | B |
| Reference Example 9 | 13 | 200 | 8 | 15000 | 100 | 1.2 | 1.35 | 69 | C |
| Reference Example 10 | 14 | 200 | 8 | 110000 | 100 | 1.4 | 1.35 | 65 | C |
| Reference Example 11 | 15 | 210 | 7 | 15000 | 100 | 1.3 | 1.12 | 90 | C |
| Reference Example 12 | 16 | 210 | 7 | 110000 | 100 | 1.6 | 1.12 | 82 | C |
| Reference Example 13 | 17 | 190 | 6 | 15000 | 100 | 2.4 | 1.11 | 84 | D |
| Reference Example 14 | 18 | 190 | 6 | 110000 | 100 | 3.5 | 1.11 | 79 | D |
| Reference Example 15 | 19 | 180 | 5 | 15000 | 100 | 1.5 | 1.14 | 89 | C |
| Reference Example 16 | 20 | 180 | 5 | 110000 | 100 | 1.9 | 1.14 | 79 | C |
| Reference Example 17 | 21 | 200 | 2 | 35000 | 100 | 1.0 | 1.35 | 68 | B |
|  | 22 | 100 | 8 | 35000 | 100 | 1.0 | 1.30 | 66 | B |
|  | 23 | 50 | 8 | 35000 | 100 | 1.0 | 1.28 | 60 | D |
|  | 24 | 250 | 8 | 35000 | 100 | 1.5 | 1.32 | 65 | C |
|  | 25 | 200 | 22 | 35000 | 100 | 1.2 | 1.33 | 71 | B |
|  | 26 | 200 | 30 | 35000 | 100 | 1.2 | 1.33 | 72 | B |
| Reference Example 18 | 27 | 200 | 2 | 41000 | 100 | 1.0 | 1.25 | 90 | B |
|  | 28 | 100 | 8 | 41000 | 100 | 1.0 | 1.20 | 86 | B |
|  | 29 | 50 | 8 | 41000 | 100 | 1.0 | 1.18 | 81 | D |
|  | 30 | 250 | 8 | 41000 | 100 | 1.3 | 1.22 | 86 | C |
|  | 31 | 200 | 20 | 41000 | 100 | 1.1 | 1.21 | 91 | B |
|  | 32 | 200 | 30 | 41000 | 100 | 1.0 | 1.21 | 92 | B |
| Reference Example 19 | 33 | 200 | 2 | 33000 | 100 | 1.0 | 1.20 | 86 | B |
|  | 34 | 100 | 8 | 33000 | 100 | 1.0 | 1.15 | 81 | B |
|  | 35 | 50 | 8 | 33000 | 100 | 1.0 | 1.12 | 78 | D |
|  | 36 | 250 | 8 | 33000 | 100 | 1.9 | 1.17 | 82 | C |
|  | 37 | 200 | 15 | 33000 | 100 | 1.6 | 1.17 | 87 | B |
|  | 38 | 200 | 30 | 33000 | 100 | 1.4 | 1.16 | 88 | B |
| Reference Example 20 | 39 | 200 | 2 | 31000 | 100 | 1.0 | 1.25 | 98 | B |
|  | 40 | 100 | 8 | 31000 | 100 | 1.0 | 1.21 | 91 | B |
|  | 41 | 50 | 8 | 31000 | 100 | 1.0 | 1.19 | 86 | D |
|  | 42 | 250 | 8 | 31000 | 100 | 1.5 | 1.21 | 91 | C |
|  | 43 | 200 | 11 | 31000 | 100 | 1.3 | 1.23 | 96 | B |
|  | 44 | 200 | 30 | 31000 | 100 | 1.4 | 1.23 | 96 | B |

Pressure: dispersion pressure (Mpa),
Pass: number of passes,
Mw: weight average molecular weight,
Stability: storage stability,
OD: OD value,
Glossiness: glossiness on gloss paper,
Discharge: discharge stabilit TABLE IX-2-continued Ink composition (% by weight)

|  | Pigment | | | |
| --- | --- | --- | --- | --- |
|  | PBk7 | PB15:1 | PV19 | PY74 |
| Trimethyrol propane | 4 | 7 | 5 | 5 |
| Surfinol 104 | 0.15 | 0.15 | 0.15 | 0.15 |
| Ion exchange water | Residual quantity | Residual quantity | Residual quantity | Residual quantity |

PBk7: C.I. Pigment Black 7
PB15:1: C.I. Pigment Blue 15:1
PV19: C.I. Pigment Violet 19
PY74: C.I. Pigment Yellow 74
TEGmBE: Triethylene glycol monobuthylether
Surfinol 104: acethylene glycol surfactant, made by Nisshin Chemical Industry Co., Ltd.

Example X

Example X-1

500 parts by weight of Cyanine Blue G-500 pure-A (C.I.PB15:1; made by Sanyo Color Works, Ltd.) was mixed with 950 parts by weight of sulfolane. 25 parts by weight of amidosulfuric acid was added thereto, and the resultant mixture was stirred at 140 to 150° C. for 4 hours. The obtained slurry was supplied into 3000 parts by weight of ion exchanged water to obtain a wet cake subjected to surface treatment by a centrifugal separator at 12000 rpm. This pigment wet cake was redispersed in 6000 parts by weight of ion exchanged water, and the dispersed pigment was condensed to a pigment concentration of 25% by weight by ultrafiltration. This aqueous pigment dispersion showed weak acidity (pH 4.5 to 5.5).

Example X-2

500 parts by weight of Monarch 880 (C.I.PBk7; made by Cabot Corp.) was mixed with 950 parts by weight of sulfolane. 25 parts by weight of amidosulfuric acid was added thereto, and the resultant mixture was stirred at 140 to 150° C. for 4 hours. The obtained slurry was supplied into 3000 parts by weight of ion exchanged water to obtain a wet cake subjected to surface treatment by a centrifugal separator at 12000 rpm. This pigment wet cake was redispersed in 6000 parts by weight of ion exchanged water, and the dispersed pigment was condensed to a pigment concentration of 25% by weight by ultrafiltration. This aqueous pigment dispersion showed weak acidity (pH 4.5 to 5.5).

Example X-3

500 parts by weight of Pigment Violet GC227-A was mixed with 1500 parts by weight of sulfolane. 25 parts by weight of amidosulfuric acid was added thereto, and the resultant mixture was stirred at 140 to 150° C. for 4 hours. The obtained slurry was supplied into 3000 parts by weight of ion exchanged water to obtain a wet cake subjected to surface treatment by a centrifugal separator at 12000 rpm. This pigment wet cake was redispersed in 6000 parts by weight of ion exchanged water, and the dispersed pigment was condensed to a pigment concentration of 25% by weight by ultrafiltration. This aqueous pigment dispersion showed weak acidity (pH 4.5 to 5.5).

Example X-4

500 parts by weight of Fast Yellow 7413-A (C.I.PY74; made by Sanyo Color Works, Ltd.) was mixed with 1200 parts by weight of sulfolane. 25 parts by weight of amidosulfuric acid was added thereto, and the resultant mixture was stirred at 140 to 150° C. for 4 hours. The obtained slurry was supplied into 3000 parts by weight of ion exchanged water to obtain a wet cake subjected to surface treatment by a centrifugal separator at 12000 rpm. This pigment wet cake was redispersed in 6000 parts by weight of ion exchanged water, and the dispersed pigment was condensed to a pigment concentration of 25% by weight by ultrafiltration. This aqueous pigment dispersion showed weak acidity (pH 4.5 to 5.5).

Example X-5

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was added into the separable flask. Furthermore, the reaction was carried out at 80° C. for 1 hour. The diethylene glycol monomethyl ether was then removed by reduced-pressure distillation. 600.0 parts by weight of methyl ethyl ketone were added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 50 mgKOH/g, and the weight average molecular weight thereof was 22000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of a cyan surface treatment pigment produced in Example 1 was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure dispersing machine (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink for ink jet of ink composition example A shown in Table X-2 was produced.

Example X-6

An ink of a composition example A shown in Table X-2 was produced in the same manner as in Example 5, except that 85.3 parts by weight of acrylic acid was used in place of 38.8 parts by weight of acrylic acid, and 8.2 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 110 mgKOH/g, and the weight average molecular weight thereof was 22000.

Example X-7

An ink of a composition example A shown in Table X-2 was produced in the same manner as in Example 5, except that 966.0 parts by weight of benzyl acrylate was used in place of 483.0 parts by weight of benzyl acrylate, 77.5 parts by weight of acrylic acid was used in place of 38.8 parts by weight of acrylic acid, and 2.88 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 50 mgKOH/g, and the weight average molecular weight thereof was 115000.

Example X-8

An ink of a composition example A shown in Table X-2 was produced in the same manner as in Example 1, except that 966.0 parts by weight of benzyl acrylate was used in place of 483.0 parts by weight of benzyl acrylate, 170.5 parts by weight of acrylic acid was used in place of 38.8 parts by weight of acrylic acid, and 2.91 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 110 mgKOH/g, and the weight average molecular weight thereof was 115000.

Example X-9

An ink of composition example B shown in Table X-2 was produced in the same manner as in Example 5, except that 480.0 parts by weight of the black surface treatment pigment dispersion prepared in Example 2 and having a pigment concentration of 25% by weight was used in place of 480.0 parts by weight of the cyan surface treatment pigment dispersion prepared in Example 1.

Example X-10

An ink of composition example B shown in Table X-2 was produced in the same manner as in Example 6, except that 480.0 parts by weight of the black surface treatment pigment dispersion prepared in Example 2 and having a pigment concentration of 25% by weight was used in place of 480.0 parts by weight of the cyan surface treatment pigment dispersion prepared in Example 1.

Example X-11

An ink of composition example B shown in Table X-2 was produced in the same manner as in Example 7, except that 480.0 parts by weight of the black surface treatment pigment dispersion prepared in Example 2 and having a pigment concentration of 25% by weight was used in place of 480.0 parts by weight of the cyan surface treatment pigment dispersion prepared in Example 1.

Example X-12

An ink of composition example B shown in Table X-2 was produced in the same manner as in Example 8, except that 480.0 parts by weight of the black surface treatment pigment dispersion prepared in Example 2 and having a pigment concentration of 25% by weight was used in place of 480.0 parts by weight of the cyan surface treatment pigment dispersion prepared in Example 1.

Example X-13

An ink of composition example C shown in Table X-2 was produced in the same manner as in Example 5, except that 480.0 parts by weight of the magenta surface treatment pigment dispersion prepared in Example 3 and having a pigment concentration of 25% by weight was used in place of 480.0 parts by weight of the cyan surface treatment pigment dispersion prepared in Example 1.

Example X-14

An ink of composition example C shown in Table X-2 was produced in the same manner as in Example 6, except that 480.0 parts by weight of the magenta surface treatment pigment dispersion prepared in Example 3 and having a pigment concentration of 25% by weight was used in place of 480.0 parts by weight of the cyan surface treatment pigment dispersion prepared in Example 1.

Example X-15

An ink of composition example C shown in Table X-2 was produced in the same manner as in Example 7, except that 480.0 parts by weight of the magenta surface treatment pigment dispersion prepared in Example 3 and having a pigment concentration of 25% by weight was used in place of 480.0 parts by weight of the cyan surface treatment pigment dispersion prepared in Example 1.

Example X-16

An ink of composition example C shown in Table X-2 was produced in the same manner as in Example 8, except that 480.0 parts by weight of the magenta surface treatment pigment dispersion prepared in Example 3 and having a pigment concentration of 25% by weight was used in place of 480.0 parts by weight of the cyan surface treatment pigment dispersion prepared in Example 1.

Example X-17

An ink of composition example D shown in Table X-2 was produced in the same manner as in Example 5, except that 480.0 parts by weight of the yellow surface treatment pigment dispersion prepared in Example 4 and having a pigment concentration of 25% by weight was used in place of 480.0 parts by weight of the cyan surface treatment pigment dispersion prepared in Example 1.

Example X-18

An ink of composition example D shown in Table X-2 was produced in the same manner as in Example 6, except that 480.0 parts by weight of the yellow surface treatment pigment dispersion prepared in Example 4 and having a pigment concentration of 25% by weight was used in place of 480.0 parts by weight of the cyan surface treatment pigment dispersion prepared in Example 1.

Example X-19

An ink of composition example D shown in Table X-2 was produced in the same manner as in Example 7, except that 480.0 parts by weight of the yellow surface treatment pigment dispersion prepared in Example 4 and having a pigment concentration of 25% by weight was used in place of 480.0 parts by weight of the cyan surface treatment pigment dispersion prepared in Example 1.

Example X-20

An ink of composition example D shown in Table X-2 was produced in the same manner as in Example 8, except that 480.0 parts by weight of the yellow surface treatment pigment dispersion prepared in Example 4 and having a pigment concentration of 25% by weight was used in place of 480.0 parts by weight of the cyan surface treatment pigment dispersion prepared in Example 1.

Reference Example X-1

An ink of composition example A shown in Table X-2 was produced in the same manner as in Example 5, except that 31.0 parts by weight of acrylic acid was used in place of 38.8 parts by weight of acrylic acid and 7.1 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 40 mgKOH/g, and the weight average molecular weight thereof was 22000.

Reference Example X-2

An ink of composition example A shown in Table X-2 was produced in the same manner as in Example 5, except that 100.8 parts by weight of acrylic acid was used in place of 38.8 parts by weight of acrylic acid and 8.8 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 130 mgKOH/g, and the weight average molecular weight thereof was 22000.

Reference Example X-3

An ink of composition example A shown in Table X-2 was produced in the same manner as in Example 5, except that 966.0 parts by weight of benzyl acrylate was used in place of 483.0 parts by weight of benzyl acrylate, 62.0 parts by weight of acrylic acid was used in place of 38.8 parts by weight of acrylic acid and 2.87 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 40 mgKOH/g, and the weight average molecular weight thereof was 115000.

Reference Example X-4

An ink of composition example A shown in Table X-2 was produced in the same manner as in Example 5, except that 966.0 parts by weight of benzyl acrylate was used in place of 483.0 parts by weight of benzyl acrylate, 201.5 parts by weight of acrylic acid was used in place of 38.8 parts by weight of acrylic acid and 2.92 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 130 mgKOH/g, and the weight average molecular weight thereof was 115000.

Reference Example X-5

The aqueous pigment dispersion prepared in Example 1 was diluted by ion exchanged water so that the pigment concentration of the aqueous pigment dispersion was set to 15% by weight from 25% by weight to produce an ink for ink jet of ink composition example A shown in Table X-2.

Reference Example X-6

An ink of composition example A shown in Table X-2 was produced in the same manner as in Example 5, except that 7.9 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 50 mgKOH/g, and the weight average molecular weight thereof was 18000.

Reference Example X-7

An ink of composition example A shown in Table X-2 was produced in the same manner as in Example 5, except that 85.3 parts by weight of acrylic acid was used in place of 38.8 parts by weight of acrylic acid and 8.6 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 110 mgKOH/g, and the weight average molecular weight thereof was 18000.

Reference Example X-8

An ink of composition example A shown in Table X-2 was produced in the same manner as in Example 5, except that 966.0 parts by weight of benzyl acrylate was used in place of 483.0 parts by weight of benzyl acrylate, 77.5 parts by weight of acrylic acid was used in place of 38.8 parts by weight of acrylic acid and 2.86 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 50 mgKOH/g, and the weight average molecular weight thereof was 130000.

Reference Example X-9

An ink of composition example A shown in Table X-2 was produced in the same manner as in Example 5, except that 966.0 parts by weight of benzyl acrylate was used in place of 483.0 parts by weight of benzyl acrylate, 170.5 parts by weight of acrylic acid was used in place of 38.8 parts by weight of acrylic acid and 2.89 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 110 mgKOH/g, and the weight average molecular weight thereof was 130000.

Reference Example X-10

An ink of composition example B shown in Table X-2 was produced in the same manner as in Reference Example 1, except that 480.0 parts by weight of a Black surface treatment pigment dispersion prepared in Example 2 and having a pigment concentration of 25% by weight was used in place of 480.0 parts by weight of the cyan surface treatment pigment dispersion prepared in Example 1.

Reference Example X-11

An ink of composition example B shown in Table X-2 was produced in the same manner as in Reference Example 2, except that 480.0 parts by weight of a Black surface treatment pigment dispersion prepared in Example 2 and having a pigment concentration of 25% by weight was used in place of 480.0 parts by weight of the cyan surface treatment pigment dispersion prepared in Example 1.

Reference Example X-12

An ink of composition example B shown in Table X-2 was produced in the same manner as in Reference Example 3, except that 480.0 parts by weight of a Black surface treatment pigment dispersion prepared in Example 2 and having a pigment concentration of 25% by weight was used in place of 480.0 parts by weight of the cyan surface treatment pigment dispersion prepared in Example 1.

Reference Example X-13

An ink of composition example B shown in Table X-2 was produced in the same manner as in Reference Example 4, except that 480.0 parts by weight of a Black surface treatment pigment dispersion prepared in Example 2 and having a pigment concentration of 25% by weight was used in place of 480.0 parts by weight of the cyan surface treatment pigment dispersion prepared in Example 1.

Reference Example X-14

The aqueous pigment dispersion prepared in Example 2 was diluted by ion exchanged water so that the pigment concentration of the aqueous pigment dispersion was set to 15% by weight from 25% by weight to produce an ink for ink jet of ink composition example B shown in Table X-2.

Reference Example X-15

An ink of composition example C shown in Table X-2 was produced in the same manner as in Reference Example 1, except that 480.0 parts by weight of a magenta surface treatment pigment dispersion prepared in Example 3 and having a pigment concentration of 25% by weight was used in place of 480.0 parts by weight of the cyan surface treatment pigment dispersion prepared in Example 1.

Reference Example X-16

An ink of composition example C shown in Table X-2 was produced in the same manner as in Reference Example 2, except that 480.0 parts by weight of a magenta surface treatment pigment dispersion prepared in Example 3 and having a pigment concentration of 25% by weight was used in place of 480.0 parts by weight of the cyan surface treatment pigment dispersion prepared in Example 1.

Reference Example X-17

An ink of composition example C shown in Table X-2 was produced in the same manner as in Reference Example 3, except that 480.0 parts by weight of a magenta surface treatment pigment dispersion prepared in Example 3 and having a pigment concentration of 25% by weight was used in place of 480.0 parts by weight of the cyan surface treatment pigment dispersion prepared in Example 1.

Reference Example X-18

An ink of composition example C shown in Table X-2 was produced in the same manner as in Reference Example 4, except that 480.0 parts by weight of a magenta surface treatment pigment dispersion prepared in Example 3 and having a pigment concentration of 25% by weight was used in place of 480.0 parts by weight of the cyan surface treatment pigment dispersion prepared in Example 1.

Reference Example X-19

The aqueous pigment dispersion prepared in Example 3 was diluted by ion exchanged water so that the pigment concentration of the aqueous pigment dispersion was set to 15% by weight from 25% by weight to produce an ink for ink jet of ink composition example C shown in Table X-2.

Reference Example X-20

An ink of composition example D shown in Table X-2 was produced in the same manner as in Reference Example 1, except that 480.0 parts by weight of a yellow surface treatment pigment dispersion prepared in Example 4 and having a pigment concentration of 25% by weight was used in place of 480.0 parts by weight of the cyan surface treatment pigment dispersion prepared in Example 1.

Reference Example X-21

An ink of composition example D shown in Table X-2 was produced in the same manner as in Reference Example 2, except that 480.0 parts by weight of a yellow surface treatment pigment dispersion prepared in Example 4 and having a pigment concentration of 25% by weight was used in place of 480.0 parts by weight of the cyan surface treatment pigment dispersion prepared in Example 1.

Reference Example X-22

An ink of composition example D shown in Table X-2 was produced in the same manner as in Reference Example 3, except that 480.0 parts by weight of a yellow surface treatment pigment dispersion prepared in Example 4 and having a pigment concentration of 25% by weight was used in place of 480.0 parts by weight of the cyan surface treatment pigment dispersion prepared in Example 1.

Reference Example X-23

An ink of composition example D shown in Table X-2 was produced in the same manner as in Reference Example 4, except that 480.0 parts by weight of a yellow surface treatment pigment dispersion prepared in Example 4 and having a pigment concentration of 25% by weight was used in place of 480.0 parts by weight of the cyan surface treatment pigment dispersion prepared in Example 1.

Reference Example X-24

The aqueous pigment dispersion prepared in Example 4 was diluted by ion exchanged water so that the pigment concentration of the aqueous pigment dispersion was set to 15% by weight from 25% by weight to produce an ink for ink jet of ink composition example D shown in Table X-2.

Evaluation Test 1: Valuation Method of Coloration Property on Regular Paper

Solid printing was carried out on Xerox P paper (made by Fuji Xerox) using ink jet inks according to Examples 1 to 20 and Reference Examples 1 to 24 in Example X and an ink jet printer (EM-930C, made by Seiko Epson Co., Ltd.) to obtain test bodies. A printing mode of paper: regular paper, printing quality: super fine, color correction: none and printing direction: both directions was carried out. The OD (Optical Density) of each of the colors was measured using GRETAG-MACBETH SPECTROSCAN SP 50 (made by Gretag Corp. (US) (measurement condition; light source: D50 and viewing angle: 2 degrees). The results are shown as OD value in Table X-1.

Evaluation Test 2: Valuation Method of Glossiness

Solid printing was carried out on a photo paper <gloss> (made by Seiko Epson Co., Ltd.) using ink jet inks according to Examples 1 to 20 and Reference Examples 1 to 24 in Example X and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table X-1.

Evaluation Test 3: Valuation Method of Dispersibility

In Example X, the average particle size of particles in the ink jet inks according to Examples 1 to 20 and Reference Examples 1 to 24 was measured by a laser particle diameter analyzer (Zetasizer 3000, made by Malvern Instruments, Ltd. (Britain)). The results are shown in Table X-1.

Evaluation Test 4: Valuation Method of Storage Stability

In Example X, the initial viscosity of the pigment dispersion for ink jet ink used for Examples 1 to 20 and Reference Examples 1 to 24 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables X-1. Monomer compositions, polymerization initiators, pigments and ink jet ink compositions used when producing the ink jet ink are also shown in Table X-1.

TABLE X-1

| | Reference Example 1 | Example 5 | Example 6 | Reference Example 2 | Reference Example 3 | Example 7 | Example 8 | Reference Example 4 | Reference Example 5 |
|---|---|---|---|---|---|---|---|---|---|
| Ink composition (Refer to Table 2) | A | A | A | A | A | A | A | A | A |
| BZA | 483.0 | 483.0 | 483.0 | 483.0 | 966.0 | 966.0 | 966.0 | 966.0 | — |
| AA | 31.0 | 38.8 | 85.3 | 100.8 | 62.0 | 77.5 | 170.5 | 201.5 | — |
| BPEH | 7.1 | 7.5 | 8.2 | 8.8 | 2.87 | 2.88 | 2.91 | 2.92 | — |
| PBk7 | — | — | — | — | — | — | — | — | — |
| PB15:1 | 480.0 | 480.0 | 480.0 | 480.0 | 480.0 | 480.0 | 480.0 | 480.0 | — |
| PV19 | — | — | — | — | — | — | — | — | — |
| PY74 | — | — | — | — | — | — | — | — | — |
| Acid value (mgKOH/g) | 40 | 50 | 110 | 130 | 40 | 50 | 110 | 130 | — |
| Weight average molecular weight | 22000 | 22000 | 22000 | 22000 | 115000 | 115000 | 115000 | 115000 | — |
| Glossiness | 37.7 | 59.9 | 62.1 | 63.0 | 50.0 | 60.2 | 62.7 | 59.7 | 13.0 |
| Average particle size (nm) | 92 | 89 | 89 | 88 | 91 | 87 | 88 | 87 | 72 |
| Stability | 2.30 | 1.02 | 0.98 | 1.46 | 1.79 | 0.99 | 1.01 | 1.06 | 1.10 |
| OD | 1.17 | 1.22 | 1.22 | 0.99 | 1.1 | 1.21 | 1.19 | 0.87 | 1.19 |

| | Reference Example 6 | Reference Example 7 | Reference Example 8 | Reference Example 9 | Reference Example 10 | Example 9 | Example 10 |
|---|---|---|---|---|---|---|---|
| Ink composition (Refer to Table 2) | A | A | A | A | B | B | B |
| BZA | 483.0 | 483.0 | 966.0 | 966.0 | 483.0 | 483.0 | 483.0 |
| AA | 38.8 | 85.3 | 77.5 | 170.5 | 31.0 | 38.8 | 85.3 |
| BPEH | 7.9 | 8.6 | 2.86 | 2.89 | 7.1 | 7.5 | 8.2 |
| PBk7 | — | — | — | — | 480.0 | 480.0 | 480.0 |
| PB15:1 | 480.0 | 480.0 | 480.0 | 480.0 | — | — | — |
| PV19 | — | — | — | — | — | — | — |
| PY74 | — | — | — | — | — | — | — |
| Acid value (mgKOH/g) | 50 | 110 | 50 | 110 | 40 | 50 | 110 |
| Weight average molecular weight | 18000 | 18000 | 130000 | 130000 | 22000 | 22000 | 22000 |

TABLE X-1-continued

| | | | | | | | |
|---|---|---|---|---|---|---|---|
| Glossiness | 58.1 | 49.0 | 44.0 | 52.0 | 51.0 | 59.8 | 60.0 |
| Average particle size (nm) | 96 | 91 | 89 | 101 | 88 | 85 | 82 |
| Stability | 1.59 | 3.87 | 1.74 | 9.05 | 1.90 | 1.03 | 1.01 |
| OD | 1.01 | 1.20 | 1.15 | 1.18 | 1.1 | 1.2 | 1.21 |

| | Reference Example 11 | Reference Example 12 | Example 11 | Example 12 | Reference Example 13 | Reference Example 14 |
|---|---|---|---|---|---|---|
| Ink composition (Refer to Table 2) | B | B | B | B | B | B |
| BZA | 483.0 | 966.0 | 966.0 | 966.0 | 966.0 | — |
| AA | 100.8 | 62.0 | 77.5 | 170.5 | 201.5 | — |
| BPEH | 8.8 | 2.87 | 2.88 | 2.91 | 2.92 | — |
| PBk7 | 480.0 | 480.0 | 480.0 | 480.0 | 480.0 | — |
| PB15:1 | — | — | — | — | — | — |
| PV19 | — | — | — | — | — | — |
| PY74 | — | — | — | — | — | — |
| Acid value (mgKOH/g) | 130 | 40 | 50 | 110 | 130 | — |
| Weight average molecular weight | 22000 | 115000 | 115000 | 115000 | 115000 | — |
| Glossiness | 53.0 | 42.1 | 60.1 | 59.9 | 60.1 | 9.6 |
| Average particle size (nm) | 85 | 99 | 88 | 84 | 93 | 70 |
| Stability | 3.33 | 2.40 | 1.01 | 1.01 | 0.99 | 1.02 |
| OD | 1.08 | 1.14 | 1.23 | 1.22 | 0.89 | 1.23 |

| | Reference Example 15 | Example 13 | Example 14 | Reference Example 16 | Reference Example 17 | Example 15 |
|---|---|---|---|---|---|---|
| Ink composition (Refer to Table 2) | C | C | C | C | C | C |
| BZA | 483.0 | 483.0 | 483.0 | 483.0 | 966.0 | 966.0 |
| AA | 31.0 | 38.8 | 85.3 | 100.8 | 62.0 | 77.5 |
| BPEH | 7.1 | 7.5 | 8.2 | 8.8 | 2.87 | 2.88 |
| PBk7 | — | — | — | — | — | — |
| PB15:1 | — | — | — | — | — | — |
| PV19 | 480.0 | 480.0 | 480.0 | 480.0 | 480.0 | 480.0 |
| PY74 | — | — | — | — | — | — |
| Acid value (mgKOH/g) | 40 | 50 | 110 | 130 | 40 | 50 |
| Weight average molecular weight | 22000 | 22000 | 22000 | 22000 | 115000 | 115000 |
| Glossiness | 47.8 | 60.1 | 60.3 | 55.6 | 53.4 | 60.8 |
| Average particle size (nm) | 100 | 86 | 85 | 103 | 89 | 86 |
| Stability | 4.10 | 0.98 | 1.00 | 2.20 | 1.15 | 0.98 |
| OD | 1.19 | 1.23 | 1.2 | 1.03 | 1.09 | 1.24 |

| | Example 16 | Reference Example 18 | Reference Example 19 | Reference Example 20 | Example 17 | Example 18 |
|---|---|---|---|---|---|---|
| Ink composition (Refer to Table 2) | C | C | C | D | D | D |
| BZA | 966.0 | 966.0 | — | 483.0 | 483.0 | 483.0 |
| AA | 170.5 | 301.5 | — | 31.0 | 38.8 | 85.3 |
| BPEH | 2.91 | 2.92 | — | 7.1 | 7.5 | 8.2 |
| PBk7 | — | — | — | — | — | — |
| PB15:1 | — | — | — | — | — | — |
| PV19 | 480.0 | 480.0 | — | — | — | — |
| PY74 | — | — | — | 480.0 | 480.0 | 480.0 |
| Acid value (mgKOH/g) | 110 | 130 | — | 40 | 50 | 110 |
| Weight average molecular weight | 115000 | 115000 | — | 22000 | 22000 | 22000 |
| Glossiness | 60.4 | 60.0 | 22.0 | 60.3 | 61.9 | 63.3 |
| Average particle size (nm) | 86 | 85 | 71 | 88 | 89 | 84 |
| Stability | 1.00 | 6.50 | 1.22 | 2.08 | 1.01 | 1.01 |
| OD | 1.22 | 1.13 | 1.2 | 1.16 | 1.22 | 1.21 |

| | Reference Example 21 | Reference Example 22 | Example 19 | Example 20 | Reference Example 23 | Reference Example 24 |
|---|---|---|---|---|---|---|
| Ink composition (Refer to Table 2) | D | D | D | D | D | D |
| BZA | 483.0 | 966.0 | 966.0 | 966.0 | 966.0 | — |
| AA | 100.8 | 62.0 | 77.5 | 170.5 | 201.5 | — |
| BPEH | 8.8 | 2.87 | 2.88 | 2.91 | 2.92 | — |
| PBk7 | — | — | — | — | — | — |
| PB15:1 | — | — | — | — | — | — |
| PV19 | — | — | — | — | — | — |
| PY74 | 480.0 | 480.0 | 480.0 | 480.0 | 480.0 | — |
| Acid value (mgKOH/g) | 130 | 40 | 50 | 110 | 130 | — |
| Weight average molecular weight | 22000 | 115000 | 115000 | 115000 | 115000 | — |
| Glossiness | 65.0 | 51.0 | 60.2 | 61.5 | 62.2 | 17.0 |
| Average particle size (nm) | 102 | 92 | 85 | 87 | 103 | 73 |
| Stability | 1.60 | 3.50 | 1.02 | 1.00 | 1.20 | 1.13 |
| OD | 0.87 | 1.14 | 1.2 | 1.2 | 1.03 | 1.19 |

TABLE X-2

|  | \multicolumn{4}{c}{Composition Example} | | | |
| --- | --- | --- | --- | --- |
|  | A | B | C | D |
| PB15:1 | 4 | — | — | — |
| PBk7 | — | 5 | — | — |
| PV19 | — | — | 5 | — |
| PY74 | — | — | — | 5 |
| DEGmBE | 0.2 | — | 0.3 | — |
| TEGmBE | 1 | 3 | 1 | 1 |
| PGmBE | — | — | — | 0.1 |
| DPGmBE | 0.1 | — | — | — |
| BEPD | 0.7 | 0.7 | 0.7 | 0.7 |
| 1,2-HD | 4 | 3 | 4 | 4 |
| Glycerin | 15 | 10 | 10 | 10 |
| TMP | 7 | 4 | 5 | 5 |
| OlfineE1010 | 0.1 | 0.1 | — | — |
| Surfynol104 | 0.15 | 0.15 | 0.15 | 0.15 |
| EDTA 2.0% solution | 1 | 1 | 1 | 1 |
| Ion exchanged water | Residual quantity | Residual quantity | Residual quantity | Residual quantity |

The brevity codes used in Table X-1 to 2 are explained as follows.
BZA: benzyl acrylate
AA: acrylic acid
BPEH: t-butylperoxy(2-ethylhexanoate)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane
ethylenediamine tetraacetic acid/2Na As is clear from the results of Table X-1 and Table X-2, the evaluation tests 1 to 5 showed excellent results when the ink jet inks according to Examples 1 to 20 in Example X were used. However, when the ink jet inks according to the Reference Examples 1 to 24, excellent results were not shown in anyone or a plurality of items of the revaluation tests 1 to 5.

Example XI

Production of Ink Composition

Example 1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 34000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Blue G-500 pure-A (C.I.PB15:1; made by Sanyo Color Works, Ltd.) was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink for ink jet recording of ink composition 1 shown in Table XI-2 was produced.

Example 2

An ink of composition example 2 shown in Table XI-2 was produced in the same manner as in the composition Example 1, except that 13.2 parts of methacrylic acid and 36.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 32000.

Example 3

An ink of composition example 2 shown in Table XI-2 was produced in the same manner as in the composition Example 3, except that 42.6 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 55 mgKOH/g, and the weight average molecular weight thereof was 48000.

Example 4

An ink of composition example 4 shown in Table XI-2 was produced in the same manner as in Example 1, except that 77.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 29000.

Example 5

An ink of composition example 5 shown in Table XI-2 was produced in the same manner as in the composition Example 1, except that 480.0 parts by weight of Pigment Violet GC227-A (C.I.PV19; made by Sanyo Color Works, Ltd.) was used in place of 480.0 parts by weight of Cyanine Blue G-500 pure-A.

Example 6

An ink of composition example 6 shown in Table XI-2 was produced in the same manner as in the composition Example 2, except that 480.0 parts by weight of Pigment Violet GC227-A was used in place of 480.0 parts by weight of Cyanine Blue G-500 pure-A.

Example 7

An ink of composition example 7 shown in Table XI-2 was produced in the same manner as in the composition Example 1, except that 480.0 parts by weight of Fast Yellow 7413-A (C.I.PY74; made by Sanyo Color Works, Ltd.) was used in place of 480.0 parts by weight of Cyanine Blue G-500 pure-A.

Example 8

An ink of composition example 8 shown in Table XI-2 was produced in the same manner as in the composition example 2, except that 480.0 parts by weight of Fast Yellow 7413-A (C.I.PY74; made by Sanyo Color Works, Ltd.) was used in place of 480.0 parts by weight of Cyanine Blue G-500 pure-A.

Reference Example 1

An ink of composition example 9 shown in Table XI-2 was produced in the same manner as in the composition example 1, except that 116.3 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 150 mgKOH/g, and the weight average molecular weight thereof was 34000.

Reference Example 2

An ink of composition example 10 shown in Table XI-2 was produced in the same manner as in the composition example 5, except that 100.8 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 130 mgKOH/g, and the weight average molecular weight thereof was 29000.

Reference Example 3

An ink of composition example 11 shown in Table XI-2 was produced in the same manner as in the composition example 7, except that 100.8 parts by weight of acrylic acid were used in place of 50.4 parts by weight of acrylic acid.

Evaluation Test 1: Valuation Method of Coloration Property on Regular Paper

Solid printing was carried out on Xerox P paper (made by Fuji Xerox) using ink jet inks according to Examples 1 to 8 and Reference Examples 1 to 3 in Example XI and an ink jet printer (EM-930C, made by Seiko Epson Co., Ltd.) to obtain test bodies. A printing mode of paper: regular paper, printing quality: super fine, color correction: none and printing direction: both directions was carried out. The OD (Optical Density) of each of the colors was measured using GRETAG-MACBETH SPECTROSCAN SP 50 (made by Gretag Corp. (US) (measurement condition; light source: D50 and viewing angle: 2 degrees). The results are shown as OD value in Table XI-1.

Evaluation Test 2: Valuation Method of Glossiness

Solid printing was carried out on a photo paper <gloss> (made by Seiko Epson Co., Ltd.) using ink jet inks according to Examples 1 to 8 and Reference Examples 1 to 3 in Example XI and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table XI-1.

Evaluation Test 3: Valuation Method of Dispersibility

In Example XI, the average particle size of particles in the ink jet inks according to Examples 1 to 8 and Reference Examples 1 to 3 was measured by a laser particle diameter analyzer (Zetasizer 3000, made by Malvern Instruments, Ltd. (Britain)). The results are shown in Table XI-1.

Evaluation Test 4: Valuation Method of Storage Stability

In Example XI, the initial viscosity of the pigment dispersion for ink jet ink used for Examples 1 to 8 and Reference Examples 1 to 3 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables XI-1. Monomer compositions, polymerization initiators, pigments and ink jet ink compositions used when producing the ink jet ink are also shown in Table XI-1.

TABLE XI-1

|  | Ink example 1 | Ink example 2 | Ink example 3 | Ink example 4 | Reference ink example 1 | Ink example 5 | Ink example 6 | Reference ink example 2 | Ink example 7 | Ink example 8 | Reference ink example 3 |
|---|---|---|---|---|---|---|---|---|---|---|---|
| BZA | 483.0 | 483.0 | 483.0 | 483.0 | 483.0 | 483.0 | 483.0 | 483.0 | 483.0 | 483.0 | 483.0 |
| AA | 50.4 | 36.5 | 42.6 | 50.4 | 100.8 | 36.5 | 100.8 | 100.8 | 50.4 | 36.5 | 36.5 |
| MAA | — | 13.2 | — | — | — | 13.2 | — | — | — | 13.2 | 13.2 |
| BPEH | 5.6 | 5.6 | 5.6 | 5.6 | 5.6 | 5.6 | 5.6 | 5.6 | 5.6 | 5.6 | 15.0 |
| PB15:1 | 480.0 | 480.0 | 480.0 | — | 480.0 | — | 480.0 | — | — | — | — |
| PV19 | — | — | — | 480.0 | — | 480.0 | — | 480.0 | — | — | — |
| PY74 | — | — | — | — | — | — | — | — | 480.0 | 480.0 | 480.0 |
| Acid value | 65 | 60 | 55 | 65 | 130 | 60 | 130 | 130 | 65 | 60 | 60 |

TABLE XI-1-continued

|  | Ink example 1 | Ink example 2 | Ink example 3 | Ink example 4 | Reference ink example 1 | Ink example 5 | Ink example 6 | Reference ink example 2 | Ink example 7 | Ink example 8 | Reference ink example 3 |
|---|---|---|---|---|---|---|---|---|---|---|---|
| (mgKOH/g) |  |  |  |  |  |  |  |  |  |  |  |
| Weight averaget molecular weight | 34000 | 32000 | 48000 | 34000 | 29000 | 32000 | 29000 | 29000 | 34000 | 32000 | 18000 |
| Glossiness | 60.3 | 58.8 | 59.3 | 60.2 | 65.2 | 58.3 | 65.2 | 61.3 | 66.4 | 65.8 | 38.8 |
| Average particle size (nm) | 71 | 72 | 70 | 71 | 72 | 72 | 72 | 71 | 85 | 92 | 120 |
| Stability | 1.00 | 0.98 | 1.01 | 1.01 | 1.51 | 0.99 | 1.51 | 1.00 | 1.02 | 0.98 | 23.50 |
| OD value | 1.2 | 1.21 | 1.22 | 1.21 | 0.98 | 1.22 | 0.98 | 1.01 | 1.24 | 1.25 | 1.15 |

TABLE XI-2

| Composition example | 1 | 2 | 3 | 4 | 5 | 6 | 7 | 8 | 9 | 10 | 11 |
|---|---|---|---|---|---|---|---|---|---|---|---|
|  | Ink example 1 | Ink example 2 | Ink example 3 | Ink example 4 | Reference ink example 1 | Ink example 5 | Ink example 6 | Reference ink example 2 | Ink example 7 | Ink example 8 | Reference ink example 3 |
| PB15:1 | 4 | 4 | 4 | 4 | 4 | — | — | — | — | — | — |
| PV19 | — | — | — | — | — | 5 | 5 | 5 | — | — | — |
| PY74 | — | — | — | — | — | — | — | — | 5 | 5 | 5 |
| DEGmBE | 0.2 | 0.2 | 0.2 | 0.2 | 0.2 | 0.3 | 0.3 | 0.3 | — | — | — |
| TEGmBE | 1 | 1 | 1 | 1 | 1 | 1 | 1 | 1 | 1 | 1 | 1 |
| PGmBE | — | — | — | — | — | — | — | — | 0.1 | 0.1 | 0.1 |
| DPGmBE | 0.1 | 0.1 | 0.1 | 0.1 | 0.1 | — | — | — | — | — | — |
| BEPD | 0.7 | 0.7 | 0.7 | 0.7 | 0.7 | 0.7 | 0.7 | 0.7 | 0.7 | 0.7 | 0.7 |
| 1,2-HD | 4 | 4 | 4 | 4 | 4 | 4 | 4 | 4 | 4 | 4 | 4 |
| Glycerin | 15 | 15 | 15 | 15 | 15 | 10 | 10 | 10 | 10 | 10 | 10 |
| TMP | 7 | 7 | 7 | 7 | 7 | 5 | 5 | 5 | 5 | 5 | 5 |
| OlfineE1010 | 0.1 | 0.1 | 0.1 | 0.1 | 0.1 | — | — | — | — | — | — |
| Surfynol104 | 0.15 | 0.15 | 0.15 | 0.15 | 0.15 | 0.15 | 0.15 | 0.15 | 0.15 | 0.15 | 0.15 |
| Ion exchanged water | Residual quantity | Residual quantity | Residual quantity | Residual quantity | Residual quantity | Residual quantity | Residual quantity | Residual quantity | Residual quantity | Residual quantity | Residual quantity |

The brevity codes used in Table XI-1 to 2 are explained as follows.
BZA: benzyl acrylate
AA: acrylic acid
BPEH: t-butylperoxy(2-ethylhexanoate)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane Examples XI-1 to 4, Reference Example XI-1 to 6

The ink sets of Examples 1 to 4 and Reference Examples 1 to 6 were produced in the combination described in Table XI-3. By using the ink jet printer to be described below, three colors of cyan, magenta and yellow were applied to Xerox P paper (printing mode: paper: regular paper, printing quality: superfine, color correction: none) and photo paper <gloss> (printing mode: paper: photo paper <gloss>, printing quality: photo, and color correction: none) so that three colors of cyan, magenta and yellow were mixed to form black color to obtain solid image test bodies of black color.

Recorder Types
(1) Printer: PX-V600 (made by Seiko Epson Co., Ltd.)
  Nozzle arrangement: longitudinal
  Applying order: applying in the order of No. 1→No. 2→No. 3 to color order described in Table XI-3
  Printing direction: both directions
(2) Printer: PX-A550 (made by Seiko Epson Co., Ltd.)
  Nozzle arrangement: transversal
  Applying order: applying in the order of No. 1→No. 2→No. 3 to color order described in Table XI-3
  Printing direction: outward
(3) Printer: PX-A550 (made by Seiko Epson Co., Ltd.)
  Nozzle arrangement: transversal
  Applying order: applying in the order of No. 1→No. 2→No. 3 to color order described in Table XI-3
  Printing direction: homeward Referring to the printing method of the ink sets of examples XI-1 to 4 and Reference Examples XI-1 to 6, the values of the above items (1) to (3) were described as recorder types described in Table XI-3.

(Evaluation Test 5: Coloration Property Evaluation of Black Part)

Referring to the test bodies obtained by the combination of the Examples 1 to 8 and reference ink Examples 1 to 3, the OD (Optical Density) of each color was measured by using GRETAGMACBETH SPECTROSCAN SP50 (made by Gretag) (measurement condition; light source: D50 and viewing angle: 2 degrees). The results are shown in Table XI-3 as the OD value.

(Evaluation Test 6: Glossiness Evaluation of Black Part)

Referring to the test bodies produced by the EPSON photograph of the test bodies obtained by the combination of the Examples 1 to 8 and reference ink Examples 1 to 3, the glosses of the test bodies at 20 degrees were measured by a gloss meter (HG-268, made by Suga Test Instruments Co., Ltd.). The results are shown in Table XI-3.

composition solution thus produced, and the resultant solution was stirred by a high speed disper for 5 minutes. Furthermore, 480.0 parts by weight of PALIOTOL Yellow DO960 (C.I. Pigment Yellow 138; made by BASF AG) was added into the solution, and the resultant solution was stirred by the high speed disper for 1 hour to obtain pigment dispersion slurry. The pigment dispersion slurry was repeatedly dispersed for

TABLE XI-3

|  |  | Exmaple 1 | Exmaple 2 | Exmaple 3 | Exmaple 4 | Reference Exmaple 1 | Reference Exmaple 2 | Reference Exmaple 3 | Reference Exmaple 4 | Reference Exmaple 5 | Reference Exmaple 6 |
|---|---|---|---|---|---|---|---|---|---|---|---|
| Color order | No. 1 | Ink Exmaple 1 (Cyan) | Ink Exmaple 2 (Cyan) | Ink Exmaple 3 (Cyan) | Ink Exmaple 8 (Yellow) | Reference ink Exmaple 1 (Cyan) | Ink Exmaple 2 (Cyan) | Ink Exmaple 3 (Cyan) | Ink Exmaple 7 (Yellow) | Ink Exmaple 3 (Cyan) | Ink Exmaple 4 (Cyan) |
|  | No. 2 | Ink Exmaple 5 (Magenta) | Ink Exmaple 6 (Magenta) | Ink Exmaple 5 (Magenta) | Ink Exmaple 6 (Magenta) | Ink Exmaple 5 (Magenta) | Ink Exmaple 6 (Magenta) | Reference ink Exmaple 2 (Magenta) | Ink Exmaple 5 (Magenta) | Ink Exmaple 7 (Yellow) | Ink Exmaple 8 (Yellow) |
|  | No. 3 | Ink Exmaple 7 (Yellow) | Ink Exmaple 8 (Yellow) | Ink Exmaple 7 (Yellow) | Ink Exmaple 4 (Cyan) | Ink Exmaple 7 (Yellow) | Reference ink Exmaple 3 (Yellow) | Ink Exmaple 7 (Yellow) | Ink Exmaple 1 (Cyan) | Ink Exmaple 5 (Magenta) | Ink Exmaple 6 (Magenta) |
| Recorder type |  | 1 | 1 | 2 | 3 | 1 | 1 | 2 | 1 | 2 | 3 |
| Glossiness | Gloss paper | 63.2 | 61.6 | 60.9 | 61.4 | 63.9 | 51.0 | 59.3 | 47.2 | 54.4 | 54.7 |
| OD value | Regular paper | 1.22 | 1.23 | 1.20 | 1.16 | 1.14 | 1.19 | 1.10 | 1.04 | 1.13 | 1.12 |
|  | Gloss paper | 1.82 | 1.84 | 1.80 | 1.75 | 1.63 | 1.78 | 1.71 | 1.61 | 1.71 | 1.69 |

As is clear from the results of Table XI-1 to XI-3, all of the evaluation tests showed excellent results when the ink jet inks according to Examples 1 to 8 in Example XI were used. However, when the ink jet inks according to the Reference Examples 1 to 3, excellent results were not shown in any one or a plurality of items of the revaluation tests 1 to 5.

Example XII

Example XII-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the solid of the obtained polymer composition was 65 mgKOH/g, and the weight average molecular weight thereof was 34000.

3.0 parts by weight of a 30% sodium hydroxide solution was then added into 120.0 parts by weight of the polymer 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink for ink jet recording of ink composition Example 1 shown in Table XII-3 was produced.

Example XII-2

An ink of composition example 2 shown in Table XII-3 was produced in the same manner as in Example 1, except that 13.2 parts by weight of methacrylic acid and 36.5 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 60 mgKOH/g, and the weight average molecular weight thereof was 32000.

Example XII-3

An ink of composition example 2 shown in Table XII-3 was produced in the same manner as in Example 1, except that 42.6 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 55 mgKOH/g, and the weight average molecular weight thereof was 48000.

Example XII-4

An ink of composition example 4 shown in Table XII-3 was produced in the same manner as in Example 1, except that 456.0 parts by weight of PALIOTOL Yellow DO960 and 24.0 parts by weight of Fast Yellow 7413-A (C.I.PY74; made by Sanyo Color Works, Ltd.) were used in place of 480.0 parts by weight of PALIOTOL Yellow DO960.

Example XII-5

An ink of composition example 5 shown in Table XII-3 was produced in the same manner as in Example 2, except that 320.0 parts by weight of PALIOTOL Yellow DO960 and 160.0 parts by weight of Fast Yellow 7413-A were used in place of 480.0 parts by weight of PALIOTOL Yellow DO960.

Example XII-6

An ink of composition example 6 shown in Table XII-3 was produced in the same manner as in Example 1, except that 77.5 parts by weight of acrylic acid was used in place of 50.4 parts by weight of acrylic acid, 48.0 parts by weight of PALIOTOL Yellow DO960 and 432.0 parts by weight of Fast Yellow 7413-A were used in place of 480.0 parts by weight of PALIOTOL Yellow DO960. After taking a part of the polymer composition solution and drying the polymer composition solution in an ignition drier of 105° C. for 1 hour, the acid value of the solid of the obtained polymer composition was 100 mgKOH/g, and the weight average molecular weight thereof was 29000.

Example XII-7

An ink of composition example 6 shown in Table XII-3 was produced in the same manner as in Example 1, except that 93.0 parts by weight of acrylic acid was used in place of 50.4 parts by weight of acrylic acid, 30.0 parts by weight of PALIOTOL Yellow DO960 and 450.0 parts by weight of Fast Yellow 7413-A were used in place of 480.0 parts by weight of PALIOTOL Yellow DO960. After taking a part of the polymer composition solution and drying the polymer composition solution in an ignition drier of 105° C. for 1 hour, the acid value of the solid of the obtained polymer composition was 120 mgKOH/g, and the weight average molecular weight thereof was 34000.

Reference Example XII-1

An ink of composition example 8 shown in Table XII-4 was produced in the same manner as in Example 1, except that 100.8 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 130 mgKOH/g, and the weight average molecular weight thereof was 29000.

Reference Example XII-2

An ink of composition example 9 shown in Table XII-4 was produced in the same manner as in Example 1, except that 116.3 parts by weight of acrylic acid were used in place of 50.4 parts by weight of acrylic acid. After taking a part of the polymer composition solution and drying the polymer composition solution in an ignition drier of 105° C. for 1 hour, the acid value of the solid of the obtained polymer composition was 150 mgKOH/g, and the weight average molecular weight thereof was 34000.

Reference Example XII-3

An ink of composition example 10 shown in Table XII-4 was produced in the same manner as in Example 3, except that 155.0 parts by weight of acrylic acid were used in place of 42.6 parts by weight of acrylic acid. After taking a part of the polymer composition solution and drying the polymer composition solution in an ignition drier of 105° C. for 1 hour, the acid value of the solid of the obtained polymer composition was 200 mgKOH/g, and the weight average molecular weight thereof was 29000.

Reference Example XII-4

An ink of composition example 11 shown in Table XII-4 was produced in the same manner as in Example 4, except that 19.2 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 10000.

Reference Example XII-5

An ink of composition example 12 shown in Table XII-4 was produced in the same manner as in Example 5, except that 14.2 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 60 mgKOH/g, and the weight average molecular weight thereof was 18000.

Reference Example XII-6

An ink of composition example 13 shown in Table XII-4 was produced in the same manner as in Example 6, except that 2.3 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition was 65 mgKOH/g, and the weight average molecular weight thereof was 140000.

Reference Example XII-7

An ink of composition example 14 shown in Table XII-4 was produced in the same manner as in Example 7, except that 23.3 parts by weight of acrylic acid was used in place of 93.0 parts by weight of acrylic acid. After taking a part of the polymer composition solution and drying the polymer composition solution in an ignition drier of 105° C. for 1 hour, the acid value of the solid of the obtained polymer composition was 30 mgKOH/g, and the weight average molecular weight thereof was 33000.

Evaluation Test 1: Valuation Method of Coloration Property on Regular Paper

Solid printing was carried out on Xerox P paper (made by Fuji Xerox) using ink jet inks according to Examples 1 to 7 and Reference Examples 1 to 7 in Example XII and an ink jet printer (EM-930C, made by Seiko Epson Co., Ltd.) to obtain test bodies. A printing mode of paper: regular paper, printing quality: super fine, color correction: none and printing direction: both directions was carried out. The OD (Optical Density) of each of the colors was measured using GRETAG-MACBETH SPECTROSCAN SP 50 (made by Gretag Corp. (US) (measurement condition; light source: D50 and viewing angle: 2 degrees). The results are shown as OD value in Table XII-1 and Table XII-2.

Evaluation Test 2: Valuation Method of Glossiness

Solid printing was carried out on a photo paper <gloss> (made by Seiko Epson Co., Ltd.) using ink jet inks according to Examples 1 to 7 and Reference Examples 1 to 7 in Example XII and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table XII-1 and XII-2.

Evaluation Test 3: Valuation Method of Dispersibility

In Example XII, the average particle size of particles in the ink jet inks according to Examples 1 to 7 and Reference Examples 1 to 7 was measured by a laser particle diameter analyzer (Zetasizer 3000, made by Malvern Instruments, Ltd. (Britain)). The results are shown in Table XII-1 and XII-2.

Evaluation Test 4: Valuation Method of Storage Stability

In Example XII, the initial viscosity of the pigment dispersion for ink jet ink used for Examples 1 to 7 and Reference Examples 1 to 7 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables XII-1 and XII-2. Monomer compositions, polymerization initiators, pigments and ink jet ink compositions used when producing the ink jet ink are also shown in Table XII-1 and XII-2.

(Evaluation Test 5: Evaluation of Light Resistance)

Solid printing was carried out by using inks according to examples XII-1 to 7 and Reference Examples XII-1 to 7 and an ink jet printer (EM-930C) and by adjusting applied Duty to a photo paper <gloss> so that OD (Optical Density) was set to 0.9 to 1.1 to obtain test bodies (printing mode: paper: photo printing paper, printing quality: photo, color correction: none and printing direction: both directions). After the test bodies were left in a room at a normal temperature for three days, a light exposure processing of 720 hours was carried out under the conditions of 24° C. and 60% RH; BPT (black panel temperature) 40° C.; illumination 34 W/m$^2$ in an irradiation wavelength region of 300 to 400 nm using a xenon weather meter (XL-75S; made by Suga Test Instruments Co., Ltd.). Referring to the test bodies before and after the light exposure processing, the OD was measured using GRETAGMACBETH SPECTROSCAN SP50, and the percentage of residual optical density (ROD) was determined by the following formula. The results are shown in Table XII-3 and Table XII-4.

$$ROD(\%) = (D/D_0) \times 100$$

D: OD after light exposure processing
$D_0$: OD before light exposure processing

TABLE XII-1

|  | Example 1 | Example 2 | Example 3 | Example 4 | Example 5 | Example 6 | Example 7 |
|---|---|---|---|---|---|---|---|
| BZA | 483.0 | 483.0 | 483.0 | 483.0 | 483.0 | 483.0 | 483.0 |
| AA | 50.4 | 36.5 | 42.6 | 50.4 | 36.5 | 77.5 | 93.0 |
| MAA | — | 13.2 | — | — | 13.2 | — | — |
| BPEH | 5.6 | 5.6 | 5.6 | 5.6 | 5.6 | 5.6 | 5.6 |
| PY138 | 480.0 | 480.0 | 480.0 | 456.0 | 320.0 | 48.0 | 30.0 |
| PY74 | — | — | — | 24.0 | 160.0 | 432.0 | 450.0 |
| (PY138:PY74) Ratio | 1:0 | 1:0 | 1:0 | 19:1 | 2:1 | 1:9 | 1:15 |
| Acid value (mgKOH/g) | 65 | 60 | 55 | 65 | 60 | 100 | 120 |
| Weight average molecular weight | 34000 | 32000 | 48000 | 34000 | 32000 | 29000 | 34000 |
| Glossiness | 69.1 | 67.5 | 68.3 | 67.4 | 66.9 | 67.1 | 65.2 |
| Average particle size (nm) | 91 | 98 | 92 | 98 | 93 | 95 | 88 |
| Stability | 1.01 | 1.00 | 0.98 | 1.03 | 1.02 | 1.05 | 0.99 |
| OD value | 1.22 | 1.31 | 1.02 | 1.19 | 1.21 | 1.23 | 1.24 |

TABLE XII-2

|  | Reference Example 1 | Reference Example 2 | Reference Example 3 | Reference Example 4 | Reference Example 5 | Reference Example 6 | Reference Example 7 |
|---|---|---|---|---|---|---|---|
| BZA | 483.0 | 483.0 | 483.0 | 483.0 | 483.0 | 483.0 | 483.0 |
| AA | 100.8 | 116.3 | 155.0 | 50.4 | 36.5 | 50.4 | 23.3 |
| MAA | — | — | — | — | 13.2 | — | — |
| BPEH | 5.6 | 5.6 | 5.6 | 20.0 | 15.0 | 3.1 | 5.6 |
| PY138 | 480.0 | 480.0 | 480.0 | 456.0 | 320.0 | 48.0 | 30.0 |
| PY74 | — | — | — | 24.0 | 160.0 | 432.0 | 450.0 |
| (PY138:PY74) Ratio | 1:0 | 1:0 | 1:0 | 19:1 | 2:1 | 1:9 | 1:15 |
| Acid Value (mgKOH/g) | 130 | 150 | 200 | 65 | 60 | 65 | 30 |
| Weight average molecular weight | 29000 | 34000 | 29000 | 10000 | 18000 | 140000 | 33000 |
| Glossiness | 67.2 | 65.3 | 63.3 | 53.2 | 44.1 | 35.2 | 38.8 |
| Average particle size (nm) | 93 | 96 | 95 | 98 | 103 | 122 | 175 |
| Stability | 2.61 | 1.85 | 1.55 | 235.1 | 155.4 | 16.6 | 1.23 |
| OD value | 0.79 | 0.88 | 0.65 | 0.84 | 1.10 | 1.05 | 1.02 |

TABLE XII-3

| | Composition example | | | | | | |
|---|---|---|---|---|---|---|---|
| | 1 | 2 | 3 | 4 | 5 | 6 | 7 |
| | | | | Example | | | |
| | Example 1 | Example 2 | Example 3 | Example 4 | Example 5 | Example 6 | Example 7 |
| PY138 | 4.8 | 7.2 | 2.4 | 4.56 | 3.2 | 0.48 | 0.3 |
| PY74 | — | — | — | 2.4 | 1.6 | 4.32 | 4.5 |
| DEGmBE | — | 0.2 | — | — | 0.2 | — | 0.3 |
| TEGmBE | 1 | 1 | 2 | 1 | 1 | 2 | 1 |
| PGmBE | 0.1 | — | — | 0.1 | — | — | — |
| DPGmBE | — | 0.1 | — | — | 0.1 | — | — |
| BEPD | 0.7 | 0.7 | 0.7 | 0.7 | 0.7 | 0.7 | 0.7 |
| 1,2-HD | 4 | 4 | 3 | 4 | 4 | 3 | 4 |
| Glycerin | 10 | 15 | 10 | 10 | 15 | 10 | 10 |
| TMP | 5 | 7 | 4 | 5 | 7 | 4 | 5 |
| Olefin E1010 | — | 0.1 | 0.1 | — | 0.1 | 0.1 | — |
| Surfinol 104 | 0.15 | 0.15 | 0.15 | 0.15 | 0.15 | 0.15 | 0.15 |
| Ion exchange water | Residual quantity | Residual quantity | Residual quantity | Residual quantity | Residual quantity | Residual quantity | Residual quantity |
| Light resistance | 82% | 85% | 79% | 79% | 78% | 76% | 71% |

TABLE XII-4

| | Composition example | | | | | | |
|---|---|---|---|---|---|---|---|
| | 8 | 9 | 10 | 11 | 12 | 13 | 14 |
| | | | | Reference Example | | | |
| | Reference Example 1 | Reference Example 2 | Reference Example 3 | Reference Example 4 | Reference Example 5 | Reference Example 6 | Reference Example 7 |
| PY138 | 4.8 | 7.2 | 2.4 | 4.56 | 3.2 | 0.48 | 0.3 |
| PY74 | — | — | — | 2.4 | 1.6 | 4.32 | 4.5 |
| DEGmBE | — | 0.2 | — | — | 0.2 | — | 0.3 |
| TEGmBE | 1 | 1 | 2 | 1 | 1 | 2 | 1 |
| PGmBE | 0.1 | — | — | 0.1 | — | — | — |
| DPGmBE | — | 0.1 | — | — | 0.1 | — | — |
| BEPD | 0.7 | 0.7 | 0.7 | 0.7 | 0.7 | 0.7 | 0.7 |
| 1,2-HD | 4 | 4 | 3 | 4 | 4 | 3 | 4 |
| Glycerin | 10 | 15 | 10 | 10 | 15 | 10 | 10 |
| TMP | 5 | 7 | 4 | 5 | 7 | 4 | 5 |
| Olefin E1010 | — | 0.1 | 0.1 | — | 0.1 | 0.1 | — |
| Surfinol 104 | 0.15 | 0.15 | 0.15 | 0.15 | 0.15 | 0.15 | 0.15 |
| Ion exchange water | Residual quantity | Residual quantity | Residual quantity | Residual quantity | Residual quantity | Residual quantity | Residual quantity |
| Light resistance | 66% | 69% | 54% | 67% | 69% | 69% | 67% |

The brevity codes used in Table XII-1 to 4 are explained as follows.

BZA: benzyl acrylate
AA: acrylic acid
MAA: methacrylic acid
BPEH: t-butylperoxy(2-ethylhexanoate)
PY38: C.I. Pigment Yellow 138
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane As is clear from the results of Table XII-1 and Table XII-4, all of the evaluation tests showed excellent results when the ink jet inks according to Examples 1 to 7 in Example XII were used. However, when the ink jet inks according to the Reference Examples 1 to 7, excellent results were not shown in any one or a plurality of items of the revaluation tests.

Example XIII

Production of Dispersion 1

As the dispersion 1, Monarch 880 (made by Cabot Corp.) which was pigment black 7 (a carbon black) was used. Powder of Monarch 880 was moisturized, and was kneaded by a three-roll mill for 3 hours to use the powder in the moisturized state. The powder was used as a humid pigment having a pigment concentration of 25%.

After carrying out nitrogen replacement of the interior of a reaction vessel equipped with a stirrer, a thermometer, a reflux tube and a dripping funnel, 65 parts of paracumylphenoxyethylene glycol acrylate, 10 parts of benzyl acrylate, 2 parts of acrylic acid, and 0.3 parts of t-dodecyl mercaptan were placed in the reaction vessel and heated to 70° C. Then, 150 parts of paracumylphenoxyethylene glycol acrylate, 15 parts of acrylic acid, 5 parts of butyl acrylate, 1 part of t-dodecyl mercaptan, 20 parts of methyl ethyl ketone, and 1 part of azobisisovaleronitrile, which were prepared separately, were placed in the dripping funnel. The resultant solution was dripped into the reaction vessel over a period of 4 hours to carry out a polymerization reaction of dispersion polymer. Methyl ethyl ketone was then added to the reaction vessel to produce dispersion polymer solution of a concentration of 40%.

40 parts of the above dispersion polymer solution, 120 parts of a humid pigment having a pigment concentration of 25% as Monarch 880 (made by Cabot Corp.) which is the pigment black 7 (carbon black), 100 parts of a 0.1 mol/L sodium hydroxide aqueous solution, and 30 parts of methyl ethyl ketone were then mixed. About 1600 g of the mixture was then dispersed for 8 passes at 200 MPa using an ultrahigh pressure homogenizer (Ultimizer HJP-25005, made by Sugino Machine Limited). Thereafter, the dispersed mixture was moved to another container, and 300 parts of ion exchanged water was added into the mixture, and stirring was carried out for another hour. The entire amount of methyl ethyl ketone and a part of the water were then removed using a rotary evaporator, and the pH was adjusted to 8.5 by neutralization by a 0.1 mol/L sodium hydroxide. Then filtration through a membrane filter of 0.3 μm was carried out, thereby preparing dispersion 1 having a pigment concentration of 20% by the adjustment with the ion exchanged water.

Production of Dispersion 2

As a dispersion 2, Pigment Blue 15:1 was used. A pigment was ground by salt-milling using the crude of the synthesized pigment. Then, desalination processing was carried out by washing using ion exchanged water, and a wet cake having a pigment concentration of 25% was produced by dehydrating and concentrating. The dispersion 2 was produced by using the wet cake. After carrying out nitrogen replacement of the interior of a reaction vessel equipped with a stirrer, a thermometer, a reflux tube and a dripping funnel, 65 parts of paracumylphenoxyethylene glycol acrylate, 10 parts of benzyl acrylate, 2 parts of acrylic acid, and 0.3 parts of t-dodecyl mercaptan were placed in the reaction vessel and heated to 70° C. Then, 150 parts of paracumylphenoxyethylene glycol acrylate, 15 parts of acrylic acid, 5 parts of butyl acrylate, 1 part of t-dodecyl mercaptan, 20 parts of methyl ethyl ketone, and 1 part of azobisisovaleronitrile, which were prepared separately, were placed in the dripping funnel. The resultant solution was dripped into the reaction vessel over a period of 4 hours to carry out a polymerization reaction of dispersion polymer. Methyl ethyl ketone was then added to the reaction vessel to produce dispersion polymer solution of a concentration of 40%.

40 parts of the above dispersion polymer solution, 120 parts of wet cake of Pigment Blue 15:1 having a concentration of 25%, 100 parts of a 0.1 mol/L sodium hydroxide solution and 30 parts of methyl ethyl ketone were mixed. About 1600 g of the resultant mixture was dispersed for 8 passes at 200 MPa by using an ultrahigh pressure homogenizer (Ultimizer HJP-25005, made by Sugino Machine Limited). Thereafter, the dispersed mixture was moved to another container, and 300 parts of ion exchanged water was added into the mixture, and stirring was carried out for another hour. The entire amount of methyl ethyl ketone and a part of the water were then removed using a rotary evaporator, and the pH was adjusted to 8.5 by neutralization by a 0.1 mol/L sodium hydroxide aqueous solution. Then filtration through a membrane filter of 0.3 μm was carried out, thereby preparing pigment dispersion 1 having a pigment concentration of 20% by the adjustment with the ion exchanged water.

Production of Dispersion 3

Dispersion 3 was produced in the same manner as in the dispersion 2 by using Pigment Violet 19.

Production of Dispersion 4

Dispersion 4 was produced in the same manner as in the dispersion 2, except that no process for salt-milling by using Pigment Yellow 74 and the crude of the synthesized pigment to grind the pigment was carried out.

Example XIII-1

An ink 1 was produced by mixing the dispersion 1 with vehicle components shown in Table XIII-2.

Example XIII-2

An ink 2 was produced by mixing the dispersion 2 with vehicle components shown in Table XIII-2.

Example XIII-3

An ink 3 was produced by mixing the dispersion 3 with vehicle components shown in Table XIII-2.

Example XIII-4

An ink 4 was produced by mixing the dispersion 4 with vehicle components shown in Table XIII-2.

Reference Example XIII-1

Monarch 880 which was a carbon black (PBk7) and was made by U.S. Cabot Corp. was used as in the dispersion 1. Pigment dispersion 5 was produced in the same manner as in Example 1, except that the amount of acrylic acid when producing a polymer used for the dispersion was decreased and a polymer having an acid value set to 40 was used. An ink 5 was produced by mixing the pigment dispersion 5 with the vehicle components shown in Table XIII-2 in the same manner as in Example 1.

Reference Example XIII-2

Monarch 880 which was a carbon black (PBk7) and was made by U.S. Cabot Corp. was used as in the dispersion 1. Pigment dispersion 6 was produced in the same manner as in Example 1, except that the amount of acrylic acid when producing a polymer used for the dispersion was increased and a polymer having an acid value set to 200 was used. An ink 6 was produced by mixing the pigment dispersion 6 with the vehicle components shown in Table XIII-2 in the same manner as in Example 1.

Reference Example XIII-3

Pigment Blue 15:1 (trichloro copper phthalocyanine pigment, G500, made by Sanyo Color Works, Ltd.) was used as in the dispersion 1. Pigment dispersion 7 was produced in the same manner as in Example 2, except that the amount of acrylic acid when producing a polymer used for the dispersion was decreased and a polymer having an acid value set to 40 was used. An ink 7 was produced by mixing the pigment dispersion 7 with the vehicle components shown in Table XIII-2 in the same manner as in Example 1.

Reference Example XIII-4

Pigment Blue 15:1 (trichloro copper phthalocyanine pigment, G500, made by Sanyo Color Works, Ltd.) was used as in the Reference Example 2. Pigment dispersion 8 was produced in the same manner as in Example 2, except that the amount of acrylic acid when producing a polymer used for the dispersion was increased and a polymer having an acid value set to 200 was used. An ink 8 was produced by mixing the pigment dispersion 8 with the vehicle components shown in Table XIII-2 in the same manner as in Example 1.

Reference Example XIII-5

Pigment Violet 19 (quinacridone pigment; made by Clariant, Ltd.) was used as in Reference Example 1. Pigment dispersion 9 was produced in the same manner as in Example 3, except that the amount of acrylic acid when producing a polymer used for the dispersion was decreased and a polymer having an acid value set to 40 was used. An ink 9 was produced by mixing the pigment dispersion 9 with the vehicle components shown in Table XIII-2 in the same manner as in Example 2.

Reference Example XIII-6

Pigment Violet 19 (quinacridone pigment; made by Clariant, Ltd.) was used as in Reference Example 2. Pigment dispersion 10 was produced in the same manner as in Example 2, except that the amount of acrylic acid when producing a polymer used for the dispersion was increased and a polymer having an acid value set to 200 was used. An ink 10 was produced by mixing the pigment dispersion 10 with the vehicle components shown in Table XIII-2 in the same manner as in Example 3.

Reference Example XIII-7

Pigment Yellow 74 (condensed azo pigment; made by Clariant, Ltd.) was used as in Reference Example 1. Pigment dispersion 11 was produced in the same manner as in Example 4, except that the amount of acrylic acid when producing a polymer used for the dispersion was decreased and a polymer having an acid value set to 40 was used. An ink 11 was produced by mixing the pigment dispersion 11 with the vehicle components shown in Table XIII-2 in the same manner as in Example 2.

Reference Example XIII-8

Pigment Yellow 74 (condensed azo pigment; made by Clariant, Ltd.) was used as in Reference Example 2. Pigment dispersion 12 was produced in the same manner as in Example 4, except that the amount of acrylic acid when producing a polymer used for the dispersion was increased and a polymer having an acid value set to 200 was used. An ink 12 was produced by mixing the pigment dispersion 12 with the vehicle components shown in Table XIII-2 in the same manner as in Example 2.

Reference Example XIII-9

Monarch 880 which was a carbon black (PBk7) and was made by U.S. Cabot Corp. was used as in the dispersion 1. Pigment dispersion 13 was produced in the same manner as in Example 1, except that the amount of azobisisovaleronitrile when producing a polymer used for the dispersion was increased and a polymer having a weight average molecular weight set to 15000 was used. An ink 13 was produced by mixing the pigment dispersion 13 with vehicle components shown in Table XIII-2 in the same manner as in Example 1.

Reference Example XIII-10

Monarch 880 which was a carbon black (PBk7) and was made by U.S. Cabot Corp. was used as in the dispersion 1. Pigment dispersion 14 was produced in the same manner as in Example 1, except that the amount of azobisisovaleronitrile when producing a polymer used for the dispersion was decreased and a polymer having a weight average molecular weight set to 110000 was used. An ink 14 was produced by mixing the pigment dispersion 14 with vehicle components shown in Table XIII-2 in the same manner as in Example 1.

Reference Example XIII-11

Pigment Blue 15:1 (trichloro copper phthalocyanine pigment, G500, made by Sanyo Color Works, Ltd.) was used as in Reference Example 1. Pigment dispersion 15 was produced in the same manner as in Example 2, except that the amount of azobisisovaleronitrile when producing a polymer used for the dispersion was increased and a polymer having a weight average molecular weight set to 15000 was used. An ink 15 was produced by mixing the pigment dispersion 15 with vehicle components shown in Table XIII-2 in the same manner as in Example 2.

Reference Example XIII-12

Pigment Blue 15:1 (trichloro copper phthalocyanine pigment, G500, made by Sanyo Color Works, Ltd.) was used as in Reference Example 2. Pigment dispersion 16 was produced in the same manner as in Example 2, except that the amount of azobisisovaleronitrile when producing a polymer used for the dispersion was decreased and a polymer having a weight average molecular weight set to 110000 was used. An ink 16 was produced by mixing the pigment dispersion 16 with vehicle components shown in Table XIII-2 in the same manner as in Example 2.

Reference Example XIII-13

Pigment Violet 19 (quinacridone pigment; made by Clariant, Ltd.) was used as in Reference Example 1. Pigment dispersion 17 was produced in the same manner as in Example 3, except that the amount of azobisisovaleronitrile when producing a polymer used for the dispersion was increased and a polymer having a weight average molecular weight set to 15000 was used. An ink 17 was produced by mixing the pigment dispersion 17 with vehicle components shown in Table XIII-2 in the same manner as in Example 2.

Reference Example XIII-14

Pigment Violet 19 (quinacridone pigment; made by Clariant, Ltd.) was used as in Reference Example 2. Pigment dispersion 18 was produced in the same manner as in Example 3, except that the amount of azobisisovaleronitrile when producing a polymer used for the dispersion was decreased and a polymer having a weight average molecular weight set to 110000 was used. An ink 18 was produced by mixing the pigment dispersion 18 with vehicle components shown in Table XIII-2 in the same manner as in Example 2.

Reference Example XIII-15

Pigment Yellow 74 (condensed azo pigment; made by Clariant, Ltd.) was used as in Reference Example 1. Pigment dispersion 19 was produced in the same manner as in Example 4, except that the amount of azobisisovaleronitrile when producing a polymer used for the dispersion was increased and a polymer having a weight average molecular weight set to 15000 was used. An ink 19 was produced by mixing the pigment dispersion 19 with vehicle components shown in Table XIII-2 in the same manner as in Example 2.

Reference Example XIII-16

Pigment Yellow 74 (condensed azo pigment; made by Clariant, Ltd.) was used as in Reference Example 2. Pigment dispersion 20 was produced in the same manner as in Example 4, except that the amount of azobisisovaleronitrile when producing a polymer used for the dispersion was decreased and a polymer having a weight average molecular weight set to 110000 was used. An ink 20 was produced by mixing the pigment dispersion 20 with vehicle components shown in Table XIII-2 in the same manner as in Example 2.

Reference Example XIII-17

Monarch 880 which was carbon black (PBk7) and was made by U.S. Cabot Corp. was used as in the dispersion 1. Pigment dispersions 21 to 26 were produced in the same manner as in Example 1 except that dispersion pressure and the number of passes were changed by using the same polymer as that of the dispersion 1, and inks 21 to 26 were produced by mixing the pigment dispersions 21 to 26 with the vehicle components shown in Table XIII-2 in the same manner as in Example 1.

Reference Example XIII-18

Pigment Blue 15:1 (trichloro copper phthalocyanine pigment, G500, made by Sanyo Color Works, Ltd.) was used as in the dispersion 2. Pigment dispersions 27 to 32 were produced in the same manner as in Example 2 except that dispersion pressure and the number of passes were changed by using the same polymer as that of the dispersion 2, and inks 27 to 32 were produced by mixing the pigment dispersions 27 to 32 with the vehicle components shown in Table XIII-2 in the same manner as in Example 2.

Reference Example XIII-19

Pigment Violet 19 (quinacridone pigment; made by Clariant, Ltd.) was used as in the dispersion 3. Pigment dispersions 33 to 38 were produced in the same manner as in Example 1 except that dispersion pressure and the number of passes were changed by using the same polymer as that of the dispersion 3, and inks 33 to 38 were produced by mixing the pigment dispersions 33 to 38 with the vehicle components shown in Table XIII-2 in the same manner as in Example 3.

Reference Example XIII-20

Pigment Yellow 74 (condensed azo pigment; made by Clariant, Ltd.) was used as in the dispersion 4. Pigment dispersions 39 to 44 were produced in the same manner as in Example 4 except that dispersion pressure and the number of passes were changed by using the same polymer as that of the dispersion 4, and inks 39 to 44 were produced by mixing the pigment dispersions 39 to 44 with the vehicle components shown in Table XIII-2 in the same manner as in Example 4.

Reference Example XIII-21

An ink 45 was produced by mixing with the vehicle components shown in Table XIII-2 in the same manner as in Example 1, except that Monarch 880 which was a powder carbon black (PBk7) and was made by U.S. Cabot Corp. was used.

Reference Example XIII-22

An ink 46 was produced by mixing with the vehicle components shown in Table XIII-2 in the same manner as in Example 2, except that powdery Pigment Blue 15:1 (trichloro copper phthalocyanine pigment, G500, made by Sanyo Color Works, Ltd.) was used.

Reference Example XIII-23

An ink 47 was produced by mixing with the vehicle components shown in Table XIII-2 in the same manner as in Example 3, except that powdery Pigment Violet 19 (quinacridone pigment; made by Clariant, Ltd.) was used.

Reference Example XIII-24

An ink 48 was produced by mixing with the vehicle components shown in Table XIII-2 in the same manner as in Example 4, except that powdery Pigment Yellow 74 (condensed azo pigment; made by Clariant, Ltd.) was used.

(Preparation of Pigment Ink for Ink Jet)

Hereinafter, suitable examples of compositions for pigment inks for ink jet are shown in Table XIII-2. The ink jet ink as the present invention was produced by mixing the dispersion 1 produced by the above method with vehicle components shown in Table XIII-2. 0.05% of Topside 240 (made by Permachem Asia Ltd.) in ion exchanged water for prevention corrosion of ink, 0.02% of benzotriazole in ion exchanged water for prevention of corrosion of ink jet head parts, and 0.04% of EDTA (ethylenediamine tetraacetic acid)/2Na salt in ion exchanged water for reducing the effects of metal ions in the ink system were used in the residual quantity of water in Table XIII-1.

Reference Example XIII-25

Inks 49 to 54 were produced by mixing the pigment dispersion with the vehicle components shown in Table XIII-3 in the same manner as in Example 1, except that the vehicle components were changed.

Reference Example XIII-26

Inks 55 to 60 were produced by mixing the pigment dispersion with the vehicle components shown in Table XIII-3 in the same manner as in Example 2, except that the vehicle components were changed.

Reference Example XIII-27

Inks 61 to 66 were produced by mixing the pigment dispersion with the vehicle components shown in Table XIII-3 in the same manner as in Example 3, except that the vehicle components were changed.

Reference Example XIII-28

Inks 67 to 72 were produced by mixing the pigment dispersion with the vehicle components shown in Table XIII-3 in the same manner as in Example 4, except that the vehicle components were changed.

Evaluation of Dispersion Stability

The percentage changes in viscosity (%) and sedimentation percentage (%) upon leaving pigment inks for ink jet produced by using dispersions which differ in the pigment particle size at 60° C. for 30 days are shown in Table XIII-1. The dispersion stability is indicated as the percentage change in viscosity (%) upon leaving each aqueous ink at 60° C. for 30 days. For the change in viscosity, viscosity values were measured at an angle of 60 degrees using the AMVn, made by Anton Paar GmbH (Germany), and 1-(value after 30 days)/(initial value) is indicated in the form of percentage (%).

Evaluation of Regular Paper OD and Glossiness of Gloss Paper

As regular paper, Xerox 4024 paper made by U.S. Xerox was used, and as gloss paper, photo paper (gloss) made by Seiko Epson Corporation was used. The ink jet printer EM930C, made by Seiko Epson Co., Ltd., was used as the printer and evaluations were made using samples printed at 720 dpi photo quality in the case of regular paper and samples printed at 1440 dpi photo quality in the case of gloss paper. The OD was measured using GRETAGMACBETH SPECTROSCAN SPM-50 manufactured by GRETAG COMPANY. Referring to the measurement of the gloss, the specular glossiness of a recorded surface was measured for an incidence angle of 60 degrees using a gloss checker (IG-320, made by Horiba, Ltd.) and the average of five measurements was determined for each recording paper. Photo paper (gloss), manufactured by Seiko Epson Co., Ltd. was used as the medium and printing at 720 dpi photo quality using the EM930C, made by Seiko Epson Co., Ltd., as the printer was carried out. The results are shown in Table XIII-1.

Measurement of Discharge Stability

Printing on 100 pages of A4-size Xerox P paper made by Fuji Xerox at 4000 letters/page of a standard of character size of 11 and MSP Gothic of Microsoft Word was carried out at 35° C. in 35% atmosphere by using the ink jet printer PX-V600, made by Seiko Epson Co., Ltd., and evaluated. AA indicates that no print distortions occurred, A indicates that one print distortion occurred, B indicates that print distortions occurred at 2 to 3 locations, C indicates that print distortions occurred at 4 to 5 locations, and D indicates that print distortions occurred at no less than 6 locations. Table XIII-1 shows the results.

TABLE XIII-1

Results of tests for dispersion stability, OD on regular paper, Glossiness on gloss paper, and discharge stability

| | Dispersion | Pressure | Pass | Mw | Acid value | Stability | OD | Glossiness | Discharge |
|---|---|---|---|---|---|---|---|---|---|
| Example 1 | 1 | 200 | 8 | 35000 | 100 | 1.0 | 1.40 | 71 | A |
| Example 2 | 2 | 210 | 7 | 41000 | 100 | 1.0 | 1.25 | 94 | AA |
| Example 3 | 3 | 190 | 6 | 33000 | 100 | 1.0 | 1.20 | 89 | AA |
| Example 4 | 4 | 180 | 5 | 31000 | 100 | 1.0 | 1.25 | 99 | AA |
| Reference Example 1 | 5 | 200 | 8 | 35000 | 40 | 2.9 | 1.35 | 75 | D |
| Reference Example 2 | 6 | 200 | 8 | 35000 | 200 | 3.5 | 1.35 | 70 | B |
| Reference Example 3 | 7 | 210 | 7 | 41000 | 40 | 1.5 | 1.12 | 95 | D |
| Reference Example 4 | 8 | 210 | 7 | 41000 | 200 | 2.1 | 1.12 | 90 | B |
| Reference Example 5 | 9 | 190 | 6 | 33000 | 40 | 2.9 | 1.11 | 92 | D |
| Reference Example 6 | 10 | 190 | 6 | 33000 | 200 | 3.5 | 1.11 | 85 | B |
| Reference Example 7 | 11 | 180 | 5 | 31000 | 40 | 2.0 | 1.14 | 90 | D |
| Reference Example 8 | 12 | 180 | 5 | 31000 | 200 | 2.4 | 1.14 | 105 | B |
| Reference Example 9 | 13 | 200 | 8 | 15000 | 100 | 1.2 | 1.35 | 69 | C |
| Reference Example 10 | 14 | 200 | 8 | 110000 | 100 | 1.4 | 1.35 | 65 | C |
| Reference Example 11 | 15 | 210 | 7 | 15000 | 100 | 1.3 | 1.12 | 90 | C |
| Reference Example 12 | 16 | 210 | 7 | 110000 | 100 | 1.6 | 1.12 | 82 | C |
| Reference Example 13 | 17 | 190 | 6 | 15000 | 100 | 2.4 | 1.11 | 84 | D |
| Reference Example 14 | 18 | 190 | 6 | 110000 | 100 | 3.5 | 1.11 | 79 | D |
| Reference Example 15 | 19 | 180 | 5 | 15000 | 100 | 1.5 | 1.14 | 89 | C |
| Reference Example 16 | 20 | 180 | 5 | 110000 | 100 | 1.9 | 1.14 | 79 | C |
| Reference Example 17 | 21 | 200 | 2 | 35000 | 100 | 1.0 | 1.35 | 68 | B |
| | 22 | 100 | 8 | 35000 | 100 | 1.0 | 1.30 | 66 | B |
| | 23 | 50 | 8 | 35000 | 100 | 1.0 | 1.28 | 60 | D |
| | 24 | 250 | 8 | 35000 | 100 | 1.5 | 1.32 | 65 | C |
| | 25 | 200 | 22 | 35000 | 100 | 1.2 | 1.33 | 71 | B |
| | 26 | 200 | 30 | 35000 | 100 | 1.2 | 1.33 | 72 | B |
| Reference Example 18 | 27 | 200 | 2 | 41000 | 100 | 1.0 | 1.25 | 90 | B |
| | 28 | 100 | 8 | 41000 | 100 | 1.0 | 1.20 | 86 | B |
| | 29 | 50 | 8 | 41000 | 100 | 1.0 | 1.18 | 81 | D |
| | 30 | 250 | 8 | 41000 | 100 | 1.3 | 1.22 | 86 | C |
| | 31 | 200 | 20 | 41000 | 100 | 1.1 | 1.21 | 91 | B |
| | 32 | 200 | 30 | 41000 | 100 | 1.0 | 1.21 | 92 | B |
| Reference Example 19 | 33 | 200 | 2 | 33000 | 100 | 1.0 | 1.20 | 86 | B |
| | 34 | 100 | 8 | 33000 | 100 | 1.0 | 1.15 | 81 | B |
| | 35 | 50 | 8 | 33000 | 100 | 1.0 | 1.12 | 78 | D |
| | 36 | 250 | 8 | 33000 | 100 | 1.9 | 1.17 | 82 | C |
| | 37 | 200 | 15 | 33000 | 100 | 1.6 | 1.17 | 87 | B |
| | 38 | 200 | 30 | 33000 | 100 | 1.4 | 1.16 | 88 | B |
| Reference Example 20 | 39 | 200 | 2 | 31000 | 100 | 1.0 | 1.25 | 98 | B |
| | 40 | 100 | 8 | 31000 | 100 | 1.0 | 1.21 | 91 | B |
| | 41 | 50 | 8 | 31000 | 100 | 1.0 | 1.19 | 86 | D |
| | 42 | 250 | 8 | 31000 | 100 | 1.5 | 1.21 | 91 | C |

TABLE XIII-1-continued

Results of tests for dispersion stability, OD on regular paper, Glossiness on gloss paper, and discharge stability

|  | Dispersion | Pressure | Pass | Mw | Acid value | Stability | OD | Glossiness | Discharge |
|---|---|---|---|---|---|---|---|---|---|
|  | 43 | 200 | 11 | 31000 | 100 | 1.3 | 1.23 | 96 | B |
|  | 44 | 200 | 30 | 31000 | 100 | 1.4 | 1.23 | 96 | B |
| Reference Example 21 | 45 | 200 | 8 | 35000 | 100 | 1.0 | 1.41 | 85 | AA |
| Reference Example 22 | 46 | 210 | 7 | 41000 | 100 | 1.0 | 1.24 | 110 | AA |
| Reference Example 23 | 47 | 190 | 6 | 33000 | 100 | 1.0 | 1.22 | 105 | AA |
| Reference Example 24 | 48 | 180 | 5 | 31000 | 100 | 1.0 | 1.25 | 112 | AA |
| Reference Example 25 | 49 | 200 | 8 | 35000 | 100 | 1.0 | 1.41 | 86 | B |
|  | 50 | 200 | 8 | 35000 | 100 | 1.0 | 1.40 | 85 | B |
|  | 51 | 200 | 8 | 35000 | 100 | 1.0 | 1.38 | 86 | B |
|  | 52 | 200 | 8 | 35000 | 100 | 1.5 | 1.22 | 70 | C |
|  | 53 | 200 | 8 | 35000 | 100 | 1.2 | 1.13 | 67 | D |
|  | 54 | 200 | 8 | 35000 | 100 | 1.2 | 1.03 | 60 | D |
| Reference Example 26 | 55 | 210 | 7 | 41000 | 100 | 1.0 | 1.20 | 90 | B |
|  | 56 | 210 | 7 | 41000 | 100 | 1.0 | 1.20 | 91 | B |
|  | 57 | 210 | 7 | 41000 | 100 | 1.0 | 1.20 | 91 | B |
|  | 58 | 210 | 7 | 41000 | 100 | 1.3 | 1.21 | 76 | C |
|  | 59 | 210 | 7 | 41000 | 100 | 1.1 | 1.11 | 71 | D |
|  | 60 | 210 | 7 | 41000 | 100 | 1.0 | 1.01 | 62 | D |
| Reference Example 27 | 61 | 190 | 6 | 33000 | 100 | 1.0 | 1.00 | 85 | B |
|  | 62 | 190 | 6 | 33000 | 100 | 1.0 | 1.20 | 85 | B |
|  | 63 | 190 | 6 | 33000 | 100 | 1.0 | 1.19 | 85 | B |
|  | 64 | 190 | 6 | 33000 | 100 | 1.9 | 1.10 | 71 | C |
|  | 65 | 190 | 6 | 33000 | 100 | 1.6 | 0.99 | 65 | D |
|  | 66 | 190 | 6 | 33000 | 100 | 1.4 | 0.95 | 57 | D |
| Reference Example 28 | 67 | 180 | 5 | 31000 | 100 | 1.0 | 1.25 | 98 | B |
|  | 68 | 180 | 5 | 31000 | 100 | 1.0 | 1.22 | 98 | B |
|  | 69 | 180 | 5 | 31000 | 100 | 1.0 | 1.23 | 96 | B |
|  | 70 | 180 | 5 | 31000 | 100 | 1.5 | 1.11 | 81 | C |
|  | 71 | 180 | 5 | 31000 | 100 | 1.3 | 1.05 | 66 | D |
|  | 72 | 180 | 5 | 31000 | 100 | 1.4 | 1.03 | 56 | D |

Pressure: dispersion pressure (MPa),
Pass: number of passes,
Mw: weight average molecular weight,
OD: OD value,
Glossiness: glossiness on glos paper,
Discharge: discharge stability

TABLE XIII-2

Ink composition (% by weight)

|  | Pigment | | | |
|---|---|---|---|---|
|  | PBk7 | PB15:1 | PV19 | PY74 |
| Example 1, Reference Example 1, 2, 9, 10, 17 | 46.7 | — | — | — |
| Example 2, Reference Example 3, 4, 11, 12, 18 | — | 33.3 | — | — |
| Example 3, Reference Example 5, 6, 13, 14, 19 | — | — | 40 | — |
| Example 4, Reference Example 7, 8, 15, 16, 20 | — | — | — | 40 |
| TEGmBE | 3 | 1 | 1 | 1 |
| 1,2-HD | 3 | 4 | 4 | 4 |
| Gl | 10 | 15 | 10 | 10 |
| TMP | 4 | 7 | 5 | 5 |
| S104 | 0.15 | 0.15 | 0.15 | 0.15 |

TABLE XIII-2-continued

Ink composition (% by weight)

|  | Pigment | | | |
|---|---|---|---|---|
|  | PBk7 | PB15:1 | PV19 | PY74 |
| Ion exchange water | Residual quantity | Residual quantity | Residual quantity | Residual quantity |

PBk7: C.I. Pigment Black 7
PB15:1: C.I. Pigment Blue 15:1
PV19: C.I. Pigment Violet 19
PY74: Pigment Yellow 74
TEGmBE: Triethylene glycol monobuthyl ether
1,2-HD: 1,2-hexanediol
Gl: Glycerin
TMP: Trimethylol propane
S104: Surfinol 104 (acethylene glycol surfactant, made by Nisshin Chemical Industry Co.,

TABLE XIII-3

Ink compositions with various vehicle components (% by weight)

| Reference Example | PBk7 | PB15:1 | PV19 | PY74 | TEGmBE | 1,2-HD | Gl | TMP | S104 | Water |
|---|---|---|---|---|---|---|---|---|---|---|
| 49 | 46.7 | — | — | — | 2 | 3 | 10 | 4 | — | Residual quantity |
| 50 | 46.7 | — | — | — | 2 | — | 12 | 5 | 0.15 | Residual quantity |
| 51 | 46.7 | — | — | — | — | 3 | 12 | 4 | 0.15 | Residual quantity |
| 52 | 46.7 | — | — | — | — | — | 12 | 6 | 0.15 | Residual quantity |
| 53 | 46.7 | — | — | — | — | — | 12 | 6 | 0.03 | Residual quantity |

TABLE XIII-3-continued

Ink compositions with various vehicle components (% by weight)

| Reference Example | PBk7 | PB15:1 | PV19 | PY74 | TEGmBE | 1,2-HD | GI | TMP | S104 | Water |
|---|---|---|---|---|---|---|---|---|---|---|
| 54 | 46.7 | — | — | — | — | — | 12 | 6 | — | Residual quantity |
| 55 | — | 33.3 | — | — | 1 | 4 | 15 | 7 | — | Residual quantity |
| 56 | — | 33.3 | — | — | 1 | — | 17 | 8 | 0.15 | Residual quantity |
| 57 | — | 33.3 | — | — | — | 4 | 17 | 7 | 0.15 | Residual quantity |
| 58 | — | 33.3 | — | — | — | — | 17 | 9 | 0.15 | Residual quantity |
| 59 | — | 33.3 | — | — | — | — | 17 | 9 | 0.03 | Residual quantity |
| 60 | — | 33.3 | — | — | 1 | 4 | 17 | 9 | — | Residual quantity |
| 61 | — | — | 40 | — | 1 | 4 | 10 | 5 | — | Residual quantity |
| 62 | — | — | 40 | — | 1 | — | 12 | 6 | 0.15 | Residual quantity |
| 63 | — | — | 40 | — | — | 4 | 12 | 5 | 0.15 | Residual quantity |
| 64 | — | — | 40 | — | — | — | 12 | 7 | 0.15 | Residual quantity |
| 65 | — | — | 40 | — | — | — | 12 | 7 | 0.03 | Residual quantity |
| 66 | — | — | 40 | — | 1 | 4 | 12 | 7 | — | Residual quantity |
| 67 | — | — | — | 40 | 1 | 4 | 10 | 5 | — | Residual quantity |
| 68 | — | — | — | 40 | 1 | — | 12 | 6 | 0.15 | Residual quantity |
| 69 | — | — | — | 40 | — | 4 | 12 | 5 | 0.15 | Residual quantity |
| 70 | — | — | — | 40 | — | — | 12 | 7 | 0.15 | Residual quantity |
| 71 | — | — | — | 40 | — | — | 12 | 7 | 0.03 | Residual quantity |
| 72 | — | — | — | 40 | 1 | 4 | 12 | 7 | — | Residual quantity |

Example XIV

Example XIV-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 363.0 parts by weight of benzil acrylate, 120 parts by weight of urethane acrylate (Ebecryl CL1039: made by DAICEL-CYTEC Company LTD.), 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the obtained polymer was 65 mgKOH/g, and the weight average molecular weight thereof was 34000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Blue G-500 pure-A (C.I.PB15:1; made by Sanyo Color Works, Ltd.) was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After methyl ethyl ketone was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 5.00 μm. Then, an ink for ink jet recording of ink composition 1 shown in Table XIV-2 was produced.

Example XIV-2

An ink of composition example 2 shown in Table XIV-2 was produced in the same manner as in Example 1, except that 13.2 parts by weight of methacrylic acid and 36.5 parts by weight of acrylic acid were used in place of 50.4 parts by weight of acrylic acid, and 120 parts of epoxy acrylate (NK oligomer EA-6320, made by New Nakamura Chemistry) was used in place of 120 parts of urethane acrylate (Ebecryl CL1039, made by DAICEL-CYTEC Company LTD.). After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 32000.

Example XIV-3

An ink of composition example 3 shown in Table XIV-2 was produced in the same manner as in Example 1, except that 42.6 parts by weight of acrylic acid was used in place of 50.4 parts by weight of acrylic acid, and 120 parts of epoxy acrylate (NK oligomer EA-6320, made by New Nakamura Chemistry) was used in place of 120 parts of urethane acrylate (Ebecryl CL1039, made by DAICEL-CYTEC Company LTD.). After taking a part of the polymer composition solution and drying the polymer composition solution in an ignition drier of 105° C. for 1 hour, the acid value of the obtained polymer of the ink for ink jet recording was 55 mgKOH/g, and the weight average molecular weight thereof was 48000.

Example XIV-4

An ink of composition example 4 shown in Table XIV-2 was produced in the same manner as in Example 1, except that 77.5 parts by weight of acrylic acid was used in place of 50.4 parts by weight of acrylic acid, and 120 parts of epoxy acrylate (NK oligomer EA-6320, made by New Nakamura Chemistry) was used in place of 120 parts of urethane acrylate (Ebecryl CL1039, made by DAICEL-CYTEC Company LTD.). After taking a part of the polymer composition solution and drying the polymer composition solution in an ignition drier of 105° C. for 1 hour, the acid value of the obtained polymer of the ink for ink jet recording was 100 mgKOH/g, and the weight average molecular weight thereof was 29000.

Example XIV-5

An ink of composition example 5 shown in Table XIV-2 was produced in the same manner as in Example 1, except that 93.0 parts by weight of acrylic acid was used in place of 50.4 parts by weight of acrylic acid, and 120 parts of epoxy acrylate (NK oligomer EA-6320, made by New Nakamura Chemistry) was used in place of 120 parts of urethane acrylate (Ebecryl CL1039, made by DAICEL-CYTEC Company LTD.). After taking a part of the polymer composition solution and drying the polymer composition solution in an ignition drier of 105° C. for 1 hour, the acid value of the obtained polymer of the ink for ink jet recording was 120 mgKOH/g, and the weight average molecular weight thereof was 34000.

Example XIV-6

An ink of composition example 13 shown in Table XIV-2 was produced in the same manner as in Example 1, except that Monarch 880 (C.I.PBk7: made by Cabot Corp.) was used in place of 480.0 parts by weight of Cyanine Blue G-500 pure-A having a pigment concentration of 25% by weight. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 34000.

Example XIV-7

An ink of composition example 14 shown in Table XIV-2 was produced in the same manner as in Example 2, except that Monarch 880 (C.I.PBk7: made by Cabot Corp.) was used in place of 480.0 parts by weight of Cyanine Blue G-500 pure-A having a pigment concentration of 25% by weight. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 32000.

Example XIV-8

An ink of composition example 19 shown in Table XIV-2 was produced in the same manner as in Example 1, except that 120.0 parts by weight of Pigment Violet GC227-A was used in place of 120.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 34000.

Example XIV-9

An ink of composition example 20 shown in Table XIV-2 was produced in the same manner as in Example 2, except that 120.0 parts by weight of Pigment Violet GC227-A was used in place of 120.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 32000.

Example XIV-10

An ink of composition example 25 shown in Table XIV-2 was produced in the same manner as in Example 1, except that 120.0 parts by weight of Fast Yellow 7413-A (C.I.PY74; made by Sanyo Color Works, Ltd.) was used in place of 120.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 34000.

Example XIV-11

An ink of composition example 26 shown in Table XIV-2 was produced in the same manner as in Example 2, except that 120.0 parts by weight of Fast Yellow 7413-A (C.I.PY74; made by Sanyo Color Works, Ltd.) was used in place of 120.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 32000.

Reference Example XIV-1

An ink of composition example 6 shown in Table XIV-2 was produced in the same manner as in Example 1, except that 483.0 parts by weight of benzyl acrylate was used in place of 363.0 parts by weight of benzyl acrylate and 120 parts by weight of urethane acrylate. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 29000.

Reference Example XIV-2

An ink of composition example 7 shown in Table XIV-2 was produced in the same manner as in Example 1, except that 116.3 parts by weight of acrylic acid was used in place of 50.4 parts by weight of acrylic acid. After taking a part of the polymer composition solution and drying the polymer composition solution in an ignition drier of 105° C. for 1 hour, the acid value of the obtained polymer of the ink for ink jet recording was 150 mgKOH/g, and the weight average molecular weight thereof was 34000.

Reference Example XIV-3

An ink of composition example 8 shown in Table XIV-2 was produced in the same manner as in Example 1, except that 155.0 parts by weight of acrylic acid was used in place of 50.4 parts by weight of acrylic acid. After taking a part of the polymer composition solution and drying the polymer composition solution in an ignition drier of 105° C. for 1 hour, the acid value of the obtained polymer of the ink for ink jet recording was 200 mgKOH/g, and the weight average molecular weight thereof was 29000.

Reference Example XIV-4

An ink of composition example 9 shown in Table XIV-2 was produced in the same manner as in Example 1, except that 20.0 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 10000.

Reference Example XIV-5

An ink of composition example 10 shown in Table XIV-2 was produced in the same manner as in Example 2, except that 15.0 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 18000.

Reference Example XIV-6

An ink of composition example 11 shown in Table XIV-2 was produced in the same manner as in Example 1, except that 3.1 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 130000.

Reference Example XIV-7

An ink of composition example 12 shown in Table XIV-2 was produced in the same manner as in Example 1, except that 23.3 parts by weight of acrylic acid was used in place of 50.4 parts by weight of acrylic acid, and 120 parts of epoxy acrylate (NK oligomer EA-6320, made by New Nakamura Chemistry) was used in place of 120 parts of urethane acrylate (Ebecryl CL1039, made by DAICEL-CYTEC Company LTD.). After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 33000.

Reference Example XIV-8

An ink of composition example 15 shown in Table XIV-2 was produced in the same manner as in Reference Example 1, except that 480.0 parts by weight of Monarch 880 (C.I.PBk7; made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 34000.

Reference Example XIV-9

An ink of composition example 16 shown in Table XIV-2 was produced in the same manner as in Reference Example 5, except that 480.0 parts by weight of Monarch 880 (C.I.PBk7; made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 32000.

Reference Example XIV-10

An ink of composition example 17 shown in Table XIV-2 was produced in the same manner as in Reference Example 6, except that 480.0 parts by weight of Monarch 880 (C.I.PBk7; made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 130000.

Reference Example XIV-11

An ink of composition example 18 shown in Table XIV-2 was produced in the same manner as in Reference Example 7, except that 480.0 parts by weight of Monarch 880 (C.I.PBk7; made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 33000.

Reference Example XIV-12

An ink of composition example 21 shown in Table XIV-2 was produced in the same manner as in Reference Example 1, except that 480.0 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 34000.

Reference Example XIV-13

An ink of composition example 22 shown in Table XIV-2 was produced in the same manner as in Reference Example 5, except that 480.0 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 18000.

Reference Example XIV-13

An ink of composition example 23 shown in Table XIV-2 was produced in the same manner as in Reference Example 6, except that 480.0 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 130000.

Reference Example XIV-153

An ink of composition example 24 shown in Table XIV-2 was produced in the same manner as in Reference Example 7, except that 480.0 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 33000.

Reference Example XIV-16

An ink of composition example 27 shown in Table XIV-2 was produced in the same manner as in Reference Example 1, except that 480.0 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 130 mgKOH/g, and the weight average molecular weight thereof was 29000.

Reference Example XIV-17

An ink of composition example 28 shown in Table XIV-2 was produced in the same manner as in Reference Example 5, except that 480.0 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 18000.

Reference Example XIV-18

An ink of composition example 29 shown in Table XIV-2 was produced in the same manner as in Reference Example 6, except that 480.0 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 130000.

Reference Example XIV-19

An ink of composition example 30 shown in Table XIV-2 was produced in the same manner as in Reference Example 7, except that 480.0 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 33000.

(Evaluation Test 1: Valuation Method of Friction Resistance)

Solid printing was carried out on a photo paper <gloss> (made by Seiko Epson Co., Ltd.) using inks for ink jet recording according to examples XIV-1 to 11 and Reference Examples XIV-1 to 19 and an ink jet printer (EM-930C, made by Seiko Epson Co., Ltd.) to obtain test bodies. A printing mode of paper: photo printing paper, printing quality: photo, color correction: none and printing direction: both directions was carried out. A fixing property evaluation test was then carried out, in which the test body is rubbed by a line marker applying a load of 300 g to the test body. The fixing property evaluation test was carried out by using the above test body (photo paper <gloss>) and observing the exfoliation situation of ink when a printed surface and a rear surface were overlapped with a load of 300 g and moved at a speed of 1 m/s. In Table XIV-2, S indicates that there was no rub-off when the photo paper was moved 3 times, AA indicates that there was no rub-off even when the photo paper was moved 2 times, but there was slight rub-off when the photo paper was moved 3 times, A indicates that there was no rub-off in 1 time, but there was slight rub-off when the photo paper was moved 2 times, B indicates that there was slight rub-off, C indicates that there was rub-off and transfer onto the rear surface, and D indicates that there was considerable rub-off and transfer onto the rear surface.

Evaluation Test 2: Valuation Method of Coloration Property on Regular Paper

Solid printing was carried out on Xerox P paper (made by Fuji Xerox) using ink jet inks according to Examples 1 to 11 and Reference Examples 1 to 19 in Example XIV and an ink jet printer (EM-930C, made by Seiko Epson Co., Ltd.) to obtain test bodies. A printing mode of paper: regular paper, printing quality: superfine, color correction: none and printing direction: both directions was carried out. The OD (Optical Density) of each of the colors was measured using GRETAGMACBETH SPECTROSCAN SP 50 (made by Gretag Corp. (US) (measurement condition; light source: D50 and viewing angle: 2 degrees). The results are shown as OD value in Table XIV-1.

Evaluation Test 3: Valuation Method of Glossiness

Solid printing was carried out on a photo paper <gloss> (made by Seiko Epson Co., Ltd.) using ink jet inks according to Examples 1 to 11 and Reference Examples 1 to 19 in Example XIV and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table XIV-1.

Evaluation Test 4: Valuation Method of Dispersibility

In Example XIV, the average particle size of particles in the ink jet inks according to Examples 1 to 11 and Reference Examples 1 to 19 was measured by a laser particle diameter analyzer (Zetasizer 3000, made by Malvern Instruments, Ltd. (Britain)).

Evaluation Test 4: Valuation Method of Storage Stability

In Example XIV, the initial viscosity of the pigment dispersion for ink jet ink used for Examples 1 to 11 and Reference Examples 1 to 19 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables XIV-1. Monomer compositions, polymerization initiators, pigments and ink jet ink compositions used when producing the ink jet ink are also shown in Table XIV-1.

TABLE XIV-1

| | Example 1 | Example 2 | Reference Example 10 | Reference Example 11 | Example 3 | Example 4 | Example 5 | Reference Example 12 | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|---|---|---|---|---|---|---|---|
| BZA | 363.0 | 363.0 | 363.0 | 363.0 | 363.0 | 363.0 | 363.0 | 363.0 | 363.0 | 363.0 | 363.0 | 363.0 | 363.0 | 363.0 | 363.0 | 483.0 |
| AA | 50.4 | 36.5 | 23.3 | 23.3 | 42.6 | 77.5 | 93.0 | 100.8 | 116.3 | 155.0 | 50.4 | 36.5 | 50.4 | 50.4 | 36.5 | 100.8 |
| MAA | — | 13.2 | — | — | — | — | — | — | — | — | — | 13.2 | 13.2 | 3.1 | 13.2 | — |
| BPEH | 5.6 | 5.6 | 5.6 | 5.6 | 5.6 | 5.6 | 5.6 | 5.6 | 5.6 | 5.6 | 5.6 | 5.6 | — | — | 5.6 | — |
| URA | 120.0 | — | 120.0 | 120.0 | 120.0 | 120.0 | 120.0 | 120.0 | 120.0 | 120.0 | 120.0 | 120.0 | 120.0 | 120.0 | — | — |
| EPA | — | 120.0 | — | — | — | — | — | — | — | — | — | — | — | — | 120.0 | 120.0 |
| PBk7 | — | — | — | — | — | — | — | — | — | — | — | — | — | — | — | 480.0 |
| PB15:1 | 480.0 | 480.0 | 480.0 | 480.0 | 480.0 | 480.0 | 480.0 | 480.0 | 480.0 | 480.0 | 480.0 | 480.0 | 480.0 | 480.0 | 480.0 | — |
| Acid value (mgKOH/g) | 65 | 60 | 30 | 65 | 55 | 100 | 120 | 130 | 150 | 200 | 65 | 60 | 15 | 65 | 60 | 130 |
| Average molecular weight | 34000 | 32000 | 130000 | 33000 | 48000 | 29000 | 34000 | 29000 | 34000 | 29000 | 10000 | 18000 | 130000 | 32000 | 29000 |
| Fixation property | S | S | D | B | S | S | S | AA | A | AA | D | C | D | AA | B |
| OD | 1.2 | 1.21 | 1.05 | 1.18 | 1.12 | 0.94 | 0.9 | 1.12 | 1.12 | 1.08 | 1.25 | 1.33 | 1.01 |
| Glossiness | 60.3 | 58.8 | 19.3 | 59.3 | 66.1 | 64.7 | 65.2 | 65.7 | 66.0 | 38.8 | 40.4 | 19.3 | 20.4 | 38.8 | 41.2 |
| Average particle size (nm) | 71 | 72 | 156 | 146 | 70 | 70 | 66 | 71 | 72 | 77 | 92 | 102 | 98 | 120 | 165 | 98 | 110 |
| Stability | 1.00 | 0.98 | 24.30 | 156.20 | 1.01 | 1.06 | 1.09 | 1.00 | 1.01 | 1.95 | 1.85 | 98.50 | 52.40 | 12.30 | 180.00 | 0.98 | 1.62 |

| | Reference Example 9 | Reference Example 10 | Reference Example 11 | Example 8 | Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
|---|---|---|---|---|---|---|---|---|---|---|---|---|---|---|---|
| BZA | 363.0 | 363.0 | 363.0 | 363.0 | 363.0 | 363.0 | 363.0 | 363.0 | 363.0 | 363.0 | 363.0 | 363.0 | 363.0 | 363.0 | 363.0 |
| AA | 36.5 | 50.4 | 23.3 | 50.4 | 36.5 | 100.8 | 36.5 | 50.4 | 23.3 | 50.4 | 36.5 | 100.8 | 36.5 | 50.4 | 23.3 |
| MAA | 13.2 | — | — | — | 13.2 | — | 13.2 | 3.1 | — | — | 13.2 | — | 13.2 | 3.1 | — |
| BPEH | 15.0 | 3.1 | 5.6 | 5.6 | 5.6 | 5.6 | 15.0 | 3.1 | 5.6 | 5.6 | 5.6 | 5.6 | 15.0 | 3.1 | 5.6 |
| URA | 120.0 | 120.0 | 120.0 | 120.0 | 120.0 | 120.0 | 120.0 | 120.0 | 120.0 | 120.0 | 120.0 | 120.0 | 120.0 | 120.0 | 120.0 |
| EPA | — | — | — | — | — | — | — | — | — | — | — | — | — | — | — |
| PBk7 | 480.0 | 480.0 | 480.0 | 480.0 | 480.0 | 480.0 | 480.0 | 480.0 | 480.0 | 480.0 | 480.0 | 480.0 | 480.0 | 480.0 | 480.0 |
| PV19 | — | — | — | — | — | — | — | — | — | — | — | — | — | — | — |
| PY74 | — | — | — | — | — | — | — | — | — | — | — | — | — | — | — |
| Acid value (mgKOH/g) | 60 | 65 | 30 | 65 | 60 | 130 | 60 | 65 | 30 | 65 | 60 | 130 | 60 | 65 | 30 |
| Average molecular weight | 18000 | 130000 | 33000 | 34000 | 32000 | 29000 | 18000 | 130000 | 33000 | 34000 | 32000 | 29000 | 18000 | 130000 | 33000 |
| Fixation property | C | D | B | S | S | B | C | D | B | S | S | B | C | D | B |
| OD | 1.31 | 1.12 | 1.05 | 1.21 | 1.22 | 1.01 | 1.12 | 1.02 | 1.05 | 1.24 | 1.25 | 1.15 | 1.15 | 1.1 | 1.06 |
| Glossiness | 28.8 | 19.3 | 40.4 | 60.2 | 58.3 | 61.3 | 58.8 | 29.6 | 20.4 | 66.4 | 65.8 | 60.2 | 38.8 | 29.7 | 20.4 |
| Average particle size (nm) | 130 | 156 | 146 | 71 | 72 | 71 | 89 | 110 | 123 | 85 | 92 | 91 | 120 | 125 | 135 |
| Stability | 35.40 | 24.30 | 156.20 | 1.01 | 0.99 | 1.00 | 23.50 | 46.20 | 125.30 | 1.02 | 0.98 | 1.00 | 23.50 | 46.20 | 135.20 |

TABLE XIV-2

| | Composition example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| | Example 1 | Example 2 | Example 3 | Example 4 | Example 5 | Reference Example 1 | Reference Example 2 | Reference Example 3 | Reference Example 4 | Reference Example 5 | Reference Example 6 | Reference Example 7 | Reference Example 6 | Reference Example 7 | Reference Example 8 |
| PB15:1 | 4 | 4 | 4 | 4 | 4 | 4 | 4 | 4 | 4 | 4 | 4 | 4 | — | — | — |
| PBk7 | — | — | — | — | — | — | — | — | — | — | — | — | 5 | 5 | 5 |
| PV19 | — | — | — | — | — | — | — | — | — | — | — | — | — | — | — |
| PY74 | — | — | — | — | — | — | — | — | — | — | — | — | — | — | — |
| DEGmBE | 0.2 | 0.2 | 0.2 | 0.2 | 0.2 | 0.2 | 0.2 | 0.2 | 0.2 | 0.2 | 0.2 | 0.2 | — | — | — |
| TEGmBE | 1 | 1 | 1 | 1 | 1 | 1 | 1 | 1 | 1 | 1 | 1 | 1 | — | — | — |
| PGmBE | — | — | — | — | 0.1 | — | — | — | — | — | — | — | — | — | — |
| DPGmBE | — | — | — | — | — | — | — | — | — | — | — | — | 2 | 3 | 4 |
| BEPD | 0.1 | 0.1 | 0.1 | 0.1 | 0.1 | 0.1 | 0.1 | 0.1 | 0.1 | 0.1 | 0.1 | 0.1 | 0.7 | 0.7 | 0.7 |
| 1,2-HD | 0.7 | 0.7 | 0.7 | 0.7 | 0.7 | 0.7 | 0.7 | 0.7 | 0.7 | 0.7 | 0.7 | 0.7 | 3 | 3 | 3 |
| Glycerin | 4 | 4 | 4 | 4 | 4 | 4 | 4 | 4 | 4 | 4 | 4 | 4 | 10 | 10 | 10 |
| TMP | 15 | 15 | 15 | 15 | 15 | 15 | 15 | 15 | 15 | 15 | 15 | 15 | 4 | 4 | 4 |
| Olfine E1010 | 7 | 7 | 7 | 7 | 7 | 7 | 7 | 7 | 7 | 7 | 7 | 7 | — | — | — |
| Surfinol 104 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Ion exchange water | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity |

| | Composition example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| | Reference Example 9 | Reference Example 10 | Reference Example 11 | Example 8 | Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
| PB15:1 | — | — | — | — | — | — | — | — | — | — | — | — | — | — | — |
| PBk7 | 5 | 5 | 5 | 5 | 5 | 5 | 5 | 5 | 5 | 5 | 5 | 5 | 5 | 5 | 5 |
| PV19 | — | — | — | — | — | — | — | — | — | — | — | — | — | — | — |
| PY74 | — | — | — | — | — | — | — | — | — | — | — | — | — | — | — |
| DEGmBE | 4 | — | 6 | — | — | — | — | — | — | — | — | — | — | 13 | — |
| TEGmBE | — | 5 | — | 5 | 5 | 5 | 5 | 5 | 5 | 5 | 5 | 5 | 5 | 5 | 5 |
| PGmBE | — | — | — | — | 0.1 | — | — | — | — | — | — | — | — | — | — |
| DPGmBE | — | — | — | 1 | 1 | 0.3 | 0.3 | 0.3 | 1 | 1 | 1 | 1 | 1 | 1 | 1 |
| BEPD | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| 1,2-HD | 3 | 3 | 3 | 4 | 4 | 4 | 4 | 4 | 4 | 4 | 4 | 4 | 4 | 4 | 4 |
| Glycerin | 10 | 10 | 10 | 10 | 10 | 10 | 10 | 10 | 10 | 10 | 10 | 10 | 10 | 10 | 10 |
| TMP | 4 | 4 | 4 | 5 | 5 | 5 | 5 | 5 | 5 | 5 | 5 | 5 | 5 | 5 | 5 |
| Olfine E1010 | 0.1 | 0.1 | 0.1 | — | — | — | — | — | — | — | — | — | — | — | — |
| Surfinol 104 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Ion exchange water | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity |

The brevity codes used in Table XIV are explained as follows.
BZA: benzyl acrylate
AA: acrylic acid
MAA: methacrylic acid
BPEH: t-butylperoxy(2-ethylhexanoate)
URA: urethane acrylate (Ebecrvl CL1039: made by DAICEL-CYTEC Company Ltd.)
EPA: epoxyacrylate (NK oligomer EA-6320, made by New Nakamura Chemistry)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane As is clear from the results of Table XIV-1 and Table XIV-2, the evaluation tests 1 to 5 showed excellent results when the ink jet inks according to Examples 1 to 11 in Example XIV were used. However, when the ink jet inks according to the Reference Examples 1 to 19, excellent results were not shown in any one or a plurality of items of the revaluation tests 1 to 5.

Example XV

Example XV-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 483.0 parts by weight of benzil acrylate, 38.8 parts by weight of acrylic acid, and 7.5 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the obtained polymer of the ink for ink jet recording was 50 mgKOH/g, and the weight average molecular weight thereof was 22000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Blue G-500 pure-A (C.I.PB15:1; made by Sanyo Color Works, Ltd.) having a pigment concentration of 25% by weight was added into the solution, and the solution was stirred by the high speed disper for 1 hour to obtain pigment dispersion slurry. The pigment dispersion slurry was repeatedly dispersed for 10 passes at 180 MPa by an ultrahigh pressure homogenizer (Nanomizer, made by Nanomizer Co., Ltd.) to obtain a pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 2.5 μm. Then, an ink for ink jet of ink composition example A shown in Table XV-2 was produced.

Example XV-2

An ink of composition example A shown in Table XV-2 was produced in the same manner as in Example 1, except that 85.3 parts by weight of acrylic acid was used in place of 38.8 parts by weight of acrylic acid, and 8.2 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 110 mgKOH/g, and the weight average molecular weight thereof was 22000.

Example XV-3

An ink of composition example A shown in Table XV-2 was produced in the same manner as in Example 1, except that 966.0 parts by weight of benzyl acrylate was used in place of 483.0 parts by weight of benzyl acrylate, 77.5 parts by weight of acrylic acid was used in place of 38.8 parts by weight of acrylic acid, and 2.88 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 50 mgKOH/g, and the weight average molecular weight thereof was 115000.

Example XV-4

An ink of composition example A shown in Table XV-2 was produced in the same manner as in Example 1, except that 170.5 parts by weight of acrylic acid was used in place of 38.8 parts by weight of acrylic acid, and 2.91 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 110 mgKOH/g, and the weight average molecular weight thereof was 115000.

Example XV-5

An ink of composition example B shown in Table XV-2 was produced in the same manner as in Example 1, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example XV-6

An ink of composition example B shown in Table XV-2 was produced in the same manner as in Example 2, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example XV-7

An ink of composition example B shown in Table XV-2 was produced in the same manner as in Example 3, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example XV-8

An ink of composition example B shown in Table XV-2 was produced in the same manner as in Example 4, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Example XV-9

An ink of composition example C shown in Table XV-2 was produced in the same manner as in Example 1, except that 480.0 parts by weight of Pigment Violet GC227-A having a pigment concentration of 25% by weight was used in place of 480.0 parts by weight of Cyanine Blue G-500 pure-A.

Example XV-10

An ink of composition example C shown in Table XV-2 was produced in the same manner as in Example 2, except that 480.0 parts by weight of Pigment Violet GC227-A having a pigment concentration of 25% by weight was used in place of 480.0 parts by weight of Cyanine Blue G-500 pure-A.

Example XV-11

An ink of composition example C shown in Table XV-2 was produced in the same manner as in Example 3, except that 480.0 parts by weight of Pigment Violet GC227-A having a pigment concentration of 25% by weight was used in place of 480.0 parts by weight of Cyanine Blue G-500 pure-A.

Example XV-12

An ink of composition example C shown in Table XV-2 was produced in the same manner as in Example 4, except that 480.0 parts by weight of Pigment Violet GC227-A having a pigment concentration of 25% by weight was used in place of 480.0 parts by weight of Cyanine Blue G-500 pure-A.

Example XV-13

An ink of composition example D shown in Table XV-2 was produced in the same manner as in Example 1, except that 480.0 parts by weight of Fast Yellow 7413-A having a pigment concentration of 25% by weight was used in place of 480.0 parts by weight of Cyanine Blue G-500 pure-A.

Example XV-14

An ink of composition example D shown in Table XV-2 was produced in the same manner as in Example 2, except that 480.0 parts by weight of Fast Yellow 7413-A having a pigment concentration of 25% by weight was used in place of 480.0 parts by weight of Cyanine Blue G-500 pure-A.

Example XV-15

An ink of composition example D shown in Table XV-2 was produced in the same manner as in Example 3, except that 480.0 parts by weight of Fast Yellow 7413-A having a pigment concentration of 25% by weight was used in place of 480.0 parts by weight of Cyanine Blue G-500 pure-A.

Example XV-16

An ink of composition example D shown in Table XV-2 was produced in the same manner as in Example 4, except that 480.0 parts by weight of Fast Yellow 7413-A having a pigment concentration of 25% by weight was used in place of 480.0 parts by weight of Cyanine Blue G-500 pure-A.

Reference Example XV-1

An ink of composition example A shown in Table XV-2 was produced in the same manner as in Example 1, except that 31.0 parts by weight of acrylic acid was used in place of 38.8 parts by weight of acrylic acid, and 7.1 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 40 mgKOH/g, and the weight average molecular weight thereof was 22000.

Reference Example XV-2

An ink of composition example A shown in Table XV-2 was produced in the same manner as in Example 1, except that 100.8 parts by weight of acrylic acid was used in place of 38.8 parts by weight of acrylic acid, and 8.8 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 130 mgKOH/g, and the weight average molecular weight thereof was 22000.

Reference Example XV-3

An ink of composition example A shown in Table XV-2 was produced in the same manner as in Example 1, except that 966.0 parts by weight of benzyl acrylate was used in place of 483.0 parts by weight of benzyl acrylate, 62.0 parts by weight of acrylic acid was used in place of 38.8 parts by weight of acrylic acid, and 2.87 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 40 mgKOH/g, and the weight average molecular weight thereof was 115000.

Reference Example XV-4

An ink of composition example A shown in Table XV-2 was produced in the same manner as in Example 1, except that 966.0 parts by weight of benzyl acrylate was used in place of 483.0 parts by weight of benzyl acrylate, 201.5 parts by weight of acrylic acid was used in place of 38.8 parts by weight of acrylic acid, and 2.92 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the solid of the obtained polymer composition for ink jet ink was 130 mgKOH/g, and the weight average molecular weight thereof was 115000.

Reference Example XV-5

An ink of composition example A shown in Table XV-2 was produced in the same manner as in Reference Example 1, except that beads mill (Ashizawa Finetec Co., Ltd.) was filled with beads having a diameter of 0.05 mm with a filling rate of 80% in place of using a high pressure homogenizer for the pigment dispersion slurry, and the pigment dispersion slurry was dispersed by passing continuously for 2 hours under a condition of the number of rotations of 5000 rpm. After taking a part of the polymer composition solution and drying the polymer composition solution in an ignition drier of 105° C. for 1 hour, the acid value of the solid of the obtained polymer composition for ink jet ink was 40 mgKOH/g, and the weight average molecular weight thereof was 22000.

Reference Example XV-6

An ink of composition example A shown in Table XV-2 was produced in the same manner as in Example 1, except that beads mill (Ashizawa Finetec Co., Ltd.) was filled with beads having a diameter of 0.05 mm with a filling rate of 80% in place of using a high pressure homogenizer for the pigment dispersion slurry, and the pigment dispersion slurry was dispersed by passing continuously for 2 hours under a condition of the number of rotations of 5000 rpm. After taking a part of the polymer composition solution and drying the polymer composition solution in an ignition drier of 105° C. for 1 hour, the acid value of the solid of the obtained polymer composition for ink jet ink was 50 mgKOH/g, and the weight average molecular weight thereof was 22000.

Reference Example XV-7

An ink of composition example A shown in Table XV-2 was produced in the same manner as in Example 2, except that beads mill (Ashizawa Finetec Co., Ltd.) was filled with beads having a diameter of 0.05 mm with a filling rate of 80% in place of using a high pressure homogenizer for the pigment dispersion slurry, and the pigment dispersion slurry was dispersed by passing continuously for 2 hours under a condition of the number of rotations of 5000 rpm. After taking a part of the polymer composition solution and drying the polymer composition solution in an ignition drier of 105° C. for 1 hour, the acid value of the solid of the obtained polymer composition for ink jet ink was 110 mgKOH/g, and the weight average molecular weight thereof was 22000.

Reference Example XV-8

An ink of composition example A shown in Table XV-2 was produced in the same manner as in Reference Example 2, except that beads mill (Ashizawa Finetec Co., Ltd.) was filled with beads having a diameter of 0.05 mm with a filling rate of 80% in place of using a high pressure homogenizer for the pigment dispersion slurry, and the pigment dispersion slurry was dispersed by passing continuously for 2 hours under a condition of the number of rotations of 5000 rpm. After taking a part of the polymer composition solution and drying the polymer composition solution in an ignition drier of 105° C. for 1 hour, the acid value of the solid of the obtained polymer composition for ink jet ink was 130 mgKOH/g, and the weight average molecular weight thereof was 22000.

Reference Example XV-9

An ink of composition example A shown in Table XV-2 was produced in the same manner as in Reference Example 3, except that beads mill (Ashizawa Finetec Co., Ltd.) was filled with beads having a diameter of 0.05 mm with a filling rate of 80% in place of using a high pressure homogenizer for the pigment dispersion slurry, and the pigment dispersion slurry was dispersed by passing continuously for 2 hours under a condition of the number of rotations of 5000 rpm. After taking a part of the polymer composition solution and drying the polymer composition solution in an ignition drier of 105° C. for 1 hour, the acid value of the solid of the obtained polymer composition for ink jet ink was 40 mgKOH/g, and the weight average molecular weight thereof was 115000.

Reference Example XV-10

An ink of composition example A shown in Table XV-2 was produced in the same manner as in Example 3, except that beads mill (Ashizawa Finetec Co., Ltd.) was filled with beads having a diameter of 0.05 mm with a filling rate of 80% in place of using a high pressure homogenizer for the pigment dispersion slurry, and the pigment dispersion slurry was dispersed by passing continuously for 2 hours under a condition of the number of rotations of 5000 rpm. After taking a part of the polymer composition solution and drying the polymer composition solution in an ignition drier of 105° C. for 1 hour, the acid value of the solid of the obtained polymer composition for ink jet ink was 50 mgKOH/g, and the weight average molecular weight thereof was 115000.

Reference Example XV-11

An ink of composition example A shown in Table XV-2 was produced in the same manner as in Example 4, except that beads mill (Ashizawa Finetec Co., Ltd.) was filled with beads having a diameter of 0.05 mm with a filling rate of 80% in place of using a high pressure homogenizer for the pigment dispersion slurry, and the pigment dispersion slurry was dispersed by passing continuously for 2 hours under a condition of the number of rotations of 5000 rpm. After taking a part of the polymer composition solution and drying the polymer composition solution in an ignition drier of 105° C. for 1 hour, the acid value of the solid of the obtained polymer composition for ink jet ink was 110 mgKOH/g, and the weight average molecular weight thereof was 115000.

Reference Example XV-12

An ink of composition example A shown in Table XV-2 was produced in the same manner as in Reference Example 4, except that beads mill (Ashizawa Finetec Co., Ltd.) was filled with beads having a diameter of 0.05 mm with a filling rate of 80% in place of using a high pressure homogenizer for the pigment dispersion slurry, and the pigment dispersion slurry was dispersed by passing continuously for 2 hours under a condition of the number of rotations of 5000 rpm. After taking a part of the polymer composition solution and drying the polymer composition solution in an ignition drier of 105° C. for 1 hour, the acid value of the solid of the obtained polymer composition for ink jet ink was 130 mgKOH/g, and the weight average molecular weight thereof was 115000.

Reference Example XV-13

An ink of composition example A shown in Table XV-2 was produced in the same manner as in Example 1, except that 7.9 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 50 mgKOH/g, and the weight average molecular weight thereof was 18000.

Reference Example XV-14

An ink of composition example A shown in Table XV-2 was produced in the same manner as in Example 1, except that 85.3 parts by weight of acrylic acid was used in place of 38.8 parts by weight of acrylic acid, and 8.6 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 110 mgKOH/g, and the weight average molecular weight thereof was 18000.

Reference Example XV-15

An ink of composition example A shown in Table XV-2 was produced in the same manner as in Example 1, except that 966.0 parts by weight of benzyl acrylate was used in place of 483.0 parts by weight of benzyl acrylate, 77.5 parts by weight of acrylic acid was used in place of 38.8 parts by weight of acrylic acid, and 2.86 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 50 mgKOH/g, and the weight average molecular weight thereof was 130000.

Reference Example XV-16

An ink of composition example A shown in Table XV-2 was produced in the same manner as in Example 1, except that 966.0 parts by weight of benzyl acrylate was used in place of 483.0 parts by weight of benzyl acrylate, 170.5 parts by weight of acrylic acid was used in place of 38.8 parts by weight of acrylic acid, and 2.89 parts by weight of t-butylperoxy(2-ethylhexanoate) was used in place of 7.5 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 110 mgKOH/g, and the weight average molecular weight thereof was 130000.

Reference Example XV-17

An ink of composition example B shown in Table XV-2 was produced in the same manner as in Reference Example 1, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-18

An ink of composition example B shown in Table XV-2 was produced in the same manner as in Reference Example 2, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-19

An ink of composition example B shown in Table XV-2 was produced in the same manner as in Reference Example 3, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-20

An ink of composition example B shown in Table XV-2 was produced in the same manner as in Reference Example 4, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-21

An ink of composition example B shown in Table XV-2 was produced in the same manner as in Reference Example 5, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-22

An ink of composition example B shown in Table XV-2 was produced in the same manner as in Reference Example 6, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-23

An ink of composition example B shown in Table XV-2 was produced in the same manner as in Reference Example 7, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-24

An ink of composition example B shown in Table XV-2 was produced in the same manner as in Reference Example 8, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-25

An ink of composition example B shown in Table XV-2 was produced in the same manner as in Reference Example 9, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-26

An ink of composition example B shown in Table XV-2 was produced in the same manner as in Reference Example 10, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-27

An ink of composition example B shown in Table XV-2 was produced in the same manner as in Reference Example 11, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-28

An ink of composition example B shown in Table XV-2 was produced in the same manner as in Reference Example 12, except that 480.0 parts by weight of Monarch 800 (C.I.PBk7: made by Cabot Corp.) having a pigment concentration of 25% by weight was used in place of 480.0 parts by weight of Cyanine Blue G-500 pure-A.

Reference Example XV-29

An ink of composition example C shown in Table XV-2 was produced in the same manner as in Reference Example 1, except that 480.0 parts by weight of Pigment Violet GC227-A having a pigment concentration of 25% by weight was used in place of 480.0 parts by weight of Cyanine Blue G-500 pure-A.

Reference Example XV-30

An ink of composition example C shown in Table XV-2 was produced in the same manner as in Reference Example 2, except that 480.0 parts by weight of Pigment Violet GC227-A having a pigment concentration of 25% by weight was used in place of 480.0 parts by weight of Cyanine Blue G-500 pure-A.

Reference Example XV-31

An ink of composition example C shown in Table XV-2 was produced in the same manner as in Reference Example 3, except that 480.0 parts by weight of Pigment Violet GC227-A having a pigment concentration of 25% by weight was used in place of 480.0 parts by weight of Cyanine Blue G-500 pure-A.

Reference Example XV-32

An ink of composition example C shown in Table XV-2 was produced in the same manner as in Reference Example 4, except that 480.0 parts by weight of Pigment Violet GC227-A having a pigment concentration of 25% by weight was used in place of 480.0 parts by weight of Cyanine Blue G-500 pure-A.

Reference Example XV-33

An ink of composition example C shown in Table XV-2 was produced in the same manner as in Reference Example 5, except that 480.0 parts by weight of Pigment Violet GC227-A having a pigment concentration of 25% by weight was used in place of 480.0 parts by weight of Cyanine Blue G-500 pure-A.

Reference Example XV-34

An ink of composition example C shown in Table XV-2 was produced in the same manner as in Reference Example 6, except that 480.0 parts by weight of Pigment Violet GC227-A having a pigment concentration of 25% by weight was used in place of 480.0 parts by weight of Cyanine Blue G-500 pure-A.

Reference Example XV-35

An ink of composition example C shown in Table XV-2 was produced in the same manner as in Reference Example 7, except that 480.0 parts by weight of Pigment Violet GC227-A having a pigment concentration of 25% by weight was used in place of 480.0 parts by weight of Cyanine Blue G-500 pure-A.

Reference Example XV-36

An ink of composition example C shown in Table XV-2 was produced in the same manner as in Reference Example 8, except that 480.0 parts by weight of Pigment Violet GC227-A having a pigment concentration of 25% by weight was used in place of 480.0 parts by weight of Cyanine Blue G-500 pure-A.

Reference Example XV-37

An ink of composition example C shown in Table XV-2 was produced in the same manner as in Reference Example 9, except that 480.0 parts by weight of Pigment Violet GC227-A having a pigment concentration of 25% by weight was used in place of 480.0 parts by weight of Cyanine Blue G-500 pure-A.

Reference Example XV-38

An ink of composition example C shown in Table XV-2 was produced in the same manner as in Reference Example 10, except that 480.0 parts by weight of Pigment Violet GC227-A having a pigment concentration of 25% by weight was used in place of 480.0 parts by weight of Cyanine Blue G-500 pure-A.

Reference Example XV-39

An ink of composition example C shown in Table XV-2 was produced in the same manner as in Reference Example 11, except that 480.0 parts by weight of Pigment Violet GC227-A having a pigment concentration of 25% by weight was used in place of 480.0 parts by weight of Cyanine Blue G-500 pure-A.

Reference Example XV-40

An ink of composition example C shown in Table XV-2 was produced in the same manner as in Reference Example 12, except that 480.0 parts by weight of Pigment Violet GC227-A having a pigment concentration of 25% by weight was used in place of 480.0 parts by weight of Cyanine Blue G-500 pure-A.

Reference Example XV-41

An ink of composition example D shown in Table XV-2 was produced in the same manner as in Reference Example 1, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-42

An ink of composition example D shown in Table XV-2 was produced in the same manner as in Reference Example 2, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-43

An ink of composition example D shown in Table XV-2 was produced in the same manner as in Reference Example 3, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-44

An ink of composition example D shown in Table XV-2 was produced in the same manner as in Reference Example 4, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-45

An ink of composition example D shown in Table XV-2 was produced in the same manner as in Reference Example 5, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-46

An ink of composition example D shown in Table XV-2 was produced in the same manner as in Reference Example 6, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-47

An ink of composition example D shown in Table XV-2 was produced in the same manner as in Reference Example 7, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-48

An ink of composition example D shown in Table XV-2 was produced in the same manner as in Reference Example 8, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-49

An ink of composition example D shown in Table XV-2 was produced in the same manner as in Reference Example 9, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-50

An ink of composition example D shown in Table XV-2 was produced in the same manner as in Reference Example 10, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-51

An ink of composition example D shown in Table XV-2 was produced in the same manner as in Reference Example 11, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Reference Example XV-52

An ink of composition example D shown in Table XV-2 was produced in the same manner as in Reference Example 12, except that 480.0 parts by weight of Fast Yellow 7413-A (C.I.PY74; made by Sanyo Color Works, Ltd.) having a pigment concentration of 25% by weight was used in place of 480.0 parts by weight of Cyanine Blue G-500 pure-A.

Evaluation Test 1: Valuation Method of Coloration Property on Regular Paper

Solid printing was carried out on Xerox P paper (made by Fuji Xerox) using ink jet inks according to Examples 1 to 16 and Reference Examples 1 to 52 in Example XV and an ink jet printer (EM-930C, made by Seiko Epson Co., Ltd.) to obtain test bodies. A printing mode of paper: regular paper, printing quality: super fine, color correction: none and printing direction: both directions was carried out. The OD (Optical Density) of each of the colors was measured using GRETAG-MACBETH SPECTROSCAN SP 50 (made by Gretag Corp. (US) (measurement condition; light source: D50 and viewing angle: 2 degrees). The results are shown as OD value in Table XV-1.

Evaluation Test 2: Valuation Method of Glossiness

Solid printing was carried out on a photo paper <gloss> (made by Seiko Epson Co., Ltd.) using ink jet inks according to Examples 1 to 16 and Reference Examples 1 to 52 in Example XV and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table XV-1.

Evaluation Test 3: Valuation Method of Dispersibility

In Example XV, the average particle size of particles in the ink jet inks according to Examples 1 to 16 and Reference Examples 1 to 52 was measured by a laser particle diameter analyzer (Zetasizer 3000, made by Malvern Instruments, Ltd. (Britain)). The results are shown in Table XV-1.

Evaluation Test 4: Valuation Method of Storage Stability

In Example XV, the initial viscosity of the pigment dispersion for ink jet ink used for Examples 1 to 16 and Reference Examples 1 to 52 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables XV-1. Monomer compositions, polymerization initiators, pigments and ink jet ink compositions used when producing the ink jet ink are also shown in Table XV-1.

TABLE XV-1

| | Reference Example 1 | Example 1 | Example 2 | Reference Example 2 | Reference Example 3 | Example 3 | Example 4 | Reference Example 4 | Reference Example 5 |
|---|---|---|---|---|---|---|---|---|---|
| Ink composition (Refer to Table 2) | A | A | A | A | A | A | A | A | A |
| BZA | 483.0 | 483.0 | 483.0 | 483.0 | 966.0 | 966.0 | 966.0 | 966.0 | 483.0 |
| AA | 31.0 | 38.8 | 85.3 | 100.8 | 62.0 | 77.5 | 170.5 | 201.5 | 31.0 |
| BPEH | 7.1 | 7.5 | 8.2 | 8.8 | 2.87 | 2.88 | 2.91 | 2.92 | 7.1 |
| PBk7 | — | — | — | — | — | — | — | — | — |
| PB15:1 | 480.0 | 480.0 | 480.0 | 480.0 | 480.0 | 480.0 | 480.0 | 480.0 | 480.0 |
| PV19 | — | — | — | — | — | — | — | — | — |
| PY74 | — | — | — | — | — | — | — | — | — |
| Acid value (mgKOH/g) | 40 | 50 | 110 | 130 | 40 | 50 | 110 | 130 | 40 |
| Weight average molecular weight | 22000 | 22000 | 22000 | 22000 | 115000 | 115000 | 115000 | 115000 | 22000 |
| Glossiness | 53.9 | 61.7 | 62.4 | 37.5 | 60.1 | 60.7 | 61.3 | 48.7 | 23.7 |
| Average particle size (nm) | 105 | 81 | 83 | 95 | 107 | 79 | 81 | 99 | 109 |
| Stability | 6.55 | 1.01 | 0.98 | 2.02 | 11.2 | 1.02 | 1.01 | 3.06 | 1.07 |
| OD | 0.96 | 1.21 | 1.21 | 1.13 | 1.07 | 1.22 | 1.20 | 1.18 | 1.13 |
| Dispersion model | NM | NM | NM | NM | NM | NM | NM | NM | BM |

| | Reference Example 6 | Reference Example 7 | Reference Example 8 | Reference Example 9 | Reference Example 10 | Reference Example 11 | Reference Example 12 | Reference Example 13 | Reference Example 14 |
|---|---|---|---|---|---|---|---|---|---|
| Ink composition (Refer to Table 2) | A | A | A | A | A | A | A | A | A |
| BZA | 483.0 | 483.0 | 483.0 | 966.0 | 966.0 | 966.0 | 966.0 | 483.0 | 483.0 |
| AA | 38.8 | 85.3 | 100.8 | 62.0 | 77.5 | 170.5 | 201.5 | 38.8 | 85.3 |
| BPEH | 7.5 | 8.2 | 8.8 | 2.87 | 2.88 | 2.91 | 2.92 | 7.9 | 8.6 |
| PBk7 | — | — | — | — | — | — | — | — | — |
| PB15:1 | 480.0 | 480.0 | 480.0 | 480.0 | 480.0 | 480.0 | 480.0 | 480.0 | 480.0 |
| PV19 | — | — | — | — | — | — | — | — | — |
| PY74 | — | — | — | — | — | — | — | — | — |
| Acid value (mgKOH/g) | 50 | 110 | 130 | 40 | 50 | 110 | 130 | 50 | 110 |
| Weight average molecular weight | 22000 | 22000 | 22000 | 115000 | 115000 | 115000 | 115000 | 18000 | 18000 |
| Glossiness | 42.2 | 38.4 | 58.9 | 39.0 | 53.1 | 45.2 | 61.0 | 60.3 | 56.1 |
| Average particle size (nm) | 90 | 86 | 111 | 203 | 106 | 81 | 132 | 358 | 109 |
| Stability | 1.45 | 1.02 | 3.88 | 23.2 | 3.55 | 1.08 | 3.56 | 44.8 | 2.03 |
| OD | 1.08 | 1.12 | 0.98 | 1.22 | 1.16 | 1.02 | 0.97 | 1.09 | 0.87 |
| Dispersion model | BM | BM | BM | BM | BM | BM | BM | NM | NM |

| | Reference Example 15 | Reference Example 16 | Reference Example 17 | Example 5 | Example 6 | Reference Example 18 | Reference Example 19 | Example 7 | Example 8 |
|---|---|---|---|---|---|---|---|---|---|
| Ink composition (Refer to Table 2) | A | A | B | B | B | B | B | B | B |
| BZA | 966.0 | 966.0 | 483.0 | 483.0 | 483.0 | 483.0 | 966.0 | 966.0 | 966.0 |
| AA | 77.5 | 170.5 | 31.0 | 38.8 | 85.3 | 100.8 | 62.0 | 77.5 | 170.5 |
| BPEH | 2.86 | 2.89 | 7.1 | 7.5 | 8.2 | 8.8 | 2.87 | 2.88 | 2.91 |
| PBk7 | — | — | 480.0 | 480.0 | 480.0 | 480.0 | 480.0 | 480.0 | 480.0 |
| PB15:1 | 480.0 | 480.0 | — | — | — | — | — | — | — |
| PV19 | — | — | — | — | — | — | — | — | — |
| PY74 | — | — | — | — | — | — | — | — | — |
| Acid value (mgKOH/g) | 50 | 110 | 40 | 50 | 110 | 130 | 40 | 50 | 110 |
| Weight average molecular | 130000 | 130000 | 22000 | 22000 | 22000 | 22000 | 115000 | 115000 | 115000 |

TABLE XV-1-continued

| weight | | | | | | | | | |
|---|---|---|---|---|---|---|---|---|---|
| Glossiness | 49.9 | 57.1 | 38.4 | 61.1 | 60.5 | 61.3 | 33.1 | 59.9 | 60.2 |
| Average particle size (nm) | 144 | 105 | 111 | 85 | 82 | 91 | 118 | 83 | 84 |
| Stability | 34.2 | 16.5 | 14.2 | 0.99 | 1.01 | 3.21 | 1.88 | 1.01 | 1.02 |
| OD | 1.11 | 1.20 | 1.11 | 1.19 | 1.2 | 0.89 | 1.14 | 1.23 | 1.24 |
| Dispersion model | NM | NM | NM | NM | NM | NM | NM | NM | NM |

| | Reference Example 20 | Reference Example 21 | Reference Example 22 | Reference Example 23 | Reference Example 24 | Reference Example 25 | Reference Example 26 | Reference Example 27 | Reference Example 28 |
|---|---|---|---|---|---|---|---|---|---|
| Ink composition (Refer to Table 2) | B | B | B | B | B | B | B | B | B |
| BZA | 966.0 | 483.0 | 483.0 | 483.0 | 483.0 | 966.0 | 966.0 | 966.0 | 966.0 |
| AA | 201.5 | 31.0 | 38.8 | 85.3 | 100.8 | 62.0 | 77.5 | 170.5 | 201.5 |
| BPEH | 2.92 | 7.1 | 7.5 | 8.2 | 8.8 | 2.87 | 2.88 | 2.91 | 2.92 |
| PBk7 | 480.0 | 480.0 | 480.0 | 480.0 | 480.0 | 480.0 | 480.0 | 480.0 | 480.0 |
| PB15:1 | — | — | — | — | — | — | — | — | — |
| PV19 | — | — | — | — | — | — | — | — | — |
| PY74 | — | — | — | — | — | — | — | — | — |
| Acid value (mgKOH/g) | 130 | 40 | 50 | 110 | 130 | 40 | 50 | 110 | 130 |
| Weight average molecular weight | 115000 | 22000 | 22000 | 22000 | 22000 | 115000 | 115000 | 115000 | 115000 |
| Glossiness | 46.6 | 52.2 | 39.6 | 60.1 | 51.9 | 45.6 | 21.9 | 60.1 | 59.8 |
| Average particle size (nm) | 97 | 102 | 135 | 89 | 89 | 96 | 92 | 156 | 108 |
| Stability | 7.08 | 4.30 | 29.0 | 2.33 | 1.98 | 1.87 | 1.09 | 10.9 | 2.22 |
| OD | 0.99 | 1.16 | 1.11 | 0.99 | 1.01 | 1.19 | 1.23 | 1.1 | 1.14 |
| Dispersion model | NM | BM | BM | BM | BM | BM | BM | BM | BM |

| | Reference Example 29 | Example 9 | Example 10 | Reference Example 30 | Reference Example 31 | Example 11 | Example 12 | Reference Example 32 |
|---|---|---|---|---|---|---|---|---|
| Ink composition (Refer to Table 2) | C | C | C | C | C | C | C | C |
| BZA | 483.0 | 483.0 | 483.0 | 483.0 | 966.0 | 966.0 | 966.0 | 966.0 |
| AA | 31.0 | 38.8 | 85.3 | 100.8 | 62.0 | 77.5 | 170.5 | 201.5 |
| BPEH | 7.1 | 7.5 | 8.2 | 8.8 | 2.87 | 2.88 | 2.91 | 2.92 |
| PBk7 | — | — | — | — | — | — | — | — |
| PB15:1 | — | — | — | — | — | — | — | — |
| PV19 | 480.0 | 480.0 | 480.0 | 480.0 | 480.0 | 480.0 | 480.0 | 480.0 |
| PY74 | — | — | — | — | — | — | — | — |
| Acid value (mgKOH/g) | 40 | 50 | 110 | 130 | 40 | 50 | 110 | 130 |
| Weight average molecular weight | 22000 | 22000 | 22000 | 22000 | 115000 | 115000 | 115000 | 115000 |
| Glossiness | 29.7 | 62.2 | 64.9 | 58.4 | 49.1 | 61.5 | 60.7 | 61.2 |
| Average particle size (nm) | 166 | 80 | 79 | 122 | 111 | 79 | 79 | 76 |
| Stability | 1.16 | 1.03 | 1.02 | 6.66 | 3.12 | 1.01 | 1.02 | 2.67 |
| OD | 1.17 | 1.20 | 1.23 | 1.10 | 1.15 | 1.21 | 1.21 | 1.11 |
| Dispersion model | NM | NM | NM | NM | NM | NM | NM | NM |

| | Reference Example 33 | Reference Example 34 | Reference Example 35 | Reference Example 36 | Reference Example 37 | Reference Example 38 | Reference Example 39 | Reference Example 40 |
|---|---|---|---|---|---|---|---|---|
| Ink composition (Refer to Table 2) | C | C | C | C | C | C | C | C |
| BZA | 483.0 | 483.0 | 483.0 | 483.0 | 966.0 | 966.0 | 966.0 | 966.0 |
| AA | 31.0 | 38.8 | 85.3 | 100.8 | 62.0 | 77.5 | 170.5 | 201.5 |
| BPEH | 7.1 | 7.5 | 8.2 | 8.8 | 2.87 | 2.88 | 2.91 | 2.92 |
| PBk7 | — | — | — | — | — | — | — | — |
| PB15:1 | — | — | — | — | — | — | — | — |
| PV19 | 480.0 | 480.0 | 480.0 | 480.0 | 480.0 | 480.0 | 480.0 | 480.0 |
| PY74 | — | — | — | — | — | — | — | — |
| Acid value (mgKOH/g) | 40 | 50 | 110 | 130 | 40 | 50 | 110 | 130 |
| Weight average molecular weight | 22000 | 22000 | 22000 | 22000 | 115000 | 115000 | 115000 | 115000 |
| Glossiness | 59.8 | 47.3 | 50.0 | 33.7 | 57.3 | 39.4 | 46.3 | 56.3 |
| Average particle size (nm) | 99 | 89 | 94 | 120 | 87 | 83 | 76 | 77 |
| Stability | 4.20 | 9.66 | 4.05 | 2.01 | 3.05 | 1.99 | 5.61 | 1.22 |
| OD | 1.00 | 1.19 | 1.17 | 1.06 | 1.13 | 1.19 | 1.20 | 0.85 |
| Dispersion model | BM | BM | BM | BM | BM | BM | BM | BM |

| | Reference Example 41 | Example 13 | Example 14 | Reference Example 42 | Reference Example 43 | Example 15 | Example 16 | Reference Example 44 |
|---|---|---|---|---|---|---|---|---|
| Ink composition (Refer to Table 2) | D | D | D | D | D | D | D | D |
| BZA | 483.0 | 483.0 | 483.0 | 483.0 | 966.0 | 966.0 | 966.0 | 966.0 |
| AA | 31.0 | 38.8 | 85.3 | 100.8 | 62.0 | 77.5 | 170.5 | 201.5 |
| BPEH | 7.1 | 7.5 | 8.2 | 8.8 | 2.87 | 2.88 | 2.91 | 2.92 |

TABLE XV-1-continued

|  | | | | | | | | |
|---|---|---|---|---|---|---|---|---|
| PBk7 | — | — | — | — | — | — | — | — |
| PB15:1 | — | — | — | — | — | — | — | — |
| PV19 | — | — | — | — | — | — | — | — |
| PY74 | 480.0 | 480.0 | 480.0 | 480.0 | 480.0 | 480.0 | 480.0 | 480.0 |
| Acid value (mgKOH/g) | 40 | 50 | 110 | 130 | 40 | 50 | 110 | 130 |
| Weight average molecular weight | 22000 | 22000 | 22000 | 22000 | 115000 | 115000 | 115000 | 115000 |
| Glossiness | 51.6 | 63.5 | 63.1 | 45.9 | 32.0 | 60.9 | 61.4 | 60.3 |
| Average particle size (nm) | 126 | 89 | 88 | 100 | 98 | 88 | 89 | 76 |
| Stability | 3.42 | 1.02 | 1.02 | 1.65 | 2.88 | 1.03 | 1.00 | 2.87 |
| OD | 1.13 | 1.22 | 1.21 | 0.86 | 1.18 | 1.21 | 1.21 | 0.85 |
| Dispersion model | NM | NM | NM | NM | NM | NM | NM | NM |

|  | Reference Example 45 | Reference Example 46 | Reference Example 47 | Reference Example 48 | Reference Example 49 | Reference Example 50 | Reference Example 51 | Reference Example 52 |
|---|---|---|---|---|---|---|---|---|
| Ink composition (Refer to Table 2) | D | D | D | D | D | D | D | D |
| BZA | 483.0 | 483.0 | 483.0 | 483.0 | 966.0 | 966.0 | 966.0 | 966.0 |
| AA | 31.0 | 38.8 | 85.3 | 100.8 | 62.0 | 77.5 | 170.5 | 201.5 |
| BPEH | 7.1 | 7.5 | 8.2 | 8.8 | 2.87 | 2.88 | 2.91 | 2.92 |
| PBk7 | — | — | — | — | — | — | — | — |
| PB15:1 | — | — | — | — | — | — | — | — |
| PV19 | — | — | — | — | — | — | — | — |
| PY74 | 480.0 | 480.0 | 480.0 | 480.0 | 480.0 | 480.0 | 480.0 | 480.0 |
| Acid value (mgKOH/g) | 40 | 50 | 110 | 130 | 40 | 50 | 110 | 130 |
| Weight average molecular weight | 22000 | 22000 | 22000 | 22000 | 115000 | 115000 | 115000 | 115000 |
| Glossiness | 39.2 | 47.1 | 58.6 | 46.3 | 51.6 | 44.6 | 61.5 | 52.1 |
| Average particle size (nm) | 110 | 101 | 95 | 98 | 97 | 115 | 102 | 98 |
| Stability | 2.10 | 3.41 | 14.8 | 1.82 | 22.8 | 3.64 | 1.33 | 1.13 |
| OD | 1.11 | 1.22 | 1.15 | 1.01 | 1.18 | 1.20 | 0.99 | 1.03 |
| Dispersion model | BM | BM | BM | BM | BM | BM | BM | BM |

TABLE XV-2

|  | Composition Example | | | |
|---|---|---|---|---|
|  | A | B | C | D |
| PB15:1 | 4 | — | — | — |
| PBk7 | — | 5 | — | — |
| PV19 | — | — | 5 | — |
| PY74 | — | — | — | 5 |
| DEGmBE | 0.2 | — | 0.3 | — |
| TEGmBE | 1 | 3 | 1 | 1 |
| PGmBE | — | — | — | 0.1 |
| DPGmBE | 0.1 | — | — | — |
| BEPD | 0.7 | 0.7 | 0.7 | 0.7 |
| 1,2-HD | 4 | 3 | 4 | 4 |
| Glycerin | 15 | 10 | 10 | 10 |
| TMP | 7 | 4 | 5 | 5 |
| OlfineE1010 | 0.1 | 0.1 | — | — |
| Surfynol104 | 0.15 | 0.15 | 0.15 | 0.15 |
| EDTA 2.0% solution | 1 | 1 | 1 | 1 |
| Ion exchanged water | Residual quantity | Residual quantity | Residual quantity | Residual quantity |

The brevity codes used in Table XV-1 to 2 are explained as follows.
BZA: benzyl acrylate
AA: acrylic acid
BPEH: t-butylperoxy(2-ethylhexanoate)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane
EDTA: ethylenediamine tetraacetic acid/2Na
NM: Nanomizer (Nanomizer Co., Ltd.)
BM: beads mill (Ashizawa Finetec Co., Ltd.)

As is clear from the results of Table XV-1 and Table XV-2, the evaluation tests 1 to 5 showed excellent results when the ink jet inks according to Examples 1 to 16 in Example VI were used. However, when the ink jet inks according to the Reference Examples 1 to 52, excellent results were not shown in any one or a plurality of items of the revaluation tests 1 to 5.

Example XVI

Example XVI-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 363.0 parts by weight of benzil acrylate, 120 parts by weight of styrene, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the obtained polymer was 65 mgKOH/g, and the weight average molecular weight thereof was 33000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Blue G-500 pure-A (C.I.PB15:1; made by Sanyo Color Works, Ltd.) was added into the solution, and the resultant solution was stirred by the high speed disper for 1 hour to obtain pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 5.0 μm. Then, an ink for ink jet of ink composition 1 shown in Table XVI-2 was produced.

Example XVI-2

An ink of composition example 2 shown in Table XVI-2 was produced in the same manner as in Example 1, except that 13.2 parts of methacrylic acid and 36.5 parts by weight of acrylic acid were used in place of 50.4 parts by weight of acrylic acid, and 80 parts of styrene and 40 parts of styrene macro monomer AS-6S (made by Toagosei, Inc.) were used in place of 120 parts of styrene. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 31000.

Example XVI-3

An ink of composition example 3 shown in Table XVI-2 was produced in the same manner as in Example 1, except that 42.6 parts by weight of acrylic acid were used in place of 50.4 parts by weight of acrylic acid, and 80 parts of styrene and 40 parts of styrene macro monomer AS-6S (made by Toagosei, Inc.) were used in place of 120 parts of styrene. After taking a part of the polymer composition solution and drying the polymer composition solution in an ignition drier of 105° C. for 1 hour, the acid value of the obtained polymer of the ink for ink jet recording was 55 mgKOH/g, and the weight average molecular weight thereof was 45000.

Example XVI-4

An ink of composition example 4 shown in Table XVI-2 was produced in the same manner as in Example 1, except that 77.5 parts by weight of acrylic acid were used in place of 50.4 parts by weight of acrylic acid, and 80 parts of styrene and 40 parts of styrene macro monomer AS-6S (made by Toagosei, Inc.) were used in place of 120 parts of styrene. After taking a part of the polymer composition solution and drying the polymer composition solution in an ignition drier of 105° C. for 1 hour, the acid value of the obtained polymer of the ink for ink jet recording was 100 mgKOH/g, and the weight average molecular weight thereof was 27000.

Example XVI-5

An ink of composition example 5 shown in Table XVI-2 was produced in the same manner as in Example 1, except that 93.0 parts by weight of acrylic acid were used in place of 50.4 parts by weight of acrylic acid, and 80 parts of styrene and 40 parts of styrene macro monomer AS-6S (made by Toagosei, Inc.) were used in place of 120 parts of styrene. After taking a part of the polymer composition solution and drying the polymer composition solution in an ignition drier of 105° C. for 1 hour, the acid value of the obtained polymer of the ink for ink jet recording was 120 mgKOH/g, and the weight average molecular weight thereof was 33000.

Example XVI-6

An ink of composition example 13 shown in Table XVI-2 was produced in the same manner as in Example 1, except that Monarch 880 (C.I.PBk7: made by Cabot Corp.) was used in place of 480.0 parts by weight of Cyanine Blue G-500 pure-A having a pigment concentration of 25% by weight. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 32000.

Example XVI-7

An ink of composition example 14 shown in Table XVI-2 was produced in the same manner as in Example 2, except that Monarch 880 (C.I.PBk7: made by Cabot Corp.) was used in place of 480.0 parts by weight of Cyanine Blue G-500 pure-A having a pigment concentration of 25% by weight. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 30000.

Example XVI-8

An ink of composition example 19 shown in Table XVI-2 was produced in the same manner as in Example 1, except that 120 parts by weight of Pigment Violet GC227-A was used in place of 120.0 parts by weight of Cyanine Blue G-500 pure-A having a pigment concentration of 25% by weight. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 32000.

Example XVI-9

An ink of composition example 20 shown in Table XVI-2 was produced in the same manner as in Example 2, except that 120 parts by weight of Pigment Violet GC227-A was used in place of 120.0 parts by weight of Cyanine Blue G-500 pure-A having a pigment concentration of 25% by weight. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 32000.

Example XVI-10

An ink of composition example 25 shown in Table XVI-2 was produced in the same manner as in Example 1, except that 120 parts by weight of Fast Yellow 7413-A (C.I.PY74; made by Sanyo Color Works, Ltd.) was used in place of 120.0 parts by weight of Cyanine Blue G-500 pure-A having a pigment concentration of 25% by weight. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 33000.

Example XVI-11

An ink of composition example 26 shown in Table XVI-2 was produced in the same manner as in Example 2, except that 120 parts by weight of Fast Yellow 7413-A (C.I.PY74; made by Sanyo Color Works, Ltd.) was used in place of 120.0 parts by weight of Cyanine Blue G-500 pure-A having a pigment concentration of 25% by weight. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 31000.

Reference Example XVI-1

An ink of composition example 6 shown in Table XVI-2 was produced in the same manner as in Example 1, except that 483.0 parts by weight of benzyl acrylate was used in place of 363.0 parts by weight of benzyl acrylate and 120 parts of styrene. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 27000.

Reference Example XVI-2

An ink of composition example 7 shown in Table XVI-2 was produced in the same manner as in Example 1, except that 116.3 parts by weight of acrylic acid was used in place of 50.4 parts by weight of acrylic acid. After taking a part of the polymer composition solution and drying the polymer composition solution in an ignition drier of 105° C. for 1 hour, the acid value of the obtained polymer of the ink for ink jet recording was 150 mgKOH/g, and the weight average molecular weight thereof was 32000.

Reference Example XVI-3

An ink of composition example 8 shown in Table XVI-2 was produced in the same manner as in Example 1, except that 155.0 parts by weight of acrylic acid was used in place of 50.4 parts by weight of acrylic acid. After taking a part of the polymer composition solution and drying the polymer composition solution in an ignition drier of 105° C. for 1 hour, the acid value of the obtained polymer of the ink for ink jet recording was 200 mgKOH/g, and the weight average molecular weight thereof was 27000.

Reference Example XVI-4

An ink of composition example 9 shown in Table XVI-2 was produced in the same manner as in Example 1, except that 20.0 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 10000.

Reference Example XVI-5

An ink of composition example 10 shown in Table XVI-2 was produced in the same manner as in Example 2, except that 15.0 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 17000.

Reference Example XVI-6

An ink of composition example 11 shown in Table XVI-2 was produced in the same manner as in Example 1, except that 3.1 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 120000.

Reference Example XVI-7

An ink of composition example 12 shown in Table XVI-2 was produced in the same manner as in Example 1, except that 23.3 parts by weight of acrylic acid were used in place of 50.4 parts by weight of acrylic acid, and 80 parts of styrene and 40 parts of styrene macro monomer AS-6S (made by Toagosei, Inc.) were used in place of 120 parts of styrene. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 32000.

Reference Example XVI-8

An ink of composition example 15 shown in Table XVI-2 was produced in the same manner as in Reference Example 1, except that 480.0 parts by weight of Monarch 800 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 130 mgKOH/g, and the weight average molecular weight thereof was 27000.

Reference Example XVI-9

An ink of composition example 16 shown in Table XVI-2 was produced in the same manner as in Reference Example 5, except that 480.0 parts by weight of Monarch 800 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 17000.

Reference Example XVI-10

An ink of composition example 17 shown in Table XVI-2 was produced in the same manner as in Reference Example 6, except that 480.0 parts by weight of Monarch 800 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 120000.

Reference Example XVI-11

An ink of composition example 18 shown in Table XVI-2 was produced in the same manner as in Reference Example 7, except that 480.0 parts by weight of Monarch 800 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 32000.

Reference Example XVI-12

An ink of composition example 21 shown in Table XVI-2 was produced in the same manner as in Reference Example 1, except that 480.0 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 130 mgKOH/g, and the weight average molecular weight thereof was 27000.

Reference Example XVI-13

An ink of composition example 22 shown in Table XVI-2 was produced in the same manner as in Reference Example 5, except that 480.0 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 16000.

Reference Example XVI-14

An ink of composition example 23 shown in Table XVI-2 was produced in the same manner as in Reference Example 6, except that 480.0 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 120000.

Reference Example XVI-15

An ink of composition example 24 shown in Table XVI-2 was produced in the same manner as in Reference Example 7, except that 480.0 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 32000.

Reference Example XVI-16

An ink of composition example 27 shown in Table XVI-2 was produced in the same manner as in Reference Example 1, except that 480.0 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 130 mgKOH/g, and the weight average molecular weight thereof was 27000.

Reference Example XVI-17

An ink of composition example 28 shown in Table XVI-2 was produced in the same manner as in Reference Example 5, except that 480.0 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 17000.

Reference Example XVI-18

An ink of composition example 29 shown in Table XVI-2 was produced in the same manner as in Reference Example 6, except that 480.0 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 120000.

Reference Example XVI-19

An ink of composition example 30 shown in Table XVI-2 was produced in the same manner as in Reference Example 7, except that 480.0 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 31000.

(Evaluation Test 1: Valuation Method of Friction Resistance)

Solid printing was carried out on a photo paper <gloss> (made by Seiko Epson Co., Ltd.) using inks for ink jet recording according to examples XVI-1 to 11 and Reference Examples XVI-1 to 19 and an ink jet printer (EM-930C, made by Seiko Epson Co., Ltd.) to obtain test bodies. A printing mode of paper: photo printing paper, printing quality: photo, color correction: none and printing direction: both directions was carried out. A fixing property evaluation test was then carried out, in which the test body is rubbed by a line marker applying a load of 300 g to the test body. The fixing property evaluation test was carried out by using the above test body (photo paper <gloss>) and observing the exfoliation situation of ink when a printed surface and a rear surface were overlapped with a load of 300 g and moved at a speed of 1 m/s. In Table XIV-2, S indicates that there was no rub-off when the photo paper was moved 3 times, AA indicates that there was no rub-off even when the photo paper was moved 2 times, but there was slight rub-off when the photo paper was moved 3 times, A indicates that there was no rub-off in 1 time, but there was slight rub-off when the photo paper was moved 2 times, B indicates that there was slight rub-off, C indicates that there was rub-off and transfer onto the rear surface, and D indicates that there was considerable rub-off and transfer onto the rear surface.

Evaluation Test 2: Valuation Method of Coloration Property on Regular Paper

Solid printing was carried out on Xerox P paper (made by Fuji Xerox) using ink jet inks according to Examples 1 to 11 and Reference Examples 1 to 19 in Example XVI and an ink jet printer (EM-930C, made by Seiko Epson Co., Ltd.) to obtain test bodies. A printing mode of paper: regular paper, printing quality: super fine, color correction: none and printing direction: both directions was carried out. The OD (Optical Density) of each of the colors was measured using GRETAGMACBETH SPECTROSCAN SP 50 (made by Gretag Corp. (US) (measurement condition; light source: D50 and viewing angle: 2 degrees). The results are shown as OD value in Table XVI-1.

Evaluation Test 3: Valuation Method of Glossiness

Solid printing was carried out on a photo paper <gloss> (made by Seiko Epson Co., Ltd.) using ink jet inks according to Examples 1 to 11 and Reference Examples 1 to 19 in Example XVI and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table XVI-1.

Evaluation Test 4: Valuation Method of Dispersibility

In Example XVI, the average particle size of particles in the ink jet inks according to Examples 1 to 11 and Reference Examples 1 to 19 was measured by a laser particle diameter analyzer (Zetasizer 3000, made by Malvern Instruments, Ltd. (Britain)).

Evaluation Test 4: Valuation Method of Storage Stability

In Example XVI, the initial viscosity of the pigment dispersion for ink jet ink used for Examples 1 to 11 and Reference Examples 1 to 19 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables XVI-1. Monomer compositions, polymerization initiators, pigments and ink jet ink compositions used when producing the ink jet ink are also shown in Table XVI-1.

TABLE XVI-1

| | Example 1 | Example 2 | Example 3 | Example 4 | Example 5 | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|---|---|---|---|---|
| BZA | 363.0 | 363.0 | 363.0 | 363.0 | 363.0 | 483.0 | 363.0 | 363.0 | 363.0 | 363.0 | 363.0 | 363.0 | 483.0 |
| AA | 50.4 | 36.5 | 42.6 | 77.5 | 93.0 | 100.8 | 116.3 | 155.0 | 50.4 | 36.5 | 50.4 | 36.5 | 100.8 |
| MAA | — | 13.2 | — | — | — | — | — | — | — | 13.2 | — | 13.2 | — |
| BPEH | 5.6 | 5.6 | 5.6 | 5.6 | 5.6 | 5.6 | 5.6 | 5.6 | 20.0 | 15.0 | 3.1 | 5.6 | 5.6 |
| ST | 120.0 | 80.0 | 120.0 | 120.0 | 120.0 | — | 120.0 | 120.0 | 120.0 | 120.0 | 120.0 | 80.0 | 80.0 |
| STM | — | 40.0 | — | — | — | — | — | — | — | — | — | 40.0 | 40.0 |
| PBk7 | — | — | — | — | — | — | — | — | — | — | — | — | — |
| PB15:1 | 480.0 | 480.0 | 480.0 | 480.0 | 480.0 | 480.0 | 480.0 | 480.0 | 480.0 | 480.0 | 480.0 | 480.0 | 480.0 |
| Acid value (mgKOH/g) | 65 | 60 | 55 | 100 | 120 | 65 | 150 | 200 | 65 | 60 | 65 | 60 | 130 |
| Average molecular weight | 33000 | 31000 | 45000 | 27000 | 33000 | 27000 | 32000 | 27000 | 10000 | 17000 | 120000 | 30000 | 27000 |
| Fixation property | S | AA | AA | S | S | AA | AA | B | D | C | D | A | B |
| OD | 1.21 | 1.20 | 1.20 | 1.17 | 1.15 | 1.20 | 0.95 | 0.91 | 1.13 | 1.13 | 1.12 | 1.35 | 1.08 |
| Glossiness | 75.2 | 74.3 | 78.0 | 79.2 | 76.6 | 71.9 | 71.4 | 74.2 | 51.1 | 46.6 | 25.4 | 49.8 | 49.1 |
| Average particle size (nm) | 72 | 73 | 73 | 74 | 70 | 70 | 79 | 100 | 106 | 102 | 128 | 100 | 117 |
| Stability | 1.00 | 1.06 | 1.05 | 1.04 | 1.06 | 1.03 | 2.21 | 2.51 | 98.20 | 54.60 | 18.10 | 1.00 | 1.36 |

| | Reference Example 9 | Reference Example 10 | Reference Example 11 | Example 8 | Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
|---|---|---|---|---|---|---|---|---|---|---|---|---|---|---|---|
| BZA | 363.0 | 363.0 | 363.0 | 363.0 | 363.0 | 363.0 | 363.0 | 363.0 | 363.0 | 363.0 | 363.0 | 363.0 | 363.0 | 363.0 | 363.0 |
| AA | 36.5 | 50.4 | 23.3 | 50.4 | 36.5 | 100.8 | 36.5 | 50.4 | 23.3 | 50.4 | 36.5 | 100.8 | 36.5 | 50.4 | 23.3 |
| MAA | 13.2 | — | — | — | 13.2 | — | 13.2 | — | — | — | 13.2 | — | 13.2 | — | — |
| BPEH | 15.0 | 3.1 | 5.6 | 5.6 | 5.6 | 5.6 | 15.0 | 3.1 | 5.6 | 5.6 | 5.6 | 5.6 | 15.0 | 3.1 | 5.6 |
| ST | 120.0 | 120.0 | 120.0 | 120.0 | 80.0 | 120.0 | 120.0 | 120.0 | 80.0 | 120.0 | 80.0 | 120.0 | 120.0 | 120.0 | 80.0 |
| STM | — | — | — | — | 40.0 | — | — | — | 40.0 | — | 40.0 | — | — | — | 40.0 |
| PBk7 | 480.0 | 480.0 | 480.0 | — | — | — | — | — | — | — | — | — | — | — | — |
| PB15:1 | — | — | — | 480.0 | 480.0 | 480.0 | — | — | — | — | — | — | — | — | — |
| PV19 | — | — | — | — | — | — | 480.0 | 480.0 | 480.0 | — | — | — | — | — | — |
| PY74 | — | — | — | — | — | — | — | — | — | 480.0 | 480.0 | 480.0 | 480.0 | 480.0 | 480.0 |
| Acid value (mgKOH/g) | 60 | 65 | 30 | 65 | 60 | 130 | 60 | 65 | 30 | 65 | 60 | 130 | 60 | 65 | 30 |
| Average molecular weight | 17000 | 120000 | 32000 | 32000 | 31000 | 27000 | 16000 | 120000 | 32000 | 33000 | 31000 | 27000 | 17000 | 120000 | 31000 |
| Fixation property | C | D | B | S | S | B | C | D | B | S | S | B | C | D | B |
| OD | 1.32 | 1.13 | 1.06 | 1.21 | 1.22 | 1.00 | 1.14 | 1.05 | 1.07 | 1.26 | 1.22 | 1.04 | 1.15 | 1.12 | 1.06 |
| Glossiness | 35.6 | 27.6 | 49.3 | 75.3 | 71.8 | 76.2 | 69.1 | 37.3 | 29.1 | 76.5 | 77.6 | 76.4 | 46.1 | 37.0 | 28.0 |
| Average particle size (nm) | 146 | 172 | 151 | 71 | 75 | 76 | 98 | 130 | 136 | 92 | 98 | 94 | 136 | 142 | 158 |
| Stability | 25.60 | 19.80 | 242.60 | 1.01 | 1.02 | 1.06 | 42.80 | 43.60 | 156.80 | 1.02 | 1.01 | 1.00 | 30.20 | 42.10 | 98.20 |

TABLE XVI-2

Composition example (1–15)

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | Example 1 | Reference Example 10 | Reference Example 11 | Example 4 | Example 5 | Reference Example 1 | Reference Example 2 | Reference Example 3 | Reference Example 4 | Reference Example 5 | Reference Example 6 | Reference Example 7 | Reference Example 6 | Reference Example 7 | Reference Example 8 |
| PB15:1 | 4 | 4 | 4 | 4 | 4 | 4 | 4 | 4 | 4 | 4 | 4 | 4 | — | — | — |
| PBk7 | — | — | — | — | — | — | — | — | — | — | — | — | 5 | 5 | 5 |
| PV19 | — | — | — | — | — | — | — | — | — | — | — | — | — | — | — |
| PY74 | — | — | — | — | — | — | — | — | — | — | — | — | — | — | — |
| DEGmBE | 0.2 | 0.2 | 0.2 | 0.2 | 0.2 | 0.2 | 0.2 | 0.2 | 0.2 | 0.2 | 0.2 | 0.2 | — | — | — |
| TEGmBE | 1 | 1 | 1 | 1 | 1 | 1 | 1 | 1 | 1 | 1 | 1 | 1 | — | — | — |
| PGmBE | — | — | — | — | 0.1 | — | — | — | — | — | — | — | 2 | 3 | 4 |
| DPGmBE | — | — | — | — | — | — | — | — | — | — | — | — | — | — | — |
| BEPD | 0.1 | 0.1 | 0.1 | 0.1 | 0.1 | 0.1 | 0.1 | 0.1 | 0.1 | 0.1 | 0.1 | 0.1 | 0.7 | 0.7 | 0.7 |
| 1,2-HD | 0.7 | 0.7 | 0.7 | 0.7 | 0.7 | 0.7 | 0.7 | 0.7 | 0.7 | 0.7 | 0.7 | 0.7 | 3 | 3 | 3 |
| Glycerin | 4 | 4 | 4 | 4 | 4 | 4 | 4 | 4 | 4 | 4 | 4 | 4 | 10 | 10 | 10 |
| TMP | 15 | 15 | 15 | 15 | 15 | 15 | 15 | 15 | 15 | 15 | 15 | 15 | 4 | 4 | 4 |
| Olfin E1010 | 7 | 7 | 7 | 7 | 7 | 7 | 7 | 7 | 7 | 7 | 7 | 7 | 0.1 | 0.1 | 0.1 |
| Surfinol 104 | 0.1 | 0.1 | 0.1 | 0.1 | 0.1 | 0.1 | 0.1 | 0.1 | 0.1 | 0.1 | 0.1 | 0.1 | 0.15 | 0.15 | 0.15 |
| Ion exchange water | 0.15 / Residual quantity | 0.15 / Residual quantity | 0.15 / Residual quantity | 0.15 / Residual quantity | 0.15 / Residual quantity | 0.15 / Residual quantity | 0.15 / Residual quantity | 0.15 / Residual quantity | 0.15 / Residual quantity | 0.15 / Residual quantity | 0.15 / Residual quantity | 0.15 / Residual quantity | Residual quantity | Residual quantity | Residual quantity |

Composition example (16–30)

| | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| | Reference Example 9 | Reference Example 10 | Reference Example 11 | Example 8 | Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
| PB15:1 | 5 | — | — | — | — | — | — | — | — | — | — | — | — | — | — |
| PBk7 | — | 5 | 5 | 5 | 5 | 5 | 5 | 5 | 5 | 5 | 5 | 5 | 5 | 5 | 5 |
| PV19 | — | — | — | — | — | — | — | — | — | — | — | — | — | — | — |
| PY74 | — | — | — | — | — | — | — | — | — | — | — | — | — | — | — |
| DEGmBE | — | — | — | 0.3 | 0.3 | 0.3 | 0.3 | 0.3 | 0.3 | — | — | — | — | — | — |
| TEGmBE | — | — | 6 | 1 | 1 | 1 | 1 | 1 | 1 | 1 | 1 | 1 | 1 | 1 | 1 |
| PGmBE | — | — | — | — | 0.1 | — | — | — | — | — | — | — | — | — | — |
| DPGmBE | 4 | 5 | — | — | — | — | — | — | — | — | — | — | — | — | — |
| BEPD | 0.7 | 0.7 | 0.7 | 0.7 | 0.7 | 0.7 | 0.7 | 0.7 | 0.7 | 0.1 | 0.1 | 0.1 | 0.1 | 0.1 | 0.1 |
| 1,2-HD | 3 | 3 | 3 | 4 | 4 | 4 | 4 | 4 | 4 | 0.7 | 0.7 | 0.7 | 0.7 | 0.7 | 0.7 |
| Glycerin | 10 | 10 | 10 | 10 | 10 | 10 | 10 | 10 | 10 | 4 | 4 | 4 | 4 | 4 | 4 |
| TMP | 4 | 4 | 4 | 5 | 5 | 5 | 5 | 5 | 5 | 10 | 10 | 10 | 10 | 10 | 10 |
| Olfin E1010 | 0.1 | 0.1 | 0.1 | — | — | — | — | — | — | 5 | 5 | 5 | 5 | 5 | 5 |
| Surfinol 104 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Ion exchange water | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity |

The brevity codes used in Table XVI-1 to 2 are explained as follows.
BZA: benzyl acrylate
AA: acrylic acid
MAA: methacrylic acid
BPEH: t-butylperoxy(2-ethylhexanoate)
ST: styrene
STM: styrene macro monomer AS-6S (made by Toagosei, Inc.)
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
EDTA: ethylenediamine tetraacetic acid/2Na
1,2-HD: 1,2-hexanediol
TMP: trimethylolpropane As is clear from the results of Table XVI-1 and Table XVI-2, the evaluation tests 1 to 5 showed excellent results when the ink jet inks according to Examples 1 to 11 in Example XVI were used. However, when the ink jet inks according to the Reference Examples 1 to 19, excellent results were not shown in any one or a plurality of items of the revaluation tests 1 to 5.

Example XVII

Example XVII-1

After carrying out nitrogen replacement of the interior of a separable flask of 2000 ml equipped with a stirrer, a reflux tube, a thermometer and a dripping funnel, 200.0 parts by weight of diethylene glycol monomethyl ether was placed in the separable flask and heated to 80° C. while being stirred. Then, 200.0 parts by weight of diethylene glycol monomethyl ether, 363.0 parts by weight of benzil acrylate, 120 parts by weight of lauryl acrylate, 50.4 parts by weight of acrylic acid, and 4.8 parts by weight of t-butylperoxy(2-ethylhexanoate) were placed in the dripping funnel, and the resultant solution was dripped into the separable flask over a period of 4 hours at 80° C. to carry out a reaction. After the completion of the dripping, the separable flask was held at 80° C. for 1 hour, and 0.8 parts by weight of t-butylperoxy(2-ethylhexanoate) was then added into the separable flask. Furthermore, the reaction was carried out at 80° C. for 1 hour. The diethylene glycol monomethyl ether was then removed by reduced-pressure distillation. 600.0 parts by weight of methyl ethyl ketone was added to obtain a polymer composition solution having a resin solid content of 50%. After taking a part of the thus obtained polymer composition solution and drying the polymer composition solution in an ignition drier of 105° C. for 1 hour, the acid value of the obtained polymer was 65 mgKOH/g, and the weight average molecular weight thereof was 33000.

3.0 parts by weight of a 30% sodium hydroxide solution was then added into 120.0 parts by weight of the polymer composition solution thus produced, and the resultant solution was stirred by a high speed disper for 5 minutes. Furthermore, 480.0 parts by weight of Cyanine Blue G-500 pure-A (C.I.PB15:1; made by Sanyo Color Works, Ltd.) was added into the solution, and the solution was stirred by the high speed disper for 1 hour to obtain a pigment dispersion slurry. The pigment dispersion slurry was repeatedly dispersed for 10 passes at 200 MPa by an ultrahigh pressure homogenizer (Microfluidizer, made by Mizuho Industrial Co., Ltd.) to obtain pigment dispersion.

After a part of methyl ethyl ketone and water was removed from the thus obtained pigment dispersion by reduced-pressure distillation using an evaporator, and the pigment dispersion was centrifugally separated in a centrifugal separator (05P-21, made by Hitachi Ltd.) at 5000 rpm for 30 minutes, the pigment dispersion was adjusted by adding ion exchanged water so that the pigment concentration was set to 15% by weight. A pressure filtration was carried out using a membrane filter (made by Advantec Co., Ltd.) of 5.0 μm. Then, an ink for ink jet recording of ink composition 1 shown in Table XVII-2 was produced.

Example XVII-2

An ink of composition example 2 shown in Table XVII-2 was produced in the same manner as in Example 1, except that 13.2 parts of methacrylic acid and 36.5 parts by weight of acrylic acid were used in place of 50.4 parts by weight of acrylic acid, and 120 parts of polyethylene glycol 200 acrylate (PEG200 acrylate) was used in place of 120 parts of lauryl acrylate. After taking a part of the polymer composition solution and drying the polymer composition solution in an ignition drier of 105° C. for 1 hour, the acid value of the obtained polymer composition was 60 mgKOH/g, and the weight average molecular weight thereof was 31000.

Example XVII-3

An ink of composition example 3 shown in Table XVII-2 was produced in the same manner as in Example 1, except that 42.6 parts by weight of acrylic acid was used in place of 50.4 parts by weight of acrylic acid, and 120 parts of polyethylene glycol 200 acrylate (PEG200 acrylate) was used in place of 120 parts of lauryl acrylate. After taking a part of the polymer composition solution and drying the polymer composition solution in an ignition drier of 105° C. for 1 hour, the acid value of the obtained polymer composition was 55 mgKOH/g, and the weight average molecular weight thereof was 45000.

Example XVII-4

An ink of composition example 4 shown in Table XVII-2 was produced in the same manner as in Example 1, except that 77.5 parts by weight of acrylic acid was used in place of 50.4 parts by weight of acrylic acid, and 120 parts of polyethylene glycol 200 acrylate (PEG200 acrylate) was used in place of 120 parts of lauryl acrylate. After taking a part of the polymer composition solution and drying the polymer composition solution in an ignition drier of 105° C. for 1 hour, the acid value of the obtained polymer composition was 100 mgKOH/g, and the weight average molecular weight thereof was 27000.

Example XVII-5

An ink of composition example 5 shown in Table XVII-2 was produced in the same manner as in Example 1, except that 93.0 parts by weight of acrylic acid was used in place of 50.4 parts by weight of acrylic acid, and 120 parts of polyethylene glycol 200 acrylate (PEG200 acrylate) was used in place of 120 parts of lauryl acrylate. After taking a part of the polymer composition solution and drying the polymer composition solution in an ignition drier of 105° C. for 1 hour, the acid value of the obtained polymer composition was 120 mgKOH/g, and the weight average molecular weight thereof was 32000.

Example XVII-6

An ink of composition example 13 shown in Table XVII-2 was produced in the same manner as in Example 1, except that 480.0 parts by weight of Monarch 880 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 32000.

Example XVII-7

An ink of composition example 14 shown in Table XVII-2 was produced in the same manner as in Example 2, except that Monarch 880 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 30000.

Example XVII-8

An ink of composition example 19 shown in Table XVII-2 was produced in the same manner as in Example 1, except that 120.0 parts by weight of Pigment Violet GC227-A was used in place of 120.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 32000.

Example XVII-9

An ink of composition example 20 shown in Table XVII-2 was produced in the same manner as in Example 2, except that 120.0 parts by weight of Pigment Violet GC227-A was used in place of 120.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 31000.

Example XVII-10

An ink of composition example 25 shown in Table XVII-2 was produced in the same manner as in Example 1, except that 120.0 parts by weight of Fast Yellow 7413-A (C.I.PY74; made by Sanyo Color Works, Ltd.) was used in place of 120.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 33000.

Example XVII-11

An ink of composition example 26 shown in Table XVII-2 was produced in the same manner as in Example 2, except that 120.0 parts by weight of Fast Yellow 7413-A (C.I.PY74; made by Sanyo Color Works, Ltd.) was used in place of 120.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 31000.

Reference Example XVII-1

An ink of composition example 6 shown in Table XVII-2 was produced in the same manner as in Example 1, except that 483.0 parts by weight of benzyl acrylate was used in place of 363.0 parts by weight of benzyl acrylate and 120 parts by weight of lauryl acrylate. After taking a part of the polymer composition solution and drying the polymer composition solution in an ignition drier of 105° C. for 1 hour, the acid value of the obtained polymer composition was 65 mgKOH/g, and the weight average molecular weight thereof was 27000.

Reference Example XVII-2

An ink of composition example 7 shown in Table XVII-2 was produced in the same manner as in Example 1, except that 116.3 parts by weight of acrylic acid was used in place of 50.4 parts by weight of acrylic acid. After taking a part of the polymer composition solution and drying the polymer composition solution in an ignition drier of 105° C. for 1 hour, the acid value of the obtained polymer composition was 150 mgKOH/g, and the weight average molecular weight thereof was 32000.

Reference Example XVII-3

An ink of composition example 8 shown in Table XVII-2 was produced in the same manner as in Example 1, except that 155.0 parts by weight of acrylic acid was used in place of 50.4 parts by weight of acrylic acid. After taking a part of the polymer composition solution and drying the polymer composition solution in an ignition drier of 105° C. for 1 hour, the acid value of the obtained polymer composition was 200 mgKOH/g, and the weight average molecular weight thereof was 27000.

Reference Example XVII-4

An ink of composition example 9 shown in Table XVII-2 was produced in the same manner as in Example 1, except that 20.0 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer composition was 65 mgKOH/g, and the weight average molecular weight thereof was 10000.

Reference Example XVII-5

An ink of composition example 10 shown in Table XVII-2 was produced in the same manner as in Example 1, except that 15.0 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer composition was 60 mgKOH/g, and the weight average molecular weight thereof was 17000.

Reference Example XVII-6

An ink of composition example 11 shown in Table XVII-2 was produced in the same manner as in Example 1, except that 3.10 parts by weight of t-butylperoxy(2-ethylhexanoate) was used in place of 4.8 parts by weight of t-butylperoxy(2-ethylhexanoate). After taking a part of the polymer composition solution and drying the polymer composition solution in an ignition drier of 105° C. for 1 hour, the acid value of the obtained polymer composition was 65 mgKOH/g, and the weight average molecular weight thereof was 120000.

Reference Example XVII-7

An ink of composition example 12 shown in Table XVII-2 was produced in the same manner as in Example 1, except that 23.3 parts by weight of acrylic acid were used in place of 50.4 parts by weight of acrylic acid, and 120 parts of polyethylene glycol 200 acrylate (PEG200 acrylate) was used in place of 120 parts of lauryl acrylate. After taking a part of the polymer composition solution and drying the polymer composition solution in an ignition drier of 105° C. for 1 hour, the acid value of the obtained polymer composition was 30 mgKOH/g, and the weight average molecular weight thereof was 32000.

Reference Example XVII-8

An ink of composition example 15 shown in Table XVII-2 was produced in the same manner as in Reference Example 1, except that 480 parts by weight of Monarch 880 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 130 mgKOH/g, and the weight average molecular weight thereof was 27000.

Reference Example XVII-9

An ink of composition example 16 shown in Table XVII-2 was produced in the same manner as in Reference Example 5, except that 480 parts by weight of Monarch 880 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 17000.

Reference Example XVII-10

An ink of composition example 17 shown in Table XVII-2 was produced in the same manner as in Reference Example 6, except that 480 parts by weight of Monarch 880 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 120000.

Reference Example XVII-11

An ink of composition example 18 shown in Table XVII-2 was produced in the same manner as in Reference Example 7, except that 480 parts by weight of Monarch 880 (C.I.PBk7: made by Cabot Corp.) was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 32000.

Reference Example XVII-12

An ink of composition example 21 shown in Table XVII-2 was produced in the same manner as in Reference Example 1, except that 480 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 130 mgKOH/g, and the weight average molecular weight thereof was 27000.

Reference Example XVII-13

An ink of composition example 22 shown in Table XVII-2 was produced in the same manner as in Reference Example 5, except that 480 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 16000.

Reference Example XVII-14

An ink of composition example 23 shown in Table XVII-2 was produced in the same manner as in Reference Example 6, except that 480 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 120000.

Reference Example XVII-15

An ink of composition example 24 shown in Table XVII-2 was produced in the same manner as in Reference Example 7, except that 480 parts by weight of Pigment Violet GC227-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 32000.

Reference Example XVII-16

An ink of composition example 27 shown in Table XVII-2 was produced in the same manner as in Reference Example 1, except that 480 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 130 mgKOH/g, and the weight average molecular weight thereof was 27000.

Reference Example XVII-17

An ink of composition example 28 shown in Table XVII-2 was produced in the same manner as in Reference Example 5, except that 480 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 60 mgKOH/g, and the weight average molecular weight thereof was 17000.

Reference Example XVII-18

An ink of composition example 29 shown in Table XVII-2 was produced in the same manner as in Reference Example 6, except that 480 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 65 mgKOH/g, and the weight average molecular weight thereof was 120000.

Reference Example XVII-19

An ink of composition example 30 shown in Table XVII-2 was produced in the same manner as in Reference Example 7, except that 480 parts by weight of Fast Yellow 7413-A was used in place of 480.0 parts by weight of Cyanine Blue G-500 pure-A. After taking a part of the polymer composition solution and drying the polymer composition solution in an ignition drier of 105° C. for 1 hour, the acid value of the obtained polymer of the ink for ink jet recording was 30 mgKOH/g, and the weight average molecular weight thereof was 31000.

(Evaluation Test 1: Valuation Method of Friction Resistance)

Solid printing was carried out on a photo paper <gloss> (made by Seiko Epson Co., Ltd.) using inks for ink jet recording according to examples XVII-1 to 11 and Reference Examples XVII-1 to 19 and an ink jet printer (EM-930C, made by Seiko Epson Co., Ltd.) to obtain test bodies. A printing mode of paper: photo printing paper, printing quality: photo, color correction: none and printing direction: both directions was carried out. A fixing property evaluation test was then carried out, in which the test body is rubbed by a line marker applying a load of 300 g to the test body. The fixing property evaluation test was carried out by using the above test body (photo paper <gloss>) and observing the exfoliation situation of ink when a printed surface and a rear surface were overlapped with a load of 300 g and moved at a speed of 1 m/s. In Table XIV-2, S indicates that there was no rub-off when the photo paper was moved 3 times, AA indicates that there was no rub-off even when the photo paper was moved 2 times, but there was slight rub-off when the photo paper was moved 3 times, A indicates that there was no rub-off in 1 time, but there was slight rub-off when the photo paper was moved 2 times, B indicates that there was slight rub-off, C indicates that there was rub-off and transfer onto the rear surface, and D indicates that there was considerable rub-off and transfer onto the rear surface.

Evaluation Test 2: Valuation Method of Coloration Property on Regular Paper

Solid printing was carried out on Xerox P paper (made by Fuji Xerox) using ink jet inks according to Examples 1 to 11 and Reference Examples 1 to 19 in Example XVII and an ink jet printer (EM-930C, made by Seiko Epson Co., Ltd.) to obtain test bodies. A printing mode of paper: regular paper, printing quality: super fine, color correction: none and printing direction: both directions was carried out. The OD (Optical Density) of each of the colors was measured using GRETAGMACBETH SPECTROSCAN SP 50 (made by Gretag Corp. (US) (measurement condition; light source: D50 and viewing angle: 2 degrees). The results are shown as OD value in Table XVII-1.

Evaluation Test 3: Valuation Method of Glossiness

Solid printing was carried out on a photo paper <gloss> (made by Seiko Epson Co., Ltd.) using ink jet inks according to Examples 1 to 11 and Reference Examples 1 to 19 in Example XVII and an ink jet printer (EM-930C, made by Seiko Epson Co., Ltd.) to obtain test bodies. A printing mode of paper: photo printing paper, printing quality: photo, color correction: none and printing direction: both directions was carried out. The glosses of 20 degrees of the test bodies were measured by a gloss meter (HG-268, made by Suga Test Instruments Co., Ltd.). The results are shown in Table XVII-1.

Evaluation Test 4: Valuation Method of Dispersibility

In Example XVII, the average particle size of particles in the ink jet inks according to Examples 1 to 11 and Reference Examples 1 to 19 was measured by a laser particle diameter analyzer (Zetasizer 3000, made by Malvern Instruments, Ltd. (Britain)).

Evaluation Test 4: Valuation Method of Storage Stability

In Example XVII, the initial viscosity of the pigment dispersion for ink jet ink used for Examples 1 to 11 and Reference Examples 1 to 19 and the viscosity after settling for one week at 70° C. were measured by a rolling ball type viscosity meter (AMVn, made by Anton Paar GmbH (Germany)). The results are shown as the value of storage stability: initial viscosity (mPa·S) after settling for one week at 70° C./initial viscosity (mPa·S) in Tables XVII-1. Monomer compositions, polymerization initiators, pigments and ink jet ink compositions used when producing the ink jet ink are also shown in Table XVII-1.

TABLE XVII-1

| | Example 1 | Example 2 | Example 3 | Example 4 | Example 5 | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|---|---|---|---|---|
| BZA | 363.0 | 363.0 | 363.0 | 363.0 | 363.0 | 483.0 | 363.0 | 363.0 | 363.0 | 363.0 | 363.0 | 363.0 | 483.0 |
| AA | 50.4 | 36.5 | 42.6 | 77.5 | 93.0 | 100.8 | 116.3 | 155.0 | 50.4 | 36.5 | 50.4 | 36.5 | 100.8 |
| MAA | — | 13.2 | — | — | — | — | — | — | 20.0 | 13.2 | 3.1 | 13.2 | — |
| BPEH | 5.6 | 5.6 | 5.6 | 5.6 | 5.6 | 5.6 | 5.6 | 5.6 | — | 15.0 | — | 5.6 | 5.6 |
| LA | 120.0 | — | 120.0 | 120.0 | 120.0 | — | 120.0 | 120.0 | 120.0 | 120.0 | 120.0 | 120.0 | — |
| PEG200A | — | 120.0 | — | — | — | — | — | — | — | — | — | — | — |
| PBk7 | — | — | — | — | — | — | — | — | — | — | — | 120.0 | 480.0 |
| PB15:1 | 480.0 | 480.0 | 480.0 | 480.0 | 480.0 | 480.0 | 480.0 | 480.0 | 480.0 | 480.0 | 480.0 | 480.0 | — |
| Acid value (mgKOH/g) | 65 | 60 | 55 | 100 | 120 | 65 | 150 | 200 | 65 | 60 | 65 | 60 | 130 |
| Average molecular weight | 33000 | 31000 | 45000 | 27000 | 33000 | 27000 | 32000 | 27000 | 10000 | 17000 | 120000 | 30000 | 27000 |
| Fixation property | AA | AA | AA | AA | AA | AA | A | B | D | C | D | A | B |
| OD | 1.20 | 1.21 | 1.21 | 1.18 | 1.12 | 1.20 | 0.93 | 0.89 | 1.11 | 1.11 | 1.09 | 1.30 | 1.00 |
| Glossiness | 82.6 | 79.1 | 79.1 | 81.1 | 79.3 | 71.9 | 72.3 | 75.9 | 53.4 | 53.2 | 32.3 | 63.8 | 56.2 |
| Average particle size (nm) | 72 | 71 | 70 | 70 | 67 | 70 | 78 | 97 | 104 | 99 | 123 | 99 | 114 |
| Stability | 1.02 | 1.10 | 1.06 | 1.07 | 1.12 | 1.03 | 2.36 | 2.65 | 109.60 | 64.80 | 15.60 | 0.98 | 1.95 |

| | Reference Example 9 | Reference Example 10 | Reference Example 11 | Example 8 | Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
|---|---|---|---|---|---|---|---|---|---|---|---|---|---|---|---|
| BZA | 363.0 | 363.0 | 363.0 | 363.0 | 363.0 | 363.0 | 363.0 | 363.0 | 363.0 | 363.0 | 363.0 | 363.0 | 363.0 | 363.0 | 363.0 |
| AA | 36.5 | 50.4 | 23.3 | 50.4 | 36.5 | 100.8 | 36.5 | 50.4 | 23.3 | 50.4 | 36.5 | 100.8 | 36.5 | 50.4 | 23.3 |
| MAA | 13.2 | — | — | — | 13.2 | — | 13.2 | — | — | — | 13.2 | — | 13.2 | — | — |
| BPEH | 5.6 | 3.1 | 5.6 | 5.6 | 5.6 | 5.6 | 5.6 | 3.1 | 5.6 | 5.6 | 5.6 | 5.6 | 5.6 | 3.1 | 5.6 |
| LA | 15.0 | 120.0 | 120.0 | 120.0 | — | 120.0 | 15.0 | 120.0 | 120.0 | 120.0 | 120.0 | 120.0 | 15.0 | 120.0 | 120.0 |
| PEG200A | 120.0 | — | — | — | 120.0 | — | — | — | — | — | — | — | 120.0 | — | — |
| PBk7 | — | — | — | — | — | — | — | — | — | — | — | — | — | — | — |
| PB15:1 | 480.0 | 480.0 | 480.0 | 480.0 | 480.0 | 480.0 | 480.0 | 480.0 | 480.0 | 480.0 | 480.0 | 480.0 | 480.0 | 480.0 | 480.0 |
| PV19 | — | — | — | — | — | — | — | — | — | — | — | — | — | — | 30 |
| PY74 | — | — | — | — | — | — | — | — | — | — | — | — | — | — | — |
| Acid value (mgKOH/g) | 60 | 65 | 30 | 65 | 60 | 130 | 60 | 65 | 30 | 65 | 60 | 130 | 60 | 65 | 30 |
| Average molecular weight | 17000 | 120000 | 32000 | 32000 | 31000 | 27000 | 16000 | 120000 | 32000 | 33000 | 31000 | 27000 | 17000 | 120000 | 31000 |
| Fixation property | C | D | B | AA | AA | B | C | D | B | AA | AA | B | C | D | B |
| OD | 1.30 | 1.11 | 1.01 | 1.18 | 1.19 | 0.95 | 1.10 | 1.00 | 1.01 | 1.21 | 1.21 | 1.00 | 1.12 | 1.09 | 1.03 |
| Glossiness | 42.3 | 34.1 | 56.6 | 85.7 | 83.3 | 78.2 | 76.3 | 44.4 | 35.0 | 78.5 | 79.7 | 78.5 | 52.3 | 44.2 | 35.1 |
| Average particle size (nm) | 138 | 166 | 154 | 70 | 74 | 74 | 93 | 116 | 127 | 89 | 94 | 92 | 128 | 136 | 143 |
| Stability | 40.30 | 29.60 | 182.30 | 1.06 | 1.10 | 1.12 | 36.80 | 52.40 | 163.40 | 1.09 | 1.10 | 1.06 | 35.60 | 53.40 | 165.30 |

TABLE XVII-2

Composition example

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | Example 1 | Example 2 | Example 3 | Example 4 | Example 5 | Reference Example 1 | Reference Example 2 | Reference Example 3 | Reference Example 4 | Reference Example 5 | Reference Example 6 | Reference Example 7 | Reference Example 6 | Reference Example 7 | Reference Example 8 |
| PB15:1 | 4 | 4 | 4 | 4 | 4 | 4 | 4 | 4 | 4 | 4 | 4 | 4 | — | — | — |
| PBk7 | — | — | — | — | — | — | — | — | — | — | — | — | 5 | 5 | 5 |
| PV19 | — | — | — | — | — | — | — | — | — | — | — | — | — | — | — |
| PY74 | — | — | — | — | — | — | — | — | — | — | — | — | — | — | — |
| DEGmBE | 0.2 | 0.2 | 0.2 | 0.2 | 0.2 | 0.2 | 0.2 | 0.2 | 0.2 | 0.2 | 0.2 | 0.2 | — | — | — |
| TEGmBE | 1 | 1 | 1 | 1 | 1 | 1 | 1 | 1 | 1 | 1 | 1 | 1 | — | — | — |
| PGmBE | — | — | — | — | 0.1 | — | — | — | — | — | — | — | — | — | — |
| DPGmBE | — | — | — | — | 0.1 | — | — | — | — | — | — | — | 2 | 3 | 4 |
| BEPD | 0.1 | 0.1 | 0.1 | 0.1 | 0.1 | 0.1 | 0.1 | 0.1 | 0.1 | 0.1 | 0.1 | 0.1 | 0.7 | 0.7 | 0.7 |
| 1,2-HD | 0.7 | 0.7 | 0.7 | 0.7 | 0.7 | 0.7 | 0.7 | 0.7 | 0.7 | 0.7 | 0.7 | 0.7 | 3 | 3 | 3 |
| Glucerin | 4 | 4 | 4 | 4 | 4 | 4 | 4 | 4 | 4 | 4 | 4 | 4 | 10 | 10 | 10 |
| TMP | 15 | 15 | 15 | 15 | 15 | 15 | 15 | 15 | 15 | 15 | 15 | 15 | 4 | 4 | 4 |
| Olfine E1010 | 7 | 7 | 7 | 7 | 7 | 7 | 7 | 7 | 7 | 7 | 7 | 7 | 0.1 | 0.1 | 0.1 |
| Surfinol 104 | 0.1 | 0.1 | 0.1 | 0.1 | 0.1 | 0.1 | 0.1 | 0.1 | 0.1 | 0.1 | 0.1 | 0.1 | 0.15 | 0.15 | 0.15 |
| Ion exchange water | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | 0.15 Residual quantity | Residual quantity | Residual quantity | Residual quantity |

Composition example

| | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| | Reference Example 9 | Reference Example 10 | Reference Example 11 | Example 8 | Example 9 | Reference Example 12 | Reference Example 13 | Reference Example 14 | Reference Example 15 | Example 10 | Example 11 | Reference Example 16 | Reference Example 17 | Reference Example 18 | Reference Example 19 |
| PB15:1 | — | — | — | — | — | — | — | — | — | — | — | — | — | — | — |
| PBk7 | 5 | 5 | 5 | 5 | 5 | 5 | 5 | 5 | 5 | — | — | — | — | — | — |
| PV19 | — | — | — | — | — | — | — | — | — | 5 | 5 | 5 | 5 | 5 | 5 |
| PY74 | — | — | — | — | — | — | — | — | — | — | — | — | — | — | — |
| DEGmBE | — | — | — | 0.3 | 0.3 | 0.3 | 0.3 | 0.3 | 0.3 | — | — | — | — | — | — |
| TEGmBE | 4 | 5 | 6 | 1 | 1 | 1 | 1 | 1 | 1 | 1 | 1 | 1 | 1 | 1 | 1 |
| PGmBE | — | — | — | — | 0.1 | — | — | — | — | — | — | — | — | — | — |
| DPGmBE | — | — | — | — | — | — | — | — | — | — | — | — | — | — | — |
| BEPD | 0.7 | 0.7 | 0.7 | 0.7 | 0.7 | 0.7 | 0.7 | 0.7 | 0.7 | 0.1 | 0.1 | 0.1 | 0.1 | 0.1 | 0.1 |
| 1,2-HD | 3 | 3 | 3 | 4 | 4 | 4 | 4 | 4 | 4 | 0.7 | 0.7 | 0.7 | 0.7 | 0.7 | 0.7 |
| Glucerin | 10 | 10 | 10 | 5 | 5 | 5 | 5 | 5 | 5 | 4 | 4 | 4 | 4 | 4 | 4 |
| TMP | 4 | 4 | 4 | — | — | — | — | — | — | 10 | 10 | 10 | 10 | 10 | 10 |
| Olfine E1010 | 0.1 | 0.1 | 0.1 | 0.15 | 0.15 | 0.15 | 0.15 | 0.15 | 0.15 | 5 | 5 | 5 | 5 | 5 | 5 |
| Surfinol 104 | 0.15 | 0.15 | 0.15 | — | — | — | — | — | — | 0.15 | 0.15 | 0.15 | 0.15 | 0.15 | 0.15 |
| Ion exchange water | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity | Residual quantity |

The brevity codes used in Table XVII-1 to 2 are explained as follows.
BZA: benzyl acrylate
AA: acrylic acid
MAA: methacrylic acid
BPEH: t-butylperoxy(2-ethylhexanoate)
LA: lauryl acrylate
PEG200A: polyethylene glycol 200 acrylate
PBk7: C.I. Pigment Black 7 (carbon black)
PB15:1: C.I. Pigment Blue 15:1 (trichloro phthalocyanine)
PV19: C.I. Pigment Violet 19 (quinacridone)
PY74: C.I. Pigment Yellow 74 (condensed azo pigment)
DEGmBE: diethylene glycol mono butyl ether
TEGmBE: triethylene glycol mono butyl ether
PGmBE: propylene glycol mono butyl ether
DPGmBE: dipropylene glycol mono butyl ether
BEPD: 2-butyl-2-ethyl-1,3-propanediol
1,2-HD: 1,2-hexanediol
TMP: trimethylolpropane As is clear from the results of Table XVII-1 and Table XVII-2, the evaluation tests 1 to 5 showed excellent results when the ink jet inks according to Examples 1 to 11 in Example XVII were used. However, when the ink jet inks according to the Reference Examples 1 to 19, excellent results were not shown in any one or a plurality of items of the revaluation tests 1 to 5.

The present invention claims the benefit of priority from Japanese Patent Application No. 2004-307763 filed on Oct. 22, 2004, Japanese Patent Application No. 2005-094813 filed on Mar. 29, 2005, Japanese Patent Application No. 2005-094818 filed on Mar. 29, 2005, Japanese Patent Application No. 2005-094819 filed on Mar. 29, 2005, Japanese Patent Application No. 2005-094820 filed on Mar. 29, 2005, Japanese Patent Application No. 2005-292131 filed on Oct. 5, 2005, Japanese Patent Application No. 2005-292132 filed on Oct. 5, 2005, Japanese Patent Application No. 2005-292133 filed on Oct. 5, 2005, Japanese Patent Application No. 2005-292134 filed on Oct. 5, 2005, Japanese Patent Application No. 2005-292135 filed on Oct. 5, 2005, Japanese Patent Application No. 2005-292136 filed on Oct. 5, 2005, Japanese Patent Application No. 2005-292139 filed on Oct. 5, 2005, Japanese Patent Application No. 2005-292140 filed on Oct. 5, 2005, Japanese Patent Application No. 2005-292141 filed on Oct. 5, 2005, Japanese Patent Application No. 2005-292142 filed on Oct. 5, 2005, Japanese Patent Application No. 2005-292144 filed on Oct. 5, 2005, and Japanese Patent Application No. 2005-292145 filed on Oct. 5, 2005, the contents of all of which are incorporated by reference herein in their entirety.

INDUSTRIAL APPLICABILITY

The present invention can be applied to the production of the recorded matter by the ink jet recording method.

The invention claimed is:

1. An ink for ink jet recording comprising:
water; at least one compound selected from the group consisting of 2,4,7,9-tetramethyl-5-decyne-4,7-diol, 3,6-dimethyl-4-octyne-3,6-diol, an alkylene oxide adduct of 2,4,7,9-tetramethyl-5-decyne-4,7-diol, and an alkylene oxide adduct of 3,6-dimethyl-4-octyne-3,6-diol, said compound being present in the ink in an amount of no less than 0.05% by weight and no more than 1% by weight; and
a pigment dispersed by using a polymer which is obtained by polymerizing at least 50% by weight or more of benzyl acrylate and/or cyclohexyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000 such that the polymer provides the ink with the capability of forming print on gloss paper having a glossiness value at 20° of at least 27.8%.

2. The ink for ink jet recording according to claim 1, wherein the pigment includes PY74 as a yellow pigment, at least one selected from PV19, PR122, PR177 and PR254 as a magenta pigment, or PB15:1 as a cyan pigment.

3. The ink for ink jet recording according to claim 2, wherein the dispersed particle diameter of the yellow pigment is no less than 90 nm and no more than 110 nm, and the primary particle diameter thereof is no less than 30 nm and no more than 80 nm.

4. The ink for ink jet recording according to claim 2, wherein the dispersed particle diameter of the magenta pigment is no less than 20 nm and no more than 100 nm, and the primary particle diameter thereof is no less than 20 nm and no more than 70 nm.

5. The ink for ink jet recording according to claim 2, wherein the dispersed particle diameter of the cyan pigment is no less than 20 nm and no more than 100 nm, and the primary particle diameter thereof is no less than 20 nm and no more than 70 nm.

6. The ink for ink jet recording according to claim 1, comprising no less than 1% by weight and no more than 20% by weight of trimethylolpropane.

7. The ink for ink jet recording according to claim 1, comprising no less than 0.1% by weight and no more than 10% by weight of 2-buthyl-2-ethyl-1,3-propanediol.

8. The ink for ink jet recording according to claim 1, further comprising at least one kind of resin fine particles containing a polymer which is obtained by polymerizing at least 50% by weight or more of benzyl acrylate and 15% by weight or less of (meth)acrylic acid as components of the polymer and has an acid value of 50 mgKOH/g to 120 mgKOH/g and a weight average molecular weight of no less than 20000 and no more than 120000 in the form of a resin emulsion.

9. The ink for ink jet recording according to claim 8, wherein the polymer used for the resin emulsion includes 50% or more of the same component as that of the polymer used for the pigment dispersion in terms of weight ratio.

10. The ink for ink jet recording according to claim 8, wherein the average particle size of the resin fine particles contained as the resin emulsion is 30 to 150 nm.

11. The ink for ink jet recording according to claim 8, wherein 0.1 to 10% by weight of the resin fine particles contained as the resin emulsion is contained based on the total amount of ink.

12. The ink for ink jet recording according to claim 1, comprising at least (i) 0.5 to 15% by weight of 1,2-alkylene glycol of $C_4$ to $C_{10}$, and (ii) 5 to 30% by weight of polyhydric alcohols of $C_{10}$ or less except the 1,2-alkylene glycol.

13. The ink for ink jet recording according to claim 12, wherein the sum of the contents of the 1,2-alkylene glycol and the polyhydric alcohols is 6 to 40% by weight.

14. The ink for ink jet recording according to claim 12, wherein the content ratio of the 1,2-alkylene glycol to the polyhydric alcohols is 1:50 to 1:1.5.

15. The ink for ink jet recording according to claim 12, comprising 0.5 to 15% by weight of glycol ethers represented by $R^1O-(C_mH_{2m}O)n-R^2$, where m and n are an integer of 1 or more; $m \times n \leq 10$; $R^1$ and $R^2$ are an alkyl group having $C_8$ or less; and $R^1$ and $R^2$ may be the same or different.

16. The ink for ink jet recording according to claim 15, wherein the content ratio of the 1,2-alkylene glycol to the glycol ethers is 10:1 to 1:10.

17. The ink for ink jet recording according to claim 15, wherein the sum of the contents of the 1,2-alkylene glycol, the polyhydric alcohols and the glycol ethers is 7 to 40% by weight.

18. The ink for ink jet recording according to claim 1, comprising pigment dispersion which is obtained by modifying the polymer on a surface of a self-dispersed pigment particle.

19. The ink for ink jet recording according to claim 1, wherein the pigment includes at least C.I. Pigment Yellow 138.

20. The ink for ink jet recording according to claim 19, wherein the pigment further includes at least C.I. Pigment Yellow 74.

21. The ink for ink jet recording according to claim 20, wherein the content ratio of C.I. Pigment Yellow 138 to the C.I. Pigment Yellow 74 is 20:1 to 1:10 in terms of weight.

22. The ink for ink jet recording according to claim 1, further comprising 10% or more of epoxy(meth)acrylate and/or urethane(meth)acrylate as a component of the polymer.

23. The ink for ink jet recording according to claim 1, comprising 10% or more of a styrene monomer and/or styrene macromonomer as a component of the polymer.

24. The ink for ink jet recording according to claim 1, comprising 10% or more of alkyl(meth)acrylate and/or alkylene glycol(meth)acrylate as a component of the polymer.

25. The ink for ink jet recording according to claim 1, comprising no less than 0.05% by weight and no more than 1% by weight of at least one adduct selected from 2,4,7,9-tetramethyl-5-decyne-4,7-diol and an alkylene oxide adduct of 2,4,7,9-tetramethyl-5-decyne-4,7-diol.

26. The ink for ink jet recording according to claim 1, comprising 1,2-alkylene glycol.

27. The ink for ink jet recording according to claim 1, comprising at least one compound selected from the group consisting of di(tri)ethylene glycol mono butyl ether and (di)propylene glycol mono butyl ether.

28. The ink for ink jet recording according to claim 1, comprising 2-butyl-2-ethyl-1,3-propanediol.

29. An ink set having at least a yellow ink, a magenta ink and a cyan ink, wherein each of the inks comprises:
  water;
  a pigment dispersed by using a polymer which obtained by polymerizing at least 50% by weight or more of benzyl acrylate and 15% by weight or less of (meth)acrylic acid as components of the polymer and has an acid value of no less than 50 mgKOH/g and no more than 120 mgKOH/g and a weight average molecular weight of no less than 20000 and no more than 120000,
  at least one compound selected from the group consisting of 2,4,7,9-tetramethyl-5-decyne-4,7-diol, 3,6-dimethyl-4-octyne-3,6-diol, an alkylene oxide adduct of 2,4,7,9-tetramethyl-5-decyne-4,7-diol, and an alkylene oxide adduct of 3,6-dimethyl-4-octyne-3,6-diol, said compound being present in the ink in an amount of no less than 0.05% by weight and no more than 1% by weight; wherein
  the yellow ink includes PY74 as a pigment, the magenta ink includes at least one selected from the group consisting of PV19, PR122, PR177 and PR254 as a pigment, and the cyan ink includes PB15:1 as a pigment.

30. The ink for ink jet recording according to claim 1, wherein the ink has a storage stability that is such that an initial viscosity of the ink, V(i), and a viscosity of the ink after settling for one week at 70° C., V(f), satisfy a condition that V(f)/V(i) does not exceed 1.04.

* * * * *